US012632517B2

(12) United States Patent
Horton et al.

(10) Patent No.: US 12,632,517 B2
(45) Date of Patent: May 19, 2026

(54) AI-GENERATED DERIVATIVE CONTENT SCALING FOR MERCHANDISE

(71) Applicant: Music IP Holdings (MIH), Inc., Charleston, SC (US)

(72) Inventors: Christopher Horton, Charleston, SC (US); Jeremy Uzan, Charleston, SC (US)

(73) Assignee: Music IP Holdings, Inc., Nashville, TN (US)

( * ) Notice: Subject to any disclaimer, the term of this patent is extended or adjusted under 35 U.S.C. 154(b) by 0 days.

(21) Appl. No.: 19/349,714

(22) Filed: Oct. 3, 2025

(65) Prior Publication Data

US 2026/0030325 A1     Jan. 29, 2026

Related U.S. Application Data

(63) Continuation-in-part of application No. 19/306,731, filed on Aug. 21, 2025, which is a continuation of
(Continued)

(51) Int. Cl.
G06F 21/10          (2013.01)
G06F 16/632        (2019.01)
G06F 40/205        (2020.01)

(52) U.S. Cl.
CPC .......... *G06F 21/106* (2023.08); *G06F 16/632* (2019.01); *G06F 21/1084* (2023.08); *G06F 40/205* (2020.01); *G06F 2221/2137* (2013.01)

(58) Field of Classification Search
CPC .. G06F 21/106; G06F 21/1084; G06F 16/632; G06F 40/205
See application file for complete search history.

(56) References Cited

U.S. PATENT DOCUMENTS 12,019,982 B2     6/2024   Veyseh et al.
12,080,046 B2     9/2024   Saraee et al.
(Continued)

FOREIGN PATENT DOCUMENTS

AU          2004258523 A1     1/2005
CA             2065641 A1     11/2006
(Continued)

OTHER PUBLICATIONS

Atal et al., "A pattern recognition approach to voiced-unvoiced-silence classification with applications to speech recognition", IEEE Transactions on Acoustics, Speech, and Signal Processing (vol. 24, Issue: 3, Jun. 1976), 12 / pgs.
(Continued)

*Primary Examiner* — Khoi V Le

(57)          ABSTRACT

The present disclosure provides a system for generating artist-governed merchandise derivative works, comprising at least one processor and memory storing instructions that, when executed, cause the system to receive a request associated with source content and a transformation theme for creating a merchandise derivative work, evaluate the request against pre-generation preference data associated with a content authority using a knowledge agent maintaining brand guidelines, generate the merchandise derivative work from the source content according to the transformation theme by applying a generative artificial-intelligence model through an action agent, perform post-generation validation against the brand guidelines, generate a digital identifier based on the merchandise derivative work, and enable distribution through a physical merchandise path for tangible products or a virtual merchandise path for digital assets.

19 Claims, 20 Drawing Sheets

Related U.S. Application Data application No. 19/197,818, filed on May 2, 2025, now Pat. No. 12,423,388, which is a continuation-in-part of application No. 18/926,097, filed on Oct. 24, 2024, now Pat. No. 12,322,402.

(60) Provisional application No. 63/592,741, filed on Oct. 24, 2023.

(56) References Cited

U.S. PATENT DOCUMENTS

| | | | | |
|---|---|---|---|---|
| 12,086,857 | B2 | 9/2024 | Kharbanda et al. | |
| 12,105,729 | B1 * | 10/2024 | Haq | G06F 16/93 |
| 12,106,318 | B1 * | 10/2024 | Chiang | G06Q 30/016 |
| 12,106,548 | B1 | 10/2024 | Brudalla et al. | |
| 12,118,325 | B2 * | 10/2024 | Gray | G06F 40/56 |
| 12,118,976 | B1 | 10/2024 | Chen et al. | |
| 12,165,655 | B1 | 12/2024 | Sandrew | |
| 12,204,627 | B2 | 1/2025 | Wexler | |
| 2006/0004669 | A1 | 1/2006 | Ito | |
| 2006/0271494 | A1 | 11/2006 | Ito | |
| 2022/0092267 | A1 | 3/2022 | Hou et al. | |
| 2023/0095092 | A1 | 3/2023 | Xiao et al. | |
| 2023/0100289 | A1 * | 3/2023 | Kare | G06F 16/252 |
| | | | | 707/702 |
| 2023/0377099 | A1 | 11/2023 | Kreis et al. | |
| 2023/0377214 | A1 | 11/2023 | Kansy et al. | |
| 2024/0005604 | A1 | 1/2024 | Kreis et al. | |
| 2024/0095987 | A1 | 3/2024 | Piramutha et al. | |
| 2024/0152544 | A1 | 5/2024 | Aykut et al. | |
| 2024/0185396 | A1 | 6/2024 | Hatamizadeh et al. | |
| 2024/0202795 | A1 * | 6/2024 | Kharbanda | G06Q 30/0627 |
| 2024/0253217 | A1 | 8/2024 | Vahdat et al. | |
| 2024/0282079 | A1 | 8/2024 | Saraee et al. | |
| 2024/0289407 | A1 | 8/2024 | Rofouei et al. | |
| 2024/0304177 | A1 * | 9/2024 | Wu | G06F 40/247 |
| 2024/0312087 | A1 | 9/2024 | Agrawal et al. | |
| 2024/0346629 | A1 | 10/2024 | Harikumar et al. | |

FOREIGN PATENT DOCUMENTS

| | | | |
|---|---|---|---|
| CA | 2605641 | A1 | 11/2006 |
| CA | 2605646 | A1 | 11/2006 |
| CN | 1525363 | A | 9/2004 |
| JP | 2004013493 | A | 1/2004 |
| JP | 2004506947 | A | 3/2004 |
| JP | 2004193843 | A | 7/2004 |
| JP | 2006244075 | A | 9/2006 |
| JP | 3990853 | B2 | 10/2007 |
| JP | 4353651 | B2 | 10/2009 |
| JP | 4456185 | B2 | 4/2010 |
| KR | 100865247 | B1 | 10/2008 |
| WO | 2024097380 | A1 | 5/2024 |
| WO | 2024158853 | A1 | 8/2024 |
| WO | 2024220450 | A1 | 10/2024 |
| WO | 2024243183 | A2 | 11/2024 |

OTHER PUBLICATIONS

Kingma et al., "Auto-Encoding Variational Bayes", Cornell Univ., arXiv: 1312.6114v11 [stat. ML] -, Dec. 10, 2022, pgs.

Sohl-Dickstein et al., "Deep Unsupervised Learning using Nonequilibrium Thermodynamics" Cornell Univ., arXiv:1503. 03585v8 [cs.LG], Nov. 18, 2015. 18 pgs.

Ronneberger et al., "U-Net: Convolutional Networks for Biomedical Image Segmentation", Cornell Univ., arXiv:1505.04597v1 [cs. CV], May 18, 2015, 8 pgs.

Ho et al., "Denoising Diffusion Probabilistic Models", Cornell Univ., arXiv:2006.11239v2 [cs.LG], Dec. 16, 2020, 25 pgs.

Radford et al., "Learning Transferable Visual Models From Natural Language Supervision", Cornell Univ., arXiv:2103.00020v1 [cs. CV], Feb. 26, 2021, 48 pgs.

Dhariwal et al., "Diffusion Models Beat GANs on Image Synthesis", Cornell Univ., arXiv:2105.05233v4 [cs.LG], Jun. 2021, 44 pgs.

Rombach et al., "High-Resolution Image Synthesis with Latent Diffusion Models", Cornell Univ., arXiv:2112.10752v2 [cs.CV], Apr. 13, 2022, 45 pgs.

Blattmann et al., "Semi-Parametric Neural Image Synthesis", Cornell Univ., arXiv:2204.11824v3 [cs.CV], Oct. 24, 2022, 34 pgs.

Karras et al., . . . "Elucidating the Design Space of Diffusion-Based Generative Models", Cornell Univ., arXiv:2206.00364v2 [cs.CV], Oct. 11, 2022, 47 pgs.

Graikos et al., "Diffusion models as plug-and-play priors" Cornell Univ., arXiv:2206.09012v3 [cs.LG], Jan. 8, 2023, 22 pgs.

Luo, "Understanding Diffusion Models: A Unified Perspective", Cornell Univ., arXiv:2208.11970v1 [cs.LG], Aug. 25, 2022, 23 pgs.

Ruiz et al., "DreamBooth: Fine Tuning Text-to-Image Diffusion Models for Subject-Driven Generation", Cornell Univ., arXiv:2208. 12242v2 [cs.CV], Mar. 15, 2023, 25 pgs.

Yang et al., "Diffusion Models: A Comprehensive Survey of Methods and Applications", Cornell Univ., arXiv:2209.00796v9 [cs.LG], Oct. 24, 2022, 39 pgs.

Yang et al., "Diffusion Models: A Comprehensive Survey of Methods and Applications", Cornell Univ., arXiv:2209.00796v13 [cs. LG], Oct. 24, 2022, 39 pgs.

Lipman et al., "Flow Matching for Generative Modeling", Cornell Univ., arXiv:2210.02747v2 [cs.LG], Feb. 8, 2023, 28 pgs.

Peebles et al., "Scalable Diffusion Models with Transformers", Cornell Univ., arXiv:2212.09748v2 [cs.CV], Mar. 2023, 25 pgs.

Schneider et al., "MoOsai: Text-to-Music Generation with Long-Context Latent Diffusion", Cornell Univ., arXiv:2301.11757v2 [cs. CL], Jan. 30, 2023, 13 pgs.

Fei, et al., "Generative Diffusion Prior for Unified Image Restoration and Enhancement", Cornell Univ., arXiv:2304.01247v1 [cs. CV], Apr. 3, 2023, 46 pages.

Ghosal, et al., "Text-to-Audio Generation using Instruction-Tuned LLM and Latent Diffusion Model", Cornell Univ., arXiv:2304. 13731v2 [eess.AS], May 29, 2023, 15 pages.

Liu, et al., AudioLDM: Text-to-Audio Generation with Latent Diffusion Models', Cornell Univ., arXiv:2301.12503v3 [cs.SD], Sep. 9, 2023, 25 pages.

Wei, et al., "ELITE: Encoding Visual Concepts into Textual Embeddings for Customized Text-to-Image Generation", Cornell Univ., arXiv:2302.13848v2 [cs.CV], Aug. 18, 2023, 16 pages.

Zhang, et al., "A Survey on Audio Diffusion Models: Text to Speech Synthesis and Enhancement in Generative AI", Cornell Univ., arXiv:2303.13336v2 [cs.SD], Apr. 2, 2023, 18 pages.

Nikkiran, et al., "Step-by-Step Diffusion: An Elementary Tutorial", Cornell Univ., arXiv:2406.08929v2 [cs.LG], Jun. 23, 2024, 51 pages.

Copet, et al., "Simple and Controllable Music Generation", Cornell Univ., arXiv:2306.05284v3 [cs. SD], Jan. 30, 2024, 17 pages.

Li, et al., "JEN-1: Text-Guided Universal Music Generation with Omnidirectional Diffusion Models", Cornell Univ., arXiv:2308. 04729v1 [cs. SD], Aug. 9, 2023, 12 pages.

Yao, et al., "JEN-1 Composer: A Unified Framework for High-Fidelity Multi-Track Music Generation", Cornell Univ., arXiv:2310. 19180v2 [cs.SD], Nov. 3, 2023, 12 pages.

Xue, et al., "Auffusion: Leveraging the Power of Diffusion and Large Language Models for Text-to-Audio Generation", Cornell Univ., arXiv:2401.01044v1 [cs.SD], Jan. 2, 2024, 17 pages.

Zheng, et al., "BAT: Learning to Reason about Spatial Sounds with Large Language Models", Cornell Univ., arXiv:2402.01591v2 [eess. AS], May 25, 2024, 16 pages.

Sammani, et al., "Interpreting and Analyzing CLIP's Zero-Shot Image Classification via Mutual Knowledge", Cornell Univ., arXiv:2410. 13016v2 [cs.CV], Oct. 20, 2024, 28 pages.

Sammani, et al., "Interpreting and Analyzing CLIP's Zero-Shot Image Classification via Mutual Knowledge", Cornell Univ., arXiv:2410. 13016v1 [cs.CV], Oct. 16, 2024, 28 pages.

Chen, et al., "F5-TTS: A Fairytaler that Fakes Fluent and Faithful Speech with Flow Matching", Cornell Univ., arXiv:2410.06885v2 [eess.AS], Oct. 15, 2024, 18 pages.

(56)　　　　　References Cited

OTHER PUBLICATIONS

Chen, et al., "Contrastive Localized Language-Image Pre-Training", Cornell Univ., arXiv:2410.02746v1 [cs.CV], Oct. 3, 2024, 20 pages.
Xin, et al., "DiffATR: Diffusion-based Generative Modeling for Audio-Text Retrieval", Cornell Univ., arXiv:2409.10025v2 [cs.SD], Oct. 17, 2024, 5 pages.
Chen, et al., "JEN-1 DreamStyler: Customized Musical Concept Learning via Pivotal Parameters Tuning", Cornell Univ., arXiv:2406.12292v1 [cs.SD], Jun. 28, 2024, 13 pages.
Chan, Stanley, H., "Tutorial on Diffusion Models for Imaging and Vision", Cornell Univ., arXiv:2403.18103v2 [cs.LG], Sep. 6, 2024, 89 pages.
Tu, et al., "A Closer Look at the Robustness of Contrastive Language-Image Pre-Training (CLIP)", Cornell Univ., arXiv:2402.07410v1 [cs.CV], Feb. 12, 2024, 14 pages.
Esser, et al., "Scaling Rectified Flow Transformers for High-Resolution Image Synthesis", Cornell Univ., arXiv:2403.03206v1 [cs.CV], Mar. 5, 2024, 28 pages.
Bansal, et al., "Universal Guidance for Diffusion Models", Cornell Univ., arXiv:2302.07121v1 [cs.CV], Feb. 14, 2023, 10 pages.
Young, Mike, "A Complete Guide to Turning Text into Audio with Audio-LDM", retrieved from the internet on Oct. 20, 2024, https://notes.airmodels.fyi/audio-ldm-ai-text-to-audio-generation-with-latent-diffusion-models/, 9 pages.
"Lecture 14: LPC speech synthesis and autocorrelation-based pitch tracking", ECE 417, Multimedia Signal Processing, Oct. 10, 2019, 37 pages.
Ribeiro, Andre, "Linking Images and Text with OpenAI CLIP", Tawards Data Scoemce. retrieved from the internet on Oct. 22, 2024, https://towardsdatascience.com/linking-images-and-text-wth-openai-clip-abb4bdf5dbd2, 23 pages.
Copet, Jade, "MusicGen: Simple and Controllable Music Generation", GitHub, retrieved from the internet on Oct. 20, 2024, https://github.com/facebookresearch/audiocraft/blob/main/docs/MUSICGEN.md, 10 pages.
Agostinelli, et al., "MusicLM: Generating Music From Text", Cornell Univ., arXiv:2301.11325v1 [cs. SD], Jan. 26, 2023, 15 pages.
Microsoft Copilot: Your AI Companion, retrieved from the internet on Oct. 23, 2024, https://copilot. microsoft.com/?FORM=hpcodx&showconv=1, 3 pages.
Graf et al., "Features for voice activity detection: a comparative analysis", EURASIP Journal on Advances in Signal Processing, a SpringerOpen Journal, 2015, 15 pages.
"SELD SpatialSoundQA", GitHub, retrieved from the internet on Oct. 20, 2024, https://github.com/X-LANCE/SLAM-LLM/blob/main/examples/seld_spatialsoundqa/README.md, 4 pages.
Radford, et al., "Contrastive Language-Image Pretraining", CLIP Explained, Papers With Code, retrieved from the internet on Oct. 22, 2024, https://paperswithcode.com/method/clip, 5 pages.
Huang, et al., "Make-An-Audio: Text-To-Audio Generation with Prompt-Enhanced Diffusion Models", Cornell Univ., arXiv:2301.12661v1 [cs. SD], Jan. 30, 2023, 16 pages.
Aguilera, Frank Morales, "Open AI Clip: Bridging Text and Images", The Deep Hub, https://medium.com/thedeephub/openai-clip-bridging-text-and-images-aaf3cd20299e, Apr. 11, 2024, 15 pages.
Ramponi, Marco, "Recent developments in Generative AI for Audio", AssemblyAI, retrieved from the internet on Oct. 20, 2024, https://www.assemblyai.com/blog/recent-developments-in-generative-ai-for-audio/, 34 pages.
Weng, Lilian, "What are Diffusion Models?", GitHub, Jul. 11, 2021, https://lilianweng.github.io/posts/2021-07-11-diffusion-models/#reverse-diffusion-process, 25 pages.
O'Connor, Ryan, "Automatic summarization with LLMs in Python", AssemblyAI, retrieved from the internet on Oct. 20, 2024, https://www.assemblyai.com/blog/automatic-summarization-llms-python/, 12 pages.
"Apply LLMs to audio files, Learn how to leverage LLMs for speech using LeMUR", Assembly AI, retrieved from the internet on Oct. 20, 2024, https://www.assemblyai.com/docs/getting-started/apply-llm-to-audio-files, 5 pages.
"Building In-Video Search", Netflix Technology Blog, Nov. 6, 2023, 12 pages.
Stevens, Ingrid, "Chat with Your Audio Locally: A guide to RAG with Whisper, Ollama, and FAISS", Medium, Nov. 19, 2023, https://medi um. com/@ingridstevens/chat-with-your-audio-locally-a-gui de-to-rag-with-whisperollama-and-faiss-6656b040a68, 9 pages.
Anderson, Brian, "Reverse-Time Diffusion Equation Models", Stochastic Processes and their Applications 12 (1982) 313-326, North-Holland Publishing Company, 14 pages.
"Content Moderation", AssemblyAI, retrieved from the internet on Oct. 20, 2024, https://www.assembyai.com/docs/audio-intelligence/content-moderation, 11 pages.
Muthukumar, "Detecting Voiced, Unvoiced and Silent parts of a speech signal", Medium, Mar. 19, 2024, https://muthuku37.medium.com/detecting-voiced-unvoiced-and-silent-parts-of-a-speech-signal-?4e6fbf5e 75, 26 pages.
"Diffusion Models: A Comprehensive High-Level Understanding", Research Graph, Medium, May 21, 2024, https://medium.com/@researchgraph/diffusion-model-compreshensive-high-level-understanding-55d6ecad2cba, 22 pages.
Larcher, Mario, "Diffusion Transformer Explained", Towards Data Science, Feb. 28, 2024, https://medium.com/towards-data-sciene/diffusion-transforer-explained-e603c4770f7 e, 19 pages.
O'Connor, Ryan, "Introduction to Diffusion Models for Machine Learning" AssemblyAI, May 12, 2022, https://www. assemblyai.com/blog/diffusion-models-for-machine-learning-introduction/, 34 pages.
Andreas, et al., "DRCap_Zeroshot_Audio-Captioning", GitHub, retrieved from the internet on Oct. 20, 2024, https://github.com/X-LANCE/SLAM-LLM/blob/main/examples/drcap_zeroshot_aac/README.md, 3 pages.
Di Pietro, Mauro, "GenAI with Python: Build Agents from Scratch (Complete Tutorial)", Towards Data Science, Sep. 29, 2024, https://towardsdatascience.com/genai-with-python-build-agents-from-scratch-com pletetutorial-4fc1 e0814e2ec, 31 pages.
Ramesh, et al., "Hierarchical Text-Conditional Image Generation with CLIP Latents", Cornell Univ., arXiv:2204.06125v1 [cs.CV], Apr. 13, 2022, 27 pages.
Ramirez, et al., "Voice Activity Detection. Fundamentals and Speech Recognition System Robustness." InTech Open Science Open Minds, 2007, 24 pages.
Swimberghe, Niels, "How to integrate spoken audio into LangChain.js using AssemblyAI", AssemblyAI, Aug. 15, 2023, https://www.assemblyai.com/blog/integrate-audio-langchainjs/, 12 pages.
"A Fairytaler that Fakes Fluent and Faithful Speech with Flow Matching", F5-TTS, retrieved from the internet on Oct. 20, 2024, https:/swivid.github.io.F5-TTS/, 17 pages.
"CLIP: Connecting text and images", OpenAI, Jan. 5, 2021, https://openai.com/index/clip/, 16 pages.
"CLIP", Hugging Face, retrieved from the internet on Oct. 22, 2024, https://huggingface.co/docs/transformers/model_doc/clip, 49 pages.
Rustamy, Fahim, Phd., "CLIP Model and The Importance of Multimodal Embeddings", Towards Data Science, Dec. 11, 2023, https://towardsdatascience.com/clip-model-and-the-importance-of-multimodalembeddings-1c8f6b13bf72, 20 pages.
"Diffusion Models from Scratch", Hugging Face Diffusion Course, retrieved from the internet on Oct. 22, 2024, https://huggingface.co/learn/diffusion-course/en/unit1 /3, 31 pages.
"MC_MusicCaps", GitHub, retrieved from the internet on Oct. 20, 2024, https://github.com/L-LANCES/SLAM-LLM/blob/main/examples/mc_musiccaps/README. md, 2 pages.
Briggs, James, "Quick-fire Guide to Multi-Modal ML With OpenAI's CLIP", Towards Data Science, Aug. 11, 2022, https://towardsdatascience. com/quick-tire-guide-to-multi-modal-ml-with-openais-cli p. 2dad7 e398ac0, 21 pages.
Bouchard, Louis-Francois, "Stable Diffusion for Videos Explained", Towards AI, Nov. 29, 2023, https://pub.towardsai.net/stable-diffusion-for-videos-explained-fawf0b6af3b0, 15 pages.
Erdem, Kemal, "Step by Step visual introduction to Diffusion Models", published Nov. 1, 2023, https://erdem.pl/2023/11/step-by-step-visual-introduction-to-diffusion-models, 15 pages.

(56)                    References Cited

OTHER PUBLICATIONS

"Stable Diffusion: Training Your Own Model in 3 Simple Steps", run:ai, https://www.run.ai.guides/generative-ai/stablediffusion-training, 10 pages.

Stevens, Ingrid, "Uncovering Insights in Audio: An Exploration", GitHub, retrieved from the internet on Oct. 20, 2024, https://github.com/ingridstevens/whisper-audio-transcriber/tree/main, 6 pages.

Palucha, Szymon, "Understanding OpenAI's CLIP model", Medium, Feb. 24, 2024 https://medium.com/@paluchasz/understanding-openais-cl i p-m odel-6b52bade3fa3, 23 pages.

Chen et al., JEN-1 DreamStyler: Customized Musical Concept Learning via Pivotal Parameters Tuning, Cornell Univ., arXiv:2406.12292 [cs.SD], Jun. 18, 2024, 13 pages.

GitHub, "SLAM-MC", retrieved from the internet on Oct. 20, 2024, https://github.com/X-LANCE/SLAM-LLM, 5 pages.

GitHub, "SLAM-LLM", retrieved from the internet on Oct. 20, 2024, https://github.com/X-LANCE/SLAM-LLM, 4 pages.

Huggingface.co Blog, "The Annotated Diffusion Model", retrieved from the internet on Oct. 20, 2024, https://huggingface.co/blog/annotated-diffusion, 38 pages.

Huggingface.co Blog, "Train a Diffusion Model", retrieved from the internet on Oct. 20, 2024, https://huggingface.co/docs/ diffusers/tutorials/basic_training, 12 pages.

IBM, "What are Diffusion Models?", retrieved from the internet on Oct. 22, 2024, 18 pages.

Lil 'Log, "What are Diffusion Models?", retrieved from the internet on Oct. 22, 2024, 25 pages.

Assembly AI, "Topic Detection", retrieved from the internet on Oct. 20, 2024, https://www.assemblyai.com/docs/audiointelligence/topic-detection, 6 pages.

Assembly AI, "Key Phrases", retrieved from the internet on Oct. 20, 2024, https://www.assemblyai.com/docs/audiointelligence/key-phrases, 5 pages.

Assembly All, "Sentiment Analysis", retrieved from the internet Oct. 20, 2024, https://www.assemblyai.com/docs/audio-intelligence/sentiment-analysis, 4 pages.

Assembly AI, "Summarization", retrieved from the internet on Oct. 20, 2024, https://assemblyai.com/docs/audiointelligence/summarization, 6 pages.

Chen et al., "Buildin In-Video Search", Medium, Nov. 6, 2023, https://netflixtechblog.com/building-in-videosearch-936766f0017c, 12 pages.

Atal, Bishnu S.; and Rabiner, Lawrence R.; "A Pattern Recognition Approach to Voiced-Unvoiced-Silence Classification with Applications to Speech Recognition" IEEE Transactions on Acoustics, Speech, and Signal Processing, vol. ASSP-24, No. 3, pp. 201-212; Jun. 1976.

* cited by examiner

MEMORY 205

PROG MEMORY 210

DWGAE 220

FORWARD DIFFUSION PROCESS 245

REVERSE DIFFUSION PROCESS 250

DATA MEMORY 215

DIFFUSION TRAINING DATA 255

MULTIMODAL ENCODER NETWORKS 260

MULTIMODAL DECODER NETWORKS 265

DIFFUSION MODELS 270

CONTENT APPROVAL MODELS 275

REQUESTED THEME 280

FILTER DATABASE 290

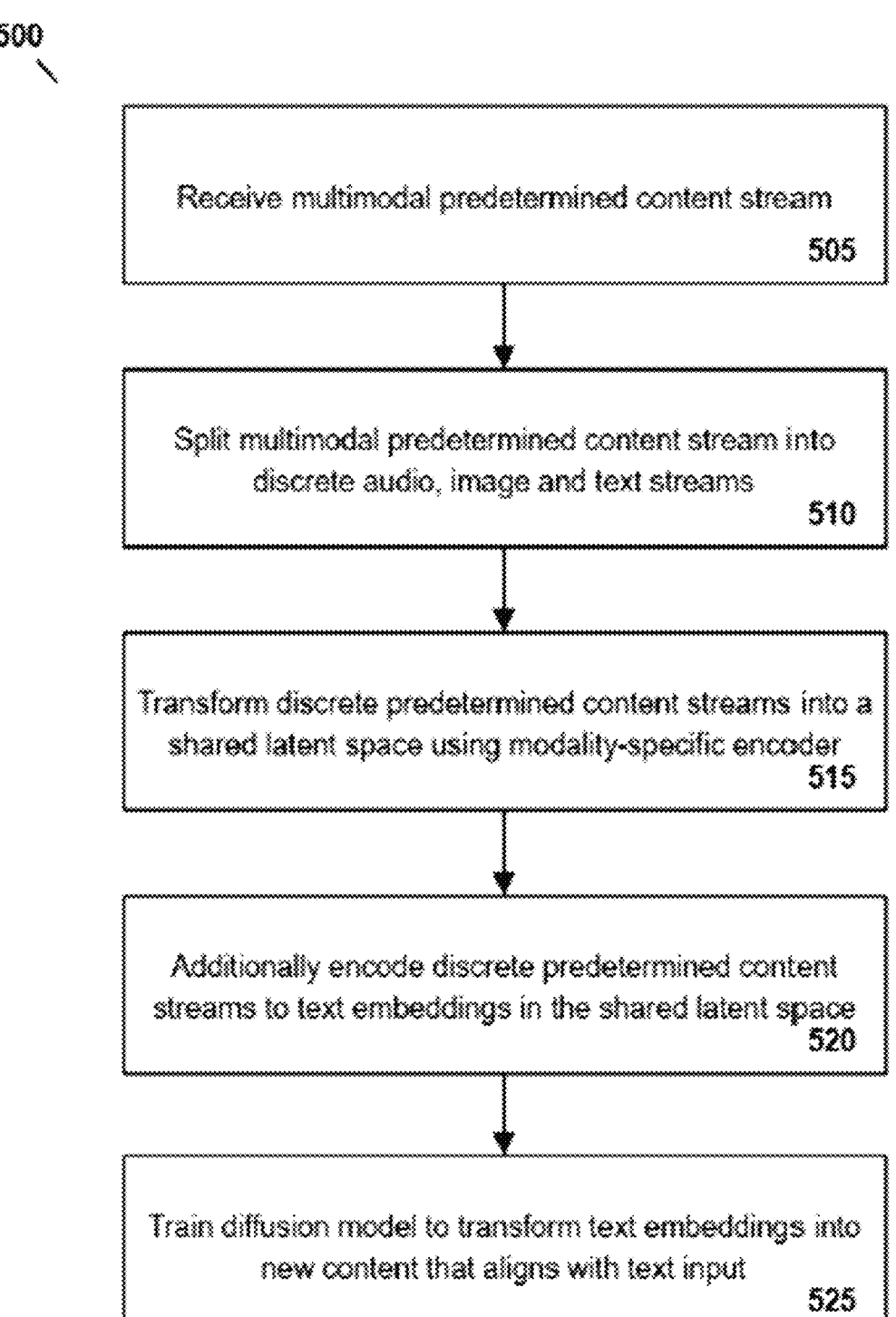

500

Receive multimodal predetermined content stream
505

Split multimodal predetermined content stream into discrete audio, image and text streams
510

Transform discrete predetermined content streams into a shared latent space using modality-specific encoder
515

Additionally encode discrete predetermined content streams to text embeddings in the shared latent space
520

Train diffusion model to transform text embeddings into new content that aligns with text input
525

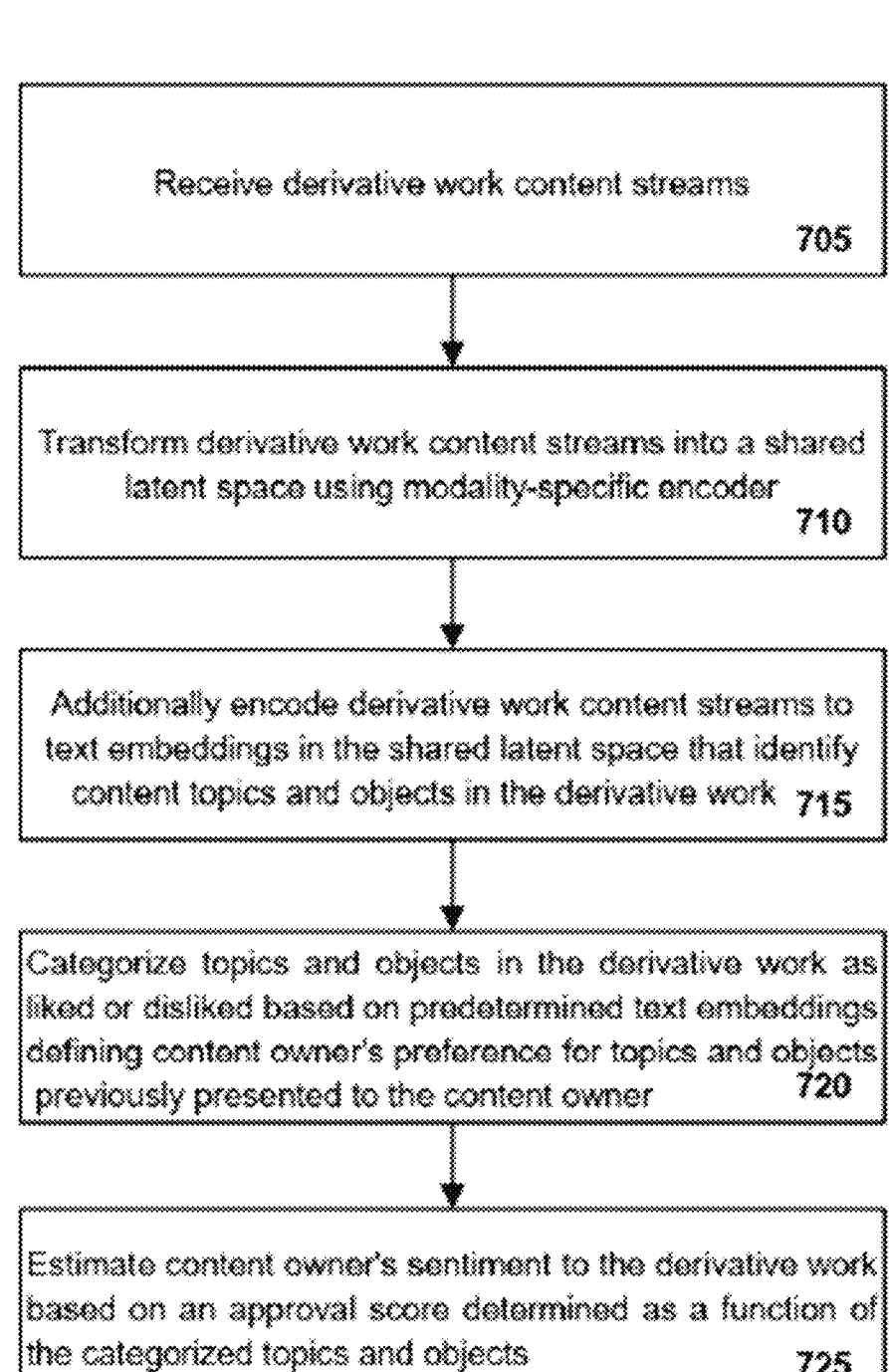

Receive derivative work content streams

705

Transform derivative work content streams into a shared latent space using modality-specific encoder

710

Additionally encode derivative work content streams to text embeddings in the shared latent space that identify content topics and objects in the derivative work

715

Categorize topics and objects in the derivative work as liked or disliked based on predetermined text embeddings defining content owner's preference for topics and objects previously presented to the content owner

720

Estimate content owner's sentiment to the derivative work based on an approval score determined as a function of the categorized topics and objects

AI-GENERATED DERIVATIVE CONTENT SCALING FOR MERCHANDISE

CROSS-REFERENCE TO RELATED APPLICATIONS

This application is a Continuation-in-part of, and claims the benefit of U.S. application Ser. No. 19/306,731, titled "MULTI-STAGE APPROVAL AND CONTROLLED DIS-TRIBUTION OF AI-GENERATED DERIVATIVE CON-TENT" filed on Aug. 21, 2025, which is a Continuation, and claims the benefit of U.S. application Ser. No. 19/197,818, titled "MULTI-STAGE APPROVAL AND CONTROLLED DISTRIBUTION OF AI-GENERATED DERIVATIVE CONTENT" filed on May 2, 2025, which is a Continuation-in-part of, and claims the benefit of U.S. application Ser. No. 18/926,097, titled "AI-GENERATED MUSIC DERIVA-TIVE WORKS" filed on Oct. 24, 2024, which claims the benefit of U.S. Provisional Application No. 63/592,741, titled "AI-GENERATED MUSIC DERIVATIVE WORKS," filed on Oct. 24, 2023, and this application incorporates the entire contents of the above-referenced applications herein by reference.

FIELD OF INVENTION

This disclosure relates generally to content transformation and management using artificial intelligence (AI) and machine learning (ML) technologies.

BACKGROUND

Derivative works are creations that are based on one or more predetermined works. In the case of AI-generated music, derivative works may be created by using AI algo-rithms to analyze and learn from content such as copyrighted music, and then generate new music or other content based on the learned patterns and structures. Such a technique may infringe on the rights of the creator or copyright holder of the predetermined work, through reproduction and transforma-tion without permission. A derivative work may be adverse to preferences of the creator or copyright holder of the predetermined work.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Herein disclosed is a system and/or method for receiving predetermined content, receiving a request to transform the predetermined content into a derivative work, receiving a requested theme for the derivative work, using generative artificial intelligence to create the derivative work generated as a function of the predetermined content and the requested theme, determining if the generated derivative work is approved based on at least one of (1) a machine learning model configured to determine a content approval score as a function of content owner preferences, or (2) predefined rule sets established by content owners that specify permis-sible and/or impermissible transformations for specific con-tent. In some aspects the system and/or method may include, in response to determining the generated derivative work is approved, applying a digital watermark to the approved derivative work, configuring an authorization server to gov-ern use of the approved derivative work based on the digital watermark and providing user access to the authorized derivative work. The requested theme may be determined using a Large Language Model (LLM) and a chatbot inter-view. The generative artificial intelligence may comprise a diffusion model. The content may comprise music.

In some implementations, a content approval process may be based on predefined rule sets, instead of or in addition to, a machine learning model. Such rule sets may be established by content owners and/or content authorities to specify permissible and impermissible transformations for their con-tent without requiring dynamic evaluation or scoring. For example, an artist and/or content authority may allow melody changes but prohibit lyric modifications, or permit instrumentation alterations while restricting vocal transfor-mations. In some implementations, these rules can be encoded as metadata associated with the predetermined content or stored in a filter database, enabling a content derivation platform to immediately determine whether a requested transformation is allowed without requiring an interactive approval process or computing an approval score. In some aspects, such an approach may allow content owners and/or content authorities to maintain precise control over derivative works through explicitly defined boundaries rather than learned preferences. The content derivation plat-form may support both rule-based and machine learning-based approval mechanisms, either separately or in combi-nation, to accommodate different content owner preferences and use cases.

Herein disclosed is a system and/or method for generating merchandisable derivative works from designated source content through artist-governed transformation processes. The system receives a request to generate a derivative work comprising a merchandisable derivative for application to at least one of a physical item or a virtual merchandise item, evaluates the request against transformation constraints derived from preference data, and upon determining com-pliance, applies a generative model to create the derivative work using parameters derived from the preference data. The system evaluates the generated derivative work against output requirements and, upon determining compliance, triggers distribution through one or more of a digital mer-chandise platform, a physical manufacturing system, or a cross-platform digital asset registry.

In some implementations, the system employs multi-agent orchestration comprising a knowledge agent that maintains brand constraints and validates designs, an action agent that applies generative artificial intelligence models to generate derivative works, and distribution agents that man-age physical production and virtual merchandise deploy-ment. The agents engage in iterative bidirectional validation during the generation process, ensuring continuous compli-ance with transformation constraints while enabling creative flexibility within approved parameters. The orchestration may be coordinated by a contract orchestrator that synchro-nizes operations among agents and executes smart contracts for automated revenue distribution to stakeholders.

The system may implement hierarchical rule governance wherein merchandise creation requests are validated against multiple rule levels including global rules establishing non-overridable brand constraints, context-specific rules tied to temporal or geographic conditions, and user-specific rules based on access tiers or verified attributes. Each subordinate rule level inherits constraints from superior levels while potentially adding level-specific modifications, with con-flicts resolved through predetermined override hierarchies that maintain the inviolability of global constraints while permitting contextual flexibility.

In some aspects, the system enables real-time generation of merchandise derivative works during live performances by receiving event data streams comprising current song lyrics, stage visuals, lighting parameters, crowd engagement metrics, or venue location data. Upon identifying trigger events within these data streams, the system generates context-specific merchandise by applying generative models to designated source content using parameters derived from the live event data, with distribution restricted by temporal availability windows or geographic regions to create exclusive, event-specific merchandise.

The system may provide interactive fan co-creation interfaces that enable users to customize merchandise derivative works with real-time validation against transformation constraints. Users select from content libraries, receive AI-generated design variations, apply customizations through intuitive controls, and preview results through photorealistic mockups, augmented reality overlays, or three-dimensional renderings. Modifications are validated in real-time to prevent violations of brand rules, licensing restrictions, or production requirements, with the system providing automated feedback and suggested compliant alternatives when constraints are violated.

In some implementations, the preference data establishing transformation constraints may be generated through machine learning systems trained on historical approval and rejection decisions, enabling autonomous refinement of transformation parameters over time. Content authorities may establish initial parameters through configuration interfaces comprising questionnaires, template libraries, or training modules, with the system subsequently processing high-volume customization requests autonomously without manual intervention. The system may embed multi-layered authentication markers in derivative works, including physical watermarks such as holographic tags or QR codes, and digital identifiers such as metadata embedding or blockchain registration, enabling tracking across distribution channels and enforcement of usage rights.

The foregoing general description of the illustrative embodiments and the following detailed description thereof are merely exemplary aspects of the teachings of this disclosure and are not restrictive.

BRIEF DESCRIPTION OF FIGURES

The following description sets forth exemplary aspects of the present disclosure. It should be recognized, however, that such description is not intended as a limitation on the scope of the present disclosure. Rather, the description also encompasses combinations and modifications to those exemplary aspects described herein.

FIG. 5 depicts a process flow of an exemplary Derivative Work Generation and Augmentation Engine (DWGAE) in an exemplary training mode.

FIG. 7 depicts a process flow of an exemplary Derivative Work Generation and Augmentation Engine (DWGAE) in an exemplary approval mode.

Like reference symbols in the various drawings indicate like elements.

DETAILED DESCRIPTION

Figure 1:
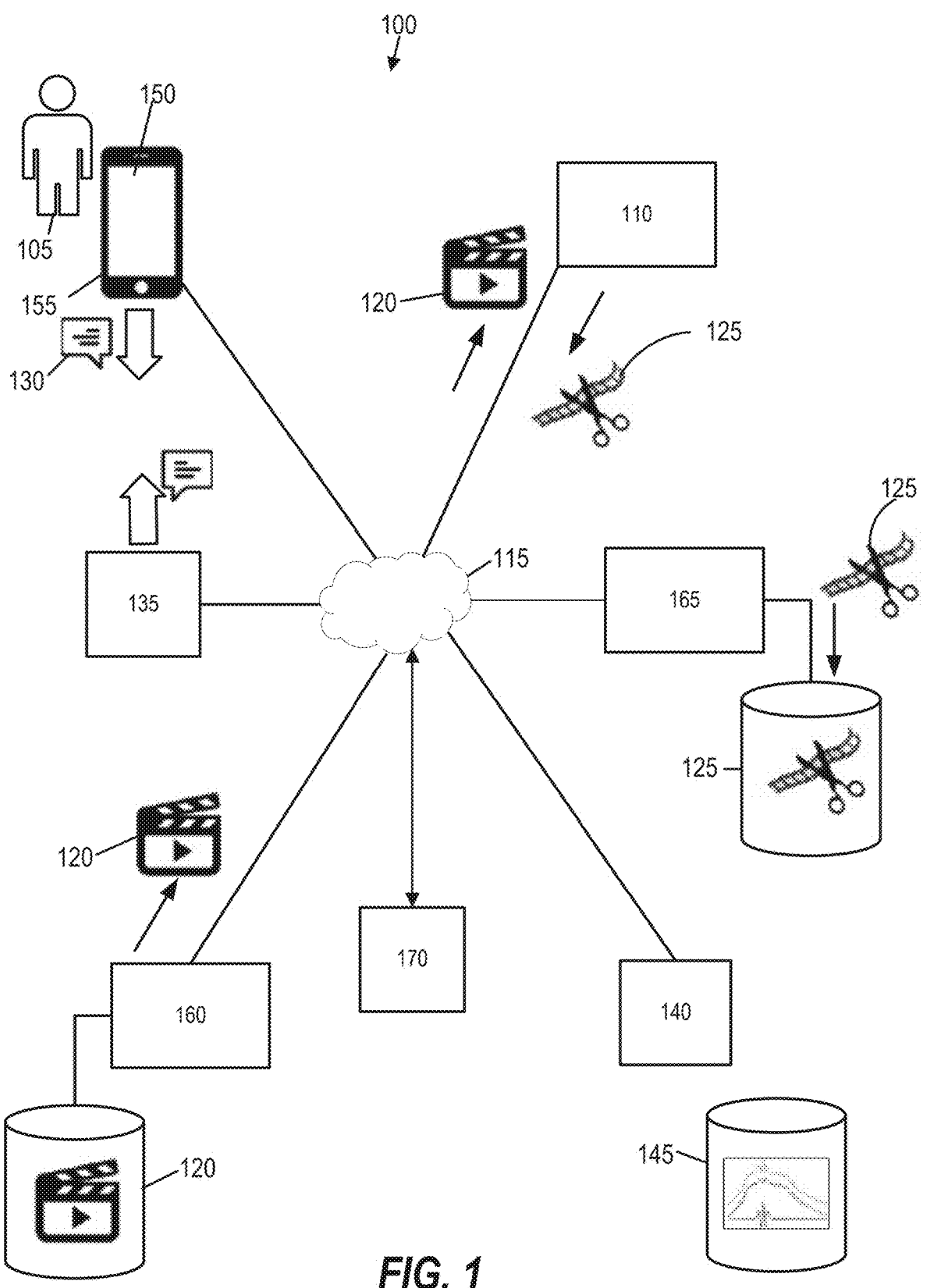
FIG. 1 depicts an illustrative operational scenario wherein users employ an exemplary content derivation platform to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work.

FIG. 1 depicts an illustrative operational scenario wherein users employ an exemplary content derivation platform to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content authority preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work. In some aspects, the term "content authority" may refer to any entity having legitimate control, decision-making power, or governance rights over digital or creative content and its permissible transformations. A content authority may include, but is not limited to, content owner(s), copyright holder(s), licensor(s), designated representative(s), rights management organization(s), or other entities authorized to establish and enforce usage parameters for content. The content authority may be a natural person (such as an artist, creator, or designated individual), a legal entity (such as a corporation, publisher, or production company), or a collective body (such as an industry association or rights management organization). In some implementations, a content authority may be an automated system acting on behalf of and according to parameters established by natural persons or legal entities. The content authority's preferences may evolve over time and may be specified at varying levels of granularity, from general thematic guidelines to specific technical parameters. These preferences form the basis for both pre-generation and post-generation evaluation of derivative work requests and outputs as described in the present disclosure.

In the exemplary scenario 100 depicted by FIG. 1, the user 105 directs the content derivation platform 110 via the network cloud 115 to transform the predetermined content 120 into a derivative work 125. In the depicted implementation, the predetermined content 120 may be received using a database server and/or a predetermined content server 160. In some aspects, the database server may be the same as or similar to the predetermined content server 160. It should be understood that the database server and/or predetermined content server 160 may not necessarily store the predetermined content 120 itself, but rather may track, index, or reference the content while the actual content files may reside in a separate file storage system such as a cloud-based object storage service (e.g., Amazon S3, Google Cloud Storage), a content delivery network, or other dedicated content repositories. This architecture allows for efficient content management while minimizing storage redundancy. The database server and/or predetermined content server may maintain metadata, permissions, and relationship information about the predetermined content 120, while the content derivation platform 110 may access the content directly from its storage location (e.g., predetermined content server 160 and/or database server) when performing transformation operations. Additionally, the content derivation platform 110 may be configured to not retain the uploaded content after the derivative work is created and approved, further enhancing data privacy, data protection, and storage efficiency. In the depicted implementation, the derivative work 125 is determined as a function of a user-specific requested theme 130 received from the user 105 as text input to the prompt system 135. The content derivation platform 110 described herein may also be applied to textual content, including but not limited to lyrics, literary works, and legal documents. For example, the content derivation platform 110 could transform song lyrics according to a requested theme such as "make these lyrics more suitable for a younger audience" or modify legal contracts with themes like "adapt this US-based streaming music contract for UK jurisdiction." The content derivation platform's 110 ability to understand contextual nuances enables it to preserve the essential meaning of predetermined textual content while implementing jurisdiction-specific terminology, formatting requirements, or stylistic modifications requested by the user 105.

The requested theme 130 may range from general stylistic direction to highly specific technical modifications. For example, while a user might request a broad theme such as "make this sound more melancholic" or "transform this into a jazz style," the user could also specify precise technical modifications such as "change this composition from C major key to $B$ minor key," "increase the tempo by 20 BPM," or "replace the piano with a violin." This flexibility in modification specificity allows for both creative stylistic transformations and targeted technical alterations to the predetermined content 120, providing users with comprehensive control over the derivative work's characteristics. In the context of derivative works, transformations may also include inserting a fan's likeness into other types of media. For instance, a user might request that their appearance be incorporated into album artwork, promotional materials, or interactive digital experiences. This could involve placing the fan's likeness among band members in album cover art, featuring them in virtual reality experiences based on the original content, or customizing concert visuals to include elements from locations meaningful to the fan, such as their hometown landmarks or personal spaces. As another example, in the context of music videos, a derivative may involve inserting a likeness of a fan, or changing an element of the video to be in a location identified by the fan. For example, the user might request that a character in the music video appear at the fan's house, school, or car, creating a personalized version of the original content while maintaining the core creative elements of the work. In the depicted implementation, the prompt system 135 includes a chatbot configured to interview the user 105 with questions directed to obtaining the requested theme 130. In the depicted implementation, the content derivation platform 110 creates the derivative work 125 using generative artificial intelligence, based on the predetermined content 120 and the requested theme 130.

In some aspects, the content derivation platform 110 may be configured to perform vocal editing and remixing operations on audio content. These operations may include modifying lyrical content of pre-defined or user-selected sections of existing vocal recordings according to user prompts, generating entirely new vocal and lyrical content for instrumental tracks, and translating existing vocal content into different languages. The prompt system 135 may employ specific moderation parameters for vocal-related prompts that align with content owner preferences stored in the filter database 290. These vocal transformation capabilities maintain the core creative elements of the original work while adapting the lyrical content according to the requested theme 130, with all derivative outputs subject to the same approval and watermarking processes as other content transformations.

In some aspects, the content derivation platform 110 may provide instrumentation editing and remixing capabilities that allow users to modify a track's musical or sonic characteristics via specific prompts. Users may request modifications such as tempo changes (e.g., "Make this track 51 BPM"), style transformations (e.g., "Recompose this track in a jazz style"), emotional shifts (e.g., "Make this track end on a sad note"), or individual instrumentation substitutions (e.g., "Replace the guitar with a saxophone"). These instrumentation-focused transformations operate through the same approval mechanisms as other derivative works, with the prompt system 135 interpreting the musical modification request and the generative artificial intelligence implementing the changes while preserving essential elements of the original composition in accordance with content owner preferences.

In some implementations, the content derivation platform 110 may enable vocalist substitution as an extension of its instrumentation modification capabilities. This feature allows users to replace the lead vocals in an existing recording with the voice of another artist who has consented to such transformations. The system employs one or more vocal isolation algorithms that extract the original vocal stem with minimal artifacts, followed by a voice adaptation process that maps the substitute vocalist's characteristics to the original melody and phrasing. For instance, a user might request that a classic recording such as Elton John's 1972 'Rocket Man' be performed with the user's vocals while maintaining the original instrumental arrangement. When implemented on digital signal processors within streaming platforms, this technology enables real-time vocal substitution activated through simple user interface selections. The selection action itself may trigger the attribution and remuneration system, which ensures appropriate compensation to both the original and substitute artists through the digital watermarking and tracking mechanisms described herein.

In the depicted implementation, the content derivation platform 110 determines if the generated derivative work 125 should be approved for use by the user 105, based on a content approval machine learning model configured to determine a content approval score as a function of a content owner preference and the generated derivative work 125. In some aspects, the content approval process may occur at multiple stages of derivative work creation. While approval may happen after generation of the derivative work 125 to verify that the derivative work 125 does not contain explicit language, infringe on existing works (e.g., reproducing lyrics from an existing song), or relate to objectionable themes, partial approval may also occur prior to generating the derivative work 125. For example, the content derivation platform 110 may verify that the user prompt itself does not include any objectionable themes that the content owner has previously indicated as unacceptable.

In some aspects, using a multi-stage approach allows content owners to establish filtering parameters that reflect their personal or brand values. For instance, if an artist is vegetarian and does not want their voice or style to be used in songs about meat consumption, this preference can be captured by their label ahead of time and provided to the content derivation platform 110. This allows filtering to occur both at the prompt level and at the output level, ensuring alignment with the content owner's values throughout the creation process. In managing derivative work approvals, the artist's comfort and copyright compliance may be considered proactively. For example, common initial preference from artists and rights holders may be to avoid derivative creations that closely replicate their unique voice, musical style, or lyrical content. Thus, incorporating explicit content filtering mechanisms aligned with these preferences becomes an important part of both the initial approval stages and ongoing content generation processes, ensuring artists feel secure and respected in their participation.

The content derivation platform 110 may also enable version remixes that represent more nuanced transformations than complete genre changes or instrumentation substitutions. The version remixes may preserve the original genre and production aesthetic while modifying compositional elements or structural arrangements. For instance, a user might request a version that extends an instrumental break, adds a new transition between sections, or creates an alternative arrangement of the chorus. This capability enables the content derivation platform 110 to provide content similar to the established practice of DJs creating custom 'dubs' or 'edits' for live performances that feature different basslines or drops than the album versions. Users may keep these personalized versions in private streaming playlists for personal enjoyment or, with appropriate permissions, share them on select platforms. The content approval models 275 may evaluate these subtle transformations with the same rigor as more dramatic modifications, ensuring that version remixes maintain the essential character and quality of the original work while allowing for creative reinterpretation within the established musical framework.

Building upon the version remix capabilities, the content derivation platform 110 may further support creation of comprehensive artist album mashups. This functionality provides capability similarly to how artists might reinterpret their own catalog for special releases or live performances, where artists reimagined and recombined their previous works into new compositions for live performances. Through this feature, users could request generative transformations that extract signature elements across an artist's discography and recombine them into cohesive new works that function as a creative reinterpretation of the artist's catalog. Unlike individual track remixes, these album-spanning mashups may create a meta-narrative across an artist's body of work, preserving their distinctive production techniques and sonic signatures while offering novel arrangements and transitions between recognizable musical motifs. The digital watermarking 145 and authorization processes ensure proper attribution and compensation while enabling this deeper form of fan engagement with an artist's catalog.

While content owners or labels may initially wish to manually review derivative works (e.g., derivative work 125) after generation, this approach may not scale effectively as the content derivation platform 110 grows in popularity, as the volume of submissions could potentially overwhelm content owner or label staff. To address this scaling challenge, the content derivation platform 110 may be configured to learn over time, building on an initial detailed questionnaire (for example, updated quarterly) that captures what the label and/or artist will and won't allow. This information is stored in a filter database 290, so that when a user wants to create a derivative work, the system already has substantial data stored for approvals and non-approvals. The filter database 290 may be stored in the memory 205 and/or the data memory 215 and/or located external to the content derivation platform 110. The machine learning model continuously learns and refines these parameters over time, reducing the need for manual review.

In addition to, or instead of, the machine learning approach described above, the content derivation platform 110 may implement a direct rule-based approach that does not require learning or evolution over time. In some aspects, content owners may provide explicit, programmatic rules that are directly applied to user prompts or inputs. Such programmatic rules may not require AI-based analysis or scoring. In some implementations, these rules may specify precise parameters for permissible transformations, such as allowing melody changes but prohibiting lyric modifications, or permitting tempo adjustments while restricting vocal alterations. In some aspects, the rules can be encoded as structured data in the filter database 290, enabling immediate validation of transformation requests against predetermined criteria. This approach provides consistent, predictable results and can be implemented without the computational overhead of machine learning models. In some implementations, content owners may choose to utilize either a rule-based approach, the machine learning approach, or a combination of both depending on specific needs and the complexity of approval requirements. The rule-based approach may allow for rapid implementation and clear communication of boundaries to users.

In some implementations, a portion of the content approval process may be performed by third-party entities 170 (e.g., content verifiers and/or content checkers). The third-party entities 170 may possess expertise in identifying potentially infringing content that could be more comprehensive than capabilities integrated directly within the content derivation platform 110. The content derivation platform 110 may be configured to interface with approved third-party checking services via secure API connections, submitting derivative works for review before final approval. Third-party services may employ proprietary technologies and dedicated teams trained specifically in copyright verification, offering enhanced detection of potential infringement compared to generalized systems. In such implementations, the third-party entities 170 may also manage transaction processes at the point of purchase, providing comprehensive tracking of royalty distributions and usage rights. This architecture provides transparency for content owners regarding the commercial exploitation of their works while maintaining separation between content generation and content approval functions. The third-party entities 170 may maintain detailed audit trails of all approvals, rejections, and financial transactions, providing valuable market data and analytics to content owners and rights holders while ensuring compliance with licensing terms.

In some aspects, the content derivation platform 110 may enforce temporal, quantitative, and/or geographic constraints on derivative work creation. For example, content owners may establish time-based restrictions preventing derivatives during specified periods (such as around an upcoming album release) to avoid market competition with their original recordings. The system may also implement quantity limitations, restricting derivative works to a predetermined maximum per time period (for example, only Z derivatives per month) to prevent market oversaturation. Geographic restrictions may further constrain which users can create derivatives based on their location, allowing content owners to strategically manage derivative creation across different territories (for instance, permitting only X users from a particular region to create derivatives within Y time period and/or permitting only Z derivatives per month from a particular region and/or within Y time period). These constraints may be stored in the filter database 290 and evaluated during the approval process, providing content owners with fine-grained control over derivative work distribution while still enabling creativity within defined boundaries.

In certain contexts, artists may prefer to license AI-generated outputs conditionally within highly controlled and limited-use scenarios. Such controlled environments could include application-based remix contests previously approved by the artist, explicitly preventing derivatives from entering broader distribution channels like commercial streaming services. These scenarios may also specify permissible modifications, such as maintaining original lyrics or limiting lyrical changes to exclude objectionable or sensitive subjects, thus providing a clear framework aligned with the artist's intentions.

The content approval score may be binary rather than a numeric threshold. Rather than generating a continuous value that must exceed a minimum threshold, the approval process may involve evaluating the derivative work 125 against a discrete set of criteria, each of which must be satisfied for approval. For example, the content derivation platform 110 may verify that the derivative work 125 does not contain explicit language, does not infringe on existing works, and aligns with specific content owner guidelines, with failure on any single criterion resulting in rejection regardless of performance on other criteria. This binary approach may simplify the approval process while maintaining strict adherence to content owner preferences.

In implementations where the content approval utilizes a binary pass/fail threshold, the content derivation platform 110 may be configured to generate a remediation report when a derivative work fails to meet approval criteria. This remediation report analyzes the derivative work and identifies specific portions or elements that contributed to the failure, such as objectionable content, unauthorized sampling, or stylistic elements that don't align with content owner preferences. The report provides detailed feedback that can guide users in modifying their requests to create compliant derivative works in subsequent attempts. By pinpointing problematic aspects rather than simply rejecting the work, the system enables a more efficient iterative creation process that respects content owner boundaries while supporting creative exploration.

In response to determining the content approval score is greater than a predetermined minimum, the content derivation platform 110 configures the authorization server 140 to govern use of the approved derivative work 125 based on applying the digital watermark 145 to the derivative work 125. The digital watermark 145 may serve various functions beyond mere control mechanisms. In some aspects, the digital watermark 145 may indicate that the output is AI-generated, providing transparency to consumers. Alternatively, or in addition, the digital watermark 145 may function as a reference pointer to additional information stored elsewhere, such as credits data describing how the music was created, provenance data documenting the creation process, attribution data identifying which elements of training material contributed to the output, licensing information, and/or usage guidelines. In some implementations, the digital watermark 145 itself might directly embed these rules (e.g., binary flags indicating when content can be used for particular functions). The versatility of the digital watermark 145 enables a range of applications from simple identification to complex rights management while maintaining the integrity of the derivative work 125. In the depicted implementation, the digital watermark 145 represents one possible identification mechanism. Alternative implementations may utilize a fingerprint, file hash, embedded metadata payload, or a combination of two or more of these techniques to identify and track the derivative work 125. Each identification method provides different advantages regarding imperceptibility and verification efficiency, allowing the content derivation platform 110 to be tailored to specific content types and use cases. In some implementations, the digital watermark 145 may serve as a reference indicator to a separate server that maintains usage rules. For example, when the derivative work 125 appears on a streaming service or social media platform, these platforms may query the referenced server, providing the watermark or fingerprint identifier to determine whether the file should be allowed on the platform and what constraints might apply to its usage. This mechanism enables dynamic rights management without embedding all usage rules within the content itself, facilitating more flexible control across various distribution channels.

In some examples, distribution control is enforced by detecting the presence or absence of a digital identifier (e.g., watermark) in the derivative work file and/or the source content, without requiring a lookup in an external usage registry. Such example enables low-latency enforcement mechanisms and accommodates partner platforms that rely solely on in-file markers. In some aspects, partner platforms can perform compliance checks using only the contents of the file (e.g., derivative work and/or source content) itself, without making outbound requests or relying on network availability. For example, a digital identifier associated with the derivative work (e.g., digital watermark embedded within the file, digital fingerprint associated with the file), may encode a control signal or permission flag that indicates whether the file is authorized for public distribution, internal testing, or restricted usage scenarios (e.g., playback-only on the originating platform). Partner platforms such as streaming services, social networks, or distribution aggregators may be contractually required to scan incoming content for the presence of such markers, and take automated enforcement action based on the encoded rules (e.g., allow, reject, or flag for review). Alternatively, or in addition, a digital identifier associated with the source content may indicate whether derivative generation is permitted at all, and may encode allowable transformation types (e.g., melody-only, acoustic remix, etc.). As another example, a fingerprint of the derivative work (e.g., computed from its perceptual or structural content) may be checked against a registry that maintains a list of approved or disallowed fingerprints. If the fingerprint is not present in the registry (i.e., unregistered or blacklisted), the platform may automatically prevent distribution or trigger additional review and/or indicate allowed or disallowed transformations. In some aspects, scenarios in which the fingerprint itself is not embedded in the derivative work, but is instead a derived signature used to confirm whether a particular output and/or source content is cleared for a specific use case may be implemented by a partner platform.

In some implementations, the digital watermark 145 may function as a lookup serial number that references external data stored in a database or blockchain entry. Alternatively, or in addition, the watermark may contain a URL or other identifier that points to remotely stored rights information, enabling more comprehensive metadata while maintaining a lightweight embedded identifier within the content itself. While the depicted implementation utilizes digital watermarks, some implementations may function without embedding watermarks into the derivative work. Instead, such implementations may use content fingerprinting (which may analyze inherent characteristics of the content without modifying it), file hashes, or other external tracking mechanisms, access controls, or digital rights management systems that do not modify the derivative work and/or the source content itself. These non-embedding approaches may be preferred for certain content types where maintaining the original fidelity of the work is important or where regulatory requirements limit content modification.

It is important to note that fingerprints differ fundamentally from watermarks in their implementation and function. While digital watermarks are embedded directly into the content, fingerprints may not be embedded but rather may be derived through analytical processing of the content's inherent characteristics. That is, a fingerprint may function as a compact representation of the content's distinctive features, generated using signal processing algorithms that identify patterns within the audio, image, or video data. Unlike hash functions, which are designed to produce different outputs when even a single bit of the input changes, fingerprinting algorithms may be specifically designed to produce similar outputs for perceptually similar content. This property allows fingerprints to identify content even after it has undergone modifications such as compression, format conversion, or other transformations. As such, fingerprints constitute an example of an "external tracking mechanism" referenced above, providing content identification without modifying the original work. In some aspects, once a fingerprint is obtained, the fingerprint may be embedded within the derivative content for use in downstream applications. Alternatively, or in addition, a fingerprint may be generated and used to identify one or more applicable content related rules, such as but not limited to one or more rules associated with content distribution and/or content use.

The digital watermark 145 may be implemented in several ways to embed metadata into content. In one implementation, referred to as indirect embedding or pointer-based watermarking, the digital watermark contains a unique identifier (UID) such as a code, hash, or serial number that points to a separate cloud-based database where full metadata is stored. This metadata may include creation date, author information, model used for generation, requested theme, and comprehensive copyright information. This approach may use minimal watermark payload while allowing for unlimited and updatable metadata storage. An advantage of this implementation includes scalability, as it uses a very light watermark; flexibility, as it allows storage of unlimited metadata; and updateability, as the metadata can be modified at any time without altering the derivative work itself. However, this solution incorporates dependency on external cloud infrastructure and generally requires an active internet connection and a protected, maintained database service to access the metadata.

Alternatively, or in addition, the watermark could directly embed the actual metadata into the content itself, an approach referred to as self-contained metadata embedding. In this implementation, relevant information is carried within the watermark embedded in the derivative work. An advantage of this approach is that the content remains independent, carrying the necessary information and operating offline without requiring external services. A limitation includes a restricted payload capacity, as there is only a finite amount of data that can be embedded without risking content quality degradation. This approach may also reduce robustness against transformations such as compression or format conversion.

A third implementation offers a hybrid solution with cryptographic signature, combining advantages of both previous approaches. In this approach, the watermark may embed a cryptographically signed metadata hash and a UID that points to a cloud database. In some implementations, a hash of the metadata associated with the derivative work is created—not the audio or media content itself-which would be impractical since embedding a watermark would alter the file and invalidate any pre-calculated hash. In some aspects, the content authority may sign the metadata hash using their private key, creating a verifiable digital signature that confirms the metadata's authenticity. This approach provides secure access to comprehensive metadata information while maintaining a lightweight and discrete watermark. The cryptographic elements provide authenticity and integrity of the derivative work, creating a tamper-evident link between the work and its associated metadata while not requiring all information to be embedded directly in the content.

In some instances, an example of a digital identifier may comprise one or more of a watermark, fingerprint, embedded metadata, hash, serial number, or content-derived signature that is associated with the derivative work and/or the source content. Depending on implementation, the digital identifier may be used to store, reference, or encode usage metadata, such as rights management rules, transformation permissions, or distribution constraints. Watermarks may embed this metadata directly within the media file or indirectly through reference mechanisms, as described above. Fingerprints, by contrast, may be derived from perceptual or signal-level features of the content and serve as unique signatures that can be matched against a registry or database to retrieve associated metadata or validation records. In some implementations, multiple identifiers may be combined (e.g., a watermark embedding a UID and a separate fingerprint) to provide redundancy, improve detection robustness, or support multi-layered verification workflows. The digital identifier thus acts as the foundation for automated usage governance, enabling systems to track, verify, and enforce authorized creation and distribution across partner ecosystems.

The authorization server 140 may provide access to the approved derivative work 125, based on monitoring use of the derivative work 125 to determine the presence of the watermark 145 in the derivative work 125. In the depicted implementation, the user 105 may direct the content derivation platform 110 using the mobile application 150 hosted by the mobile device 155. The mobile application 150 may be configured to cause the content derivation platform 110 to create the derivative work 125 using predetermined content 120 from the predetermined content server 160, based on the requested theme 130. In the depicted implementation, access to an approved derivative work 125 may be controlled by the authorization server 140 using the derivative work server 165. The derivative work server 165 may store approved derivative works 125 containing time-sensitive watermarks 145. For example, once approved, a derivative work may be repeatedly updated with a new watermark 145 that is only valid for a limited period of time. In some cases, the authorization server 140 may be configured to revoke, or not renew, approval for a derivative work 125, based on allowing the watermark 145 embedded in a derivative work 125 to expire.

In some implementations, the time-sensitive digital watermark may be coupled with a renewal payment system that enables extension of the derivative work's authorization period. When a time-to-live value approaches expiration, the authorization server 140 may notify the user 105 of the impending expiration and provide options for renewal. Upon receipt of a renewal payment from the user 105, the authorization server 140 communicates with the usage registry to update the time-to-live value associated with the digital watermark 145, thereby extending the authorized period for the derivative work 125. This renewal mechanism enables content owners to implement subscription-based or periodic licensing models, providing additional monetization opportunities while maintaining control over the distribution timeframe. The renewal payment amount may be configured based on various factors including usage history, distribution scope, or predetermined rate schedules established by the content owner.

In some aspects, the content derivation platform 110 may incorporate a plugin architecture allowing for modular integration of different technologies from various vendors. Such a configuration enables the content derivation platform 110 to adapt as technology evolves, preventing dependency on any single vendor's implementation of digital watermarking, large language models, or other critical components. As the technological landscape changes, with existing providers potentially becoming obsolete, this vendor-agnostic approach ensures long-term viability by allowing components to be replaced or updated without redesigning the entire system.

The content derivation platform 110 may be implemented with an API-first design that enables authorized third-party applications to programmatically integrate with the platform. Through this API, approved companies can submit their own media assets to be transformed with characteristics derived from specific songs, artists, catalogs, or labels within the system. This approach extends the utility of the platform beyond direct user engagement, allowing business partners to leverage the generative capabilities while maintaining the same rigorous approval processes, content owner preference enforcement, and digital watermarking that govern user-created derivatives. The API architecture includes authentication mechanisms, rate limiting, and granular permission controls that determine which transformation capabilities each integrated partner can access. Thus, an API implementation enables approved partners to submit their own media content and have it transformed to incorporate characteristics of specific songs, artists, catalogs, or labels from the predetermined content server 160. In some aspects, the authorization server 140 may manage API access permissions, ensuring that only approved partners can utilize these transformation capabilities while maintaining appropriate content owner controls and digital watermarking for all derivative works created through the API.

In some implementations, a derivative work 125 that contains a digital watermark 145 may itself be received as predetermined content for further transformation. In such cases, the content derivation platform 110 may be configured to detect the existing digital watermark 145 in the input file and either remove it entirely or modify it to reflect the new derivative relationship. The content derivation platform 110 may maintain a chain of provenance by incorporating metadata from the original watermark into the new watermark, thereby preserving the connection to the original content while adding information about the subsequent transformation. This process provides that multi-generational derivative works maintain appropriate attribution and rights management information. The authorization server 140 may apply specific rules for such cases, potentially requiring approval from all previous content owners in the transformation chain before authorizing the new derivative work.

In some aspects, the content derivation platform 110 may accommodate scenarios where derivative work generation occurs with minimal user input, functioning in a more passive or automated manner. In such implementations, and in connection with FIG. 1, the requested theme 130 may be determined implicitly by the content derivation platform 110 context rather than through explicit user specification via the prompt system 135. For example, the content derivation platform 110 may be configured as an automated playlist remixer that seamlessly blends tracks from the user's 105 existing collection stored on the predetermined content server 160, creating derivative works 125 based on contextual parameters rather than explicit requests. Similarly, the platform may generate functional audio mixes (for sleep, study, focus, or exercise) from artist catalogs or albums, or create audio derivatives based on visual media such as music videos, with the theme determination handled automatically by the system rather than through user interview. In these passive generation cases, the authorization server 140 and digital watermark 145 components may function to ensure proper rights management and content owner approval, but the content approval model (e.g., one or more content approval models 275) may evaluate the derivative work 125 against predetermined contextual parameters rather than user-specified themes. This enables applications hosted on or otherwise accessible to the mobile device 155 to deliver contextually-relevant derivative works without requiring the user 105 to engage in detailed transformation specification, while still maintaining the governance framework depicted in FIG. 1. One specific implementation of minimal-input transformation involves playlist remixing functionality. The content derivation platform 110 may present users with their existing music playlists alongside options to transform these collections into specialized versions, such as "lo-fi remixes" or "seamless DJ mixes." Rather than requiring the user to specify transformation parameters for each individual track, the system applies consistent transformation parameters across the entire playlist based on the selected style option. This creates a cohesive listening experience where previously disconnected tracks from various artists and genres are unified through consistent production aesthetics, tempo adjustments, and transition effects. The content approval models 275 evaluate these playlist-wide transformations against the collective preferences of all rights holders whose works appear in the playlist, ensuring appropriate permissions are maintained even in these bulk transformation scenarios.

In some aspects, the content derivation platform 110 can enable interactive media applications by dynamically transforming music to match contextual environments. In an implementation involving video games or interactive films, users may import their preferred music which the system then modifies to align with the established sonic palette of the media. For instance, in a western-themed game, the platform could process users preferred contemporary music to incorporate characteristics like reverb profiles, instrument selections, and mixing techniques that match the game's existing soundtrack. This creates a cohesive yet personalized experience where each user enjoys familiar music that has been transformed to feel native to the game world. Such implementations may utilize pre-approval workflows where the interactive media creator establishes transformation parameters in advance, allowing the content derivation platform 110 to apply approved modifications without requiring individual review of each transformed work. The authorization server 140 may also implement context-restricted playback, where transformed works are only accessible within the approved media environment or, alternatively, made available through connected streaming platforms with appropriate attribution and compensation mechanisms.

Figure 2:
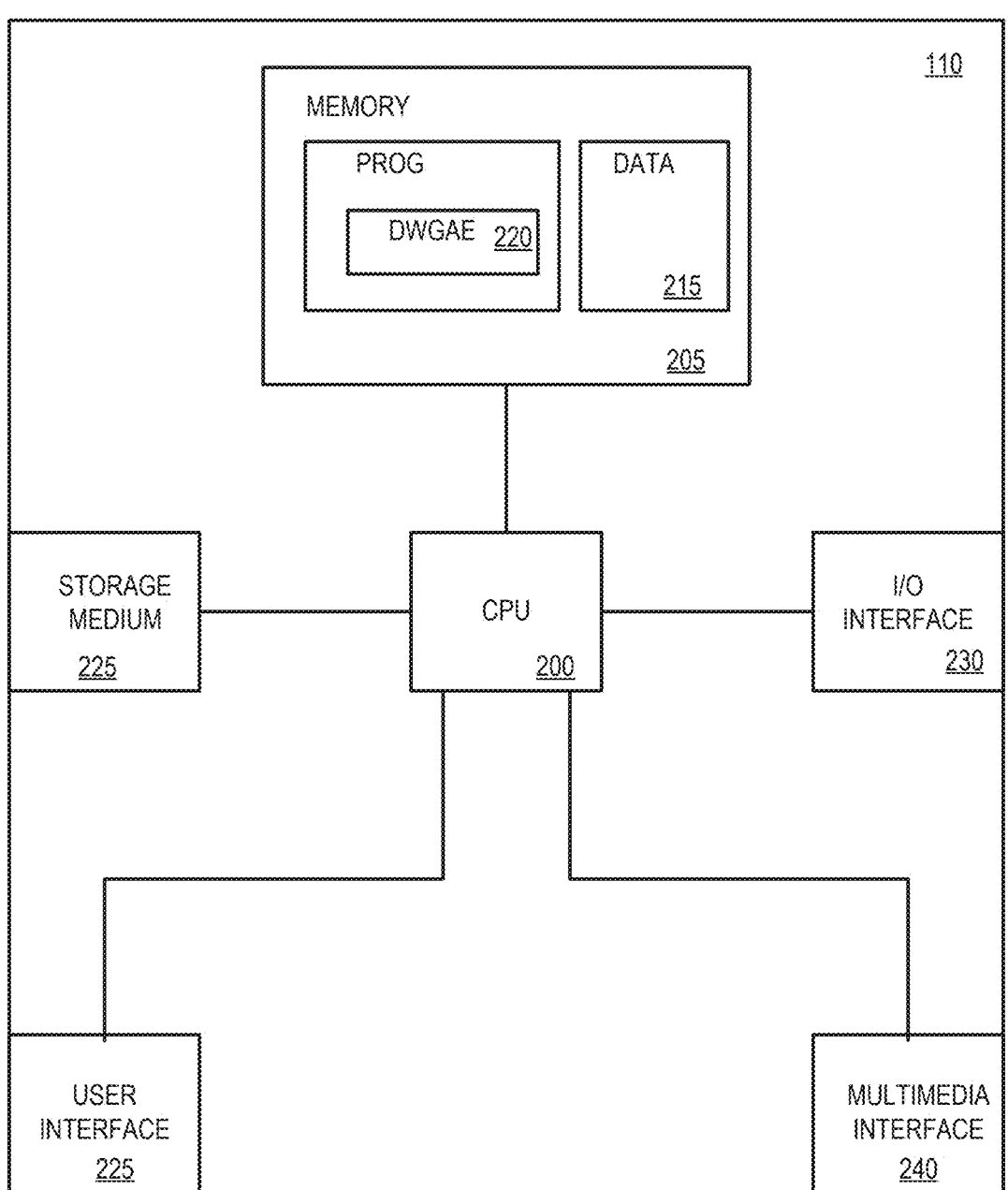
FIG. 2 depicts a schematic view of an exemplary content derivation platform designed to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work.

FIG. 2 depicts a schematic view of an exemplary content derivation platform designed to receive predetermined content, receive a request to transform the predetermined content into a derivative work, receive a requested theme for the derivative work, create the derivative work generated as a function of the predetermined content and the requested theme using generative artificial intelligence, determine if the generated derivative work is approved based on a content approval machine learning model configured to determine a content approval score as a function of a content owner preference and the generated derivative work and in response to determining the content approval score is greater than a predetermined minimum apply a digital watermark to the approved derivative work, configure an authorization server to govern use of the approved derivative work based on the digital watermark, and provide access to the approved derivative work. While the exemplary implementation describes a content approval score that exceeds a predetermined minimum, the approval mechanism may alternatively, or in addition, implement a binary approval model. In such implementations, the content approval process evaluates the derivative work against a defined set of criteria established by the content owner, with each criterion requiring a "pass" determination. The derivative work is only approved if it passes all criteria, regardless of how strongly it performs on any individual metric. This binary approach ensures that all content owner requirements are strictly enforced without allowing exceptional performance in one area to compensate for deficiencies in another, providing clearer boundaries for acceptable derivative works.

In some implementations, the content approval process may operate primarily as a pre-generation rule enforcement system rather than a post-generation evaluation. In this pre-generation enforcement approach, the content derivation platform 110 may access a pre-defined rule registry provided by content owners and/or content authorities that specifies permissible and prohibited transformations for each piece of content. These rules may define which elements of the content can be modified (such as allowing melody changes but prohibiting vocal alterations), which transformation themes are permitted, and other constraints specific to each artist, composition, or content type. Before generating any derivative work, the system verifies that the requested transformation complies with all applicable rules in the registry, only proceeding with generation if all rules are satisfied. The rule registry can be provided to partners as metadata feeds, API-accessible databases, or embedded information within the content itself, allowing for efficient rule checking without significant computational overhead. Content owners can maintain and update these rule sets independently for different artists or content categories, providing flexible governance while enabling rapid scaling of approved derivative works.

In some aspects, the content derivation platform 110 may implement a rule-based pre-approval system to govern derivative work creation. In some aspects, a rule-based pre-approval system may operate on explicitly defined transformation parameters established by content owners and/or content authorities, which may be encoded in structured data formats and made available to the content derivation platform 110 before the derivate work is generated. The pre-approval system may include a rule registry, a rule verification engine, and/or a feed integration module. The rule registry may refer to a centralized or distributed database containing transformation rules for one or more pieces of content. In some implementations, the rule registry may include a content identify and specify permissible transformation operations, prohibited transformation operations, approved themes or contexts for derivate works, use limitations for generated derivative works, and/or geographic and/or temporal restrictions.

For example, a music label may establish rules for a particular artist's catalog specifying that melody and instrumentation modifications are permitted, but vocal alterations are prohibited. The rule registry may indicate that jazz, classical, or acoustic transformations are approved themes, while explicit or politically charged themes are prohibited. The registry may further specify that derivative works can only be created for personal use, with commercial exploitation requiring additional licensing, and may restrict creation to specific territories or time periods (such as limiting derivative works during the promotional period for a new album release).

In some implementations, transformation permissions are enforced at the point of request submission by evaluating one or more embedded codes, such as provided by a watermark, fingerprint, hash, or metadata tag, associated with the source content. These codes may be embedded directly in the content file or retrieved from an external feed or API provided by a content authority (e.g., a label or rights holder). Upon receiving a transformation request, the system queries the embedded code or linked registry to determine whether the requested transformation is allowed. If the requested transformation violates one or more encoded rules or flags (e.g., "do not allow voice modification"), the system prevents generation of the derivative work before any processing by the generative model occurs. This architecture enables real-time, deterministic enforcement of transformation policies without requiring post-generation evaluation or human intervention. In some implementations, metadata governing transformation permissions or distribution constraints may be embedded in the source content itself, allowing the system or partner platforms to determine allowed operations prior to derivative generation.

The rule verification engine may be configured to query the rule registry upon receiving a transformation request from a user. Prior to allocating computational resources for derivative work generation, the rule verification engine may parse the user's requested theme and intended transformation against the applicable rules for the selected content. For instance, if a user requests to transform a song into a dance remix while the rule registry only permits jazz, classical, or acoustic transformations for that particular song, the rule verification engine may reject the request and optionally suggest permitted alternatives. This verification process may occur transparently to the user, with the content derivation platform 110 presenting permissible transformation options for each piece of content.

The feed integration module may be configured to receive and process standardized data feeds from content owners, enabling automated updates to the rule registry. These feeds may utilize industry-standard formats similar to those employed for other content management operations, such as those used by music labels to distribute metadata to streaming platforms. Through these feeds, content owners can modify transformation permissions in real-time without requiring system-wide updates to the content derivation platform 110. For example, a content owner might temporarily restrict certain transformation types during a marketing campaign, or expand permissible operations based on observed user behaviors and market trends.

In a typical implementation, a user selecting a popular song might receive a customized interface that only presents transformation options permitted by the content owner. If the content owner has specified that tempo changes between 70-120 BPM are permitted but vocal modifications are prohibited, the user interface may present slider controls for tempo adjustment within the allowed range while omitting options for vocal editing. This approach minimizes rejection of user requests by guiding users toward permissible transformations from the outset.

The rule-based pre-approval system may operate independently or in conjunction with the machine learning-based content approval models described previously. In a hybrid implementation, the rule-based system may handle initial screening of transformation requests, with the machine learning models providing secondary verification of the generated content against more subjective criteria or emerging patterns not explicitly encoded in the rule registry. As the platform evolves, analytics derived from user interactions and content owner feedback may inform refinements to both the rule-based and machine learning components, creating an increasingly sophisticated governance framework that balances creative flexibility with content owner control.

In some implementations, the rule-based pre-approval system may include versioning capabilities to manage changes to transformation permissions over time. Utilizing a versioning system helps to ensure that previously approved derivative works remain valid even if underlying rules change, while new transformation requests are evaluated against the current rule set. The rule registry may maintain a history of permission changes, enabling auditability and allowing content owners to revert to previous rule configurations if needed.

In FIG. 2, the schematic block diagram of the exemplary content derivation platform 110 includes processor 200 and memory 205. In the depicted implementation, the processor 200 is in electrical communication with the memory 205. The depicted memory 205 includes program memory 210 and data memory 215. The depicted program memory 210 stores encoded processor-executable program instructions implementing the derivative work generation and augmentation engine (DWGAE) 220. The illustrated program memory 210 may store other encoded processor-executable program instructions accessible to the processor 200. The processor-executable program instructions may include processor-executable program instructions configured to implement an OS (Operating System). The OS may include processor-executable program instructions configured to implement various operations when executed by the processor 200. The OS may be omitted. The illustrated program memory 210 may store encoded processor-executable program instructions configured to implement various Application Software. The Application Software may include processor-executable program instructions configured to implement various operations when executed by the processor 200. The Application Software may be omitted. In the depicted implementation, the processor 200 is communicatively and operably coupled with the storage medium 225. In the depicted implementation, the processor 200 is communicatively and operably coupled with the input/output (I/O) interface 230. In the depicted implementation, the I/O interface 230 includes a network interface. The network interface may be a wireless network interface. The network interface may be a Wi-Fi® interface. The network interface may be a Bluetooth® interface. The exemplary content derivation platform 110 may include more than one network interface. The network interface may be a wireline interface. The network interface may be omitted. In the depicted implementation, the processor 200 is communicatively and operably coupled with the user interface 235. In the depicted implementation, the processor 200 is communicatively and operably coupled with the multimedia interface 240. In the illustrated implementation, the multimedia interface 240 includes interfaces adapted to input and output of audio, video, and image data. The multimedia interface 240 may include one or more still image camera or video camera. Useful examples of the illustrated exemplary content derivation platform 110 include, but are not limited to, personal computers, servers, tablet PCs, smartphones, or other computing devices. Multiple exemplary content derivation platform 110 devices may be operably linked to form a computer network in a manner as to distribute and share one or more resources, such as clustered computing devices and server banks/farms. Various arrangements of such general-purpose multi-unit computer networks suitable for implementations of the disclosure, their typical configuration, and standardized communication links are well known to one skilled in the art. An exemplary content derivation platform 110 design may be realized in a distributed implementation. Some content derivation platform 110 designs may be partitioned between a client device, such as, for example, a phone, and a more powerful server system. A content derivation platform 110 partition hosted on a PC or mobile device may choose to delegate some parts of computation, such as, for example, machine learning or deep learning, to a host server. A client device partition may delegate computation-intensive tasks to a host server to take advantage of a more powerful processor, increased communication bandwidth or to offload excess work. Some content derivation platform 110 devices may be configured with a mobile chip including an engine adapted to implement specialized processing, such as, for example, neural networks, machine learning, artificial intelligence, image recognition, audio processing, or digital signal processing. Such an engine adapted to specialized processing may have sufficient processing power to implement some content derivation platform 110 features. However, an exemplary content derivation platform 110 may be configured to operate on a device with less processing power, such as, for example, various gaming consoles, which may not have sufficient processor power, or a suitable CPU architecture, to adequately support content derivation platform 110. Various implementations configured to operate on a such a device with reduced processor power may work in conjunction with a more powerful server system.

Figure 3:
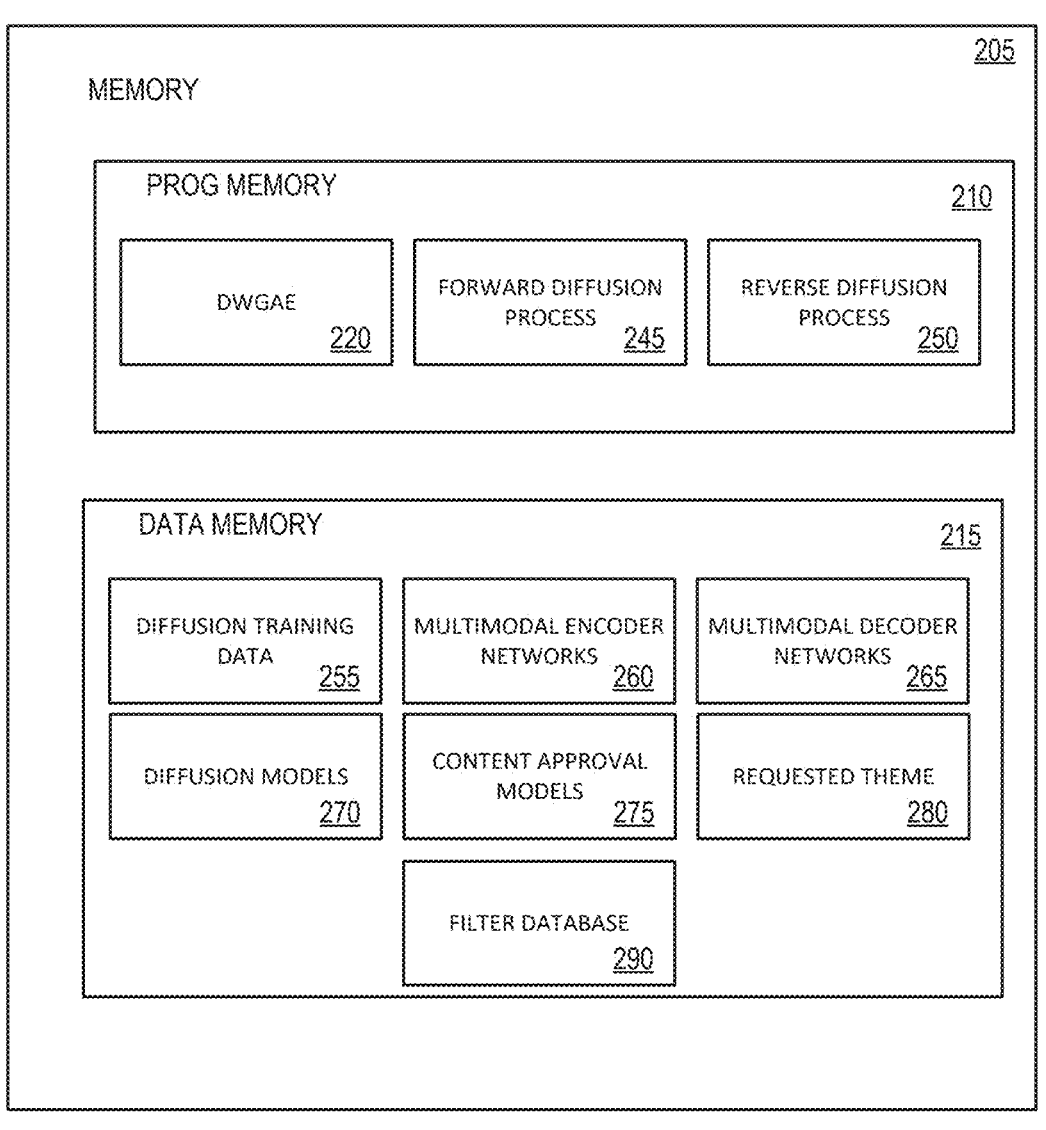
FIG. 3 depicts an exemplary organization of processor executable program instructions and data for an exemplary content derivation platform.

FIG. 3 depicts an exemplary organization of processor executable program instructions and data for an exemplary content derivation platform. In FIG. 3, the depicted detail view of the memory 205 shows the program memory 210 and the data memory 215, also illustrated at least in FIG. 2. In FIG. 3, the depicted program memory 210 includes processor-executable program instructions configured to implement the DWGAE 220.

In FIG. 3, the depicted program memory 210 includes processor-executable program instructions configured to implement the forward diffusion process 245.

In FIG. 3, the depicted program memory 210 includes processor-executable program instructions configured to implement the reverse diffusion process 250.

In FIG. 3, the depicted data memory 215 includes the diffusion training data 255.

In FIG. 3, the depicted data memory 215 includes data configured to implement the encoder networks 260 used by processor-executable program instructions executed by the DWGAE 220.

In FIG. 3, the depicted data memory 215 includes data configured to implement the decoder networks 265 used by processor-executable program instructions executed by the DWGAE 220.

In FIG. 3, the depicted data memory 215 includes data configured to implement the diffusion models 270.

In FIG. 3, the depicted data memory 215 includes data configured to implement the content approval models 275.

In FIG. 3, the depicted data memory 215 includes data configured to implement the requested theme 280.

Figure 4:
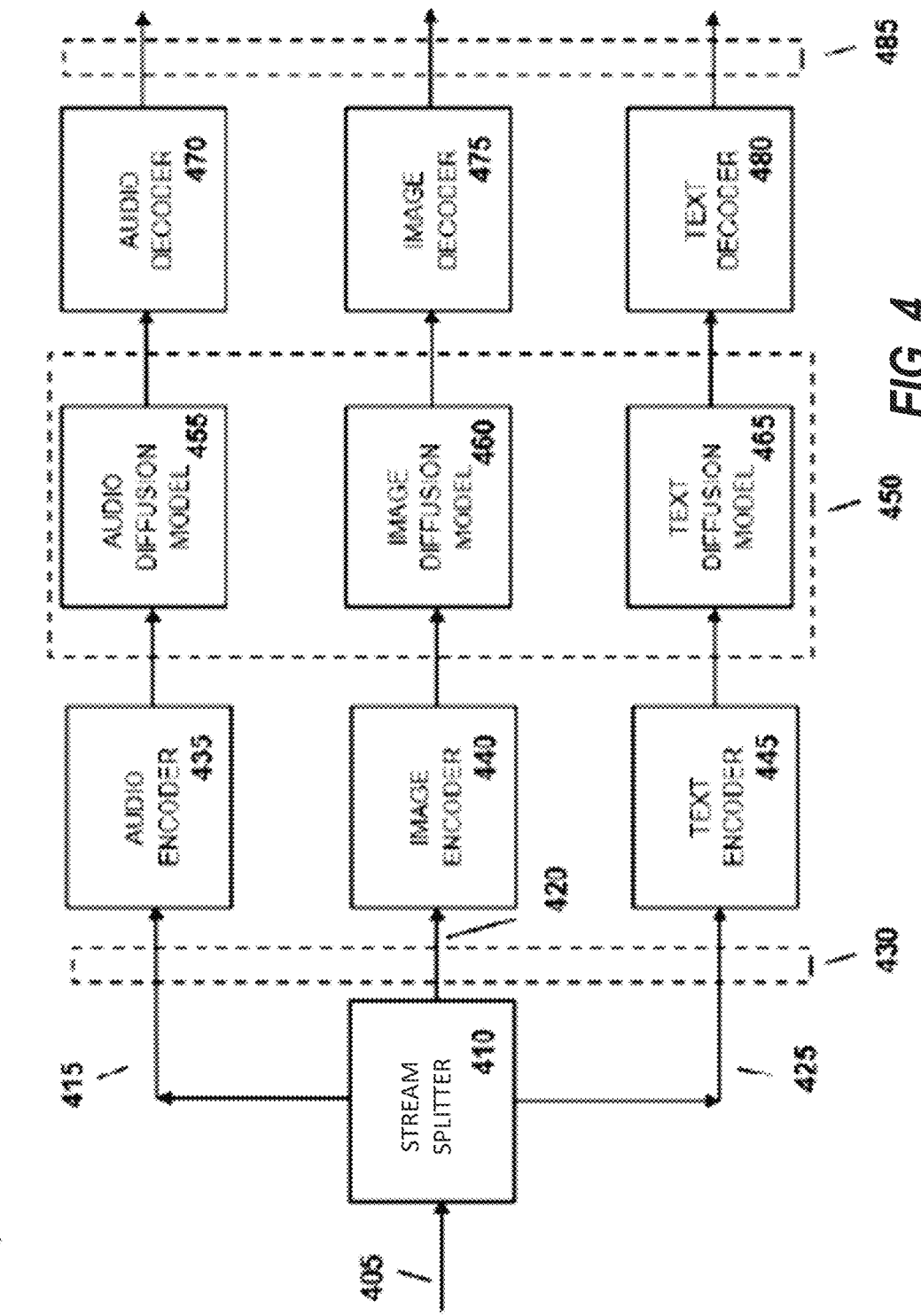
FIG. 4 depicts an exemplary content derivation pipeline.

FIG. 4 depicts an exemplary content derivation pipeline. In FIG. 4, the pipeline 400 receives the content stream 405. The content stream 405 may be predetermined content. The content stream 405 may be derivative content. The content stream 405 may be a multimodal content stream. The multimodal content stream may comprise more than one content modality. Each content modality of a multimodal content stream may be in a distinct format. In the depicted implementation, the stream splitter 410 divides the content stream into one or more discrete content stream. The stream splitter 410 may be configured to detect a modality of an individual content stream within the content stream 405. For example, the stream splitter 410 may be configured to detect a content type determined as a function of data associated with an individual content stream. The stream splitter 410 may be configured to re-route an individual stream to a modality-specific encoder.

In the depicted implementation, the stream splitter 410 detects the audio stream 415, the image stream 420 and the text stream 425 in the content stream 405. In the depicted implementation the audio stream 415, image stream 420 and text stream 425 are data in the input high-dimensional space 430. In the depicted implementation, the input high-dimensional space 430 represents a native data space for the discrete content streams. The native data space for each modality may be different, depending on the modality. For example, in the input high-dimensional space 430, the audio stream 415 may be audio amplitudes sampled as a function of time and the image stream 420 may be pixel values determined as a function of image geometry. The stream splitter 410 may be configured to detect and separate or split audio with a human voice based on one or more techniques comprising autocorrelation.

In the depicted implementation, the audio encoder 435, image encoder 440 and text encoder 445 respectively encode the audio stream 415, the image stream 420 and the text stream 425 from the high-dimensional space 430 to the latent space 450. The latent space 450 represents a lower-dimensional space suitable for operations such as, for example but not limited to, determining and mapping embeddings, and other operations associated with machine learning operations. As with the input high-dimensional space 430, the latent space 450 may be different for each modality. For example, in the latent space 450, the encoded audio stream may be audio features such as Mel spectrogram, log Mel spectrogram, or spectral features, while in contrast, the encoded image stream may be normalized pixel values, edge maps, or object detection features.

In the depicted implementation, the audio diffusion model 455, image diffusion model 460 and text diffusion model 465 operate in the latent space 450. In the depicted implementation, the audio decoder 470, image decoder 475 and text decoder 480 respectively decode the audio diffusion model 455, image diffusion model 460 and text diffusion model 465 outputs from the latent space 450 to the output high dimensional space 485.

FIG. 5 depicts a process flow of an exemplary Derivative Work Generation and Augmentation Engine (DWGAE) in an exemplary training mode. In FIG. 5, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 500 begins at step 505 with the processor 200 receiving a multimodal predetermined content stream.

Then, the method continues at step 510 with the processor 200 splitting the multimodal predetermined content stream into one or more discrete content streams. The one or more discrete content streams may include, but are not limited to, discrete audio, image or text streams.

Then, the method continues at step 515 with the processor 200 transforming each discrete predetermined content stream into a shared latent space representation using a modality-specific encoder.

Then, the method continues at step 520 with the processor 200 additionally encoding each encoded discrete predetermined content stream to a text embedding in the shared latent space.

Then, the method continues at step 525 with the processor 200 training a diffusion model to transform the text embeddings representing the predetermined content in the shared latent space into new content that aligns with text input.

In some implementations, the method may repeat. In various implementations, the method may end.

Figure 6:
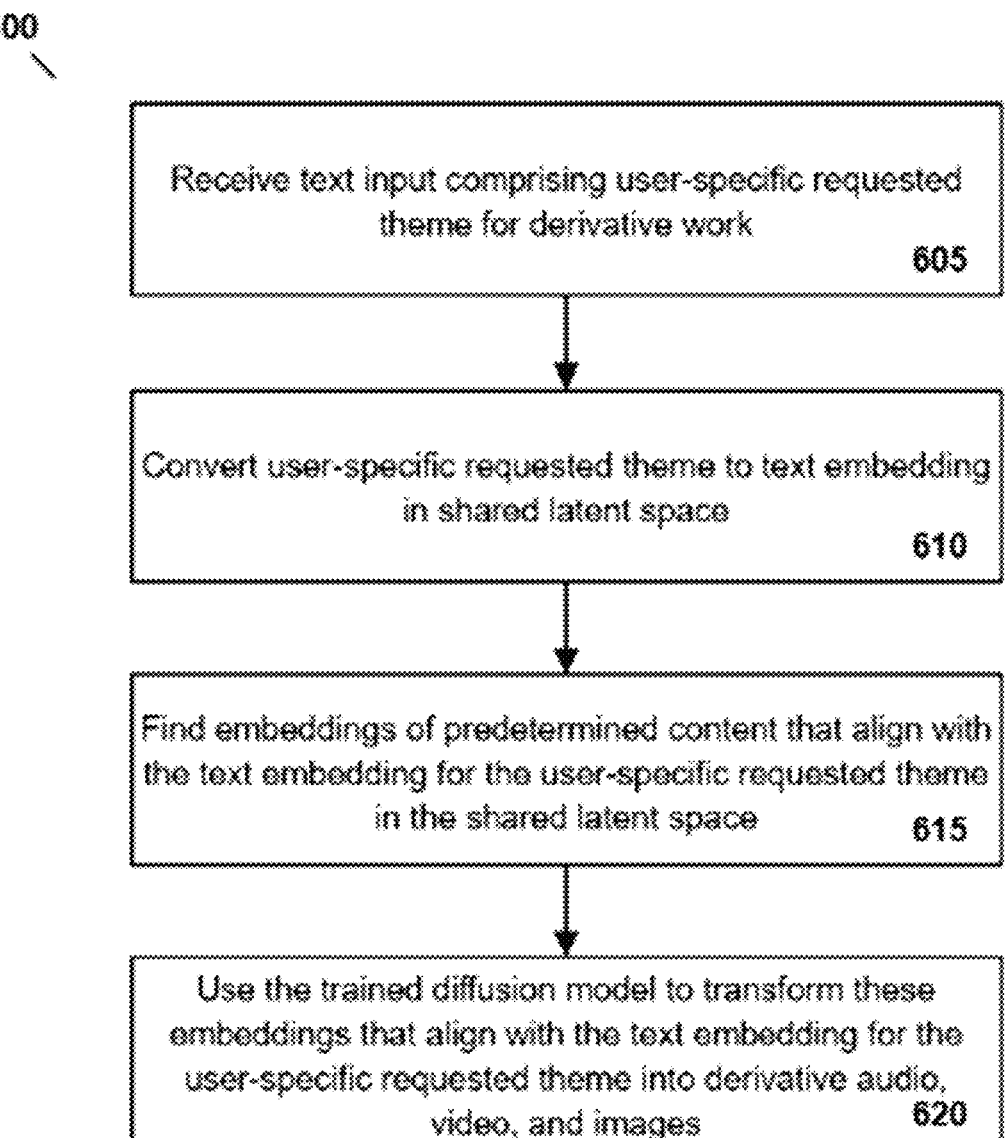
FIG. 6 depicts a process flow of an exemplary Derivative Work Generation and Augmentation Engine (DWGAE) in an exemplary generation mode.

FIG. 6 depicts a process flow of an exemplary Derivative Work Generation and Augmentation Engine (DWGAE) in an exemplary generation mode. In FIG. 6, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 600 begins at step 605 with the processor 200 receiving text input comprising a user-specific requested theme for a derivative work.

Then, the method continues at step 610 with the processor 200 converting the user-specific requested theme to a text embedding in a shared latent space.

Then, the method continues at step 615 with the processor 200 finding embeddings of predetermined content that align with the text embedding for the user-specific requested theme in the shared latent space.

Then, the method continues at step 620 with the processor 200 using the trained diffusion model to transform these embeddings of the predetermined content that align with the text embedding for the user-specific requested theme. The processor 200 may transform the predetermined content into a derivative work comprising audio, video or images, based on the embedding for the user-specific requested theme.

In some implementations, the method may repeat. In various implementations, the method may end.

FIG. 7 depicts a process flow of an exemplary Derivative Work Generation and Augmentation Engine (DWGAE) in an exemplary approval mode. In FIG. 7, the depicted method is given from the perspective of the Derivative Work Generation and Augmentation Engine DWGAE 220 implemented via processor-executable program instructions executing on the content derivation platform 110 processor 200, depicted at least in FIG. 2. In the illustrated implementation, the DWGAE 220 executes as program instructions on the processor 200 configured in the DWGAE 220 host content derivation platform 110, depicted in at least FIG. 1 and FIG. 2. In some implementations, the DWGAE 220 may execute as a cloud service communicatively and operatively coupled with system services, hardware resources, or software elements local to and/or external to the DWGAE 220 host content derivation platform 110. The depicted method 700 begins at step 705 with the processor 200 receiving one or more derivative work content streams.

Then, the method continues at step 710 with the processor 200 transforming the one or more derivative work content streams into a shared latent space using a modality-specific encoder.

Then, the method continues at step 715 with the processor 200 additionally encoding the one or more derivative work content streams to text embeddings in the shared latent space that identify content topics and objects in the derivative work.

Then, the method continues at step 720 with the processor 200 categorizing topics and objects in the derivative work as liked or disliked based on predetermined text embeddings and labels defining the content owner's preference for topics and objects previously presented to the content owner. The previously presented items may be labeled as liked or disliked by the content owner. The items previously presented to the content owner may be public items.

Then, the method continues at step 725 with the processor 200 estimating the content owner's sentiment to the derivative work based on an approval score determined as a function of the categorized topics and objects.

An implementation of process 700 may employ a trained content approval model to estimate the content owner's sentiment to the derivative work. A CLIP model may be used to determine text embeddings identifying items including but not limited to topics and objects in public content presented to the content owner in a learning phase. These text embeddings identifying the items may be augmented with labels defining the content owner's preference for the items presented to the content owner during the learning phase. For example, items of various types in public content may be presented to the content owner during the learning phase. In the learning phase, the content owner may be prompted to classify items as liked or disliked by the content owner. A degree of like or dislike may be captured from the content owner for each item. These classifications and degrees of like or dislike by the content owner may be used to label the public items with the classifications and degrees of like or dislike. The method may use a CLIP model to determine text embeddings identifying items in the derivative work. The method may determine classifications and degrees of like or dislike by the content owner for items in the derivative work by comparison with the predetermined classifications and degrees of like or dislike for the public items. For example, a public item may be identified in the public item embeddings as a knife labeled as strongly disliked by the content owner. In this example, based on exemplary derivative work embeddings, the derivative work may not include a knife. In this example, the content owner's sentiment toward the derivative work may be estimated as highly favorable. On the other hand, in this example, if the derivative work includes a knife, the content owner's sentiment toward the derivative work may be estimated as highly unfavorable.

The content approval model may be configured to determine a score identifying a degree of like or dislike by the content owner for a topic, theme, object, work of art, person, place or subject in the derivative work. Training the model may include gathering a dataset that contains examples of text descriptions for items and corresponding like/dislike scores from the content owner. This could include reviews, ratings, or any kind of feedback that quantifies preferences. For each example in the dataset, the text description may be paired with its corresponding score. The content approval model may be a neural network configured to determine a score identifying a degree of like or dislike by the content owner for the derivative work, determined as a function of a text embedding identifying an item in the derivative work. The neural network may be trained using the labeled classifications and degrees of like or dislike for the public items. The output of the content approval model may be a regression layer that outputs a continuous score.

In some implementations, the method may repeat. In various implementations, the method may end.

Figure 8:
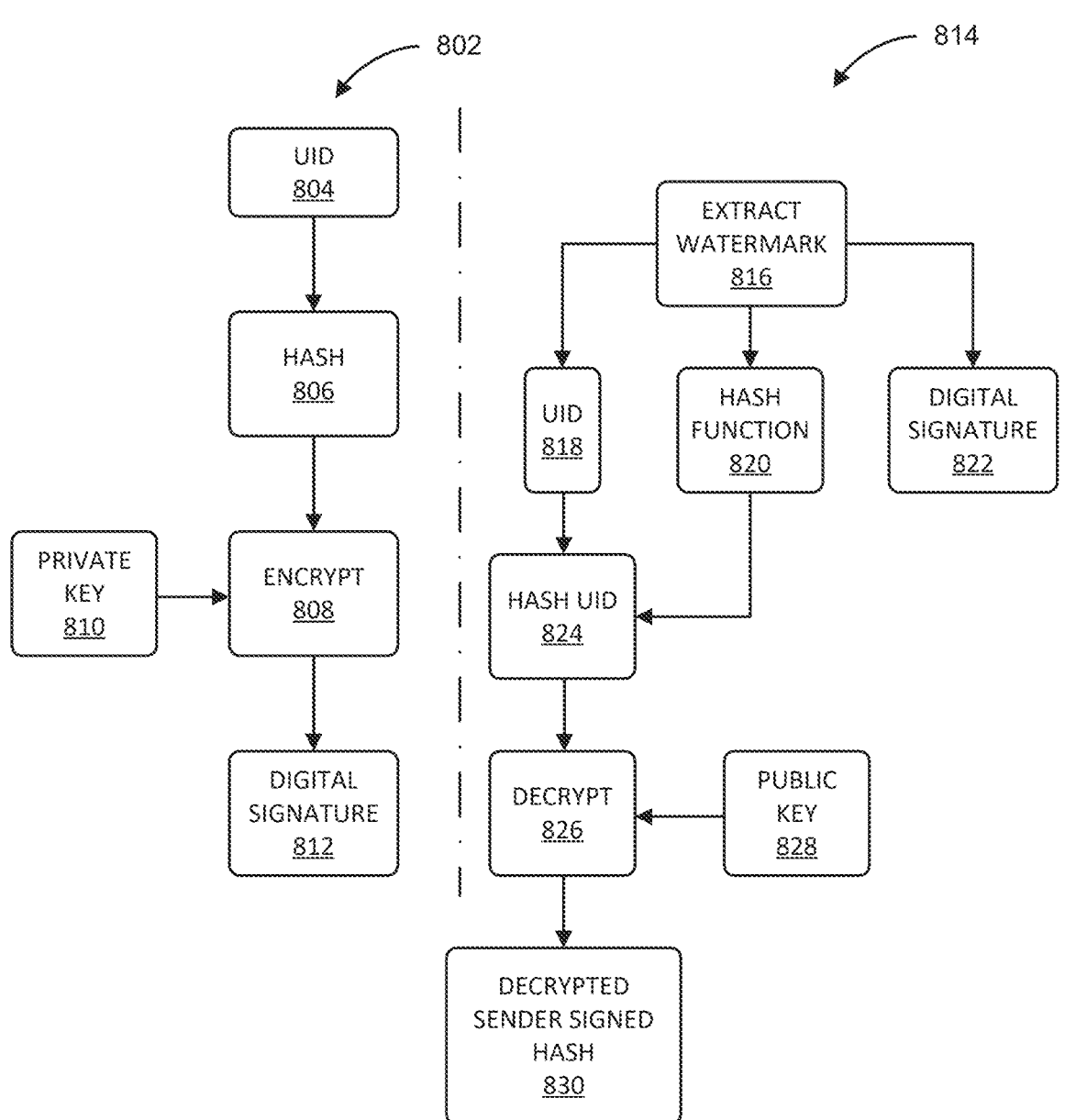
FIG. 8 depicts a schematic flow diagram illustrating a method for implementing cryptographic verification of digital watermarks in derivative works in accordance with aspects of the present disclosure.

FIG. 8 depicts a schematic flow diagram illustrating a method for implementing cryptographic verification of digital watermarks in derivative works. The method may comprise two process flows: a signature generation process 802 for creating a digital signature, and a verification process 814 for authenticating the digital signature.

In the signature generation process 802, a unique identifier (UID) 804 serves as the foundation for the cryptographic verification system. The UID 804 may comprise an alphanumeric sequence, hash code, or other unique reference designator assigned to a specific derivative work. This identifier functions as a distinctive reference point that uniquely identifies the derivative work within the system and may correspond to an entry in an external database containing comprehensive metadata about the derivative work. The UID 804 may be generated using various techniques, including sequential numbering, random string generation with collision detection, or combinations of identifiers that incorporate information about the content type, creation date, or content owner.

In some aspects, the UID 804 may be input to a hash function represented in hash operation 806. The hash operation 806 applies a cryptographic hash function to the UID 804, transforming it into a fixed-length hash value. This operation creates a distinctive digital fingerprint of the UID that serves as the basis for subsequent cryptographic operations. The hash function may employ algorithms such as SHA-256, SHA-3, or other secure hashing algorithms that provide collision resistance and one-way transformation properties.

The resultant hash value from operation 806 is then processed by an encrypt operation 808. The encrypt operation 808 receives the hash value and encrypts it using a private key 810. The private key 810 is a secure cryptographic key maintained by the content derivation platform 110 or authorization entity and is kept confidential. The encryption process transforms the hash value into an encrypted form that can only be properly decrypted using a corresponding public key, thereby creating a cryptographic binding between the content identifier and the authorizing entity.

The output of the encrypt operation 808 is a digital signature 812. The digital signature 812 represents a cryptographically secure verification token that can be embedded within the digital watermark of the derivative work. This signature serves as cryptographic proof that the derivative work has been properly authorized and has not been tampered with since its creation and approval.

In the parallel verification process 814, an extract watermark operation 816 retrieves the embedded watermark from a derivative work. This extraction process may employ various signal processing techniques specific to the media type containing the watermark, such as frequency domain analysis for audio content or spatial domain analysis for image content. The extraction operation isolates the watermark data without degrading the underlying content. The extracted watermark yields at least three components: the UID 818, hash function information 820, and the digital signature 822. The UID 818 corresponds to the same unique identifier used in the signature generation process. The hash function information 820 indicates which cryptographic hash algorithm was employed during signature generation. The digital signature 822 is the encrypted hash value that was embedded in the watermark.

A hash operation 824 receives the extracted UID 818 and processes it according to the extracted hash function information 820 to generate a verification hash. This operation replicates the same hashing procedure performed in the signature generation process. Simultaneously, a decrypt operation 826 processes the extracted digital signature 822 using a public key 828. The public key 828 corresponds cryptographically to the private key 810 used during encryption but can be widely distributed without compromising security. The decryption produces a decrypted sender-signed hash 830, which represents the original hash value that was encrypted during signature generation. The verification process is completed by comparing the newly generated verification hash from operation 824 with the decrypted sender-signed hash 830. If these hash values match, the verification confirms that the derivative work is authentic, has been properly authorized, and has not been modified since the digital signature was created. If the values do not match, it indicates potential tampering, unauthorized modification, or an invalid authorization state. This cryptographic verification mechanism enables improved governance of derivative works while supporting both online and offline verification scenarios. Such implementation balances security requirements with practical operational considerations, enabling effective rights management across diverse distribution channels and usage contexts.

Figure 9:
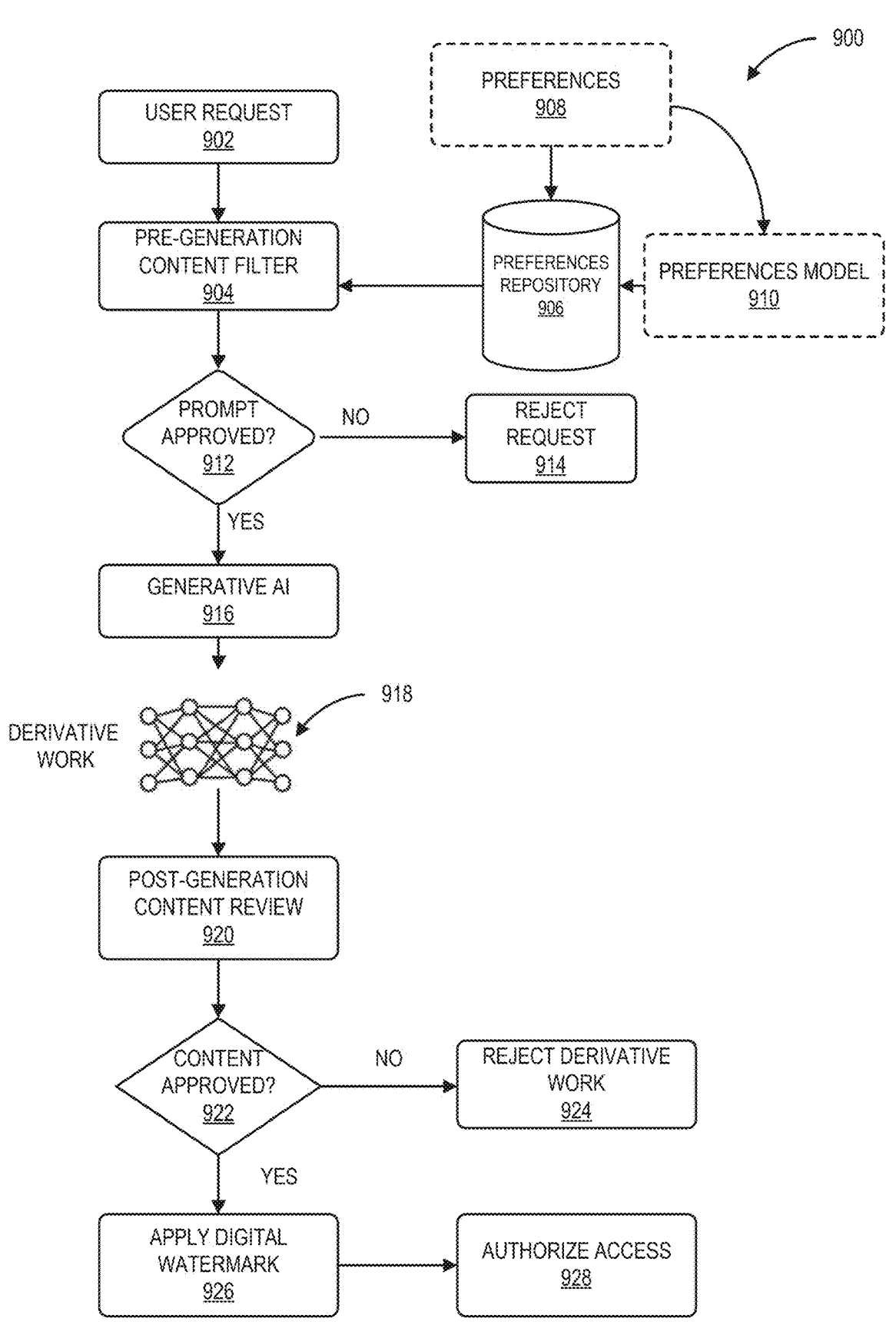
FIG. 9 depicts a schematic flow diagram illustrating a multi-stage approval process for derivative works in accordance with aspects of the present disclosure.

FIG. 9 depicts a schematic flow diagram illustrating an exemplary multi-stage approval process for derivative works in accordance with aspects of the present disclosure. The multi-stage approval process 900 represents a workflow for evaluating and approving derivative works based on predetermined content, incorporating both pre-generation and post-generation validation stages. The multi-stage approval process 900 begins with a user request 902, which may comprise a prompt or requested theme for transforming predetermined content into a derivative work. The user request 902 may be received through various interfaces, including but not limited to mobile applications, web portals, or dedicated software platforms. The user request 902 may include specific transformation parameters such as style modifications, genre adaptations, or thematic alterations to be applied to the predetermined content. The user request 902 may comprise various types of inputs such as text prompts, audio files, visual media, or combinations thereof that specify the user's desired transformation parameters for generating a derivative work.

The pre-generation content filter 904 analyzes the user request 902 against the preferences stored in the preferences repository 906 before content generation occurs. This pre-generation content filter 904 may implement various analytical techniques including but not limited to semantic analysis, keyword matching, theme classification, or natural language processing to determine whether the requested transformation aligns with content owner preferences. In some aspects, the pre-generation content filter 904 may employ one or more content approval models 275 of FIG. 2. The pre-generation content filter 904 serves as an initial screening mechanism that prevents the dedication of computational resources to derivative works that would ultimately be rejected.

Preferences 908, shown in a dashed outline to indicate they may be stored separately from the main process flow, represent content owner preferences that govern permissible transformations of the original content. These preferences may be established through questionnaires, interviews, or interactive sessions with content owners, and may be updated periodically to reflect evolving requirements. The preferences 908 may specify permitted themes, prohibited subject matter, stylistic constraints, or other parameters that define the boundaries within which derivative works may be created.

Process 900 may utilize preferences 908, which may be established by content owners, copyright holders, or platform administrators. In some aspects, the preferences 908 refer to acceptable parameters for derivative work creation and may include content restrictions, stylistic guidelines, usage limitations, or other constraints that ensure derivative works align with content owner requirements. The preferences 908 may be updated periodically based on content owner feedback, market trends, or evolving platform policies to maintain relevance and effectiveness in guiding derivative work creation. The preferences repository 906 stores and manages the content owner preferences in a structured format accessible to the approval process. The preferences repository 906 may be implemented as a database, knowledge base, or other data storage system capable of organizing and retrieving complex preference data. In some implementations, the preferences repository 906 may incorporate version control to track changes in content owner preferences over time, enabling the system to adapt to evolving creative and commercial requirements.

A preferences model 910, also shown in dashed outline, may be developed based on the content owner preferences. The preferences model 910 may comprise a machine learning model trained on historical approval decisions, explicit content owner preferences, and feedback on previously generated derivative works. The preferences model 910 enables the system to predict content owner sentiment toward new derivative works based on learned patterns, facilitating more efficient approval processes as the volume of derivative work requests increases. At decision point 912, the system determines whether the prompt is approved based on the pre-generation content filter's analysis. This decision may be binary or may involve a confidence score that must exceed a predetermined threshold. If the prompt is not approved (NO path), the system proceeds to reject the request 914, potentially providing feedback to the user regarding the specific aspects of the request that conflicted with content owner preferences.

If the prompt is approved (YES path), the process 900 continues to the generative AI 916 component, which creates the derivative work based on the predetermined content and the user-requested theme or transformation. The generative AI 916 may incorporate various technologies such as neural networks, diffusion models, or other machine learning architectures capable of content transformation while preserving essential characteristics of the original work as described herein. The derivative work 918 represents the output of the generative AI process, which transforms the predetermined content according to the user's requested theme while maintaining alignment with content owner preferences. The derivative work may comprise various media types including but not limited to audio, visual, textual, or multimedia content depending on the nature of the original content and the transformation parameters.

Following generation, the derivative work undergoes post-generation content review 920, which examines the actual content produced rather than just the prompt that initiated its creation. This review may involve content analysis algorithms, pattern recognition, or comparison against known objectionable content, ensuring that the generated derivative work adheres to content owner preferences even if the prompt itself appeared innocuous. At decision point 922, the system determines whether the content is approved based on the post-generation review. Similar to the earlier decision point, this may involve a binary decision or a confidence score comparison. If the content is not approved (NO path), the system proceeds to reject the derivative work 924, potentially logging the decision to refine future filtering and approval processes.

If the content is approved (YES path), the system applies a digital watermark 926 to the derivative work. The digital watermark 926 may embed information such as creation date, authorization parameters, usage rights, attribution details, or other metadata that facilitates tracking and management of the derivative work throughout its lifecycle as described herein. The watermark may be visible or invisible, depending on the implementation and the type of content involved. Finally, the process concludes with authorize access 928, where the system configures an authorization server to permit user access to the approved derivative work based on the digital watermark. This authorization may include specifying permissible usage scenarios, duration of access, distribution channels, or other parameters that govern how the derivative work may be utilized.

The multi-stage approval process 900 thus provides a comprehensive framework for ensuring that derivative works align with content owner preferences at both the conceptual (pre-generation) and implementation (post-generation) levels, facilitating the creation of authorized derivative works while protecting the interests and creative vision of content owners.

Figure 10:
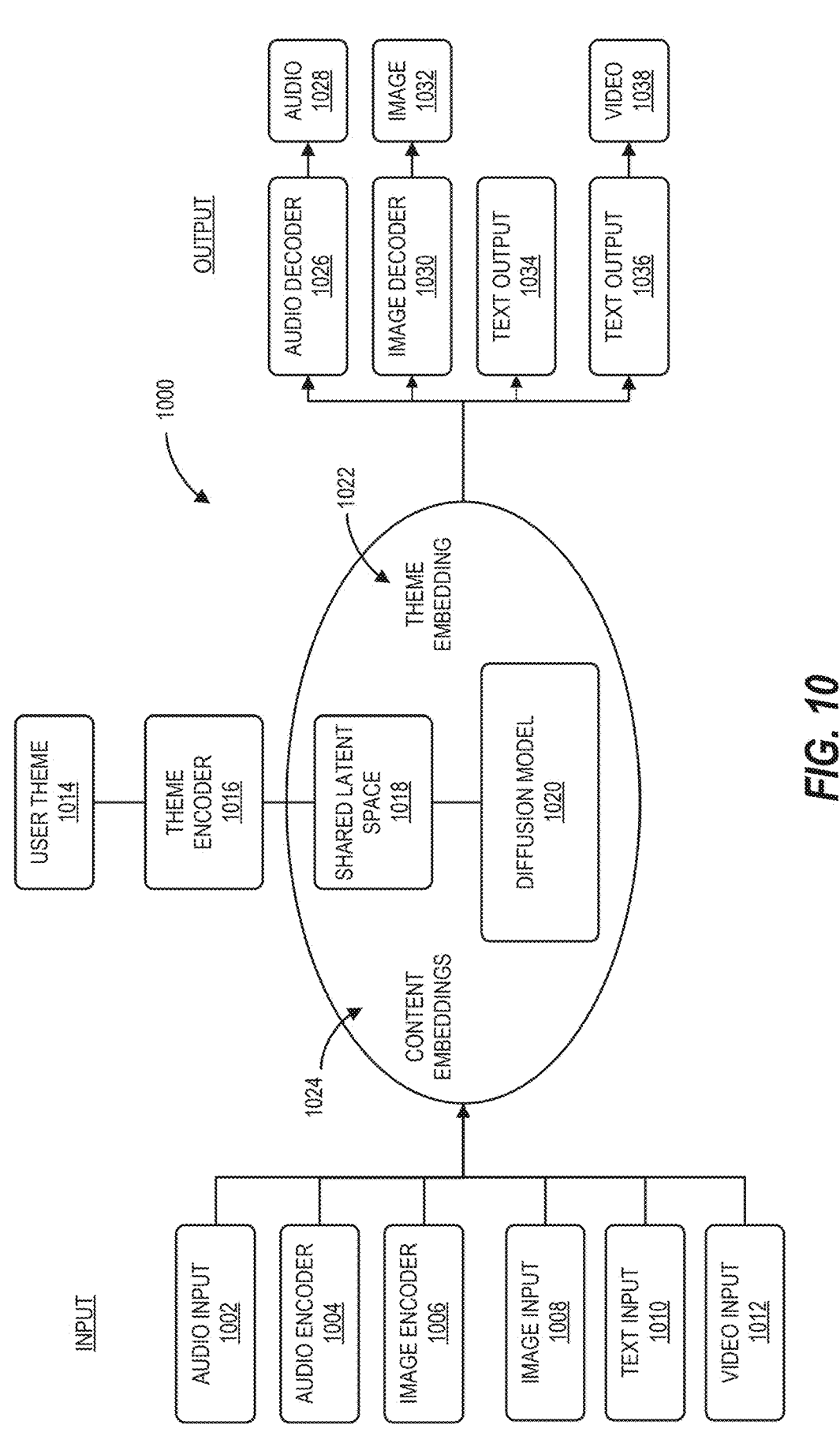
FIG. 10 depicts a schematic diagram of a latent space transformation system in accordance with aspects of the present disclosure.

FIG. 10 depicts a schematic diagram of a latent space transformation system 1000 that illustrates the processing of multimodal content through a shared latent space to generate derivative works. The system 1000 provides a detailed implementation of the content derivation platform 110 depicted in FIG. 1 and elaborates on the memory components 205, 210, 215 and processor 200 architecture shown in FIG. 2.

The input section includes various content input components that receive different types of media. Audio input 1002 represents a component configured to receive audio content, such as music, speech, or sound effects. The audio input 1002 corresponds to a portion of the predetermined content 120 shown in FIG. 1 and represents one of the discrete content streams resulting from the stream splitter 410 depicted in FIG. 4. This component may be implemented as an audio interface capable of processing various audio formats such as MP3, WAV, AAC, or FLAC, and may include preprocessing capabilities such as noise reduction, normalization, or sample rate conversion to prepare the audio content for subsequent encoding operations.

Audio encoder 1004 receives the audio input 1002 and transforms it into a representation suitable for the shared latent space 1018. The audio encoder 1004 corresponds to the audio encoder 435 shown in FIG. 4 and represents one of the multimodal encoder networks 260 depicted in FIG. 3. The audio encoder 1004 may employ various techniques such as convolutional neural networks (CNNs) to extract mel-frequency cepstral coefficients (MFCCs) or other audio features, recurrent neural networks (RNNs) to capture temporal dependencies, or transformer-based architectures to encode sequential audio information.

Image encoder 1006 is configured to encode visual content into the shared latent space 1018. The image encoder 1006 corresponds to the image encoder 440 shown in FIG. 4 and is another implementation of the multimodal encoder networks 260 from FIG. 3. The image encoder 1006 may utilize architectures such as CNNs, Vision Transformers (ViT), or other neural network configurations designed to process spatial data.

Image input 1008 provides visual content to the image encoder 1006. The image input 1008 represents another type of predetermined content 120 from FIG. 1 and corresponds to the image stream 420 in FIG. 4. This image input 1008 may receive images in various formats such as JPEG, PNG, TIFF, or RAW, and may include preprocessing functions to prepare images for optimal encoding.

Text input 1010 provides textual content for transformation within the system. The text input 1010 corresponds to the text stream 425 in FIG. 4 and is another form of predetermined content 120 from FIG. 1. The text input 1010 may perform preprocessing operations such as tokenization, stemming, or normalization to prepare the text for subsequent encoding.

Video input 1012 represents a component that receives video content for transformation, extending the multimodal input capabilities depicted in FIGS. 1 and 4. The video input 1012 may handle various video formats and may perform preprocessing operations such as frame extraction, temporal sampling, or format standardization to prepare video content for encoding.

User theme 1014 represents the user-specified theme or transformation parameters that guide the derivative work generation. The user theme 1014 directly corresponds to the requested theme 130 in FIG. 1 and the requested theme 280 in FIG. 3. This component serves as the control mechanism through which users specify their creative intent, and may be provided through the prompt system 135 shown in FIG. 1. The theme encoder 1016 transforms the user theme 1014 into a representation compatible with the shared latent space 1018. The theme encoder 1016 implements the functionality described in the DWGAE 220 from FIGS. 2 and 3, specifically for processing user-specified themes. The user theme encoder 1014 may employ natural language processing techniques, embedding models, or other neural network architectures to convert thematic specifications into vectorized representations.

The transformation section is centered around the shared latent space 1018, which serves as the unified representational domain where content from different modalities and the user theme are transformed. The shared latent space 1018 corresponds to the latent space 450 in FIG. 4 and is a component of the DWGAE 220 implementation depicted in FIG. 3. Within the shared latent space 1018, content embeddings 1024 represent the encoded input content from various modalities. The content embeddings 1024 connect to the shared latent space via connection 1024, which represents the flow of encoded content into the transformation environment and corresponds to the pathways shown between encoders and the latent space in FIG. 4. Theme embeddings 1022 represents the encoded user theme within the shared latent space 1018. The theme embedding connects to the shared latent space via connection 1022, which represents the integration of thematic parameters into the transformation process and implements the workflow described for the DWGAE 220 in FIG. 3.

The diffusion model 1020 operates within the shared latent space 1018 to transform the content embeddings 1024 based on the theme embeddings 1022. The diffusion model 1020 corresponds to one or more of the collective diffusion models 270 shown in FIG. 3 and the specific diffusion models 455, 460, 465 depicted in FIG. 4. The diffusion model 1020 may perform transformation operations that produce the derivative work in the latent representation, implementing both the forward diffusion process 245 and reverse diffusion process 250 shown in FIG. 3.

The output section includes various decoder components that transform the latent representations back into perceivable media formats. Audio decoder 1026 converts latent representations into audio outputs and corresponds to the audio decoder 470 in FIG. 4 and is part of the multimodal decoder networks 265 shown in FIG. 3. Audio output 1028 represents the derivative audio content produced by the system. This output corresponds to a component of the derivative work 125 depicted in FIG. 1 and represents content that has been processed through the output high dimensional space 485 shown in FIG. 4. Image decoder 1030 transforms latent representations into visual outputs. This component corresponds to the image decoder 475 in FIG. 4 and is another implementation of the multimodal decoder networks 265 from FIG. 3. Image output 1032 represents the derivative visual content produced by the system. This output is another aspect of the derivative work 125 from FIG. 1 and represents transformed content that has passed through the output high dimensional space 485 shown in FIG. 4. Text decoder 1034 converts latent representations into textual outputs. This component corresponds to the text decoder 480 in FIG. 4 and is another implementation of the multimodal decoder networks 265 from FIG. 3. Text output 1036 represents the derivative textual content produced by the system. This output is another aspect of the derivative work 125 shown in FIG. 1 and has been processed through the output high dimensional space 485 depicted in FIG. 4. Video output 1038 represents the derivative video content produced by the system, extending the types of derivative works 125 shown in FIG. 1 beyond the specific modalities depicted in FIG. 4. The system 1000 as a whole enables the transformation of multimodal content according to user-specified themes through a unified latent representation, elaborating on the content derivation pipeline 400 shown in FIG. 4 and implementing the functionality of the content derivation platform 110 depicted in FIG. 1. The architecture allows for cross-modal influences, creating multimedia derivative works that can be protected by the digital watermark 145 and governed by the authorization server 140 shown in FIG. 1.

While FIG. 10 depicts multiple inputs (audio input 1002, image input 1008, text input 1010, and video input 1012), it should be understood that the latent space transformation system 1000 may operate with a single input modality or any combination of multiple input modalities. The system 1000 is adaptable to various scenarios where a user may wish to transform only audio content, only video content, only image content, or any combination of available modalities. Similarly, although multiple output types are illustrated (audio output 1028, image output 1032, text output 1036, and video output 1038), the system 1000 may generate a single type of output or multiple types of outputs based on the transformation parameters and the nature of the input content, providing flexibility to create derivative works in one or more desired formats regardless of the input modality or modalities.

Figure 11:
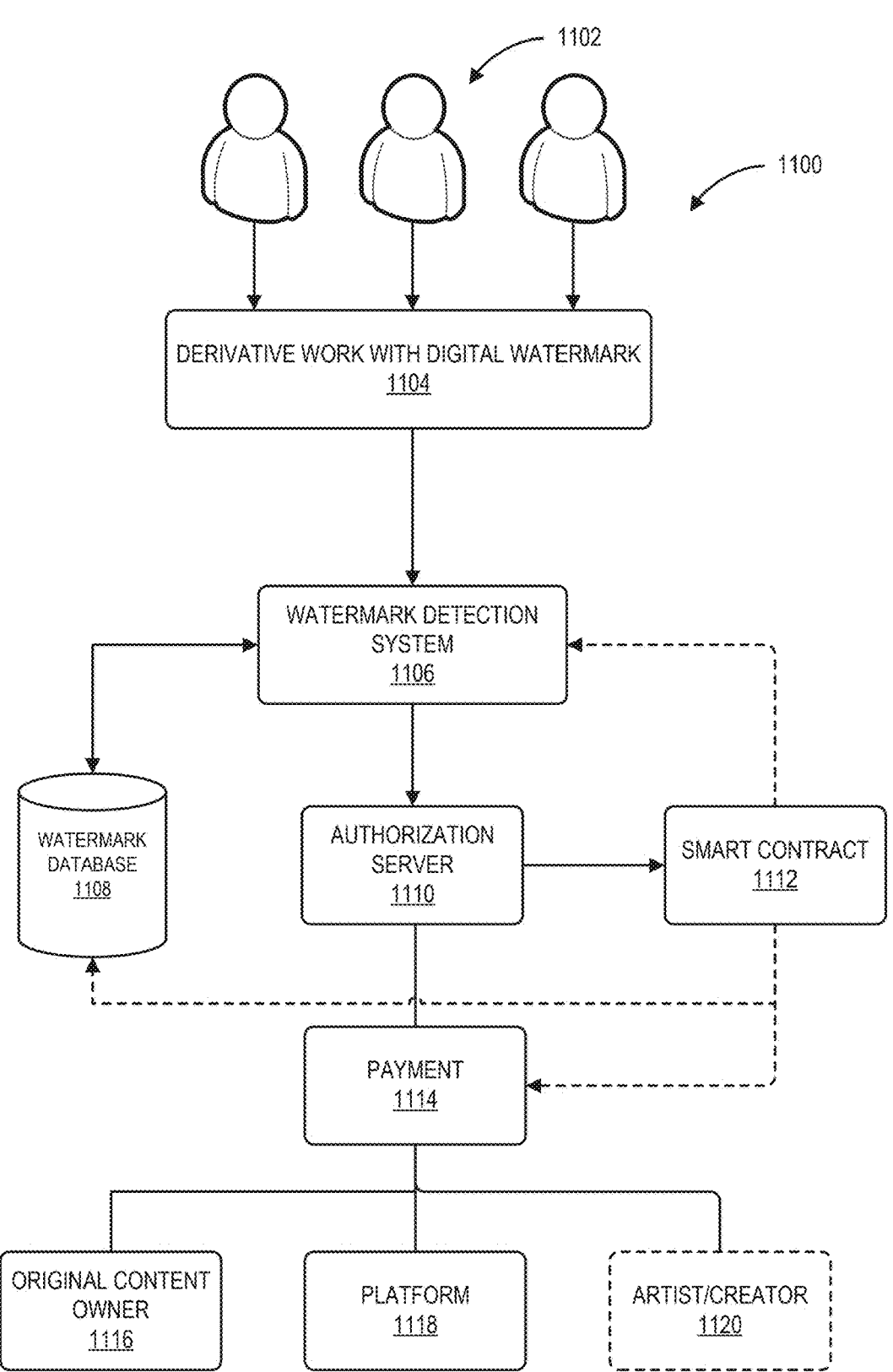
FIG. 11 depicts a schematic diagram of a smart contract payment and attribution flow system in accordance with aspects of the present disclosure.

FIG. 11 depicts a schematic diagram of a smart contract payment and attribution flow system 1100 illustrating the mechanism for tracking usage, managing rights, and distributing compensation for derivative works in accordance with aspects of the present disclosure. The system 1100 provides a more detailed implementation of how the authorization server 140 shown in FIG. 11 interacts with the digital watermark 145 to govern use of approved derivative works. The system 1100 includes multiple users 1102, represented as user icons in the diagram. These users 1102 may correspond to the user 105 depicted in FIG. 1, though in this implementation, multiple users can access the same derivative work. The users 1102 may interact with the derivative work through various interfaces, including but not limited to mobile applications 150 hosted on mobile devices 155 as shown in FIG. 1. Users 1102 may include consumers, content creators, distributors, or other stakeholders who have been granted access to the derivative work.

Derivative work with digital watermark 1104 represents the transformed content that has been approved through the multi-stage approval process, such as that depicted in FIG. 9, and subsequently watermarked for distribution. This derivative work 1104 corresponds to the derivative work 125 shown in FIG. 1, but specifically includes the embedded digital watermark 145 also shown in FIG. 1. The derivative work 1104 may comprise various types of content including audio, video, images, or text, as processed through the latent space transformation system 1000 depicted in FIG. 10. The digital watermark embedded within the derivative work 1104 may contain metadata such as creation timestamp, content identifiers, usage permissions, and attribution information that facilitates the tracking and management of the content.

Watermark detection system 1106 is configured to monitor and verify the digital watermarks embedded in derivative works as they are accessed or distributed. This system may implement various signal processing techniques to extract watermark data from different content types while maintaining the integrity of the content itself. The watermark detection system 1106 may operate across various platforms and devices, providing a consistent verification mechanism regardless of how or where the derivative work is accessed. The system may be implemented using specialized algorithms designed to detect watermarks even when content has undergone compression, format conversion, or other common transformations that might otherwise degrade embedded data. Watermark database 1108 stores information about all digital watermarks that have been applied to approved derivative works. The watermark database 1108 maintains records that can be used to authenticate watermarks detected by the watermark detection system 1106 and verify the legitimacy of derivative works in circulation. The watermark database 1108 may be implemented using secure database technologies with redundancy and encryption to protect the integrity of the watermark data. The watermark database 1108 functions as part of the broader authorization infrastructure, providing a trusted repository of watermark signatures that can be referenced during the authorization process.

In some aspects, the watermark database 1108 may function as a usage registry. A usage registry may refer to a centralized or distributed data storage system that maintains records of usage permissions, constraints, and rights management information associated with derivative works. The usage registry serves as an authoritative reference point accessible via digital identifiers embedded within derivative works, enabling automated verification and enforcement of usage terms. The usage registry may be implemented in various forms, including but not limited to: a traditional centralized database maintained by a trusted third party; a distributed ledger or blockchain-based system providing immutable records of permissions and constraints; a federated network of interconnected databases maintained by multiple stakeholders; and/or a cloud-based registry service with suitable authentication and authorization mechanisms.

In some implementations, distribution control is enforced by detecting the presence or absence of an embedded identifier (e.g., a watermark) in the derivative work file, without requiring a lookup in an external usage registry. This enables low-latency enforcement mechanisms and accommodates partner platforms that rely solely on in-file markers. In some implementations, a fingerprint of the derivative work may be generated based on characteristics of the output (e.g., spectral content, temporal structure, perceptual audio features, etc.) and stored in a fingerprint database (e.g., usage registry). When a platform receives or processes a derivative work, it can compute the fingerprint of the incoming content and compare it against records in the fingerprint database to identify the work and retrieve any associated usage constraints. This method enables enforcement even when metadata or embedded codes are missing or have been altered, and provides an alternative or complement to watermark-based enforcement. In some implementations, a usage registry may refer to an external service, an internal rule evaluation engine, and/or embedded metadata parsing logic on a playback device.

In some aspect, each record within the usage registry includes metadata defining permissible uses of a specific derivative work, including distribution channels, monetization parameters, attribution requirements, temporal limitations, geographical restrictions, and other constraints established by the content authority. The usage registry may also store provenance information documenting the derivative work's creation process, the source content utilized, and modifications applied.

Authorization server 1110 governs access to derivative works based on the verification of watermarks and application of usage policies. The authorization server 1110 corresponds directly to the authorization server 140 depicted in FIG. 1 and implements the access authorization functionality described in step 928 of FIG. 9. The authorization server 1110 may receive verification data from the watermark detection system 1106 and, upon confirming the authenticity of a watermark, issue the appropriate access permissions to users. The server may also maintain usage policies that define how derivative works can be accessed, distributed, or monetized based on agreements with content owners. One or more smart contract 1112 facilitates automated transactions based on predefined rules and conditions triggered by usage of the derivative work. The smart contract 1112 may be implemented using blockchain technology or other distributed ledger systems to ensure transparency and immutability of transaction records. When usage of a derivative work is detected and verified, the smart contract 1112 can automatically execute payment distributions according to predetermined formulas or agreements. This automation reduces administrative overhead and ensures consistent application of compensation models across multiple derivative works and usage scenarios.

Payment 1114 represents the system component responsible for processing and distributing compensation based on usage of derivative works. This component receives instructions from the smart contract 1112 and executes the appropriate financial transactions to compensate stakeholders. The payment 1114 component may interface with various financial systems, cryptocurrency networks, or banking platforms to facilitate transfers of funds. It may also generate transaction records and receipts for accounting and auditing purposes, ensuring transparency in the compensation process.

Original content owner 1116 is one of the primary recipients of payments generated from the use of derivative works. The original content owner 1116 corresponds to the entity that owns the rights to the predetermined content 120 shown in FIG. 1, which was transformed through the content derivation platform 110 to create the derivative work. This stakeholder typically receives the largest percentage of compensation, reflecting their ownership of the underlying intellectual property that forms the foundation of the derivative work. Platform 1118 represents the entity that operates the content derivation infrastructure, corresponding to the content derivation platform 110 shown in FIG. 1. The platform 1118 receives a portion of the payments generated from derivative works as compensation for providing the technological framework, processing resources, and administrative services that enable the creation, approval, and distribution of derivative works. This revenue stream supports ongoing development and maintenance of the platform's capabilities. Artist/creator 1120, shown with a dashed outline to indicate its optional nature, represents additional stakeholders who may receive compensation from the use of derivative works. These may include performers, producers, arrangers, or other creative contributors who participated in the original content or who added value during the derivative work creation process. The inclusion of this stakeholder in the payment distribution acknowledges the creative contributions beyond basic ownership rights, providing a more comprehensive compensation model.

The system 1100 as a whole enables a transparent, automated approach to managing the commercial aspects of derivative works. By linking digital watermarks to authentication systems and smart contracts, the system creates a seamless flow from content access to stakeholder compensation, ensuring that all parties receive appropriate attribution and payment for their contributions to the derivative work ecosystem. While the diagram depicts a specific configuration of components and interactions, it should be understood that various implementations may modify this architecture based on specific use cases or technological constraints. For example, the watermark detection process might be integrated directly into content playback applications, or the payment distribution might be handled through traditional financial processors rather than blockchain-based smart contracts. The flexibility of the system allows it to adapt to various business models and technological environments while maintaining its core functionality of linking content usage to appropriate compensation.

Figure 12:
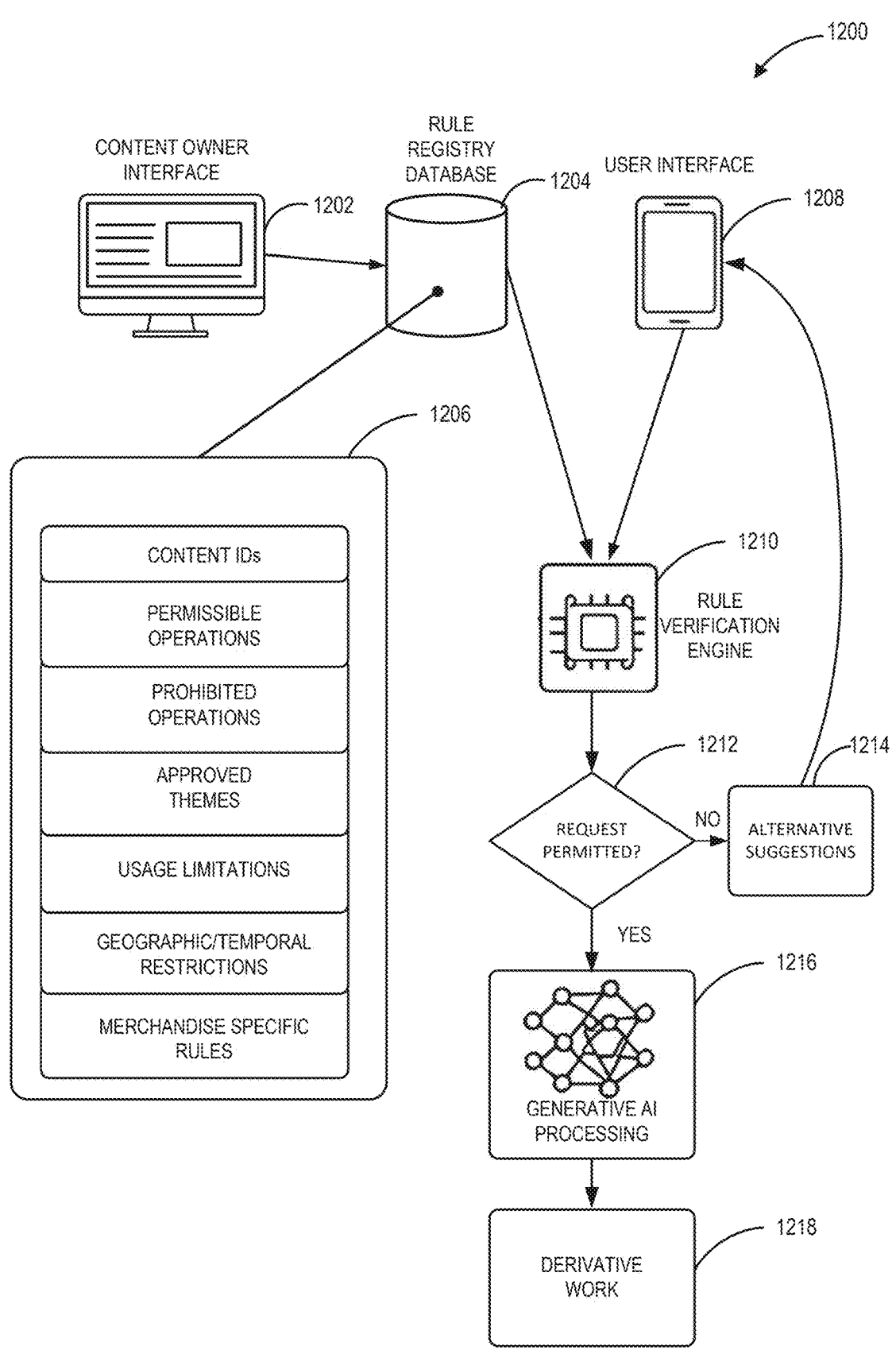
FIG. 12 depicts a system for rule-based generation of derivative works in accordance with aspects of the present disclosure.

FIG. 12 illustrates a system 1200 for rule-based generation of derivative works using artificial intelligence in accordance with aspects of the present disclosure. The system 1200 provides a framework for managing content transformation according to predefined rules while ensuring compliance with content owner preferences.

The system 1200 comprises multiple interconnected components that facilitate controlled derivative work creation. A content owner interface 1202 enables content authorities to establish and manage transformation parameters. The content owner interface 1202 may be implemented as a graphical user interface accessible via a computing device, such as a desktop computer, laptop, or tablet. Through this interface, content owners can define permissible operations, prohibited operations, approved themes, usage limitations, and geographic or temporal restrictions for their content. The interface may enable content owners to specify fine-grained control parameters that can be encoded in structured data formats. Additionally, the content owner interface 1202 may include analytics capabilities that provide insights into derivative work creation patterns, allowing content owners to refine their rule sets based on actual usage data and market trends.

A rule registry database 1204 stores transformation rules associated with various content identifiers. The rule registry database 1204 may be implemented as a centralized or distributed database containing transformation rules for one or more pieces of content. Each entry in the database may associate a content identifier with specific rule parameters, including permitted operations, prohibited operations, approved themes, usage limitations, and geographic/temporal restrictions. The database schema may support versioning of rule sets, enabling content owners to update their preferences over time while maintaining a historical record of previous rule configurations. This versioning capability ensures that previously approved derivative works remain valid even if underlying rules change, while new transformation requests are evaluated against the current rule set. Furthermore, the rule registry database 1204 may maintain a history of permission changes, enabling auditability and allowing content owners to revert to previous rule configurations if needed.

The rule registry database 1204 may include one or more content transformation rules 1206. The one or more content transformation rules 1206 organizes rules into distinct categories, including content identifiers, permissible operations, prohibited operations, approved themes, usage limitations, and geographic/temporal restrictions. Content identifiers uniquely reference specific source content that may be transformed, while permissible operations define allowed transformation types such as style transfers, tempo adjustments, or instrumentation changes. For example, a music label might establish rules for a particular artist's catalog specifying that melody and instrumentation modifications are permitted, but vocal alterations are prohibited. Prohibited operations explicitly specify transformations that are not permitted for the content, while approved themes establish the contextual boundaries within which transformations may occur, such as jazz, classical, or acoustic transformations being approved themes, while explicit or politically charged themes are prohibited. Usage limitations define constraints on how derivative works may be distributed or monetized, potentially specifying that derivative works can only be created for personal use, with commercial exploitation requiring additional licensing. Geographic/temporal restrictions may limit creation to specific territories or time periods, such as restricting derivative works during the promotional period for a new album release.

A user interface 1208 enables end users to submit transformation requests and interact with the system. The user interface 1208 may be implemented as a mobile application, web interface, or desktop software, providing intuitive controls for selecting content and specifying desired transformations. This interface may adaptively present only transformation options that align with the rule sets established for the selected content, guiding users toward compliant derivative work creation from the outset. For instance, if a content owner has specified that tempo changes between 70-120 BPM are permitted but vocal modifications are prohibited, the user interface 1208 may present slider controls for tempo adjustment within the allowed range while omitting options for vocal editing. This approach minimizes rejection of user requests by guiding users toward permissible transformations from the outset.

The system 1200 also includes a rule verification engine 1210 operatively coupled to the user interface 1208 and the rule registry database 1204. The rule verification engine 1210 is configured to retrieve rule sets corresponding to selected content identifiers and evaluate transformation requests against these retrieved rule sets. Prior to allocating computational resources for derivative work generation, the rule verification engine 1210 may parse the user's requested theme and intended transformation against the applicable rules for the selected content. For instance, if a user requests to transform a song into a dance remix while the rule registry only permits jazz, classical, or acoustic transformations for that particular song, the rule verification engine 1210 may reject the request. Upon evaluation, the rule verification engine 1210 generates an approval output when the transformation request complies with the rule set, or a rejection if compliance cannot be established.

At decision point 1212, the system 1200 determines whether a request is permitted based on the rule verification engine's evaluation. If the request is determined to be non-compliant (NO path), the system may proceed to 1214, where the system may provide alternative suggestions to a user. These suggestions may include modification recommendations that would bring the request into compliance with the established rules, or alternative content selections that better align with the user's transformation goals. For example, if a user requests an unauthorized transformation type, the system might suggest permitted alternative transformation types that achieve similar creative outcomes while respecting content owner preferences. This feedback mechanism enhances user experience by providing constructive guidance rather than simply rejecting non-compliant requests.

If the request is determined to be compliant (YES path), the system proceeds to generative AI processing 1216. This component may implement various artificial intelligence techniques such as neural networks, diffusion models, or transformer architectures to generate derivative works that comply with both the user's requested transformations and the content owner's established parameters. The generative AI processing may dynamically adapt its outputs based on the specific constraints defined in the rule set, ensuring that all generated content remains within approved boundaries. The output of the system is the derivative work 1218. This derivative work 1218 is generated according to the user's request while maintaining compliance with all applicable rules established by the content owner. The derivative work may include appropriate attribution and usage metadata, facilitating proper tracking and management throughout its lifecycle.

The system 1200 may also include capabilities for processing standardized data feeds from content owners, enabling automated updates to the rule registry database 1204. These feeds may utilize industry-standard formats similar to those employed for other content management operations, such as those used by music labels to distribute metadata to streaming platforms. Through these feeds, content owners can modify transformation permissions in real-time without requiring system-wide updates to the overall system. For example, a content owner might temporarily restrict certain transformation types during a marketing campaign, or expand permissible operations based on observed user behaviors and market trends.

In some implementations, the rule-based system 1200 may operate independently or in conjunction with machine learning-based content approval models. In a hybrid implementation, the rule-based system may handle initial screening of transformation requests, with machine learning models providing secondary verification of the generated content against more subjective criteria or emerging patterns not explicitly encoded in the rule registry database 1204. As the system evolves, analytics derived from user interactions and content owner feedback may inform refinements to both the rule-based and machine learning components, creating an increasingly sophisticated governance framework that balances creative flexibility with content owner control. The system 1200 thus provides a framework for controlled transformation of content using generative artificial intelligence, ensuring that derivative works respect the preferences and requirements established by content owners while enabling creative expression within those boundaries. Although various features have been described with reference to the Figures, other features are possible.

Implementation 1. A method comprising: receiving predetermined content, using a database server; receiving a request to transform the predetermined content into a derivative work, using a content derivation platform comprising at least one processor; receiving a requested theme for the derivative work, using the at least one processor; creating the derivative work generated as a function of the predetermined content and the requested theme, using generative artificial intelligence and the at least one processor; determining if the generated derivative work is approved based on a content approval machine learning model configured to determine a content approval score as a function of a content owner preference and the generated derivative work, using the at least one processor; and in response to determining the content approval score is greater than a predetermined minimum: applying a digital watermark to the approved derivative work, using the at least one processor; configuring an authorization server to govern use of the approved derivative work based on the digital watermark, using the at least one processor; and providing access to the approved derivative work.

Implementation 2. The method of implementation 1, wherein the content comprises music.

Implementation 3. The method of implementation 1, wherein the content comprises audio.

Implementation 4. The method of implementation 3, wherein the audio further comprises a human voice sound.

Implementation 5. The method of implementation 4, wherein the method further comprises detecting the human voice based on a technique comprising autocorrelation, using the at least one processor.

Implementation 6. The method of implementation 5, wherein the autocorrelation further comprises frequency domain autocorrelation, using the at least one processor.

Implementation 7. The method of implementation 3, wherein the audio further comprises a musical instrument sound.

Implementation 8. The method of implementation 1, wherein the requested theme is determined based on an interview with a user, using the at least one processor.

Implementation 9. The method of implementation 8, wherein the interview with the user is performed by a chatbot, using the at least one processor.

Implementation 10. The method of implementation 8, wherein the requested theme is determined based on matching a response from the user with a semantically similar predetermined theme identified by a Large Language Model (LLM) as a function of the response from the user, using the at least one processor.

Implementation 11. The method of implementation 8, wherein the predetermined theme is pre-approved by the content owner.

Implementation 12. The method of implementation 1, wherein the generative artificial intelligence comprises a diffusion model.

Implementation 13. The method of implementation 12, wherein the diffusion model is a latent diffusion model.

Implementation 14. The method of implementation 12, wherein the method further comprises encoding the content to a latent space, using an encoder network.

Implementation 15. The method of implementation 14, wherein the encoder network further comprises a convolutional neural network (CNN) configured to extract mel-frequency cepstral coefficients (MFCCs) from the content.

Implementation 16. The method of implementation 14, wherein the encoder network further comprises a CNN configured to extract a spatial or temporal feature from the content.

Implementation 17. The method of implementation 14, wherein the encoder network further comprises a recurrent neural network (RNN) or a transformer, configured to extract a word embedding from the content.

Implementation 18. The method of implementation 14, wherein the method further comprises decoding the content from the latent space, using a decoder network.

Implementation 19. The method of implementation 1, wherein the content approval machine learning model further comprises a neural network configured to determine a score identifying a degree of like or dislike by the content owner for the derivative work, the score determined as a function of a text embedding identifying an item in the derivative work, using the at least one processor.

Implementation 20. The method of implementation 1, wherein the method further comprises determining a text embedding identifying an item, using a CLIP model.

Implementation 21. The method of implementation 1, wherein the method further comprises converting the requested theme to a text embedding in a shared latent space, using the at least one processor.

Implementation 22. The method of implementation 1, wherein the method further comprises transforming the predetermined content into a derivative work comprising audio, video or images, based on an embedding for the requested theme, using the at least one processor.

Implementation 23. The method of implementation 1, wherein apply the digital watermark further comprises embedding the digital watermark in the derivative work.

Implementation 24. The method of implementation 23, wherein the method further comprises frequency domain embedding of the digital watermark.

Implementation 25. The method of implementation 1, wherein the method further comprises updating the derivative work with a new digital watermark that is valid for a limited time and providing access to the updated derivative work.

Implementation 26. The method of implementation 1, wherein govern use of the approved derivative work further comprises configure a tracking system to determine authenticity of the derivative work, verified as a function of the digital watermark by the tracking system.

Implementation 27. The method of implementation 1, wherein govern use of the approved derivative work further comprises validating user requests for access to the derivative work authorized as a function of the digital watermark.

Implementation 28. The method of implementation 1, wherein govern use of the approved derivative work further comprises automatically request an automated payment via a smart contract execution triggered based on use of the derivative work detected as a function of the digital watermark.

Implementation 29. The method of implementation 1, wherein govern use of the approved derivative work further comprises revoke access to the derivative work upon determining a time-sensitive watermark has expired.

Implementation 30. An article of manufacture comprising: a memory that is not a transitory propagating signal, wherein the memory further comprises computer readable instructions configured that when executed by at least one processor the computer readable instructions cause the at least one processor to perform operations comprising: receive predetermined content; receive a request to transform the predetermined content into a derivative work; receive a requested theme for the derivative work; create the derivative work generated as a function of the predetermined content and the requested theme, using generative artificial intelligence; determine if the generated derivative work is approved based on a content approval machine learning model configured to determine a content approval score as a function of a content owner preference and the generated derivative work; and in response to determining the content approval score is greater than a predetermined minimum: apply a digital watermark to the approved derivative work;

configure an authorization server to govern use of the approved derivative work based on the digital watermark; and provide access to the approved derivative work.

In some aspects, a method for multi-stage approval and controlled distribution of a derivative work may comprise receiving a request associated with source content and a transformation theme for creating a derivative work based on the source content; in response to evaluating the request against pre-generation preference data associated with a content authority, generating the derivative work from the source content in accordance with the transformation theme by applying a generative artificial-intelligence model; in response to evaluating the derivative work against post-generation preference data associated with the content authority, embedding a digital identifier comprising at least one of a watermark or fingerprint as part of the derivative work; providing to a usage registry addressable via the digital identifier, usage-constraint metadata for the derivative work; and enabling distribution of the derivative work in accordance with the usage-constraint metadata.

In some aspects, the request may be received through a user interface presented on a client device.

In some aspects, the request may comprise a natural-language prompt, and the method may further comprise extracting the transformation theme by parsing the natural-language prompt with a large-language-model parser.

In some aspects, the request may be generated automatically by an application from contextual data without explicit user input.

In some aspects, evaluating the request against the pre-generation preference data may comprise applying a machine-learning classifier trained on historical approvals and rejections designated by the content authority.

In some aspects, the method may further comprise transmitting the request to an external verification service designated by the content authority; and approving the request for generation when both the machine-learning classifier and the external verification service return an approval indication.

In some aspects, the pre-generation preference data may specify at least one of a temporal, quantitative, or geographic limit on derivative-work creation and the method may further comprise rejecting the request when fulfilment of the request would exceed the limit on derivative-work creation.

In some aspects, the generative artificial-intelligence model may be a latent diffusion model.

In some aspects, the method may further comprise fine-tuning the latent diffusion model on training data selected according to the transformation theme, prior to generating the derivative work.

In some aspects, evaluating the derivative work against the post-generation preference data may comprise generating a content-approval score and approving the derivative work when the content-approval score satisfies a binary pass/fail threshold.

In some aspects, the method may further comprise generating, when the derivative work fails the binary threshold, a remediation report that identifies portions of the derivative work responsible for the failure.

In some aspects, evaluating the derivative work may further comprise comparing an audio fingerprint of the derivative work with a fingerprint library representing the source content; and rejecting the derivative work when fingerprint similarity exceeds a similarity threshold.

In some aspects, the digital identifier may be a pointer that resolves to a remote record storing at least one of provenance data, attribution data or licensing data for the derivative work.

In some aspects, the pointer may comprise a cryptographically signed hash and the method may further comprise verifying the cryptographic signature before enabling distribution of the derivative work.

In some aspects, the method may further comprise, when the derivative work is subsequently received as source content, detecting the digital identifier and replacing the digital identifier with a nested digital identifier that preserves provenance for successive derivative generations.

In some aspects, the usage-constraint metadata may include a time-to-live value and an authorization server may automatically disable distribution of the derivative work upon expiry of the time-to-live value.

In some aspects, the method may further comprise updating the usage registry with a renewed time-to-live value in response to receipt of a renewal payment.

In some aspects, the usage-constraint metadata may comprise at least one of: distribution channel restrictions; monetization parameters; attribution requirements; time-limited usage permissions; or geographical distribution limitations.

In some aspects, the usage-constraint metadata may include a geographic whitelist and an authorization server may enforce the geographic whitelist by geolocating each distribution request.

In some aspects, the method may further comprise executing a smart contract that automatically allocates revenue from each authorized distribution of the derivative work to stakeholders identified in the usage registry.

In some aspects, the smart contract may be triggered by an authorization server each time the digital identifier is verified during a streaming session and records each distribution event in a distributed ledger.

In some aspects, evaluating the derivative work against post-generation preference data may comprise analyzing the derivative work for unauthorized incorporation of third-party content; comparing the derivative work against objectionable content criteria; and scoring the derivative work based on quality thresholds defined by the content authority.

In some aspects, the method may further comprise rejecting the derivative work if the score falls below a predetermined threshold.

In some aspects, the post-generation evaluation may be performed by a third-party service independent from the entity generating the derivative work.

In some aspects, the pre-generation preference data may comprise exclusionary criteria identifying at least one of themes, topics, or content elements prohibited from inclusion in the derivative work; and evaluating the request against pre-generation preference data may comprise identifying keywords or semantic elements within the request; comparing the identified keywords or semantic elements against the exclusionary criteria; and rejecting the request if the identified keywords or semantic elements match the exclusionary criteria.

In some aspects, the pre-generation preference data may be periodically updated based on machine learning analysis of previously approved and rejected derivative works.

In some aspects, generating the derivative work may comprise maintaining predetermined elements of the source content while modifying other elements according to the transformation theme.

In some aspects, the predetermined elements may comprise at least one of original vocals, melody lines, rhythm patterns, or visual components.

In some aspects, the transformation theme may comprise at least one of a musical key change, a tempo modification, a genre shift, a vocal replacement, an instrumental addition, a remix specification, or a style transfer parameter.

In some aspects, an apparatus configured to perform multi-stage approval and controlled distribution of a derivative work may comprise one or more memories configured to store a request associated with source content and a transformation theme for creating a derivative work based on the source content; and one or more processors, coupled to the one or more memories, configured to perform the method operations described in the preceding aspects.

In artificial intelligence, "architecture" refers to the foundational framework of a machine learning model. For example, the architecture of an artificial neural network (ANN) encompasses layers and connections that form a complex mesh of mathematical functions. Each layer processes input data, passes it through activation functions, and transfers the result to the next layer. The architecture determines how data flows through the model, affecting its ability to learn and generalize from data. Engineers need to grasp these structural aspects to build and fine-tune effective models.

Artificial intelligence is a broad field within computer science dedicated to creating systems that emulate human intelligence. This includes capabilities like perception, synthesis, inference, and the ability to learn from data without explicit programming. Machine learning (ML) is a subset of AI that empowers systems to adapt and improve through experience. By employing ML algorithms, engineers can develop systems that progressively enhance their performance based on accumulated data and feedback.

Backpropagation is an essential algorithm for training neural networks, crucial for the optimization of model parameters. It works by calculating the gradient of the loss function with respect to each weight in the network through a process called automatic differentiation. This gradient information is then used to update the weights in the direction that minimizes the loss function, typically using gradient descent. This iterative process fine-tunes the model, improving its predictive accuracy.

Convolutional neural networks (CNNs) are specialized feed-forward neural networks designed for processing grid-like data such as images. CNNs utilize convolutional layers that apply filters to input images, detecting spatial hierarchies of features like edges and textures. These layers are followed by pooling layers that reduce dimensionality, preserving essential information while reducing computational load. This architecture enables CNNs to excel in tasks like image recognition, object detection, and image segmentation.

Diffusion models are generative models that create output by reversing a noise diffusion process. Starting with a noise distribution, the model iteratively refines the data by reducing noise and adding detail until a sample resembling the target distribution is produced. In text-to-image generation, diffusion models leverage embeddings of text prompts to condition the generation process, resulting in images that accurately reflect the described scenes. This approach ensures high fidelity and coherence in the generated content.

An embedding is a dense vector representation of data that captures its inherent properties. These vectors enable efficient comparison and manipulation of data items by placing them in a continuous vector space where similar items are positioned close together. In natural language processing (NLP), embeddings represent words, phrases, or sentences as vectors in a high-dimensional space, facilitating operations like semantic similarity, clustering, and downstream machine learning tasks.

Feed-forward neural networks (FFNNs) are a type of neural network architecture where data flows in a single direction: from the input layer, through one or more hidden layers, to the output layer. Each neuron in a layer is connected to every neuron in the next layer, enabling the network to learn complex mappings from inputs to outputs. This architecture is particularly effective for tasks like regression and classification, where clear input-output relationships exist.

Generative AI encompasses methods focused on creating new, synthetic content such as text, images, or music. These systems use techniques like neural networks, variational autoencoders (VAEs), and transformers to generate data based on learned patterns. For instance, diffusion models and transformers can produce high-quality content conditioned on user-provided prompts or reference data, enabling applications in creative fields like art, writing, and design.

Large language models (LLMs) are sophisticated machine learning models trained on extensive text corpora. These models leverage architectures like transformers to generate human-like text by predicting the next token in a sequence based on preceding context. LLMs utilize techniques such as attention mechanisms to handle long-range dependencies, enabling them to produce coherent and contextually relevant outputs across various language-related tasks.

Natural language processing (NLP) is a subfield of AI dedicated to the interaction between computers and human language. NLP tasks include language understanding, translation, and generation, employing techniques like tokenization, part-of-speech tagging, and syntactic parsing. Advanced models, such as transformers, use embeddings and attention mechanisms to process and generate natural language, enabling applications like chatbots, virtual assistants, and automated content creation.

Recurrent neural networks (RNNs) are neural networks designed for sequential data processing. Unlike feed-forward networks, RNNs have connections that loop back, allowing them to maintain a state that captures information about previous inputs. This makes RNNs particularly suited for tasks like time-series prediction and natural language processing, where context and order are crucial. Variants like long short-term memory (LSTM) networks address the vanishing gradient problem, enhancing the ability to learn long-range dependencies.

Reinforcement learning (RL) is a machine learning paradigm where an agent learns to make decisions by interacting with an environment. The agent selects actions based on a policy and receives feedback through rewards or penalties. Over time, the agent optimizes its policy to maximize cumulative rewards, using algorithms like Q-learning or policy gradients. RL is effective for tasks requiring strategic decision-making, such as game playing, robotics, and autonomous driving.

Self-supervised learning is a technique where a model learns from unlabeled data by solving pretext tasks. These tasks generate supervisory signals from the data itself, allowing the model to learn useful representations. For example, a model might predict the missing parts of an image or the next word in a sentence. Self-supervised learning leverages large amounts of unlabeled data, making it a powerful approach for representation learning in domains like vision and NLP.

Semi-supervised learning combines labeled and unlabeled data during training to leverage the strengths of both supervised and unsupervised learning. This approach is beneficial when labeled data is scarce or expensive to obtain. Techniques like pseudo-labeling, co-training, and graph-based methods help propagate labels from labeled to unlabeled data, improving model performance and generalization by utilizing the available data more effectively.

Supervised learning involves training machine learning models using a dataset where each input is paired with a corresponding output label. The model learns to map inputs to outputs by minimizing a loss function, typically through iterative optimization techniques like gradient descent. Supervised learning is used for tasks where historical data is available, such as classification, regression, and object detection, enabling accurate predictions on new, unseen data.

Transformers are a neural network architecture designed to handle sequential data, excelling in tasks like natural language processing. They rely on self-attention mechanisms to weigh the importance of different parts of the input sequence, allowing parallel processing and capturing long-range dependencies without recurrence. This architecture underpins many state-of-the-art language models, enabling complex tasks like translation, summarization, and question answering with high accuracy.

Unsupervised learning aims to uncover hidden patterns or structures within unlabeled data. Algorithms like clustering and dimensionality reduction analyze the data to group similar items or reduce its complexity. This approach is useful for exploratory data analysis, anomaly detection, and feature learning, providing insights and revealing relationships within data that might not be immediately apparent.

Diffusion Models: Architecture, Training and Usage

In an illustrative example, the disclosed system comprises a diffusion model, a noise Scheduler, and an image synthesizer. The diffusion model is responsible for generating images from Gaussian noise, while the noise scheduler controls the amount of noise added to the input signal during training, and the image synthesizer generates high-quality images from the output of the diffusion model.

An exemplary diffusion model may comprise a forward process and a reverse process. An exemplary forward diffusion process takes in a Gaussian noise signal as input and applies a series of transformations to progressively refine the noise signal, until it converges to a real image. An exemplary reverse diffusion process takes in a real image and applies a reverse sequence of transformations to transform it back into a Gaussian noise signal.

An exemplary diffusion model may comprise multiple layers, each of which may include one or more of the following components:

1. Noise Scheduler: This component controls the amount of noise added to the input signal during training. The noise schedule is a sequence of noise levels used during training. Each level in the noise schedule corresponds to a specific loss function.
2. Loss Function: The loss function is used to evaluate the performance of the model during training. A common choice for a diffusion model is the Beta-VAE (Variational Autoencoder) loss.
3. Transformer Blocks: These blocks consist of two transformer layers that process the input signal and apply transformations to refine it.
4. Upsampling Layers: These layers upsample the output of the previous layer, allowing the model to increase the spatial resolution of the image.

5. Residual Connections: These connections allow the model to preserve some information from the previous layer, improving its ability to generate high-quality images.
6. Optimization Algorithm: The optimization algorithm is used to update the model parameters during training. A common choice for a diffusion model is stochastic gradient descent (SGD).

In an exemplary diffusion model training mode, the data flows through the following components:

1. Noise Scheduler: The noise scheduler takes in a batch of Gaussian noise signals as input and generates a schedule for adding noise to the signal.
2. Forward Process: The forward process takes in the Gaussian noise signal and applies the transformations specified by the noise schedule to progressively refine it.
3. Reverse Process: The reverse process takes in a real image and applies the reverse sequence of transformations to transform it back into a Gaussian noise signal.

In an exemplary diffusion model inference mode, the data flows through the following components:

1. Noise Scheduler: The noise scheduler generates a noise schedule for adding noise to an input signal.
2. Forward Process: The forward process takes in the input signal and applies the transformations specified by the noise schedule to generate an image.
3. Image Synthesizer: The image synthesizer takes in the output of the forward process and refines it to produce a high-quality image.

A diffusion model may be trained using a combination of two objectives:

1. Reconstruction Loss: Minimize the difference between the input signal and its reconstructed version based on the output of the diffusion model.
2. KL Divergence: Maximize the similarity between the output of the diffusion model and a target distribution.

An exemplary diffusion model training process involves the following steps:

1. Initialization: Initialize the weights of the Diffusion Model using a pre-trained model or random weights.
2. Training Loop: Iterate through the dataset, applying the forward process to generate images from Gaussian noise.
3. Backward Pass: Apply the backward pass to compute the gradients of the reconstruction loss and KL divergence with respect to the model parameters.
4. Weight Update: Update the model parameters using the computed gradients.

Latent Diffusion Model Architecture, Training and Use

The disclosed generative artificial intelligence system is designed to utilize a latent diffusion model to generate derivative content comprising audio, video, and images from predetermined content. Exemplary architecture, algorithms, and programming are detailed below:

The latent diffusion model is based on the Denoising Diffusion Probabilistic Model (DDPM). This model consists of a forward process that progressively refines the input noise signal to generate a synthetic data sample, and a reverse process that estimates the noise schedule from the generated sample.

Training:

The DDPM is trained on a dataset consisting of paired pairs of content and derivative content. The content is represented as a fixed-size vector, while the derivative content is represented as a 3D tensor with dimensions (batch size)×(sequence length)×(feature dimension). During training, the model learns to predict the noise schedule from the generated synthetic data samples.

1. Data Preparation: A dataset consisting of paired pairs of content and derivative content is prepared for training.
2. Model Initialization: The latent diffusion model is initialized with a random noise schedule.
3. Training Loop: The training loop consists of the following steps:
   a. Forward Process: The forward process refines the input noise signal to generate a synthetic data sample.
   b. Reverse Process: The reverse process estimates the noise schedule from the generated sample.
   c. Loss Calculation: The loss is calculated using a combination of reconstruction loss and KL divergence loss.
4. Training Optimization: The training optimization algorithm is used to update the model parameters during each iteration.

Contrastive Language-Image Pretraining (CLIP) Embeddings:

The CLIP embeddings are used to generate text representations for the requested theme. The CLIP model is trained on a large dataset of paired text-image pairs and consists of two branches:

1. Text Encoder: This branch takes in the input text and generates a fixed-size vector representation.
2. Image Encoder: This branch takes in an image and generates a fixed-size vector representation.

Integration with Latent Diffusion Model:

The CLIP embeddings are integrated into the latent diffusion model by utilizing the text encoder to generate a text representation for the requested theme. The text representation is then used to fine-tune the DDPM on the derivative content dataset.

Derivative Work Generation:

1. Text Input Processing: The user's input theme is processed through the CLIP model to generate a text representation.
2. Latent Diffusion Model Fine-tuning: The generated text representation is used to fine-tune the DDPM on the derivative content dataset.
3. Denoising Diffusion Probabilistic Model: The trained DDPM is used to generate synthetic data samples from the predetermined content.
4. Content Augmentation: The generated synthetic data sample is augmented with additional information, such as metadata, captions, or music lyrics, to create a more comprehensive derivative work.

Algorithms and Programming:

1. Mathematical Framework: The system's mathematical framework is based on the Denoising Diffusion Probabilistic Model (DDPM).
2. Programming Language: The system is implemented in Python using popular libraries such as TensorFlow, PyTorch, or JAX.
3. Deep Learning Architecture: The DDPM consists of a forward process and a reverse process, which are implemented using deep learning architectures such as convolutional neural networks (CNNs) or fully connected neural networks (FCNNs).
4. Contrastive Language-Image Pretraining (CLIP): The CLIP embeddings are generated using the CLIP model implemented in Python.

Programming Details:

1. Latent Diffusion Model Implementation: A custom implementation of the DDPM is written in Python using TensorFlow or PyTorch.

2. Contrastive Language-Image Pretraining (CLIP) Embeddings Generation: The CLIP embeddings are generated using a pre-trained CLIP model implemented in Python.
3. Derivative Work Generation: The system generates the derivative work by fine-tuning the DDPM on the derivative content dataset and augmenting the generated synthetic data sample with additional information.

Use:

1. Data Preparation: A dataset consisting of paired pairs of content and derivative content is prepared for training.
2. Model Training: The latent diffusion model is trained on the dataset using a pre-trained CLIP model to generate text representations for the requested theme.
3. Model Fine-tuning: The generated text representation is used to fine-tune the DDPM on the derivative content dataset.
4. Derivative Work Generation: The system generates the derivative work by integrating the latent diffusion model with the CLIP embeddings.

Use Cases:

1. Image Generation: The system can be used to generate images based on user-specific themes.
2. Video Generation: The system can be used to generate videos based on user-specific themes.
3. Music Generation: The system can be used to generate music based on user-specific themes.

Encoder and Decoder Networks

Encoder Network: An exemplary diffusion model architecture may comprise an encoder network and a decoder network. The encoder network is responsible for encoding the input data into a compact latent representation, while the decoder network generates the final output sample from this latent representation.

The encoder network typically consists of a series of transposed convolutional layers (also known as downsampling layers) followed by a bottleneck layer. The transposed convolutional layers reduce the spatial dimensions of the input data, while the bottleneck layer reduces the number of channels in the feature maps. This process compresses the input data into a compact latent representation, which is used as input to the decoder network.

Decoder Network: The decoder network typically consists of a series of transposed convolutional layers (also known as upsampling layers) followed by a bottleneck layer. The transposed convolutional layers increase the spatial dimensions of the input data, while the bottleneck layer reduces the number of channels in the feature maps. This process expands the latent representation into a high-dimensional space, allowing the decoder network to generate high-quality output samples.

The proposed architecture comprises modality-specific encoder networks and decoder networks, trained to extract domain-specific features from multimodal content using a diffusion model. The architecture is designed to support multiple modalities, including audio, video, images, and text.

Modality-Specific Encoder Network (MESN): The MESN is responsible for extracting domain-specific features from the input multimodal content. Each modality has its own encoder network, which takes as input a sequence of pixels or frames representing that modality. The output of each encoder network is a fixed-size vector representation of the modality-specific features.

1. Audio Encoder Network: For audio data, the MESN uses a 1D convolutional neural network (CNN) with kernel size 3×1 and stride 2 to extract mel-frequency cepstral coefficients (MFCCs). The output of this layer is fed into a fully connected layer with ReLU activation to produce a fixed-size vector representation of audio features.

2. Video Encoder Network: For video data, the MESN uses a 3D convolutional neural network (CNN) with kernel size 3×3×3 and stride 2 to extract spatial and temporal features. The output of this layer is fed into a fully connected layer with ReLU activation to produce a fixed-size vector representation of video features.

3. Image Encoder Network: For image data, the MESN uses a 2D convolutional neural network (CNN) with kernel size 7×7 and stride 2 to extract spatial features. The output of this layer is fed into a fully connected layer with ReLU activation to produce a fixed-size vector representation of image features.

4. Text Encoder Network: For text data, the MESN uses an encoder-based recurrent neural network (RNN) such as LSTM or GRU to extract word embeddings.

The output of each modality-specific encoder network may be concatenated to form a multimodal feature vector.

Multimodal Diffusion Model Training: The diffusion model is trained on the multimodal feature vectors extracted by the MESN. The diffusion model takes as input a sequence of noise samples and outputs a sample from the target distribution (in this case, a conditional distribution over text).

1. Noise Schedule: A learned noise schedule is used to gradually add noise to the input sequence during training.

2. Diffusion Process: The diffusion process involves iteratively applying a series of transformations to the input sequence, with each transformation adding more noise. The final output is sampled from the target distribution.

Modality-Specific Decoder Network (MDDN): The MDDN is responsible for extracting domain-specific features from the derivative multimodal content generated by the diffusion model.

1. Text Decoder Network: For text data, the MDDN uses an encoder-based RNN such as LSTM or GRU to extract word embeddings.

2. Audio Decoder Network: For audio data, the MDDN uses a 1D CNN with kernel size 3×1 and stride 2 to extract MFCCs from the output of the diffusion model.

3. Video Decoder Network: For video data, the MDDN uses a 3D CNN with kernel size 3×3×3 and stride 2 to extract spatial and temporal features from the output of the diffusion model.

4. Image Decoder Network: For image data, the MDDN uses a 2D CNN with kernel size 7×7 and stride 2 to extract spatial features from the output of the diffusion model.

The output of each modality-specific decoder network may be concatenated to form a derivative multimodal feature vector.

Vocal Editing and Remixing Implementation: The disclosed system may implement specialized audio processing capabilities for vocal content manipulation. When processing vocal tracks, the encoder network extracts both linguistic features (for lyrical content) and acoustic features (for vocal timbre and style) from the input audio. For lyrical modification, the system employs a hybrid architecture combining the audio encoder 435 with text encoder 445 components to create a unified representation that preserves the musical characteristics while enabling text-guided transformation of lyrical content. The diffusion model is conditioned not only on the requested theme but also on structural constraints that maintain alignment with musical elements such as rhythm, melody, and harmony. For language translation of vocals, the system incorporates additional conditioning parameters specifying the target language, with the diffusion model trained on multilingual lyrical datasets to maintain semantic meaning across languages while preserving the original vocal delivery style. Content filtering mechanisms are applied at both the prompt level and generation level to ensure compliance with content owner preferences regarding vocal content modifications.

Instrumentation modification implementation: The system may implement specialized capabilities for editing and remixing musical instrumentation within audio content. When processing music tracks, the content derivation platform 110 utilizes an enhanced version of the audio encoder 435 and audio decoder 470 components to isolate, analyze, and transform specific instrumental elements while maintaining compositional coherence. Users can direct these transformations through specific prompts in the prompt system 135, such as tempo adjustments (e.g., "Make this track 51 BPM"), style transformations (e.g., "Recompose this track in a jazz style"), emotional tone modifications (e.g., "Make this track end on a sad note"), or instrument substitutions (e.g., "Replace the guitar with a saxophone"). The diffusion model applies these transformations by generating new instrumental layers that seamlessly integrate with preserved elements of the original recording. The content approval models 275 evaluate these instrument-level modifications against content owner preferences to ensure the derivative work maintains appropriate artistic integrity while allowing for creative exploration of the original composition's musical elements.

Extending beyond individual track modifications, the content derivation platform 110 may facilitate the creation of artist album mashups that function similarly to how artists might reinterpret their own catalog for special releases or live performances. Inspired by concepts exemplified in works like Daft Punk's 'Alive' album, this functionality enables users to request generative transformations that sample and recontextualize elements from across an artist's discography, creating new arrangements that maintain the artist's distinctive production style and sonic characteristics. Users could specify which albums or tracks to include in the mashup, allowing the content derivation platform 110 to identify compatible musical elements, extract signature motifs, and recombine them into cohesive new compositions that function as transformative celebrations of the artist's established work. The content approval models 275 would ensure these mashups maintain appropriate fidelity to the artist's creative vision while enabling novel listening experiences that deepen audience engagement with the artist's catalog.

Contrastive Language-Image Pretraining (CLIP)

An exemplary Contrastive Language-Image Pretraining (CLIP) implementation may comprise two models trained in parallel, such as for example, a Vision Transformer (ViT) or ResNet model for image embeddings and a transformer model for language embeddings.

During training, (image, text) pairs are fed into the respective models, and both output a 512-dimensional vector embedding that represents the respective image/text in vector space.

The contrastive component takes these two vector embeddings and calculates the model loss as the difference (e.g., contrast) between the two vectors. Both models are then optimized to minimize this difference and therefore learn how to embed similar (image, text) pairs into a similar vector space.

This contrastive pretraining process produces a CLIP model, a multi-modal model capable of understanding both language and images via a shared vector space.

The CLIP architecture is built around the concept of pretraining two distinct models in parallel: one for image embeddings and another for language embeddings. The former is typically based on a Vision Transformer (ViT) or ResNet model, which is designed to extract spatial hierarchies from images. This hierarchical representation serves as the foundation for the subsequent transformer model.

The language embedding model, on the other hand, relies on a transformer architecture specifically tailored to natural language processing tasks. This model takes in textual input and produces a 512-dimensional vector embedding that captures the essence of the text's semantic meaning.

During training, the CLIP model is fed with pairs of image-text data, where each pair consists of an image and its corresponding caption. The two models are trained independently to produce these respective embeddings. This process enables the models to learn shared representations for both images and texts in a multi-modal space.

The contrastive component plays a crucial role in this pretraining phase. By computing the difference between the two vector embeddings, the model learns to align similar image-text pairs in the same vector subspace. In other words, the model is trained to maximize the similarity between positive (matched) and negative (unmatched) pairs. This process allows the models to develop a deeper understanding of the interplay between language and images.

The two models are optimized jointly using this loss function to minimize the difference between positive pairs and maximize it for negative pairs. This iterative process enables the models to converge on a shared vector space that captures both semantic meaning and visual features.

Upon completion of the pretraining phase, the CLIP model is left with a rich representation of language and images in a multi-modal space. This capacity allows CLIP to tackle a wide range of tasks, including but not limited to:

1. Image captioning: where the model predicts a caption for a given image.
2. Visual question answering (VQA): where the model answers questions about an image based on its semantic content.
3. Image retrieval: where the model retrieves images with similar captions.

Exemplary Alternative Implementation

The proposed system utilizes a type of generative artificial intelligence (GAI) model, specifically a diffusion model, to transform predetermined content into derivative works based on user-specific input. The GAI model takes in two primary inputs: the predetermined content and the user's requested theme as text input. The output is a transformed derivative work that aligns with the user's desired aesthetic or style.

The proposed system consists of three primary components:

1. Content Encoder: This component processes the predetermined content (e.g., audio, music, voice sounds, images, or video) and extracts relevant features or representations. The content encoder can be based on a convolutional neural network (CNN) or recurrent neural network (RNN) architecture.
2. Theme Embedder: This component takes in the user's requested theme as text input and generates a numerical representation (embedding) that captures the essence of the theme. The theme embedder can be based on a language model, such as a transformer-based architecture.
3. Diffusion Model: This component utilizes a diffusion model to transform the content embedding into a derivative work that aligns with the user's requested theme. The diffusion model consists of multiple layers, each of which applies a series of transformations to the input signal.

Training: The proposed system is trained using an unsupervised approach, where the GAI model learns to generate derivative works from predetermined content without explicit supervision. The training process involves the following steps:

1. Data Preparation: Collect a large dataset of paired content and theme inputs.
2. Content Encoder Training: Train the content encoder on the collected data to learn features or representations that capture the essence of the content.
3. Theme Embedder Training: Train the theme embedder on the user's requested themes to generate numerical representations (embeddings) that capture the essence of each theme.
4. Diffusion Model Training: Train the diffusion model using a combination of two objectives:
a. Reconstruction Loss: Minimize the difference between the input content and its reconstructed version based on the output of the diffusion model.
b. Theme Alignment Loss: Maximize the similarity between the output of the diffusion model and the corresponding theme embedding.

Implementation: The proposed system can be implemented using a variety of programming languages and frameworks, such as Python with TensorFlow or PyTorch, or JavaScript with WebAssembly (WASM). The content encoder and theme embedder can be implemented using pre-existing libraries or frameworks, while the diffusion model requires custom implementation.

Use Cases: The proposed system has numerous applications in various fields, including:

1. Content Generation: Generate new audio, music, voice sounds, images, or video content based on user requests.
2. Style Transfer: Transfer the style of one image to another based on user input.
3. Music Composition: Generate original music compositions based on user-provided themes and styles.

Exemplary Alternative Implementation

Contrastive Language-Image Pretraining (CLIP) is a framework for pretraining language models, which has been successfully applied to various vision-language tasks, including image-text retrieval and generation. In the context of the present disclosure, CLIP embeddings may play a role ai generating derivative works based on the user-requested theme.

Design:

1. CLIP Embedding Generation: During the user interview with the chatbot, the large language model (LLM) generates text representations for the user's input theme using a pre-trained language model such as BERT or RoBERTa.
2. Image Retrieval: The LLM uses CLIP to retrieve images from an image database that are semantically similar to the generated text representation of the theme. This step is based on the concept of contrastive learning, where the model learns to distinguish between similar and dissimilar pairs of images.

3. Audio and Video Generation: Alternatively, the system can use CLIP to generate audio or video representations for the theme. This involves creating a music library that corresponds to specific text prompts (e.g., genre, mood, style).

Configuration:

1. CLIP Model Architecture: The proposed system will utilize a variant of the CLIP model architecture, such as CLIP-Vision-Bert or CLIP-Audio-Bert.

2. Image Database and Audio/Video Library: A large dataset of images and audio/videos will be required for training the CLIP embeddings. This dataset should cover various genres, styles, and themes to ensure diverse representations.

Programming:

1. CLIP Embedding Generation: The system will utilize the CLIP library (e.g., TensorFlow or PyTorch) to generate embeddings from the generated text representation of the theme.

2. Image Retrieval and Filtering: The system will use a clustering algorithm (e.g., k-means or hierarchical clustering) to group semantically similar images retrieved by CLIP. This step involves selecting representative images that best capture the essence of the theme.

3. Audio/Video Generation: The system can utilize music libraries like Music Information Retrieval (MIR) datasets, which contain labeled audio representations for various genres and moods.

Training:

1. Pretraining: The CLIP model is pretrained on a large dataset consisting of paired text-image or text-audio pairs.

2. Fine-tuning: The pre-trained CLIP model is fine-tuned on the user-specific theme using the generated text representation. This step involves adjusting the model parameters to better align with the specific theme.

Use:

1. Derivative Work Generation: The system uses the CLIP embeddings to generate supplemental content (images, audio, or video) based on the user-requested theme.

2. Content Augmentation: The generated content can be augmented with additional information, such as metadata, captions, or music lyrics, to create a more comprehensive derivative work.

Exemplary Digital Watermarking Implementation

The disclosed digital watermarking system may comprise several key components:

1. Content Creation Module: This module is responsible for generating unique watermarks for approved derivative works. The watermarks are embedded into the multimedia content using a combination of encryption algorithms and steganography techniques. In some aspects, the digital watermark 145 may serve a variety of functions beyond traditional control mechanisms. In some implementations, the digital watermark 145 may indicate that the derivative work is AI-generated, providing transparency regarding content provenance. Alternatively, or in addition, the digital watermark 145 may function as a reference pointer to external data repositories containing supplementary information such as generation metadata (describing how the derivative work was created), provenance data (documenting the transformation process), attribution information (identifying contributing elements from training material), licensing parameters, or usage guidelines. In certain implementations, the digital watermark 145 itself may directly encode these parameters through embedded data structures (e.g., binary flags indicating permissible use cases or restrictions). This functional versatility enables the digital watermark 145 to support multiple applications ranging from basic identification to comprehensive rights management while maintaining the integrity and utility of the derivative work 125.

2. Digital Fingerprint Generation Module: This module generates digital fingerprints (e.g., MD5 or SHA-256 hashes) of the watermarked content. These fingerprints serve as unique identifiers for each derivative work.

3. Tracking and Control System: This system is responsible for detecting and verifying the authenticity of watermark-enabled multimedia content on the global internet. It uses a peer-to-peer network architecture to facilitate efficient data exchange between watermark detectors, content providers, and users.

4. Authorization Service: This module validates user requests for access to watermarked content and provides authorization decisions based on predefined rules and policies.

Algorithms and Programming:

The disclosed digital watermarking system may employ various algorithms and techniques to ensure robust security, scalability, and efficiency:

1. Advanced Encryption Algorithms: The system utilizes state-of-the-art encryption algorithms (e.g., AES-256) to protect the watermarks from unauthorized access.

2. Steganographic Techniques: Steganography-based embedding techniques (e.g., least significant bit substitution or transform coding) are employed to conceal the watermark within the multimedia content, ensuring minimal impact on video quality and data transmission efficiency.

3. Digital Fingerprint Generation: The system utilizes cryptographic hash functions (e.g., SHA-256) to generate unique digital fingerprints for each derivative work, allowing for efficient identification and verification of watermark-enabled content.

4. Peer-to-Peer Networking: The tracking and control system employs peer-to-peer networking protocols (e.g., BitTorrent or P2P protocols) to facilitate data exchange between watermark detectors, content providers, and users, ensuring scalability and low latency.

Technical Details:

The disclosed digital watermarking system may leverages the latest advancements in multimedia technology, including:

1. HMAC-Based Watermark Embedding: The system employs a hybrid approach combining HMAC (Keyed-Hash Message Authentication Code) with steganographic techniques to ensure robust watermark embedding.

2. Deep Learning-based Content Analysis: The tracking and control system incorporates deep learning-based content analysis techniques for efficient detection of watermark-enabled multimedia content.

3. Quantum-Secure Communication: The authorization service utilizes quantum-resistant encryption algorithms (e.g., Lattice-based cryptography) to provide secure communication channels between users and content providers.

Exemplary Digital Watermarking Implementation

The disclosed digital watermarking system may embed unique identifiers into digital content. These identifiers facilitate the authorization, tracking, and control of derivative works. The system employs state-of-the-art algorithms and protocols to ensure secure and efficient management of digital rights. The architecture of the digital watermarking system may be divided into three primary components: the watermarking engine, the authorization server, and the tracking module.

Watermarking Engine:

Input Processor: Receives the original digital content.

Watermark Embedder: Utilizes robust algorithms to embed unique identifiers into the digital content.

Output Generator: Produces watermarked content for distribution.

Authorization Server:

User Authentication: Verifies the credentials of users requesting access to derivative works.

License Manager: Issues licenses based on predefined policies and user credentials.

Access Control List (ACL): Maintains a record of authorized users and their permissions.

Tracking Module:

Log Analyzer: Monitors and logs access to watermarked content.

Reporting Engine: Generates reports on the usage and dissemination of derivative works.

Alert System: Triggers alerts for unauthorized access or distribution.

Algorithms

Watermarking Algorithm:

DCT-based Watermarking: Discrete Cosine Transform (DCT) is employed to embed watermarks in the frequency domain, ensuring robustness against various attacks.

Spread Spectrum Technique: Enhances the security of the watermark by distributing it across multiple frequency bands.

Blind Detection: Allows detection of the watermark without requiring the original content, facilitating easier tracking and verification.

Authorization Algorithm:

RSA Encryption: Ensures secure communication between the user and the authorization server.

Digital Signatures: Authenticates the source and integrity of digital licenses issued by the License Manager.

One-Time Passwords (OTPs): Adds an extra layer of security for user authentication.

Tracking Algorithm:

Log Correlation: Correlates logs from multiple sources to identify patterns and anomalies in content usage.

Machine Learning Classifiers: Employs classifiers to predict potential unauthorized usage based on historical data.

Blockchain Ledger: Utilizes blockchain technology to create an immutable record of all transactions, enhancing transparency and security.

In general terms, the present disclosure is directed to a system that uses generative artificial intelligence to create derivative works based on user prompts and themes from copyrighted content, such as music. The system may include a mechanism for obtaining approval from the content owner and marking the derivative work with a digital watermark for tracking its use. Advantageously, the present disclosure addresses the problem of copyright infringement and lack of proper management in the ai-generated music industry by providing a secure, standardized SaaS platform that ensures proper ip rights management, facilitates licensing, and guarantees appropriate compensation for artists, labels, and other stakeholders. According to an aspect of the disclosure, there is provided a method for transforming predetermined content using generative artificial intelligence. The content may be copyrighted and digitally controlled by a cloud-based authorization server. The method may include receiving a user request to create a derivative work using the generative artificial intelligence. The request comprises a prompt from the user to cause the generative artificial intelligence to create the derivative work as a function of the predetermined content and a user specific theme for the derivative work. The method may include determining if the derivative work is approved for creation using ai modeling the content owner. In response to determining the derivative work is approved, the method may include creating the generative artificial intelligence derivative work and marking the work with a digital watermark for tracking use of the generative artificial intelligence derivative work. The content may be music.

An implementation in accordance with the present disclosure may be configured to transform predetermined content using generative artificial intelligence. The system receives a request to transform the predetermined content. The predetermined content may be copyrighted and digitally controlled by a cloud-based authorization server. Advantageously, the system addresses the growing concern in the music industry regarding the use of copyrighted material by AI engines to create derivative works. This concern is not just theoretical but has real-world implications. For instance, consider a scenario where an AI engine uses a copyrighted melody from a popular song to create a new piece of music. Without proper management and control, this could lead to copyright infringement, resulting in legal disputes and potential financial losses for the original copyright holder. The system ensures that the use of copyrighted material is properly managed. This is achieved through a series of checks and balances. For example, when a user submits a request to create a derivative work, the system first verifies the copyright status of the original content. If the content is copyrighted, the system then checks whether the user has the necessary permissions to use the content. This could involve checking a database of licensing agreements or contacting the copyright holder directly. The rights of the copyright holders are respected in this process. This is not just a matter of legal compliance, but also of ethical business practices. By ensuring that copyright holders are properly compensated for the use of their work, the system promotes a fair and sustainable music industry.

An implementation in accordance with the present disclosure may use a cloud-based authorization server to digitally control the copyrighted content. This server acts as a gatekeeper, controlling access to the copyrighted content. For example, if a user tries to access the content without the necessary permissions, the server can deny the request. The server can also track the use of the content, providing valuable data on how, when, and by whom the content is being used. This digital control is particularly important in the context of the ongoing legal battles between record labels and AI engines over the unauthorized use of copyrighted material. For instance, in a recent case, a record label sued an AI engine for using a copyrighted melody without permission.

In an illustrative hypothetical, an AI engine may have argued that it had created a new, original work, but a court may have ruled in favor of the record label. With the disclosed system, such disputes could be avoided, as the use of copyrighted material is controlled and tracked from the outset. The system also provides a platform for the proper management of IP rights. This includes not only copyright, but also related rights such as performance rights and mechanical rights. The platform allows for the registration, administration, and enforcement of these rights, providing a one-stop solution for IP management in the music industry.

The payment of royalties to artists, music labels, and distribution partners is also facilitated by the system. For example, when a derivative work is created and sold, the system can automatically calculate and distribute the appropriate royalties. This ensures that all parties involved in the creation and distribution of the music are fairly compensated. Additionally, the system receives a user request to create a derivative work using the generative artificial intelligence, wherein the request may comprise a prompt from the user to cause the generative artificial intelligence to create the derivative work as a function of the predetermined content and a user specific theme for the derivative work. Advantageously, the system allows for the creation of derivative works using generative artificial intelligence, which is a type of ai that focuses on creating new content. This contrasts with traditional AI, which solves specific tasks with predefined rules.

The user request may include a prompt that triggers the generative ai to create the derivative work based on the predetermined content and a user-specific theme. This allows for the creation of unique and personalized derivative works, while ensuring that the use of the copyrighted material is properly managed and controlled.

The system also provides a platform for the negotiation and execution of licensing agreements, ensuring that the rights of the copyright holders are respected and that they are compensated for the use of their work. The system then determines if the derivative work is approved for creation using ai modeling of the content owners. In response to determining that the derivative work is approved, it creates the generative artificial intelligence derivative work and marks it with a digital watermark for tracking use of the generative artificial intelligence derivative work.

In this example, it is assumed that the content may be music. Advantageously, the system uses ai modeling to determine if the derivative work is approved for creation. This ensures that the derivative work is created in a manner that respects the rights of the content owner. Once the derivative work is approved, the system creates the derivative work using generative ai and marks it with a digital watermark. This allows for the tracking of the use of the derivative work, ensuring that the rights of the copyright holders are respected and that they are compensated for the use of their work.

The system also provides a platform for the reporting and payment of royalties, ensuring that the artists, music labels, and distribution partners are compensated for the use of their work. This is particularly important in the context of the music industry, where the unauthorized use of copyrighted material is a major concern. It will be understood that the term "generative artificial intelligence" as used herein may refer to a type of AI technology that can autonomously generate new content, such as music or other forms of media, based on learned patterns and inputs from existing copyrighted content. It will be understood that the term "generative artificial intelligence derivative work" as used herein may refer to a new piece of content, such as a song or artwork, that is created by an AI system using inspiration or elements from existing copyrighted material and is marked with a digital watermark for tracking its use.

It will be understood that the term "digital watermark" as used herein may refer to an embedded and often imperceptible marker or identifier in a digital asset, such as audio, video, or image data, that can be used for copyright protection, content tracking, and verification of the authenticity or ownership of the derivative work. It will be understood that the term "cloud-based authorization server" as used herein may refer to a remote server hosted on the internet that manages and verifies user permissions for accessing and manipulating copyrighted content, such as music, in the creation of derivative works. It will be understood that the term "AI modeling" as used herein may refer to the process or method employed by the generative artificial intelligence system to create derivative works, such as music, based on user prompts and themes from copyrighted content.

A method implementation may comprise: receiving a request to transform predetermined content using generative artificial intelligence, wherein the content is copyrighted and digitally controlled by a cloud-based authorization server; receiving a user request to create a derivative work using the generative artificial intelligence, wherein the request comprises a prompt from the user to cause the generative artificial intelligence to create the derivative work as a function of the predetermined content and a user specific theme for the derivative work; determining if the derivative work is approved for creation using AI modeling the content owner; and in response to determining the derivative work is approved, create the generative artificial intelligence derivative work and marking the work with a digital watermark for tracking use of the generative artificial intelligence derivative work, wherein the content is music.

An implementation in accordance with the present disclosure may provide solutions advantageous to management and control of derivative works.

In an illustrative example, an implementation may provide cloud-based authorization based on configuring a cloud-based authorization server to manage and control access to copyrighted content. This cloud-based authorization server may provide verification services for copyrighted content. For example, by contacting an authorization server, the system checks if the copyrighted content (e.g., a song, movie, book, other) that is to be transformed into a derivative work, or used by Generative AI is an actual copyright listed in the database. This may be achieved by accessing a database that maintains logs of all approved artists of many types who have approved copyrights in the server available for derivative creation. The server may contain the list of copyrights, as well as the related lists of themes and related options approved by the copyright owners, labels or managers for the derivative creation. The approval or non-approval may be controlled by the authorization server. When a derivative copyright license is created the ownership of the derivative rights may be split between the master copyright owner at some percentage level, and the AI user. Additional owners may be in the split as well depending on the situation.

In an illustrative example, an implementation may provide a user prompt system based on configuring an interface where users can submit requests and prompts for creating derivative works. For example, receiving a user request from a generative AI user (whether human or an AI Bot) may comprise the user submitting a request to a music label, motion picture company, book publisher, artist, author or other master copyright owner to create a derivative work based on their existing issued master copyright, or whereby the owner of the master recording, or master use rights have provided their approvals to use their copyrights. The existing issued master copyrights can be for music, motion pictures, books, names, images, likeness, brands or other copyrightable materials as approved by the US Copyright Office in the United States and related offices in other countries. The request may be to use Generative Artificial Intelligence (large language models), or in conjunction with an artificial intelligent system, AI software or AI applications. The authorization server can be managed by Music Labels, Artist Groups, Publishing Houses, Motion Picture Firms, Management firms, Licensing agencies or others. The owners will develop a relationship with the Generative AI firms to allow AI users to pay a fee to access the authorization server so that it can work either through the Generative AI interfaces or in conjunction with the Generative AI interfaces so that both the Companies that are managing the authorization servers have a business relationship with the Generative AI companies.

Beyond direct user prompt systems, an implementation in accordance with the present disclosure may also accommodate passive derivative work generation with minimal or no user interaction. In such cases, derivative works may be created through automated processes where the transformation parameters and requested themes are determined by the system context rather than explicit user input. For example, a playlist remixer implementation may automatically blend tracks from an existing user playlist with seamless transitions, creating a derivative work without requiring the user to specify transformation details. Similarly, an implementation may generate functional audio mixes (for sleep, study, focus, or exercise) from an artist catalog, album, or playlist based on predetermined contextual parameters rather than direct user theme specification. Another example could be a system that generates audio derivatives based on visual media like music videos, where the visual content implicitly defines the transformation theme. In these passive generation scenarios, the authorization and approval workflows adapt to evaluate content appropriateness based on predetermined contextual parameters, while still maintaining the same digital watermarking and rights management processes applied to user-directed transformations. This enables applications to deliver contextually relevant derivative works without requiring users to navigate complex transformation interfaces, while still respecting content owner preferences and maintaining appropriate governance.

In some aspects, the content derivation platform 110 may also include autonomous adaptation capabilities that analyze and respond to contextual media cues. For example, users may select a track to be automatically adapted to a video edit region based on the system's interpretation of visual intensity, perceived emotional content, or aesthetic style of the footage. The generative AI component maintains the foundational production and compositional characteristics of the original track while modifying elements to align with the visual context. This functionality extends to interactive media such as video games, where the content derivation platform 110 can perform these adaptations in real-time, creating responsive audio experiences that dynamically evolve with user interactions while maintaining appropriate rights management and approval workflows.

The request to create a derivative copyright may include a prompt that describes what the AI user wants to achieve when using the primary or master copyright to create the derivative work. A prompt system may interview the user who wants to make the derivative work. The user may answer numerous questions that ultimately specify the theme or style of the derivative works. After completing the questions by the authorization server, the request may be processed, and the authorization server will either approve or not approve the right to make the derivative work. In some cases, the authorization server may consider the existing copyrights in the database when determining whether to approve or not approve the request.

If the server authorizes the approval for the creation of the derivative works, the user may be required to pay a user creation fee, and sign a new license that outlines what copyright is being licensed, what copyrights are being conveyed, how the derivative copyrights can be used, any royalty amounts the user is required to pay to use the license, and the terms of any payments due, in the short term or in the long term and what are the requirements for payments to be made or not made, and how long the license is for.

An implementation in accordance with the present disclosure may advantageously enhance generative AI development based on implementing generative AI algorithms capable of creating derivative works created as a function of user inputs and pre-existing copyrighted content. For example, once the necessary approvals are in place, an implementation of the system may use generative AI to create the new derivative work based on the user's prompt and the pre-existing content. The derivative work is tailored to meet the user's specifications while ensuring compliance with the copyright owners' pre-approved requirements, copyright law, and the pre-negotiated derivative license. The system may allow a user to view and or listen to the newly created derivative work prior to paying a user fee, finalizing the license, signing the license, or paying an upfront royalty payment. If the User is not happy with the initial result of the derivative creation, they may try again to have the system create the derivative again so long as the same specifications are used.

An implementation in accordance with the present disclosure may verify whether a user has the necessary permissions to use the authorization server by ensuring all personal data is provided and they have registered themselves on the authorization server. The authorization server may require the ability to officially verify government-issued identification or other means of official validation to ensure there is no fraud. If no permissions exist, the system will confirm to the AI user that they must register before creating a derivative work.

For the system to scale so that many AI users can obtain a license from the same Artists, Songs, Movies, Labels, Management, etc., the system may be configured to implement an approval process comprising AI modeling to create the derivative work. In an illustrative example, an implementation may maintain a detailed database of the perspective of the content or copyright owner to determine if the derivative work can be approved for creation. This modeling takes into account the owner's preferences on which copyrights can be used, how they can be used, where they can be used, why they can be used, and so on.

An implementation in accordance with the present disclosure may be configured to integrate digital watermark technology with derivative work generation, ensuring that all derivative works are watermarked to track their use. For example, a created derivative work may be embedded with a digital watermark that helps track its usage, through AI Copyright Bots that track the derivative creation across the Internet and on other platforms that allow copyrighted materials to be heard, seen, etc. The watermark ensures that the derivative work can be monitored for licensing and copyright compliance and agreed to royalty payments throughout its lifecycle. The digital watermark may be embedded into the derivative copyright file that is ultimately downloaded by the User who created the derivative file. Once the final derivative file is created, the authorization server may electronically connect to the US Copyright Office and register the derivative copyright based on obtained information when the AI user answered questions. Additionally, this will assist the authorization server in gaining factual data from the AI user so that security and fraud issues are eliminated or cut down significantly, if any.

An implementation in accordance with the present disclosure may be configured to govern licensing and IP rights management, based on incorporating mechanisms for handling licensing agreements and enforcing IP rights. For example, an implementation may be configured to manage licensing agreements, based on negotiating and executing licensing agreements for the AI-generated derivative works. This ensures proper compensation and adherence to intellectual property (IP) rights.

Managing derivative licensing agreements electronically is an efficient way to streamline the entire process, ensuring compliance, proper tracking, and case of management. The Authorization platform may be configured with License Management Component for managing all derivative licensing agreements. This will ensure real-time updates allowing licensors and licensees to track status, usage, and compliance in real-time. The system can also have analytics and reporting offering insights into royalty payments, compliance risks, out of license issues, under payments, payments due, performance metrics, etc.

An implementation may be configured to use blockchain for smart contracts ensuring decentralized verification where the blockchain can automatically verify and execute agreements without intermediaries, reducing disputes and enforcing compliance. Additionally, such a blockchain implementation would advantageously provide a permanent and transparent ledger of the agreement which is ideal for large volume derivative creations with high licensing volumes. This can enable automated payments whereby smart contracts are used and they can trigger payments when conditions of the license are met, or when usage outside the license triggers payments that are due.

An implementation may be configured with royalty management services wherein there will be automated royalty calculations and then distributes royalties based on usage or sales data to those who own the master and the percentage owners of the derivative copyright(s). There can be multiple licensing models such as flat fees, usage-based, or tiered structures among others. There will also be revenue tracking via monitoring of the performance of licensed derivatives and tracks revenue generated from each agreement. The platform may also utilize multi-language support providing AI users from around the world with multilingual licensing interfaces for easy management across regions. An Authorization server implementation may be configured to analyze the developed licensing agreements right at the conclusion of development for risks, errors, or non-compliant terms prior to have electronic signatures. The AI system can automatically review and compare licensing terms with a set of predetermined compliance rules. The system may be configured to allow the system owners to track licensing agreements as part of a broader intellectual property strategy, ensuring protection of IP assets.

An implementation in accordance with the present disclosure may advantageously provide a royalty tracking and payment system implemented to calculate and distribute royalties based on usage tracking data. For example, an implementation may track usage and manage IP rights using technology such as but not limited to digital watermarking tracking bots, servers and other related technologies. Such digital watermarking tracking bots, servers and other related technologies continue to monitor the usage, playing, streaming, listening, viewing of the derivative work, ensuring that it complies with licensing agreements. This includes tracking where, when, how many times, and by whom the derivative work is used. When the tracking bot identifies the derivative copyright playing on a platform, the bot is able to work with the platform to identify the number of streams or plays the copyrights have played and because of the platform that the derivative is being played on, the amount of funds made by the derivative will be known whereby licensing payments will need to be paid to the original copyright owner based on the pre-agreed to amounts. If a tracking bot identifies a derivative copyright that is not following its approved license, the tracking bot can communicate with the authorization server providing updates to the authorization server allowing security or fraud systems to automatically mail cease and desist letters, demand letters for payments, or cancel the derivative work and eliminate the ability for the derivative copyright to be played, listened to or similar.

Based on the usage data collected, the system may be configured to facilitate automatic calculation and distribution of royalties to artists, copyright holders, and other stakeholders involved in the creation of the original and derivative works. By using licensing tracking technologies, internal bots, other technologies and agreed upon statistics from partnership platforms; the system may track amounts owed to the copyright owners, as well as any revenue splits or percentage splits related to the derivative works. In some cases, the owners of the authorization server and licensing technologies may allow the Generative AI platform to have some ownership in the derivative works so that in addition to initial usage fees the generative AI platforms or other AI software and applications may receive royalties as approved by the company that owns or manages the licensing technology that approves the derivative copyrights for creation.

An implementation in accordance with the present disclosure may provide an Application Programming Interface (API) that allows approved third-party companies to integrate with the platform programmatically. Through this API, authorized partners can submit external media content and request transformations that imbue this content with characteristics of specific songs, artists, catalogs, or labels from authorized rights holders. This business-to-business integration maintains all the rights management, approval workflows, and digital watermarking processes of the consumer-facing implementation, while providing enterprise partners with programmatic access to the platform's generative capabilities. The API includes comprehensive documentation, sandbox environments for testing, and customizable webhook notifications to facilitate seamless integration with partner systems while preserving content owner control over derivative works.

In an exemplary implementation, the disclosed method may begin with the reception of predetermined content, which is facilitated by a database server. This content may include various forms such as music, and is received as a multimodal predetermined content stream. The processor then splits this stream into discrete content streams, which may include audio, image, or text streams. Each discrete stream is transformed into a shared latent space representation using a modality-specific encoder.

The method further involves receiving a request to transform the predetermined content into a derivative work. This request is processed through a content derivation platform that includes at least one processor. The user can direct this platform via a network cloud to initiate the transformation process. The request includes a user-specific theme for the derivative work, which is received as text input through a prompt system. This system may include a chatbot config-ured to interview the user to obtain the requested theme.

The requested theme is converted into a text embedding within the shared latent space. The processor finds embed-dings of the predetermined content that align with this text embedding. Using generative artificial intelligence, specifi-cally a diffusion model, the processor transforms these aligned embeddings into new content that aligns with the user's requested theme. This transformation results in a derivative work that may comprise audio, video, or images.

Access to approved derivative works is controlled by an authorization server using a derivative work server that stores these works with time-sensitive watermarks. These watermarks can be updated periodically and are valid for limited periods of time. The authorization server can revoke or not renew approval for a derivative work by allowing its watermark to expire.

The method concludes by providing user access to the authorized derivative work via platforms such as mobile applications hosted on mobile devices. These applications can direct the content derivation platform to create deriva-tive works from predetermined content stored on servers dedicated to such tasks.

An implementation may leverage advanced AI models like diffusion models and CLIP implementations for gener-ating and approving derivative works based on user-specific themes while ensuring compliance through digital water-marking and authorization protocols.

This cataloging process could include tagging the content with metadata that describes its attributes, such as genre, length, and target audience. The metadata can be used to facilitate efficient retrieval and processing of the content when a request for transformation is received.

Upon receiving a request to transform the predetermined content, the content derivation platform may employ a user interface that allows users to specify additional parameters for the derivative work. These parameters could include the desired format of the derivative work, such as text, audio, video, or interactive media. Users might also specify the intended platform for distribution, such as social media, streaming services, or print.

The requested theme for the derivative work could be selected from a predefined list of themes stored in the database server, or it could be a custom theme input by the user. The generative artificial intelligence may utilize natural language processing to interpret the theme and align it with the predetermined content. For example, if the predeter-mined content is a historical text and the requested theme is "science fiction," the AI might generate a narrative that reimagines historical events with futuristic technology.

In creating the derivative work, the generative AI could employ various techniques such as style transfer, where the stylistic elements of the requested theme are applied to the predetermined content. Alternatively, the AI might use a narrative generation model that constructs new storylines or dialogues based on the theme. The AI could also incorporate multimedia elements, such as generating background music or visual effects that complement the theme.

The content approval machine learning model may be trained on a dataset of previously approved and rejected derivative works, allowing it to learn patterns that align with content owner preferences. The model could consider fac-tors such as thematic consistency, originality, and adherence to content guidelines. The content approval score might be a composite score derived from multiple sub-scores, each representing a different aspect of the content owner's pref-erences. In some aspects, this approval process operates at multiple stages-both pre-generation and post-generation. Prior to generation, one or more content approval models can verify that user prompts do not contain objectionable themes based on the content owner's established preferences (for example, if an artist is vegetarian and does not want their style used for songs about meat consumption). Post-generation, one or more content approval models 275 may evaluate whether the derivative work contains explicit lan-guage, potentially infringes on existing works, or relates to themes contrary to the content owner's values. While con-tent owners may initially review outputs manually, the system is designed to scale by learning from an initial detailed questionnaire of artist and label preferences, refin-ing parameters over time to reduce the need for human review as submission volumes grow. That is, one or more content approval models 275 may be refined over time.

Furthermore, in some aspects, content owner preferences may include specific limitations on modification, such as prohibiting vocal use, or requiring the incorporation of elements from the original recording or media in the output. These constraints address important copyright consider-ations. For example, while generative AI may recreate audio, in some aspects, there may be no copyright in the resulting "recording." However, if the recreated audio incorporates portions of the original recording in the output, then at least those portions would remain copyright protectable. Such nuanced limitations allow content owners to maintain appro-priate control over their intellectual property while still enabling creative derivative works.

If the content approval score meets or exceeds the pre-determined minimum, the digital watermark applied to the approved derivative work could include information such as the content owner's identity, the date of approval, and usage rights. The digital watermark might be visible, such as a logo or text overlay, or invisible, such as a digital signature embedded within the file.

The authorization server could be configured to enforce usage rights by tracking the distribution and access of the derivative work. It might employ blockchain technology to create an immutable record of transactions involving the derivative work. Alternatively, the server could use access control lists to restrict usage to authorized users or plat-forms.

Providing access to the approved derivative work could involve generating a unique access token that users must present to download or view the work. The access token might be time-limited or usage-limited, ensuring that the derivative work is only accessible under the conditions specified by the content owner. Additionally, the method could include generating analytics reports that provide insights into how the derivative work is being accessed and used, allowing content owners to make informed decisions about future content transformations.

A requested theme could be a modern jazz interpretation. The generative artificial intelligence could then analyze the original symphony's structure and apply jazz elements like swing rhythm, improvisational solos, and syncopated beats. The processor might adjust the tempo to a more relaxed pace typical of jazz, while reimagining the orchestration to include instruments like saxophones and trumpets.

Alternatively, the music content could be a pop song, and the requested theme might be a classical orchestral version. In this scenario, the generative AI could transform the pop song's melody and harmony into a symphonic arrangement, incorporating strings, woodwinds, and brass sections. The processor might also adjust the dynamics and articulation to reflect the grandeur of a classical performance.

In another example, the content could be a traditional folk song, and the requested theme might be an electronic dance music (EDM) remix. The generative AI could infuse the folk melody with electronic beats, synthesizers, and bass drops, creating a high-energy track suitable for dance floors. The processor might also introduce effects like reverb and delay to enhance the electronic feel.

The content approval machine learning model could be trained on a diverse dataset of music preferences, allowing it to evaluate the transformed work's alignment with the content owner's taste. For instance, if the content owner prefers a certain genre or style, the model could assign a higher content approval score to derivative works that closely match these preferences.

If the derivative work receives an approval score above the predetermined minimum, a digital watermark could be applied. This watermark might include metadata such as the transformation date, the original content's details, and the transformation parameters. The authorization server could then use this watermark to manage licensing and distribution rights, ensuring that the derivative work is used in accordance with the content owner's stipulations.

Access to the approved derivative work could be provided through various channels, such as streaming platforms, digital downloads, or physical media. The method could also allow for customization of access rights, enabling the content owner to specify conditions like geographical restrictions or time-limited availability.

The method, as described above, may comprise receiving content. The content in question may comprise audio. The audio content can be in various formats such as MP3, WAV, or AAC, and may originate from diverse sources like music tracks, podcasts, or audiobooks. Upon receiving the audio content, the system may employ audio analysis techniques to extract features such as tempo, pitch, and rhythm. These features can be used to inform the transformation process.

For instance, if the request is to transform a music track into a derivative work with a jazz theme, the system might adjust the tempo and introduce elements like swing rhythm or jazz chord progressions. Alternatively, if the requested theme is cinematic, the system could enhance the audio with orchestral elements or dramatic crescendos.

The generative artificial intelligence may utilize neural networks trained on vast datasets of audio samples to generate the derivative work. This AI could be designed to recognize patterns and styles within the audio content, allowing it to seamlessly integrate new thematic elements while maintaining the integrity of the original piece.

In another example, if the audio content is a podcast, the derivative work might involve altering the tone or style to fit a requested theme such as "mystery" or "comedy." This could involve modifying the background music, adding sound effects, or even altering the voice modulation of the speakers to match the desired theme.

As an alternative, the system could offer a feature where users can select specific segments of the audio content to be transformed, allowing for more targeted derivative works. For instance, a user might choose to apply a requested theme only to the chorus of a song or a particular chapter of an audiobook.

The content approval machine learning model may be trained to evaluate the transformed audio based on various criteria such as audio quality, thematic consistency, and adherence to content owner preferences. This model could be fine-tuned using feedback from content owners to improve its accuracy over time. Once the derivative work is approved, the digital watermark applied could include metadata such as the transformation date, the requested theme, and the content owner's information. This watermark could be embedded in the audio file in a way that is inaudible to listeners but detectable by software, ensuring the integrity and traceability of the derivative work.

The authorization server might be configured to manage permissions for the derivative work, allowing content owners to specify conditions under which the work can be accessed or distributed. This could include setting geographical restrictions, usage limits, or licensing terms. Access to the approved derivative work could be provided through various channels, such as streaming platforms, download links, or integration with third-party applications. Users might have the option to preview the derivative work before finalizing their access, ensuring satisfaction with the transformation.

The method, as described above, further may comprise an audio element. This audio element additionally may comprise a human voice sound. The audio element can be integrated in various ways, offering a range of possibilities for enhancing the derivative work. For instance, the audio element may be synchronized with visual content to create a multimedia experience. This synchronization can be achieved by aligning the timing of the audio with specific visual cues or transitions within the derivative work. Beyond audio and visual content, the described method is equally applicable to textual content transformation. This may include creative modifications to lyrics or prose, where a requested theme might direct the transformation toward a specific genre, mood, or target audience. The method is equally applicable for legal and business document adaptation, where the predetermined content might be contracts, policies, or agreements that need modification for different jurisdictions or use cases. For example, streaming music contracts could be transformed into video streaming contracts, retaining essential legal frameworks while adapting media-specific terms. The content approval model (e.g., one or more content approval models 275) would ensure that such transformations maintain legal validity and adhere to relevant regulatory requirements across different jurisdictions, while the digital watermarking would provide trackability of document lineage.

The method as described may also enable version remixes, which represent a more subtle form of transformation than complete genre changes. These version remixes maintain the same genre and production characteristics of the original content while allowing users to modify specific compositional or structural elements. This approach mirrors professional practices in the music industry, where DJs commonly create 'dubs' or special 'edits' for performances that feature alternative basslines or drops compared to album versions. Users may create these personalized variations for private streaming playlists or, when permitted, share them on selected platforms. The content approval process evaluates these subtle modifications to ensure they maintain fidelity to the original work's essential character while enabling creative reinterpretation within familiar musical frameworks. Version remixes represent an important middle ground between passive consumption and complete transformation, allowing users to engage with content in personalized ways that respect the original creative vision.

A specific example of this could involve a derivative work that is a video montage. The audio element might include a human voice sound that narrates the content, providing context or storytelling that complements the visual elements. The human voice sound could be generated using text-to-speech technology, which allows for the creation of a variety of voice profiles, including different accents, tones, and emotional expressions. This flexibility enables the derivative work to cater to diverse audience preferences or to align with the requested theme more closely. Alternatively, the audio element could be a musical score or sound effects that enhance the mood or atmosphere of the derivative work. For instance, a derivative work with a requested theme of "mystery" might include a suspenseful musical score that builds tension, while sound effects such as footsteps or whispers could be layered to add depth to the experience.

In another scenario, the audio element might be interactive, allowing users to engage with the derivative work in a dynamic way. For example, the human voice sound could be part of an interactive audio guide that responds to user inputs or choices, providing a personalized experience. This could be particularly useful in educational or training contexts, where the audio element serves as a virtual instructor or guide. As an alternative, the audio element could be designed to be adaptive, changing in response to user interactions or environmental factors. For instance, the volume, pitch, or tempo of the human voice sound could adjust based on the user's location, time of day, or even biometric data such as heart rate, creating a truly immersive and personalized experience.

Moreover, the audio element could be used to convey additional information or metadata about the derivative work. For example, a human voice sound could provide commentary or insights about the creation process, the significance of certain elements, or the intended message of the work. This could be particularly valuable in artistic or cultural contexts, where understanding the creator's perspective enhances the appreciation of the work.

In terms of alternatives, the audio element might not be limited to a single human voice sound. It could involve multiple voices, creating a dialogue or conversation that adds complexity and richness to the derivative work. These voices could represent different characters, perspectives, or narrative threads, offering a multi-layered experience that engages the audience on multiple levels.

The method, as described above, further may comprise the step of detecting the human voice. The detection of the human voice is based on a technique that may comprise autocorrelation. The at least one processor is utilized in this technique.

Autocorrelation, as mentioned, is one approach, but it can be complemented or substituted with other methods such as spectral analysis, machine learning-based voice recognition, or neural network models specifically trained for voice detection.

For instance, spectral analysis could involve breaking down the audio signal into its constituent frequencies and identifying patterns that are characteristic of human speech. This could be particularly useful in environments with significant background noise, where distinguishing human voice from other sounds is challenging.

Alternatively, a machine learning-based approach might involve training a model on a large dataset of human voices, allowing it to learn the nuances and variations in speech patterns. This model could then be deployed to detect human voice in real-time, adapting to different accents, languages, and even emotional tones.

Neural networks, particularly convolutional neural networks (CNNs) or recurrent neural networks (RNNs), could be employed to enhance voice detection accuracy. These networks could be trained to recognize not only the presence of a human voice but also specific characteristics such as pitch, speed, and intonation, which could be useful in applications like sentiment analysis or speaker identification.

In terms of practical applications, this voice detection capability could be integrated into a variety of systems. For example, in a smart home environment, the system could detect voice commands to control appliances or adjust settings. In a customer service setting, it could be used to transcribe and analyze customer interactions for quality assurance or training purposes.

As an alternative, the system could be designed to detect specific keywords or phrases, triggering certain actions or responses. This could be useful in security systems, where detecting a distress word could automatically alert authorities or initiate a lockdown procedure.

Moreover, the voice detection system could be configured to work in tandem with other sensors, such as cameras or motion detectors, to provide a more comprehensive understanding of the environment. For example, in a retail setting, detecting a customer's voice in conjunction with their movement patterns could provide insights into shopping behavior and preferences.

In terms of customization, users could be given the option to adjust the sensitivity of the voice detection system, allowing it to be tailored to specific environments or use cases. This could involve setting thresholds for voice detection, choosing which frequencies to prioritize, or selecting specific languages or dialects to focus on. The method, as described above, further may comprise the step of frequency domain autocorrelation. This frequency domain autocorrelation is performed using the at least one processor.

One approach involves transforming the predetermined content into the frequency domain using a Fast Fourier Transform (FFT). This transformation allows for the analysis of frequency components, which can be particularly useful in identifying patterns or repetitive elements within the content. Once in the frequency domain, autocorrelation can be performed by multiplying the frequency domain representation of the content by its complex conjugate. This operation highlights periodicities and can be used to enhance or suppress certain features in the derivative work. For instance, if the predetermined content is an audio file, frequency domain autocorrelation can help isolate specific musical notes or rhythms, which can then be emphasized or altered according to the requested theme.

Alternatively, frequency domain autocorrelation can be applied to visual content, such as images or videos. In this context, the method might involve analyzing the frequency components of pixel intensity variations. By identifying repeating patterns or textures, the method can adjust these elements to align with the requested theme, such as creating a derivative work with a vintage or futuristic aesthetic.

In another example, frequency domain autocorrelation could be used in the context of text-based content. Here, the method might involve converting text into a numerical representation, such as through word embeddings, and then applying frequency domain analysis to detect recurring themes or sentiments. This information can guide the generative artificial intelligence in crafting a derivative work that maintains the essence of the original content while incorporating the requested theme.

As an alternative, the method could employ a sliding window approach in the frequency domain, where autocorrelation is calculated over successive segments of the content. This technique allows for the detection of localized patterns, which can be particularly useful in creating derivative works that require a high degree of detail or precision.

Moreover, the method might include the use of adaptive filtering techniques in conjunction with frequency domain autocorrelation. By dynamically adjusting the filter parameters based on the autocorrelation results, the method can fine-tune the emphasis on specific frequency components, ensuring that the derivative work aligns closely with the requested theme.

In some embodiments, the method could incorporate machine learning algorithms to optimize the frequency domain autocorrelation process. By training a model on a dataset of successful derivative works, the method can learn to predict the most effective autocorrelation parameters for different types of content and themes, thereby enhancing the quality and relevance of the generated derivative work.

The method, as described above, further may comprise an audio element. This audio element additionally may comprise a sound produced by a musical instrument. For instance, the sound produced by a musical instrument may be recorded in a studio setting, ensuring high-quality audio capture. This sound can then be digitally processed to match the requested theme of the derivative work. For example, if the theme is "nostalgia," the sound could be processed to include effects such as reverb or vinyl crackle to evoke a sense of the past. Alternatively, the sound could be synthesized using digital audio workstations (DAWs) to create a unique audio signature that complements the visual or textual elements of the derivative work. This synthesized sound might involve layering multiple instrument sounds, such as combining a piano melody with a subtle string accompaniment, to create a rich auditory experience.

In another example, the audio element could be interactive, allowing users to manipulate the sound in real-time. This could be achieved through a user interface that lets users adjust parameters like tempo, pitch, or volume, thereby personalizing the audio experience to their preferences. Moreover, the audio element might be dynamically generated using generative artificial intelligence. This approach could involve training a machine learning model on a dataset of musical compositions to produce new, original sounds that align with the requested theme. The AI-generated audio could then be seamlessly integrated into the derivative work, providing a novel auditory dimension. Additionally, the audio element might include ambient sounds or soundscapes that enhance the immersive quality of the derivative work. For instance, a theme centered around nature could incorporate sounds of birds chirping or a gentle stream, creating a more engaging and atmospheric experience for the audience. In terms of alternatives, the audio element could be optional, allowing creators to decide whether or not to include it based on the nature of the derivative work. This flexibility ensures that the method can accommodate a wide range of creative projects, from silent visual art pieces to multimedia presentations with complex soundtracks.

The method, as described above, determines the requested theme based on an interview with a user. The determination of the requested theme is carried out using the at least one processor. The interview may be conducted using a virtual assistant powered by natural language processing algorithms. This virtual assistant could engage the user in a conversational manner, asking a series of questions designed to elicit preferences, interests, and desired outcomes for the derivative work. For instance, the virtual assistant might ask the user about their favorite genres, color schemes, or emotional tones they wish to convey in the derivative work. Alternatively, the interview process could be facilitated through a graphical user interface (GUI) that presents the user with a series of visual and textual prompts. These prompts might include sliders, checkboxes, or dropdown menus that allow the user to select or rate various thematic elements. For example, the user could be presented with a color palette and asked to choose their preferred colors, or they might be shown a series of images and asked to select those that resonate with the mood they wish to achieve. In another variation, the interview could be conducted through a collaborative platform where multiple users contribute to the theme determination process. This platform might allow users to vote on different thematic elements or to provide feedback on each other's suggestions. This collaborative approach could be particularly useful in scenarios where the derivative work is intended for a group or community.

The interview process could also incorporate machine learning algorithms that analyze the user's responses in real-time to refine and suggest themes that align with the user's preferences. These algorithms might draw on a database of past user interactions to identify patterns and make recommendations. For example, if a user frequently selects themes related to nature, the system might suggest a theme that incorporates natural elements even if the user does not explicitly mention them during the interview. Additionally, the interview could be augmented with biometric feedback, such as tracking the user's eye movements or measuring their physiological responses to different stimuli. This data could provide insights into the user's subconscious preferences, allowing the system to propose themes that the user might not have consciously considered. In terms of alternatives, the interview could be bypassed entirely in favor of an automated theme suggestion system. This system might analyze the predetermined content itself to identify potential themes based on its characteristics. For instance, if the content includes a significant amount of text, natural language processing techniques could be used to extract keywords and suggest themes that align with the content's subject matter.

The method, as described above, involves an interview with the user. The interview is performed by a chatbot. The chatbot utilizes the at least one processor for this operation. The chatbot, leveraging natural language processing capabilities, can engage the user in a conversational manner to gather detailed insights about their preferences, intentions, and specific requirements for the derivative work. For instance, the chatbot might begin by asking open-ended questions to understand the user's vision for the derivative work. It could inquire about the desired tone, style, or any particular elements the user wishes to emphasize. The chatbot could also present multiple-choice questions or sliders to gauge the user's preferences on a spectrum, such as the level of creativity versus adherence to the original content. In a specific example, if the predetermined content is a piece of music, the chatbot might ask the user whether they prefer a classical or modern reinterpretation, or if they want to incorporate specific instruments or themes. The chatbot could also suggest various themes based on the user's initial responses, offering options like "romantic," "adventurous," or "mysterious," and allow the user to select or refine these suggestions.

Alternatively, the chatbot could employ sentiment analysis to detect the user's emotional state or enthusiasm about certain ideas, adjusting its questions and suggestions accordingly. This adaptive approach ensures that the interview process is tailored to the user's unique preferences and can lead to a more personalized derivative work. Moreover, the chatbot could be designed to handle multiple languages, allowing users from different linguistic backgrounds to interact with it comfortably. It could also offer accessibility features, such as voice input and output, to accommodate users with different needs. In another variation, the chatbot might integrate with external data sources or social media platforms to gather additional context about the user's interests and preferences, further enriching the interview process. This integration could help the chatbot propose derivative work ideas that align with current trends or the user's past interactions and expressed interests. The chatbot could also provide real-time feedback and previews of potential derivative work concepts during the interview, allowing the user to iteratively refine their input and see immediate results. This interactive feedback loop can enhance user engagement and satisfaction with the final derivative work.

The method, as described above, determines the requested theme based on a specific process. This process involves matching a response from the user with a semantically similar predetermined theme. The predetermined theme is identified by a Large Language Model (LLM). The identification of the predetermined theme by the LLM is a function of the response from the user. The method utilizes at least one processor for this identification and matching process. This response is then processed by a Large Language Model (LLM) that has been trained on a diverse dataset to understand and interpret various forms of input. The LLM analyzes the semantic content of the user's response, breaking it down into key concepts and themes. For instance, if a user inputs a text response describing a serene landscape with mountains and a lake, the LLM might identify themes such as "nature," "tranquility," or "outdoor scenery." The LLM then searches its database of predetermined themes, which could include a wide array of categories like "urban," "historical," "futuristic," or "abstract," to find a match that is semantically similar to the identified themes from the user's response.

The matching process involves calculating a similarity score between the user's response and each predetermined theme. This could be achieved using techniques such as cosine similarity or other vector-based approaches that measure the distance between the semantic vectors of the user's response and the themes. The theme with the highest similarity score is selected as the requested theme. In an alternative approach, the LLM might employ a clustering algorithm to group similar themes together, allowing for a more nuanced selection process. For example, if the user's response is ambiguous or contains multiple potential themes, the LLM could assign a probability to each theme cluster and select the one with the highest likelihood. Once the requested theme is determined, the system can offer the user options to refine or adjust the theme selection. This could involve presenting a list of related themes or sub-themes, allowing the user to make a more precise choice. For example, if the initial theme is "nature," the user might refine it to "tropical rainforest" or "alpine meadow." Additionally, the system could incorporate user feedback to improve the theme matching process over time. By analyzing which themes users frequently select or adjust, the LLM can learn to make more accurate initial theme suggestions in future interactions.

In another variation, the system might allow for collaborative theme determination, where multiple users can contribute responses that are collectively analyzed to determine a consensus theme. This could be particularly useful in scenarios where the derivative work is intended for a group or community project. In the method as described above, the predetermined theme is pre-approved by the content owner.

This pre-approval can be facilitated through a user interface that allows content owners to select from a variety of themes. These themes could range from stylistic elements such as color palettes, artistic styles, or narrative tones, to more specific thematic elements like genre or mood. For instance, a content owner might pre-approve a theme that aligns with a specific brand identity, ensuring that any derivative works maintain a consistent look and feel. This could involve selecting a theme that uses a particular color scheme or font style that is synonymous with the brand. Alternatively, a content owner might choose a theme that reflects a particular narrative style, such as a comedic or dramatic tone, to ensure that the derivative work aligns with the intended audience's expectations.

In another example, a content owner might pre-approve a theme that is seasonal or event-specific, such as a holiday theme or a theme related to a particular marketing campaign. This allows for the creation of derivative works that are timely and relevant, potentially increasing engagement with the target audience. The pre-approval process could also involve setting parameters for the generative artificial intelligence to follow, such as limiting the use of certain elements or prioritizing others. For example, a content owner might specify that a derivative work should not include certain imagery or language, or that it should emphasize particular aspects of the original content. As an alternative, the pre-approval could be dynamic, allowing content owners to update or change the approved themes based on real-time feedback or changing market conditions. This could be facilitated through a dashboard that provides analytics on the performance of derivative works, enabling content owners to make informed decisions about which themes to approve or modify. Moreover, the pre-approval process could be automated to some extent, using machine learning algorithms to suggest themes based on historical data or trends. This could streamline the process for content owners, providing them with recommendations that are likely to resonate with their audience. In terms of implementation, the pre-approval of themes could be integrated into the content derivation platform, allowing for seamless selection and application of themes during the derivative work creation process. This integration could be achieved through APIs or other software interfaces that connect the theme selection module with the generative artificial intelligence and content approval systems.

In some aspects, the content approval process enriches this pre-approval framework by implementing both pre-generation and post-generation verification. Before generation begins, the one or more content approval models 275 of the content derivation platform 110 examines user prompts against the content owner's established preferences, filtering requests that conflict with their values or guidelines. In some aspects, the content owner's established preferences may be stored in one or more filter databases 290 and/or a usage registry. For example, if a content owner has specified that derivative works should not include references to certain political viewpoints, the system can reject prompts containing those elements before any content is generated. After generation, a content approval model 275 performs a more comprehensive evaluation of the derivative work. In some aspects, this includes checking for explicit language, ensuring the work doesn't infringe on existing copyrights (such as reproducing significant portions of lyrics from other songs), and verifying adherence to the content owner's thematic guidelines. This multi-layered approach ensures that all derivative works remain aligned with the content owner's artistic vision and brand identity throughout the creation process.

In some aspects, explicit content approval after generation may not be necessary if the constraints have been pre-agreed and the system implements built-in guardrails. For example, a content owner might license their catalog to a music-only AI generation service with the constraint that the service does not generate vocals. In this scenario, the only additional constraint might be that the output should not include elements that sound like the content owner's catalog. The content derivation platform 110 could implement a fine-grained fingerprint system to check if any of the output matches any of the input training data. If no match is detected, the derivative work would be automatically approved without requiring further content owner review. In some aspects, the fine-grained fingerprint system may be selected from one or more content approval models 275. In some aspects, the fine-grained fingerprint system may be separate from the one or more content approval models 275.

Alternatively, and in some aspects, if content owners have no restriction against outputs sounding similar to training data, then no final check would be required after generation. However, the content derivation platform 110 may implement the pre-agreed constraints (e.g., the model does not generate vocals) as built-in guardrails. These upfront constraints may become part of the system architecture, effectively embedding the content owner's preferences directly into the generative process rather than applying them as post-generation filters. This approach can streamline the approval workflow for high-volume applications while still maintaining alignment with content owner requirements.

While content owners may initially desire manual review of all derivative works, the system addresses scalability challenges through its learning capabilities. Beginning with a detailed questionnaire that captures the content owner's preferences, the content derivation platform 110 builds a filter database 290 that may be stored in memory 205 and/or data memory 215 and/or located external to the content derivation platform 110. This allows the platform to automatically approve or reject derivative works based on established parameters, even as submission volumes increase. The machine learning model continuously refines these parameters based on feedback, reducing reliance on manual review while maintaining alignment with content owner preferences.

The method, as described above, may comprise a generative artificial intelligence. The generative artificial intelligence further may comprise a diffusion model. This model operates by gradually transforming a simple initial state into a complex final state that aligns with the requested theme. For instance, the initial state could be a basic noise pattern or a rudimentary sketch, which the diffusion model progressively refines by adding layers of detail and complexity, guided by the predetermined content and the requested theme. In one example, the diffusion model might start with a grayscale image representing the basic structure of the derivative work. Over successive iterations, the model could introduce color gradients, textures, and intricate patterns that reflect the nuances of the requested theme. This iterative process allows for the creation of highly detailed and thematically consistent derivative works. Alternatively, the diffusion model could be configured to work with textual content. In this scenario, the model might begin with a simple outline or a set of key phrases. Through a series of transformations, it could expand these into a fully fleshedout narrative or a detailed descriptive passage, ensuring that the final text embodies the essence of the requested theme.

The diffusion model's flexibility allows for various configurations. For example, it could be adjusted to prioritize certain aspects of the theme, such as color schemes in visual works or tone and style in textual content. This adaptability ensures that the derivative work not only meets the thematic requirements but also aligns with specific aesthetic or stylistic preferences. In another embodiment, the diffusion model could incorporate feedback loops where intermediate versions of the derivative work are evaluated against the content approval machine learning model. This iterative feedback could guide the diffusion process, ensuring that the evolving work remains within acceptable parameters and increases the likelihood of approval. Moreover, the diffusion model could be integrated with other generative models, such as GANs (Generative Adversarial Networks), to enhance its capabilities. This integration might involve using GANs to generate initial content variations, which the diffusion model then refines. Such a hybrid approach could leverage the strengths of both models, resulting in more robust and versatile derivative works.

In terms of alternatives, the diffusion model could be replaced or supplemented with other generative techniques, such as variational autoencoders or transformer-based models, depending on the specific requirements of the derivative work. Each of these models offers unique advantages, such as improved handling of specific data types or enhanced scalability, which could be beneficial in different contexts.

In the method as described above, the diffusion model employed is a latent diffusion model. One approach involves utilizing a multi-layered neural network architecture that processes the predetermined content through a series of transformations. Each layer of the network can be designed to extract different features or patterns from the content, which are then used to inform the generation of the derivative work. For instance, the initial layers might focus on identifying basic shapes or structures, while subsequent layers could refine these into more complex forms or themes. An alternative implementation could involve a hybrid model that combines latent diffusion with other generative techniques, such as variational autoencoders or generative adversarial networks. This hybrid approach might allow for more nuanced control over the stylistic elements of the derivative work, enabling the system to better align with the requested theme. For example, the latent diffusion model could be used to establish the foundational structure of the work, while a generative adversarial network could fine-tune the aesthetic details to match the desired theme.

In another example, the latent diffusion model could be configured to operate in a feedback loop with the content approval machine learning model. This setup would allow the system to iteratively refine the derivative work based on real-time feedback regarding its content approval score. As the work is adjusted, the latent diffusion model could explore different pathways or variations, potentially leading to a more optimized or innovative final product. Additionally, the latent diffusion model could be adapted to incorporate user input or preferences directly into the generation process. Users might be able to specify certain parameters or constraints that the model should consider, such as color schemes, stylistic influences, or thematic elements. This customization could be achieved through an interactive interface that allows users to adjust sliders or select options, with the latent diffusion model dynamically updating the derivative work in response. Moreover, the latent diffusion model could be employed in a distributed computing environment, where different components of the model are processed across multiple devices or servers. This distributed approach might enhance the efficiency and scalability of the system, allowing it to handle larger volumes of content or more complex derivative works. For instance, one server could manage the initial feature extraction, while another focuses on theme integration, and a third refines the final output. Finally, the latent diffusion model could be integrated with external data sources or APIs to enrich the derivative work with additional context or information. This integration might involve pulling in relevant data from online databases, social media platforms, or other digital repositories, which the model could then incorporate into the creative process. Such an approach could lead to derivative works that are not only thematically aligned but also contextually relevant and informed by current trends or events.

The method, as described above, further may comprise the step of encoding the content to a latent space. This encoding process is carried out using an encoder network. This transformation is achieved through an encoder network, which can be implemented using various neural network architectures such as convolutional neural networks (CNNs), recurrent neural networks (RNNs), or transformer models, depending on the nature of the content. For instance, if the predetermined content is an image, a CNN might be employed to extract spatial hierarchies of features, reducing the image to a latent vector that encapsulates its core attributes. Alternatively, if the content is text-based, an RNN or a transformer model could be used to capture the sequential and contextual information, encoding the text into a latent space that reflects its semantic meaning. Once encoded, the latent space representation serves as a versatile foundation for generating derivative works. This representation can be manipulated to explore variations or to align with the requested theme. For example, in the case of image content, the latent vector might be adjusted to alter color schemes, introduce stylistic elements, or modify compositional aspects, all while maintaining the integrity of the original content.

In another scenario, if the content is audio, the encoder network might utilize a spectrogram-based approach to convert the audio signals into a latent space. This allows for the generation of derivative audio works that can vary in tempo, pitch, or even genre, depending on the requested theme. Alternatives to the encoder network could include autoencoders, which consist of both an encoder and a decoder. The autoencoder would compress the content into a latent space and then reconstruct it, ensuring that the latent representation is robust and retains the necessary information for generating high-quality derivative works. Moreover, the latent space encoding can facilitate the application of style transfer techniques, where the stylistic elements of one piece of content are applied to another. This is particularly useful in creating derivative works that blend multiple themes or artistic styles. In addition, the latent space can be leveraged for content interpolation, where two or more pieces of content are encoded, and their latent representations are combined to produce a new, hybrid derivative work. This approach can be used to create novel content that inherits characteristics from multiple sources, offering a rich avenue for creative exploration.

The method, as described above, further may comprise an encoder network. The encoder network also may comprise a convolutional neural network (CNN). The CNN is configured to extract mel-frequency cepstral coefficients (MFCCs) from the content. For instance, the CNN could be structured with multiple convolutional layers, each followed by activation functions such as ReLU (Rectified Linear Unit) to introduce non-linearity. These layers may be interspersed with pooling layers, such as max pooling or average pooling, to reduce dimensionality and computational load while retaining essential features. In one embodiment, the CNN may be designed to handle inputs of varying lengths by employing a global average pooling layer towards the end of the network. This layer can aggregate features across the entire input, allowing the network to produce a fixed-size output regardless of the input size. This approach can be particularly useful in scenarios where the content length is unpredictable. The extraction of mel-frequency cepstral coefficients (MFCCs) can be further refined by incorporating pre-processing steps such as noise reduction or normalization. For example, a noise reduction algorithm, like spectral subtraction, could be applied to the input content before it is fed into the CNN. This pre-processing step may help in enhancing the quality of the extracted MFCCs, especially in noisy environments.

Moreover, the encoder network might include additional feature extraction techniques alongside MFCCs. For instance, it could extract chroma features, which represent the energy distribution across different pitch classes, or spectral contrast, which measures the difference in amplitude between peaks and valleys in the sound spectrum. These additional features could be concatenated with the MFCCs to form a comprehensive feature vector that provides a richer representation of the content.

In another variation, the encoder network could be augmented with a recurrent neural network (RNN) layer, such as a Long Short-Term Memory (LSTM) or Gated Recurrent Unit (GRU), to capture temporal dependencies in the content. This addition could be beneficial for applications involving sequential data, where understanding the order and timing of features is important. The encoder network may also be designed to be adaptive, allowing it to fine-tune its parameters based on feedback from a downstream task. For instance, it could be part of a larger system that includes a decoder network, and the encoder's parameters could be updated through backpropagation based on the performance of the entire system. In terms of alternatives, the CNN could be replaced or supplemented with a transformer-based architecture, which has gained popularity for its ability to model long-range dependencies and parallelize computations. A transformer encoder could be used to process the content and extract features, potentially offering advantages in terms of scalability and performance. Furthermore, the encoder network could be implemented on various hardware platforms, ranging from high-performance GPUs for real-time processing to more resource-constrained environments like mobile devices or edge computing platforms. In such cases, techniques like model quantization or pruning could be employed to reduce the model size and computational requirements without significantly impacting performance.

The method, as described above, further may comprise using an encoder network. The encoder network additionally may comprise a Convolutional Neural Network (CNN). The CNN is configured to extract either a spatial or a temporal feature from the content. The CNN may consist of multiple layers, including convolutional layers, pooling layers, and fully connected layers, each serving a distinct purpose in feature extraction. For instance, in the context of image processing, the CNN might begin with a series of convolutional layers that apply different filters to the input image. These filters could be designed to detect edges, textures, or specific patterns within the image. The output of these convolutional layers may then be passed through pooling layers, which could perform operations such as max pooling or average pooling to reduce the spatial dimensions of the data while retaining the most significant features. In scenarios where temporal features are of interest, such as video analysis, the CNN might be configured to process sequences of frames. This could involve using 3D convolutional layers that operate across both spatial and temporal dimensions, allowing the network to capture motion patterns and changes over time.

Alternatively, the CNN could be combined with recurrent layers, such as Long Short-Term Memory (LSTM) units, to better handle temporal dependencies and sequence information. The encoder network might also incorporate various activation functions, such as ReLU (Rectified Linear Unit), sigmoid, or tanh, to introduce non-linearity into the model and enhance its ability to learn complex patterns. Batch normalization layers could be included to stabilize the learning process and improve convergence speed. In terms of specific worked examples, consider a CNN designed for facial recognition. The network could be trained on a dataset of labeled facial images, learning to extract features such as the distance between eyes, the shape of the nose, or the contour of the jawline. These features could then be used to identify or verify individuals in new images. Alternatively, for a video classification task, the CNN might be trained on a dataset of labeled video clips, learning to recognize actions or events, such as running, jumping, or waving. The network could extract both spatial features, like the appearance of objects in the scene, and temporal features, like the movement of those objects over time. As an alternative embodiment, the encoder network could be designed to handle audio data. In this case, the input might be a spectrogram representation of an audio signal, and the CNN could be configured to extract features related to pitch, rhythm, or timbre. This could be useful in applications such as music genre classification or speech recognition.

The encoder network could also be adapted to work with multimodal data, where it processes inputs from different sources simultaneously. For example, in an autonomous driving system, the network might receive both visual data from cameras and lidar data, extracting features that help the vehicle understand its environment and make driving decisions. In another variation, the CNN could be implemented on specialized hardware, such as a Graphics Processing Unit (GPU) or a Field-Programmable Gate Array (FPGA), to accelerate the computation and enable real-time processing of high-dimensional data. This could be particularly beneficial in applications requiring low latency, such as live video streaming or interactive gaming. The method, as described above, further may comprise an encoder network. The encoder network additionally may comprise a recurrent neural network (RNN) or a transformer. The RNN or the transformer is configured to extract a word embedding from the content. For instance, when utilizing a recurrent neural network (RNN), the network may be structured to include long short-term memory (LSTM) units or gated recurrent units (GRUs). These units are adept at handling sequences of data, making them particularly useful for tasks involving time-series data or natural language processing where the order of information is paramount. An LSTM, for example, can be configured with multiple layers, each layer having a different number of units to capture varying levels of abstraction in the data.

Alternatively, the encoder network may employ a transformer architecture, which is known for its ability to handle long-range dependencies in data through mechanisms such as self-attention. The transformer can be designed with multiple attention heads, each focusing on different parts of the input sequence, thereby allowing the network to learn complex relationships within the data. The transformer may also include positional encoding to retain the order of the input sequence, which is for tasks like language translation or sentiment analysis. In a specific example, the encoder network could be applied to a text classification task. Here, the input text is first tokenized into individual words or sub-words, which are then converted into numerical representations using a pre-trained word embedding model such as Word2Vec or GloVe. These embeddings serve as the input to the RNN or transformer. The RNN, if used, processes the sequence of embeddings one at a time, updating its hidden state at each step to capture the context of the text. In contrast, the transformer processes the entire sequence simultaneously, using its attention mechanism to weigh the importance of each word in the context of the entire sequence.

As an alternative, the encoder network could be adapted for use in a speech recognition system. In this scenario, the input would be a sequence of audio features, such as Mel-frequency cepstral coefficients (MFCCs), extracted from the audio signal. The RNN or transformer would then process these features to generate a sequence of embeddings that represent the phonetic content of the speech. These embeddings could be further processed by a decoder network to generate the corresponding text transcription. Moreover, the encoder network could be integrated into a larger system for image captioning. Here, the input would be an image, which is first processed by a convolutional neural network (CNN) to extract visual features. These features are then fed into the RNN or transformer, which generates a sequence of word embeddings that describe the content of the image. The network could be trained using a dataset of images paired with descriptive captions, allowing it to learn the associations between visual features and language.

In another variation, the encoder network might be employed in a recommendation system. The input could be user interaction data, such as clickstreams or purchase history, which is converted into a sequence of embeddings representing user preferences. The RNN or transformer processes this sequence to generate a user profile embedding, which can be used to predict future user behavior or recommend new items. The flexibility of the encoder network allows it to be tailored to a wide range of applications, each benefiting from the ability to extract meaningful embeddings from complex input data. Whether through the sequential processing capabilities of an RNN or the parallel processing power of a transformer, the encoder network serves as a powerful tool for transforming raw data into actionable insights.

The method, as described above, further may comprise the step of decoding the content from the latent space. This decoding process is accomplished using a decoder network. Each of these architectures offers unique advantages and can be selected based on the specific requirements of the application. For instance, an RNN-based decoder network can be employed to handle sequential data, where the temporal dependencies between elements are significant. This approach is particularly useful in applications like language translation or time-series prediction, where the order of words or data points is relevant. In this setup, the RNN processes the latent space representation sequentially, generating output one step at a time. Alternatively, an LSTM network can be utilized to address the vanishing gradient problem often encountered in traditional RNNs. LSTMs are capable of learning long-term dependencies, making them suitable for tasks that require the retention of information over extended sequences. For example, in a text generation task, an LSTM-based decoder can effectively generate coherent and contextually relevant sentences by maintaining context over long passages. A GRU-based decoder network offers a simpler architecture compared to LSTMs, with fewer parameters, which can lead to faster training times. GRUs are effective in scenarios where computational efficiency is a priority, such as in real-time applications or when working with limited computational resources.

On the other hand, a transformer-based decoder network can be employed to leverage the self-attention mechanism, which allows for parallel processing of input data. This architecture is particularly advantageous in applications requiring high throughput and scalability, such as large-scale natural language processing tasks. The transformer model can efficiently handle long-range dependencies and capture complex relationships within the data, making it a powerful choice for decoding tasks. In addition to selecting the appropriate architecture, various techniques can be applied to enhance the performance of the decoder network. For example, attention mechanisms can be integrated into RNN, LSTM, or GRU-based decoders to improve their ability to focus on relevant parts of the input sequence during decoding. This can lead to more accurate and contextually aware outputs. Furthermore, the decoder network can be trained using different loss functions, such as cross-entropy loss for classification tasks or mean squared error for regression tasks. The choice of loss function can significantly impact the quality of the decoded output and should be aligned with the specific objectives of the application.

In terms of alternatives, the decoder network can be designed to operate in a multi-modal setting, where it decodes content from latent spaces derived from different types of data, such as text, images, or audio. This approach can enable the generation of rich, multi-faceted outputs that incorporate information from diverse sources. The method, as described above, involves a content approval machine learning model. The content approval machine learning model further may comprise a neural network. The neural network is configured to determine a score. This score identifies a degree of like or dislike by the content owner for the derivative work. The score is determined as a function of a text embedding. The text embedding identifies an item in the derivative work. The determination of the score utilizes the at least one processor. For instance, a CNN might be particularly effective for analyzing visual elements within the derivative work, extracting features from images or video frames that correlate with the content owner's preferences.

Alternatively, an RNN could be employed to process sequential data, such as audio or text, capturing temporal dependencies that might influence the content owner's degree of like or dislike. In one embodiment, the neural network could incorporate an attention mechanism, allowing it to focus on specific parts of the derivative work that are more relevant to the content owner's preferences. This could be particularly useful in complex works where certain elements carry more weight in the approval process. For example, in a video, the attention mechanism might prioritize scenes with specific visual motifs or audio cues that align with the content owner's past approvals. The text embedding, which serves as a pivotal input to the neural network, can be generated using various techniques such as word2vec, GloVe, or BERT. These embeddings transform textual elements of the derivative work into numerical vectors that encapsulate semantic meaning. For instance, if the derivative work includes a script or dialogue, the text embedding could capture nuances in language, tone, and context that are significant to the content owner. The score determination process might involve multiple layers of processing, where initial layers of the neural network extract basic features, and subsequent layers combine these features to form higher-level abstractions. This hierarchical approach allows the model to progressively refine its understanding of the derivative work, ultimately leading to a more accurate score.

In another embodiment, the model could be trained using a dataset that includes historical approval data from the content owner, allowing it to learn patterns and preferences over time. This training process might involve supervised learning, where the model is provided with labeled examples of approved and disapproved works, or unsupervised learning, where the model identifies patterns without explicit labels. The model's adaptability could be enhanced by incorporating feedback loops, where the content owner can provide real-time feedback on the model's scores, allowing for continuous refinement and personalization. This feedback could be collected through a user interface that presents the score alongside the derivative work, enabling the content owner to make adjustments as needed. In some implementations, the content approval score determination may utilize a binary evaluation framework in addition to or instead of a continuous evaluation framework. For example, instead of generating a numerical score that is to exceed a predetermined threshold, a model evaluates the derivative work against a discrete set of required criteria defined by the content owner. Each criterion is individually assessed as either passing or failing, with approval granted only when all criteria are satisfied. This binary evaluation approach ensures strict compliance with all content owner requirements and simplifies the interpretation of approval decisions, as the derivative work either meets all necessary standards or requires revision. One or more content approval models 275 may be trained to perform these binary classifications across multiple criteria simultaneously, providing a comprehensive assessment of compliance. Additionally, the model could be extended to support multi-modal inputs, where it simultaneously processes text, audio, and visual data from the derivative work. This would enable a more holistic assessment of the work, capturing the interplay between different media types that might influence the content owner's approval. In terms of alternatives, the neural network could be replaced or supplemented with other machine learning models, such as decision trees or support vector machines, depending on the specific requirements and constraints of the application. These models might offer advantages in terms of interpretability or computational efficiency, providing a different balance of trade-offs compared to neural networks.

The method, as described above, further may comprise the step of determining a text embedding. This text embedding is used to identify an item. The determination of this text embedding is performed using a CLIP model. The CLIP model, which stands for Contrastive Language Image Pretraining, is a versatile tool that can be adapted to different scenarios for identifying items within derivative works. One approach involves training the CLIP model on a diverse dataset that includes a wide range of text and image pairs. This training allows the model to learn associations between textual descriptions and visual elements, enabling it to generate text embeddings that accurately represent items in derivative works. For instance, if the derivative work is a digital artwork, the CLIP model can be used to generate text embeddings for various elements within the artwork, such as "sunset," "mountain," or "river," based on the visual content and associated textual descriptions.

An alternative approach could involve fine-tuning the CLIP model on a specific domain or context relevant to the content owner. For example, if the content owner specializes in fashion, the CLIP model can be fine-tuned using a dataset of fashion-related text and images. This fine-tuning process enhances the model's ability to generate text embeddings that are more aligned with the content owner's preferences and the specific items of interest within the fashion domain, such as "vintage dress," "leather boots," or "silk scarf." Additionally, the CLIP model can be configured to handle multi-modal inputs, where both text and image data are used simultaneously to generate a more comprehensive text embedding. This configuration allows the model to consider the context provided by both modalities, resulting in a richer and more nuanced representation of the item in the derivative work. For example, a derivative work that includes both textual descriptions and visual elements can be processed by the CLIP model to generate a text embedding that captures the essence of the item, such as "a serene landscape with a tranquil lake and towering pine trees." Moreover, the CLIP model can be integrated with other machine learning techniques to enhance its performance. For instance, a reinforcement learning algorithm can be employed to iteratively improve the text embedding generation process. By providing feedback on the accuracy and relevance of the generated embeddings, the reinforcement learning algorithm can guide the CLIP model to refine its understanding of the items in the derivative work, leading to more precise and contextually appropriate text embeddings. In terms of alternatives, the CLIP model can be replaced or supplemented with other models that specialize in text embedding generation. For example, a BERT-based model can be used to generate text embeddings that focus on the semantic meaning of the text, while a ResNet-based model can be employed to extract visual features from images. By combining the strengths of different models, a more robust and versatile text embedding generation process can be achieved, catering to a wide range of derivative works and content owner preferences.

In the context of playlist remixing functionality, the system may employ specialized embeddings that capture the stylistic elements of particular music production aesthetics. For example, when a user selects to transform their playlist into a "lo-fi version," the system utilizes embeddings that represent the characteristic elements of lo-fi music production—such as specific drum patterns, frequency equalization curves, and signal processing techniques. These embeddings guide the transformation process to ensure that tracks from diverse genres and artists are modified in a consistent manner that aligns with the requested aesthetic. The text embeddings for such playlist-wide transformations encode both the technical audio processing parameters and the emotional or atmospheric qualities associated with the target style, enabling cohesive stylistic transformations across entire collections while preserving the recognizable elements of the original tracks.

The method as described may be particularly applicable in interactive media contexts such as video games or virtual reality environments. In such implementations, the content derivation platform 110 can transform a user's preferred music to match the sonic characteristics of the interactive environment. For example, in a western-themed game, the user could import their modern music library, and the platform would apply transformation parameters that align each song with the game's sonic aesthetic—potentially removing vocals, adding appropriate reverberation characteristics, or incorporating period-appropriate instrumentation. This creates a personalized yet contextually appropriate soundtrack experience unique to each user while maintaining thematic consistency with the media environment. In these contexts, the approval process may be streamlined through pre-approval of transformation parameters by both the interactive media creator and the music rights holders, establishing boundaries within which transformations can occur automatically. The authorization server may further enforce context-specific access restrictions, determining whether transformed works can only be experienced within the approved interactive environment or may also be exported to external music platforms with appropriate attribution and compensation mechanisms.

In some aspects, the content derivation platform 110 may implement vocalist substitution technology that enables users to replace the lead vocals in existing recordings with those of other participating artists. This implementation leverages advanced voice isolation and adaptation algorithms that can separate vocal elements from complex mixes and then map a substitute artist's voice characteristics to match the original performance's timing, melody, and expression. The system could be deployed on digital signal processors (DSPs) within streaming platforms, allowing users to make real-time selections—for example, choosing to hear Elton John's 1972 'Rocket Man' sung by Dua Lipa while preserving the original instrumental arrangement. The user selection action serves as both the authorization trigger and the mechanism for attribution-based remuneration, with the digital watermarking system automatically encoding information about both the original and substitute vocal performances. This ensures that both artists receive appropriate compensation when the transformed work is played. The content approval models 275 enforce artistic boundaries established by participating vocalists, ensuring that substitutions only occur between consenting artists and within approved musical contexts, thereby preserving artistic integrity while enabling novel creative and commercial opportunities.

Further extending the interactive media capabilities, the content derivation platform 110 may implement an autonomous adaptation feature that enables content to dynamically respond to contextual cues. This functionality allows users to command the model to generatively adapt selected tracks to specific edit regions in visual media or interactive environments. The system interprets video intensity, emotional content, or aesthetic style data and modifies the audio accordingly, while carefully preserving the track's core production and compositional characteristics. In some aspects, this feature supports real-time adaptation for reactive gaming experiences, where music transforms in response to gameplay events, player actions, or environmental changes, creating an immersive audio experience that maintains compliance with content owner preferences and licensing terms.

The method, as described above, further may comprise the step of converting the requested theme to a text embedding. This conversion takes place in a shared latent space. The conversion process utilizes the at least one processor. One approach involves employing a pre-trained language model, such as BERT or GPT, which can transform the theme into a high-dimensional vector representation. This vector captures semantic nuances and contextual relationships inherent in the theme, allowing for a more nuanced analysis by the neural network. For instance, if the requested theme is "vintage aesthetics," the language model might generate a text embedding that encapsulates elements like "retro," "nostalgia," and "classic design." This embedding can then be compared against embeddings of items in the derivative work to assess alignment with the theme. Alternatively, a custom-trained model could be developed specifically for the domain of interest. This model could be fine-tuned on a dataset of themes and corresponding text descriptions, enhancing its ability to generate embeddings that are particularly relevant to the content approval context. In another variation, the conversion process might involve a multi-step pipeline where the theme is first tokenized into individual words or phrases. Each token is then embedded separately, and these embeddings are aggregated using techniques such as averaging, concatenation, or attention mechanisms to form a comprehensive representation of the theme. Moreover, the shared latent space can be designed to accommodate embeddings from multiple modalities, such as text, images, and audio. This would enable the system to handle themes that are expressed in non-textual formats, broadening the scope of content that can be evaluated. In terms of alternatives, the conversion could also leverage a graph-based approach, where themes and items are represented as nodes in a graph. The relationships between nodes, such as co-occurrence or semantic similarity, could be used to derive embeddings that reflect the interconnectedness of concepts within the theme. Additionally, the shared latent space might be dynamically updated based on feedback from content owners, allowing the system to adapt to evolving preferences and trends. This could involve techniques like reinforcement learning, where the model iteratively refines its embeddings based on approval scores received from previous evaluations.

Implementation flexibility is a key consideration in the overall design of the system. The shared latent space and embedding architecture described herein are designed with extensibility in mind, enabling integration with multiple vendor implementations through standardized interfaces. This plugin-based approach recognizes that artificial intelligence and digital watermarking technologies are evolving rapidly, with market leaders potentially changing every few years. By maintaining abstraction layers between core functionality and specific vendor implementations, the system can seamlessly transition between different technology providers as the landscape evolves, ensuring continuity of operation without dependence on any particular vendor's continued market presence.

The method, as described above, further may comprise the step of transforming the predetermined content into a derivative work. This derivative work may comprise audio, video, or images. The transformation is based on an embedding for the requested theme. The transformation process utilizes the at least one processor. For instance, when transforming content into audio, one approach could involve using a text-to-speech engine that leverages the embedding for the requested theme to modulate the tone, pitch, and speed of the generated audio. This could result in a narration that aligns with the emotional or thematic context of the original content. Alternatively, the transformation could involve generating a musical composition where the embedding influences the choice of instruments, tempo, and melody to reflect the desired theme. In the case of video transformation, the process might involve using computer-generated imagery (CGI) to create animations or visual effects that are thematically consistent with the embedding.

For example, if the theme is "futuristic," the transformation could result in a video with sleek, metallic visuals and advanced technology motifs.

Another possibility is to apply filters or overlays to existing video footage, altering colors, lighting, and textures to match the theme. When it comes to images, the transformation could involve style transfer techniques, where the embedding guides the application of artistic styles to the original image. This might result in a painting-like rendition of a photograph, with brushstrokes and color palettes that reflect the theme. Alternatively, the transformation could involve compositing multiple images together, using the embedding to determine the arrangement and blending of elements to create a cohesive thematic image. In all these cases, the transformation process can be further refined by incorporating user feedback or preferences, allowing for iterative adjustments to better align the derivative work with the intended theme. Additionally, the transformation could be applied in real-time, enabling dynamic content creation that responds to changes in the embedding or user input.

Moreover, alternative approaches could involve using generative adversarial networks (GANs) to produce high-quality derivative works. In this scenario, the embedding could serve as a conditioning input to the generator network, guiding the creation of content that adheres to the thematic constraints. This method could be particularly effective for generating realistic images or videos that maintain a consistent style or mood. The method, as described above, further may comprise the step of embedding the digital watermark in the derivative work. This step involves the application of the digital watermark in a manner that integrates it into the derivative work. One method involves the use of frequency domain techniques, where the digital watermark is embedded by altering the frequency components of the derivative work. For instance, in an audio file, the watermark could be embedded by modifying the amplitude of certain frequency bands, ensuring that the watermark is imperceptible to the human ear but detectable by specialized software. Alternatively, spatial domain techniques can be employed, particularly in image or video content. Here, the digital watermark is embedded by altering the pixel values in a subtle manner. For example, in an image, the least significant bits of certain pixels could be modified to encode the watermark. This method ensures that the visual quality of the image remains largely unaffected while embedding the watermark.

In another approach, a robust watermarking technique could be utilized, which is designed to withstand various transformations and manipulations of the derivative work. This could involve embedding the watermark in a way that it remains intact even if the work is compressed, resized, or subjected to other common editing processes. For instance, a robust watermark in a video might be embedded across multiple frames, ensuring its persistence even if individual frames are altered. For applications requiring a high level of security, an encrypted watermark could be used. This involves encrypting the watermark data before embedding it into the derivative work. The decryption key would then be required to extract and verify the watermark, adding an additional layer of protection against unauthorized access or tampering. In scenarios where the derivative work is expected to undergo frequent updates or modifications, a dynamic watermarking technique might be beneficial. This method allows the watermark to be updated or changed without the need to reprocess the entire work. For example, in a collaborative document, the watermark could be designed to reflect the most recent changes or the identity of the last editor. Furthermore, the digital watermark could be designed to carry additional metadata about the derivative work, such as the creation date, author information, or usage rights. This metadata could be encoded within the watermark itself, providing a means of tracking and managing the derivative work's distribution and usage. In terms of alternatives, a visible watermark could be considered, where the watermark is intentionally made visible to serve as a deterrent against unauthorized use. This could be a logo or text overlay on an image or video, clearly indicating the ownership or intended use of the derivative work. When applied to textual content such as legal documents, the digital watermark serves additional specialized functions. For contract derivatives, the watermark could encode version history, jurisdiction applicability, and modification parameters that were applied to the original document. This becomes particularly valuable in legal and business contexts where documents may undergo multiple adaptations across different jurisdictions or business applications. For example, a streaming music licensing agreement transformed for video content usage could contain watermark data indicating both its origin document and the specific transformation parameters applied. This provides a verifiable chain of document provenance that can be critical in legal disputes or compliance verification. The digital watermark in text-based derivatives also facilitates appropriate attribution of authorship, especially important when creative works like lyrics or literature are transformed while maintaining intellectual property rights of the original creator.

The method, as described above, further may comprise the frequency domain embedding of the digital watermark. One approach involves transforming the digital content into the frequency domain using a method such as the Discrete Fourier Transform (DFT) or the Discrete Cosine Transform (DCT). Once in the frequency domain, specific frequency components can be selected for embedding the digital watermark. This selection can be based on criteria such as robustness to compression or noise, or perceptual invisibility to the human eye. For instance, in an image, the mid-frequency range might be chosen for embedding the watermark, as it offers a balance between robustness and invisibility. The watermark itself could be a binary sequence or a more complex pattern, which is modulated onto the selected frequency components. This modulation can be achieved through techniques like spread spectrum, where the watermark is spread across multiple frequencies, or quantization index modulation, where the frequency components are quantized to embed the watermark. An alternative approach could involve using wavelet transforms, which provide a multi-resolution analysis of the content. In this case, the watermark could be embedded in the wavelet coefficients at different levels of decomposition, allowing for a more flexible and potentially more robust embedding process. The choice of wavelet basis functions and the level of decomposition can be tailored to the specific requirements of the content and the desired properties of the watermark. In another example, audio content could be transformed into the frequency domain using a Fast Fourier Transform (FFT). The watermark could then be embedded in the phase or magnitude of the frequency components. Embedding in the phase might offer better perceptual transparency, while embedding in the magnitude could provide greater robustness. Additionally, the embedding process can be adaptive, where the characteristics of the content are analyzed to determine the optimal embedding strategy. This could involve machine learning techniques to predict the best frequency components for embedding based on the content's features. Furthermore, the digital watermark can be designed to carry additional information, such as metadata about the content or the content owner. This information can be encoded within the watermark and extracted during the watermark detection process. In terms of alternatives, the digital watermark could be embedded in the spatial domain instead of the frequency domain, or a combination of both domains could be used to enhance the robustness and security of the watermark. The choice of domain and embedding technique can be influenced by factors such as the type of content, the expected types of attacks or distortions, and the computational resources available.

The method, as described above, further may comprise the step of updating the derivative work. The update involves the addition of a new digital watermark. This new digital watermark is characterized by its validity for a limited time. The method also may include the provision of access to the updated derivative work. One approach involves generating a unique digital watermark for each derivative work, which can be achieved by utilizing a random number generator or a hash function. This unique watermark can be embedded into the derivative work using techniques such as frequency domain embedding, where the watermark is inserted into the less perceptible parts of the content, or spatial domain embedding, where the watermark is directly inserted into the pixel values of an image or the audio samples of a sound file. The validity of the digital watermark for a limited time can be managed by associating a timestamp with the watermark. This timestamp can be checked against the current time to determine if the watermark is still valid. Alternatively, a countdown timer could be embedded within the watermark itself, which decrements over time and becomes invalid once it reaches zero. This approach ensures that the watermark is only valid for a predetermined duration, after which it can no longer be used to verify the authenticity of the derivative work. Access to the updated derivative work can be controlled through various mechanisms. For instance, a secure access token could be generated and distributed to authorized users, allowing them to view or download the updated work. This token could be time-sensitive, expiring after a certain period, or usage-based, allowing a limited number of accesses.

In some implementations, the content derivation platform may receive input content that already contains a digital watermark from a previous transformation or approval process. When watermarked content is used as input for a new derivative work, the system may be configured to detect the existing watermark and implement specialized handling procedures. These procedures may include watermark removal prior to transformation, preservation of watermark provenance data, or modification of the existing watermark to reflect the new derivative relationship. The system maintains a chain of attribution by incorporating metadata from the original watermark into the new watermark applied to the subsequent derivative work. This hierarchical watermarking approach enables the authorization server to enforce more complex rights management scenarios, such as requiring approval from all previous content owners in the transformation lineage or implementing royalty distribution across multiple generations of derivative works.

Another option is to implement a digital rights management (DRM) system that encrypts the derivative work and requires a decryption key for access. This key could be distributed to users who have been granted permission to access the content. In terms of alternatives, the digital watermark could be made dynamic, changing periodically to enhance security. This could involve altering the watermark's pattern or embedding method at regular intervals, making it more difficult for unauthorized users to replicate or remove. Additionally, the watermark could be linked to the content owner's preferences, such as incorporating specific symbols or codes that are meaningful to them, further personalizing the derivative work. Another alternative could involve using blockchain technology to record the watermarking process. Each time a new watermark is added, a transaction could be recorded on a blockchain, providing a transparent and immutable record of the watermark's creation and validity period. This could enhance trust and accountability in the content approval process.

The method, as described above, further may comprise the step of configuring a tracking system. The purpose of this tracking system is to determine the authenticity of the derivative work. The authenticity of the derivative work is verified as a function of the digital watermark. This verification process is carried out by the tracking system. One approach involves utilizing a distributed ledger technology, such as blockchain, to record and verify the digital watermark associated with each derivative work. This ledger can store metadata about the derivative work, including its creation date, creator information, and any modifications made over time. By comparing the digital watermark in the derivative work with the records on the ledger, the tracking system can verify its authenticity. Another alternative involves employing a machine learning algorithm specifically trained to recognize and validate digital watermarks. This algorithm could analyze the patterns and characteristics of the watermark embedded in the derivative work, comparing them against a database of known authentic watermarks. The algorithm could be designed to adapt and learn from new watermark patterns, improving its accuracy over time.

A further example could involve the use of a multi-factor authentication system. In this scenario, the tracking system might require additional verification steps, such as a digital signature from the content owner or a unique identifier linked to the creator's profile. This multi-layered approach could enhance the security and reliability of the authenticity verification process. Additionally, the tracking system could incorporate a real-time monitoring feature. This feature might continuously scan the internet for unauthorized copies of the derivative work, using the digital watermark as a key identifier. Upon detecting a potential infringement, the system could alert the content owner or take automated actions, such as issuing a takedown request or notifying the platform hosting the unauthorized content. In terms of alternatives, the tracking system could also be integrated with a content management system (CMS). This integration would allow for seamless tracking and management of derivative works within the CMS, providing content owners with a centralized platform to monitor authenticity and manage their digital assets. Moreover, the tracking system could offer a user-friendly interface, enabling content owners to easily upload their derivative works and receive instant feedback on authenticity verification. This interface might include visual indicators, such as color-coded authenticity status or detailed reports outlining the verification process and results.

The method, as described above, further may comprise the step of validating user requests for access to the derivative work. The validation of these user requests is authorized as a function of the digital watermark. One approach involves the use of a digital watermark, which can be embedded within the derivative work in a manner that is imperceptible to the user but detectable by the system. This digital watermark can contain metadata such as the creator's identity, the date of creation, and access permissions. For instance, when a user requests access to the derivative work, the system can extract the digital watermark and cross-reference the embedded metadata with a database of authorized users. This database can be dynamically updated to reflect changes in access permissions, such as when a content owner decides to grant or revoke access to certain users. The system can then determine whether the requesting user is authorized to access the work based on this comparison. In another example, the digital watermark can be used to track the distribution of the derivative work. Each time the work is accessed or shared, the system can log the event, including details such as the user's identity, the time of access, and the location. This information can be used to generate reports for the content owner, providing insights into how the derivative work is being used and by whom. Alternatively, the digital watermark can be designed to degrade or alter the quality of the derivative work if unauthorized access is detected. For example, if a user attempts to access the work without proper authorization, the system can trigger a mechanism that reduces the resolution of the work or overlays a visible watermark indicating unauthorized access. This serves as a deterrent to unauthorized distribution and use. In addition to these examples, the validation process can be enhanced by incorporating machine learning algorithms that analyze patterns of access requests. By training a model on historical access data, the system can predict and flag potentially unauthorized access attempts based on deviations from typical user behavior. This predictive capability can be used to preemptively deny access or require additional authentication steps for suspicious requests. Furthermore, the digital watermark can be combined with other security measures, such as encryption or biometric authentication, to create a multi-layered access control system. For instance, a user may be required to provide a fingerprint or facial recognition scan in addition to having their access request validated by the digital watermark. This combination of techniques can provide a robust framework for protecting the derivative work from unauthorized access.

The tracking system may incorporate Elliptic Curve Cryptography (ECC) to ensure secure verification of the digital watermark. Unlike RSA encryption which requires larger key sizes, ECC provides equivalent security with significantly smaller computational overhead, enabling more efficient authentication processes even on devices with limited processing capabilities. This approach is particularly advantageous for systems that must verify watermarks across diverse platforms, from high-performance servers to mobile devices. The ECC implementation allows the tracking system to create digital signatures that securely validate the authenticity of the derivative work while maintaining performance efficiency, even as the volume of verification requests scales with increased platform adoption.

The method, as described above, further may comprise the step of automatically requesting an automated payment. This request for payment is initiated via the execution of a smart contract. The execution of this smart contract is triggered based on the use of the derivative work. The detection of this use of the derivative work is determined as a function of the digital watermark. For instance, the smart contract could be programmed to interact with a blockchain network, where the digital watermark serves as a unique identifier for the derivative work. Upon detection of the watermark, the smart contract could automatically execute a transaction, transferring a predetermined amount of cryptocurrency from the user's digital wallet to the content owner's account. This approach ensures transparency and immutability, as all transactions are recorded on the blockchain.

Alternatively, the smart contract could be integrated with traditional banking systems, where the detection of the digital watermark triggers an API call to a financial institution. This API call could initiate a direct debit from the user's bank account, transferring funds to the content owner's account. This method might appeal to users who prefer dealing in fiat currency rather than cryptocurrency. In another variation, the smart contract could be designed to offer a tiered payment structure. For example, the payment amount could vary based on the frequency or duration of the derivative work's use. If the digital watermark is detected multiple times within a certain period, the smart contract could adjust the payment amount accordingly, offering discounts for bulk usage or higher fees for extended use. Moreover, the digital watermark itself could be dynamic, changing periodically to enhance security and prevent unauthorized use. This dynamic watermark could be linked to a time-based algorithm, ensuring that only the most current version of the derivative work is authorized for use. The smart contract would then verify the validity of the watermark before executing the payment request. Additionally, the smart contract could incorporate a feedback mechanism, where the content owner is notified of each transaction. This notification could include details such as the identity of the user, the nature of the derivative work, and the amount paid. This information could be used by the content owner to adjust their pricing strategy or to identify trends in the use of their content.

The smart contract may utilize Elliptic Curve Cryptography (ECC) to secure transaction processes and verify parties involved in the payment execution. ECC offers advantages over traditional RSA encryption by providing comparable security strength with significantly smaller key sizes and reduced computational requirements. This makes ECC particularly well-suited for blockchain implementations where efficiency is a consideration. By implementing ECC within the payment verification framework, the system can authenticate transaction participants and validate payment authorizations with high security assurance while minimizing processing overhead. As blockchain technologies increasingly support the content industry, ECC represents a modern cryptographic approach that complements the quantum-resistant methods mentioned elsewhere in this disclosure, creating a comprehensive security strategy for managing derivative work transactions.

In terms of alternatives, the smart contract could be designed to support multiple payment methods, allowing users to choose between cryptocurrency, credit card payments, or direct bank transfers. This flexibility could enhance user experience and broaden the appeal of the system. Furthermore, the smart contract could be configured to handle disputes automatically. For instance, if a user believes they have been incorrectly charged, they could submit a claim through the smart contract. The contract could then temporarily hold the disputed funds in escrow while an automated arbitration process reviews the claim. This process could involve analyzing the digital watermark data and usage logs to determine the validity of the claim. The method, as described above, further may comprise the step of revoking access to the approved derivative work. This action is taken upon the determination that a time-sensitive watermark has expired. One approach involves embedding a digital watermark within the derivative work that contains metadata specifying an expiration date. This watermark can be a visible or invisible marker, depending on the nature of the content and the preferences of the content owner. For instance, in a video file, an invisible watermark might be embedded in the audio or video stream, which is detectable by specialized software. Once the expiration date is reached, the software can automatically trigger a script that restricts access to the file. This could involve encrypting the file, rendering it unreadable without a new decryption key, or moving the file to a secure location inaccessible to the user. Alternatively, in a text document, a visible watermark might be used, such as a timestamp or a digital signature that becomes invalid after a certain date. Upon expiration, the document could be programmed to display a message indicating that access has been revoked, or it could automatically delete itself from the user's device.

Another example could involve a cloud-based system where the derivative work is stored on a remote server. In this scenario, the server could monitor the expiration date embedded in the watermark and, upon reaching this date, automatically revoke user permissions to access the file. This could be achieved by altering the access control list associated with the file, effectively removing the user's ability to view or download the content. As an alternative, the watermark could be linked to a licensing agreement that specifies the terms of use, including the expiration date. Once the watermark indicates that the agreement has expired, the system could notify the user and provide options for renewing the license or purchasing additional access time. In some cases, the watermark might be dynamic, allowing for real-time updates to the expiration date based on user interactions or external factors. For example, if the user engages with the content in a specific way, such as sharing it on social media or providing feedback, the expiration date could be extended as a reward for their engagement. Furthermore, the watermark could be designed to interact with other systems, such as a digital rights management (DRM) platform, to ensure that access is revoked across all devices and platforms where the derivative work is available. This could involve synchronizing the expiration date with the DRM system, ensuring that the content is consistently protected regardless of how or where it is accessed.

In the Summary above and in this Detailed Description, and the Claims below, and in the accompanying drawings, reference is made to particular features of various implementations. It is to be understood that the disclosure of particular features of various implementations in this specification is to be interpreted to include all possible combinations of such particular features. For example, where a particular feature is disclosed in the context of a particular aspect or implementation, or a particular claim, that feature can also be used—to the extent possible—in combination with and/or in the context of other particular aspects and implementations, and in an implementation generally.

While multiple implementations are disclosed, still other implementations will become apparent to those skilled in the art from this detailed description. Disclosed implementations may be capable of myriad modifications in various obvious aspects, all without departing from the spirit and scope of the disclosed implementations. Accordingly, the drawings and descriptions are to be regarded as illustrative in nature and not restrictive.

It should be noted that the features illustrated in the drawings are not necessarily drawn to scale, and features of one implementation may be employed with other implementations as the skilled artisan would recognize, even if not explicitly stated herein. Descriptions of well-known components and processing techniques may be omitted so as to not unnecessarily obscure the implementation features.

In the present disclosure, various features may be described as being optional, for example, through the use of the verb "may;" or, through the use of any of the phrases: "in some implementations," "in some designs," "in various implementations," "in various designs," "in an illustrative example," or, "for example." For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be implemented in seven different ways, namely with just one of the three possible features, with any two of the three possible features or with all three of the three possible features.

In various implementations, elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various implementations have been disclosed and described in detail herein, it will be apparent to those skilled in the art that various changes may be made to the disclosed configuration, operation, and form without departing from the spirit and scope thereof. In particular, it is noted that the respective implementation features, even those disclosed solely in combination with other implementation features, may be combined in any configuration excepting those readily apparent to the person skilled in the art as nonsensical. Likewise, use of the singular and plural is solely for the sake of illustration and is not to be interpreted as limiting.

The Abstract is provided to comply with 37 C. F. R. § 1.72(b), to allow the reader to quickly ascertain the nature of the technical disclosure and is submitted with the understanding that it will not be used to interpret or limit the scope or meaning of the claims.

In the present disclosure, any method or apparatus implementation may be devoid of one or more process steps or components. In the present disclosure, implementations employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an implementation "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of implementation apparatus are known in the art. One or more implementation part may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described hereinabove may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f). Elements recited in means-plus-function format are intended to be construed in accordance with 35 U.S.C. § 112 (f).

Recitation in a claim of the term "first" with respect to a feature or element does not necessarily imply the existence of a second or additional such feature or element.

The phrases "connected to," "coupled to" and "in communication with" refer to any form of interaction between two or more entities, including mechanical, electrical, chemical, magnetic, electromagnetic, fluid, and thermal interaction. Two components may be functionally coupled to each other even though they are not in direct contact with each other. The terms "abutting" or "in mechanical union" refer to items that are in direct physical contact with each other, although the items may not necessarily be attached together.

The word "exemplary" is used herein to mean "serving as an example, instance, or illustration." Any implementation described herein as "exemplary" is not necessarily to be construed as preferred over other implementations. While various aspects of the disclosure are presented with reference to drawings, the drawings are not necessarily drawn to scale unless specifically indicated.

Reference throughout this specification to "an implementation" or "the implementation" means that a particular feature, structure, or characteristic described in connection with that implementation is included in at least one implementation. Thus, the quoted phrases, or variations thereof, as recited throughout this specification are not necessarily all referring to the same implementation.

Similarly, it should be appreciated that in the above description, various features are sometimes grouped together in a single implementation, Figure, or description thereof for the purpose of streamlining the disclosure. This method of disclosure, however, is not to be interpreted as reflecting an intention that any claim in this or any application claiming priority to this application require more features than those expressly recited in that claim. Rather, as the following claims reflect, inventive aspects may lie in a combination of fewer than all features of any single foregoing disclosed implementation. Thus, the claims following this Detailed Description are hereby expressly incorporated into this Detailed Description, with each claim standing on its own as a separate implementation. This disclosure is intended to be interpreted as including all permutations of the independent claims with their dependent claims.

A system or method implementation in accordance with the present disclosure may be accomplished through the use of one or more computing devices. As depicted, for example, at least in FIG. 1, FIG. 2, and FIG. 3, one of ordinary skill in the art would appreciate that an exemplary system appropriate for use with implementation in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with implementations of the present disclosure include, but are not limited to, proprietary computing devices, personal computers, mobile computing devices, tablet PCs, mini-PCs, servers, or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and implementation of the present disclosure are contemplated for use with any computing device.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device containing a processor circuit and the computing device may be a component. One or more components may reside within a process and/or thread of execution. A component may be localized on one computing device or distributed between two or more computing devices. As described herein, a component may execute from various computer-readable non-transitory media having various data structures stored thereon. Components may communicate via local and/or remote processes in accordance, for example, with one or more signals (for example, analog and/or digital) having one or more data packets (e.g., data from one component interacting with another component in a local system, distributed system, and/or across a network such as a wide area network with other systems via the signal). As another example, a component may be an apparatus with specific functionality provided by mechanical parts operated by electric or electronic circuitry that is controlled by a software application or firmware application executed by a processor circuit, wherein the processor may be internal or external to the apparatus and may execute at least a part of the software or firmware application. As another example, a component may be an apparatus that provides specific functionality through electronic components without mechanical parts, and the electronic components may include a processor therein to execute software or firmware that provides, at least in part, the functionality of the electronic components. In certain embodiments, components may communicate via local and/or remote processes in accordance, for example, with a signal having one or more data packets (e.g., data from one component interacting with another component in a local system, distributed system, and/or across a network such as a wide area network with other systems via the signal). In other embodiments, components may communicate or otherwise be coupled via thermal, mechanical, electrical, and/or electromechanical coupling mechanisms (such as conduits, connectors, combinations thereof, or the like). An interface may include input/output (I/O) components as well as associated processors, applications, and/or other programming components. The terms "component," "environment," "system," "architecture," "interface," "unit," "module," and "pipe" may be utilized interchangeably and may be referred to collectively as functional elements.

As utilized in this disclosure, the term "processor" may refer to any computing processing unit or device comprising single-core processors; single processors with software multithread execution capability; multi-core processors; multicore processors with software multithread execution capability; multi-core processors with hardware multithread technology; parallel platforms; and parallel platforms with distributed shared memory. Additionally, a processor may refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor may be implemented as a combination of computing processing units. In certain embodiments, processors may utilize nanoscale architectures such as, but not limited to, molecular and quantum-dot based transistors, switches, and gates, to optimize space usage or enhance the performance of user equipment or other electronic equipment.

As used herein, a singular term may include multiple objects. As used herein, a single element may include multiple such elements. For example, the term "computer" may include a single computer or multiple computers. The phrase "a computer that stores data and runs software," may include a single computer that both stores data and runs software, a first computer that stores data and a second computer that runs software, or multiple computers that together store data and run software, where at least one of the multiple computers stores data and at least one of the multiple computers runs software. For example, the term "processor" may include a single processor or multiple processors. The phrase "a processor that stores data and runs software," may include a single processor that both stores data and runs software, a first processor that stores data and a second processor that runs software, or multiple processors that together store data and run software, where at least one of the multiple processors stores data and at least one of the multiple processors runs software. An implementation comprising multiple processors may configure each particular processor of the multiple processors to exclusively execute only a particular task assigned to that particular processor. An implementation comprising multiple processors may configure each particular processor of the multiple processors to execute any task of multiple tasks assigned to that particular processor by a scheduler such that a different task may be assigned to different processors at different times. As used herein in an apparatus or a computer-readable medium, "at least one" object rather than or in addition to a single object may perform the claimed operations. For example, "a computer-readable medium" may be construed as "at least one computer-readable medium," and "an apparatus comprising a processor and a memory" may be construed as "a system comprising processing circuitry and a memory subsystem," or "a system comprising processing circuitry and memory" (where memory lacks the article 'a'). It should be noted that a skilled person would understand that "processing circuitry" may include a single processor or multiple processors. Similarly, "memory subsystem" or "memory" (lacking an article) may include a single memory unit or multiple memory units.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It may be appreciated that the memory components or memories described herein embody or comprise non-transitory computer storage media that may be readable or otherwise accessible by a computing device. Such media may be implemented in any methods or technology for storage of information such as computer-readable instructions, information structures, program modules, or other information objects. The memory components or memories may be either volatile memory or non-volatile memory, or may include both volatile and non-volatile memory. In addition, the memory components or memories may be removable or non-removable, and/or internal or external to a computing device or component. Examples of various types of non-transitory storage media may include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which may be accessed by a computing device.

In various implementations, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with implementations of the present disclosure, and implementations of the present disclosure are contemplated for use with any appropriate configuration.

According to an implementation of the present disclosure, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth® connections, or any combination thereof. One of ordinary skill in the art would appreciate that there are numerous communications means that may be utilized with implementations of the present disclosure, and implementations of the present disclosure are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an implementation may include an alternate order of the steps adapted to a particular application of a technique disclosed herein. All such variations and modifications are intended to fall within the scope of this disclosure. The depiction and description of steps in any particular order is not intended to exclude implementations having the steps in a different order, unless required by a particular application, explicitly stated, or otherwise clear from the context.

Traditionally, a computer program consists of a sequence of computational instructions or program instructions. It will be appreciated that a programmable apparatus (that is, computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable, and replaceable, or fixed. It will also be understood that a computer can include a Basic Input/Output System (BIOS), firmware, an operating system, a database, or the like that can include, interface with, or support the software and hardware described herein.

Implementations of the system as described herein are not limited to applications involving conventional computer programs or programmable apparatuses that run them. It is contemplated, for example, that implementations of the disclosure as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, implementations that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, implementations of the disclosure are not described with reference to any particular programming language. It is appreciated that a variety of programming languages may be used to implement the present teachings as described herein, and any references to specific languages are provided for disclosure of enablement and best mode of implementations of the disclosure. Implementations of the disclosure are well suited to a wide variety of computer network systems over numerous topologies. Within this field, the configuration and management of large networks include storage devices and computers that are communicatively coupled to dissimilar computers and storage devices over a network, such as the Internet.

The element descriptions and their respective reference characters used in the Drawings are summarized as follows.

scenario 100
user 105
content derivation platform 110
network cloud 115
predetermined content 120
derivative work 125
requested theme 130
prompt system 135
authorization server 140
watermark 145
mobile application 150
mobile device 155
predetermined content server 160
derivative work server 165
third-party entities 170
processor 200
memory 205
program memory 210
data memory 215
derivative work generation and augmentation engine (DWGAE) 220
storage medium 225
input/output (I/O) interface 230
user interface 235
multimedia interface 240
forward diffusion process 245
reverse diffusion process 250
diffusion training data 255
encoder networks 260
decoder networks 265
diffusion models 270
content approval models 275
requested theme 280
filter database 290
pipeline 400
content stream 405
stream splitter 410
audio stream 415
image stream 420
text stream 425
input high-dimensional space 430
audio encoder 435
image encoder 440
text encoder 445 latent space 450
audio diffusion model 455
image diffusion model 460
text diffusion model 465
audio decoder 470
image decoder 475
text decoder 480
output high dimensional space 485
process 500
process 600
process 700

In some aspects, the content derivation platform may encompass merchandise derivative work generation, providing a framework for transforming artist-approved assets into personalized physical and virtual merchandise while maintaining brand integrity and enabling a controlled fan co-creation process. In some aspects, the merchandise derivation system operates using a multi-agent orchestration process, where autonomous agents collaborate to coordinate merchandise derivative work generation, production, and/or distribution. These agents may include knowledge agents that maintain artist-approved design constraints and validate derivative works against brand guidelines, action agents that employ generative artificial intelligence to create merchandise designs based on approved parameters, and/or distribution agents that manage both physical production through print-on-demand services and virtual merchandise deployment across metaverse platforms.

The system may support real-time concert synchronization capabilities that enable dynamic merchandise generation based on live performance parameters. During concerts or live events, the system may capture ephemeral moments and transform them into unique, contextually-relevant merchandise that reflects specific temporal, spatial, and/or experiential elements of the performance. This real-time generation capability may incorporate multiple data streams including current song lyrics, stage visuals and lighting parameters, crowd energy metrics, and venue location data to create merchandise that authentically commemorates specific performance moments.

Rule-based governance may be implemented through hierarchical constraint systems that enable content authorities to establish transformation parameters at multiple levels of specificity. Global artist rules may establish foundational constraints that govern all merchandise derivative works, while tour-specific rules, venue-specific rules, time-based rules, and/or fan tier rules may provide increasingly granular control over merchandise generation. This hierarchical approach may enable content owners to maintain strict brand control while allowing contextual flexibility for different merchandising scenarios.

The merchandise derivation system may accommodate both physical and virtual merchandise creation pathways. In some aspects, the merchandise derivation system may generate a merchandisable derivative, where a merchandisable derivative refers to a derivative work suitable for production, sale, or distribution as physical or virtual merchandise. Physical merchandise may be generated through integration with print-on-demand fulfillment systems and/or e-commerce platforms, enabling automated production and distribution of tangible items such as apparel, posters, and accessories. Virtual merchandise may be created through three-dimensional rendering processes that generate digital assets optimized for various metaverse platforms, gaming environments, and/or augmented reality applications.

In some aspects, fan co-creation interfaces may provide interactive frameworks that enable users to collaborate in the creative process while maintaining artist-defined constraints through real-time validation and iterative refinement. These interfaces may guide users through structured workflows for asset selection, design customization, and/or preview generation, ensuring that all fan-created merchandise remains within approved parameters while enabling meaningful personalization. In some aspects, the system may implement watermarking and/or tracking mechanisms that provide multi-layered authentication and rights management for physical and/or virtual merchandise. In some aspects, physical items may incorporate visible watermarks such as holographic tags and/or QR codes. In some aspects, physical items may incorporate hidden watermarks including security threads and/or micro-printing. Virtual items may utilize metadata embedding, blockchain registration, and/or platform-specific identifiers to enable cross-platform tracking and/or authentication.

In some aspects, revenue distribution and payment processing may be automated through smart contract execution that allocates compensation to stakeholders based on predetermined agreements. The system may track usage and sales data across multiple distribution channels, automatically calculating and distributing royalties to original content owners, platform operators, manufacturing partners, and/or other stakeholders involved in the merchandise creation and distribution process.

In some aspects, the merchandise derivation framework may provide scalable rule generation and learning capabilities that enable content authorities to establish transformation parameters through one-time configuration processes. Initial questionnaires, template libraries, and/or machine learning training modules may work together to create rule sets that subsequently enable autonomous approval of fan-created derivative works without manual intervention, addressing scalability requirements for high-volume merchandise customization.

Figure 13:
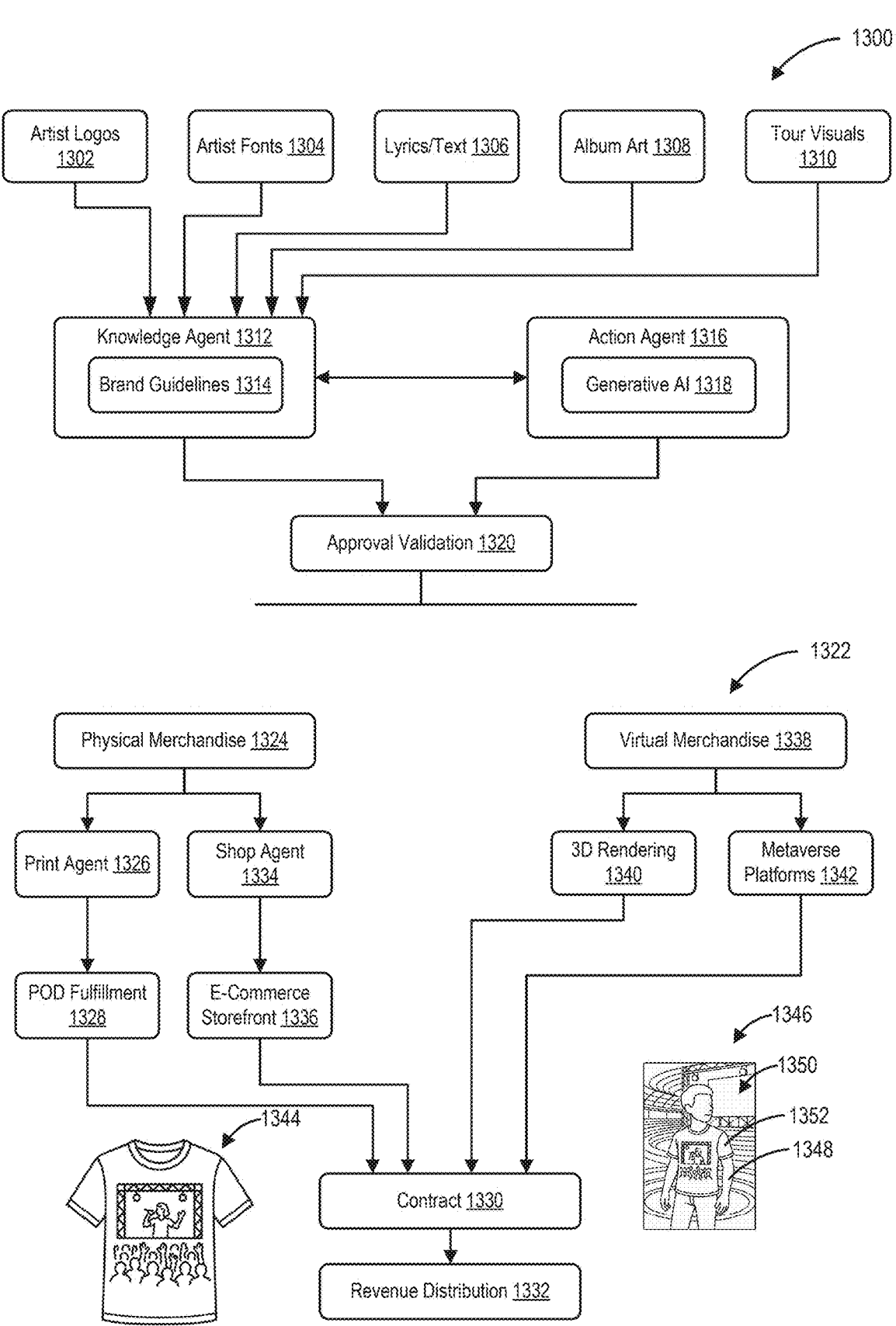
FIG. 13 depicts a diagram of a merchandise derivation system architecture for generating merchandise derivative works in accordance with aspects of the present disclosure.

FIG. 13 depicts a merchandise derivation system architecture 1300 for generating merchandise derivative works in accordance with aspects of the present disclosure. The merchandise system 1300 provides a framework for transforming artist-approved assets into personalized physical and/or virtual merchandise while maintaining brand integrity through multi-agent orchestration. In some aspects, the merchandise system 1300 comprises multiple input components representing artist-approved assets. For example, artist logos 1302 may represent visual brand identifiers including official logos, symbols, and/or graphic marks associated with the content owner. As another example, artist fonts 1304 may comprise typography assets including custom typefaces, lettering styles, and/or font families approved for merchandise use. In some aspects, lyrics text 1306 may include textual content from songs, albums, and/or other creative works, which may be extracted from the predetermined content 120 shown in FIG. 1. In some aspects, album art 1308 may represent visual assets from album covers, liner notes, and/or associated artwork. As another example, tour visuals 1310 may comprise stage designs, concert photography, lighting patterns, and/or venue-specific imagery from live performances. While the input components 1302-1310 illustrate exemplary artist-approved assets, it should be understood that other types of source content suitable for merchandise derivation are contemplated and may be utilized within the system 1300, including but not limited to video content, motion graphics, signature elements, promotional materials, and/or any other creative assets associated with the content owner.

Furthermore, while the system 1300 and associated components reference "artist-approved" assets and constraints throughout this disclosure, it should be understood that such approval may originate from various authorized parties beyond the artist themselves. For instance, artist approval may encompass authorization by record labels, management companies, publishing rights holders, estate representatives, brand managers, merchandising partners, and/or any other parties having legal authority to govern the use of the associated creative assets. Additionally, the approval process may involve multiple stakeholders with different rights to various aspects of the content, such as separate approvals for musical compositions versus sound recordings, or different territorial rights holders for international distribution. Accordingly, the term "artist-approved" may include any form of authorized approval from entities having legitimate rights to control the transformation and commercialization of the source content into merchandise derivative works.

In some aspects, a knowledge agent 1312 receives and processes the input assets 1302-1310. The knowledge agent 1312 may function as a specialized implementation of the content approval models 275 depicted in FIG. 3, specifically configured for merchandise generation. The knowledge agent 1312 maintains one or more rule sets defining brand guidelines 1314, which may be stored as structured data within the filter database 290 shown in FIG. 3. The brand guidelines 1314 may include permissible color palettes, approved material specifications, prohibited content elements, geographic restrictions, and/or temporal limitations. The knowledge agent 1312 may serve as an authoritative guardian of the artist's brand identity, ensuring merchandisable derivatives adheres to predetermined aesthetic and/or ethical constraints.

In some aspects, an action agent 1316 may operate in parallel with the knowledge agent 1312. The action agent 1316 may incorporate generative AI 1318 capabilities similar to those implemented in the DWGAE 220 shown in FIGS. 2 and 3, but may be tailored for visual design generation. The action agent 1316 may employ diffusion models, GANs, and/or other generative architectures to create merchandise designs (e.g., merchandisable derivatives) based on the input assets and/or user-specified themes. The generative AI 1318 component within the action agent 1316 may utilize techniques analogous to those described for the diffusion models 270 in FIG. 3, adapted for generating visual designs suitable for physical printing or virtual rendering.

A bidirectional validation channel facilitates continuous communication between the knowledge agent 1312 and the action agent 1316. This validation channel implements an iterative feedback loop wherein the action agent 1316 may propose design elements and the knowledge agent 1312 may validate such elements them against the brand guidelines 1314. The validation process may occur multiple times during generation, with the action agent 1316 refining its outputs based on feedback from the knowledge agent 1312. In some aspects, the bidirectional architecture provides that the creative generation remains within approved parameters. In some aspects, the bidirectional architecture provides that the creative generation remains within approved parameters, and may reduce post-generation rejections of non-compliant designs.

An approval validation 1320 component performs final verification of the generated merchandise designs. The approval validation 1320 may implement similar evaluation criteria to those employed in the post-generation content review 920 shown in FIG. 9, but tailored for merchandise.

This may include verifying that designs do not inadvertently incorporate third-party intellectual property, ensuring text elements are properly rendered and spelled, confirming color profiles match brand specifications, confirming location and/or placement of elements are in accordance with brand specification, and/or validating that designs meet minimum quality thresholds for production.

Upon successful validation, the merchandise system 1300 may bifurcate into two primary distribution channels through a processing pipeline 1322. A physical merchandise 1324 path may handle tangible product creation, while a virtual merchandise 1338 path may manage digital asset generation for online environments.

For the physical merchandise 1324 path, a print agent 1326 may interface with print-on-demand services. The print agent 1326 may format approved designs according to production specifications, including but not limited to resolution requirements, color space conversion (RGB to CMYK), bleed margins, and/or substrate-specific adjustments. The print agent 1326 may communicate with print-on-demand (POD) fulfillment 1328 systems, which may manage the actual production, quality control, and/or shipping of physical merchandise items. These items may include, but are not limited to, apparel, posters, accessories, and/or other tangible products.

In some aspects, a shop agent 1334 may operate in parallel with the print agent 1326, managing the commercial aspects of merchandise distribution. The shop agent 1334 may automatically generate product listings including titles, descriptions, pricing, and/or inventory metadata. The shop agent 1334 may interface with an e-commerce storefront 1336, which may be a standalone platform or integrated with existing artist merchandise stores. The shop agent 1334 may manage inventory levels, process orders, and/or coordinate with fulfillment services.

For the virtual merchandise 1338 path, a 3D rendering 1340 component may transform 2D designs into three-dimensional digital assets. The 3D rendering 1340 component may employ techniques such as texture mapping, normal mapping, and/or procedural material generation to create realistic virtual merchandise. These assets may be optimized for various rendering engines and platforms, with appropriate polygon counts, texture resolutions, and/or file formats for each target environment. For example, one or more metaverse platforms 1342 represent one or more distribution endpoints for virtual merchandise. The metaverse platforms 1342 may include virtual worlds, gaming environments, social VR spaces, and/or augmented reality applications. The merchandise system 1300 may generate platform-specific versions of each virtual item, accounting for different technical requirements, aesthetic styles, and/or usage contexts across platforms. Virtual merchandise may include avatar clothing, accessories, virtual concert merchandise, and/or AR-enabled items that bridge physical and digital experiences.

A contract 1330 centralizes revenue management for both physical and virtual merchandise sales. In some aspects, the contract 1330 may extend the functionality of the smart contract 1112 shown in FIG. 11, implementing merchandise-specific payment logic. This may include calculating production costs, platform fees, and/or profit margins for physical items, as well as licensing fees and platform commissions for virtual items. The contract 1330 may be implemented using blockchain technology or traditional payment processing systems, depending on the implementation requirements.

The contract 1330 may receive transaction data from all distribution channels, including the POD fulfillment 1328, e-commerce storefront 1336, and/or metaverse platforms 1342. The contract 1330 may process the transactions according to a predetermined revenue sharing agreement, which may specify different percentages for different types of merchandise, sales territories, and/or time periods.

A revenue distribution 1332 component may execute the actual disbursement of funds to stakeholders. The revenue distribution 1332 may allocate payments to the original content owner (e.g., corresponding to 1116 in FIG. 11), the platform operator (e.g., corresponding to 1118 in FIG. 11), manufacturing partners, logistics providers, and/or potentially a fan who created the customized design. The distribution percentages may be dynamically adjusted based on factors such as production costs, sales volume, or promotional campaigns.

A physical merchandise example 1344 depicts a tangible output of the physical merchandise 1324 path. The physical merchandise example 1344 may comprise apparel items, posters, accessories, or other physical products that incorporate the approved designs generated through the processing pipeline 1322.

A virtual merchandise example 1346 illustrates the digital output of the virtual merchandise 1338 path. The virtual merchandise example 1346 shows an avatar 1348 within an environment 1350, displaying virtual merchandise rendering 1352. The avatar 1348 may represent a user's digital persona within a metaverse platform, while the environment 1350 provides a contextual setting for the virtual merchandise display and/or a virtual environment of a platform, such as a metaverse platform 1342. The virtual merchandise rendering 1352 demonstrates how the 3D rendering 1340 component transforms approved designs into wearable digital assets that maintain visual fidelity and brand consistency across different virtual environments.

Figure 14:
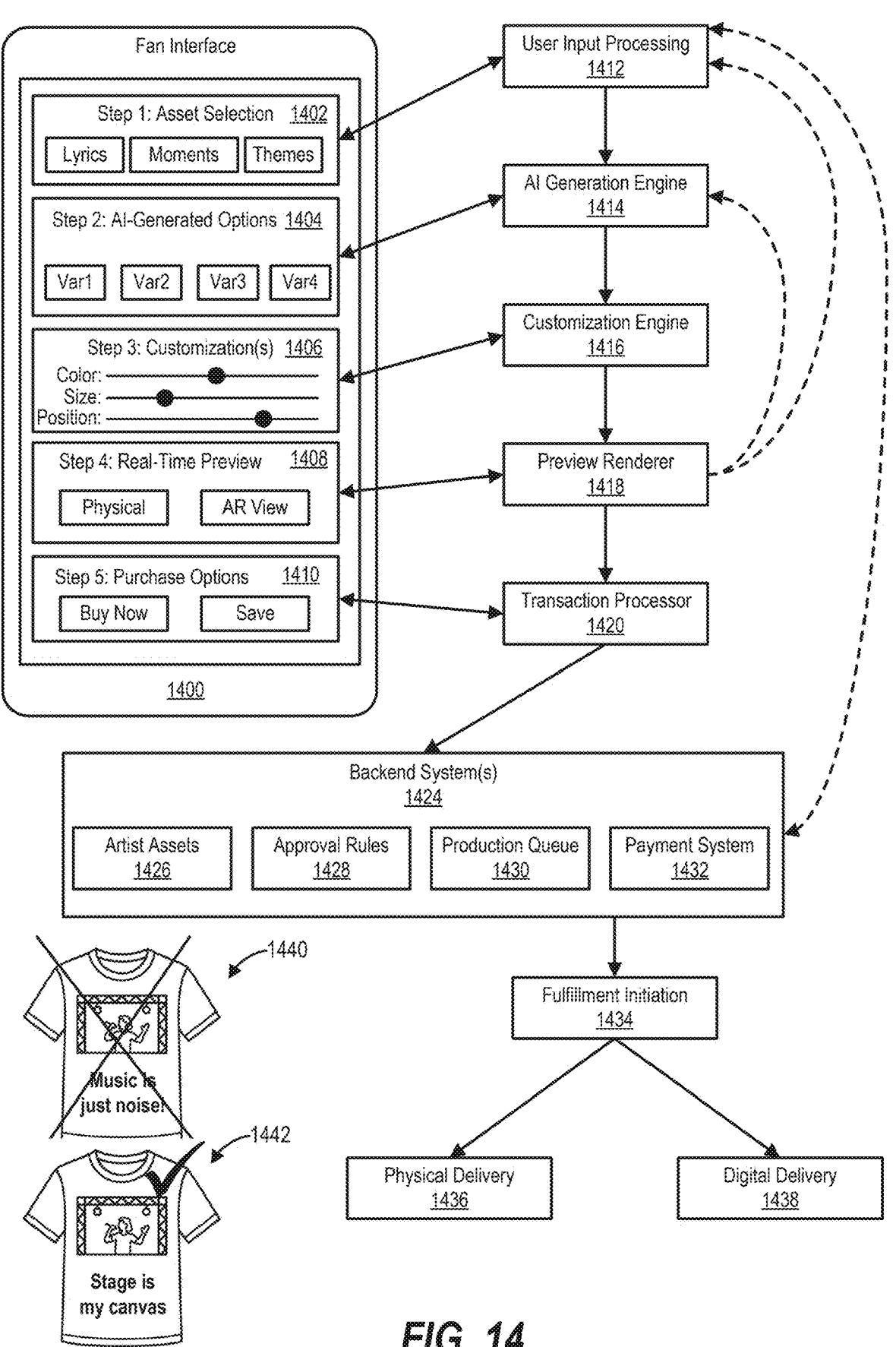
FIG. 14 depicts a flow diagram illustrating a fan co-creation interface system for generating derivative works in accordance with aspects of the present disclosure.

FIG. 14 depicts a schematic flow diagram illustrating a fan co-creation interface system for generating personalized merchandise derivative works in accordance with aspects of the present disclosure. FIG. 14 depicts an interactive framework enabling users to collaborate in a creative process while maintaining artist-defined constraints through validation and iterative refinement that may occur in real-time. In some aspects, a fan interface 1400 is implemented on a mobile device, which may correspond to the mobile device 155 depicted in FIG. 1. The fan interface 1400 may present a sequential workflow optimized for touchscreen interaction, guiding users through a structured creation process while providing visual feedback. The mobile form factor provides accessibility across diverse user demographics and enables merchandise creation in various contexts, including during live concerts, while streaming music, and/or through social media integrations.

In some aspects, an asset selection interface 1402 presents users with categorized options for incorporating artist-approved elements into their derivative work. The asset selection interface 1402 may display one or more selectable elements including lyrics extracted from predetermined content 120 shown in FIG. 1, moments representing specific temporal markers such as concert dates, venue locations, and/or memorable performances, and/or themes corresponding to pre-approved aesthetic styles, emotional tones, and/or visual motifs. The asset selection interface 1402 may query artist assets 1426 stored in backend systems 1424 to populate available options dynamically based on the user's context, such as their current location, streaming history, and/or concert attendance records.

Following asset selection, one or more AI generation options 1404 comprising one or more design variations may be presented to a user. The AI generation options 1404 may display four distinct variations (VAR 1, VAR 2, VAR 3, VAR 4), though alternative implementations may present fewer or additional options based on computational resources and user preferences. These variations may be generated by an AI generation engine 1414, which may implement similar generative capabilities to the DWGAE 220 shown in FIG. 2, specifically optimized for visual design generation. The AI generation engine 1414 may process the selected assets through neural networks trained on for example, an artist's visual style, such that one or more generated options maintain brand consistency while offering meaningful variety. In some aspects, a user input processor 1412 facilitates bidirectional communication between the fan interface 1400 and the AI generation engine 1414. The user input processor 1412 may translate touch gestures, text input, and/or selection actions into structured data formats suitable for processing by the AI generation engine 1414. The user input processor 1412 may implement natural language processing to interpret free-form text descriptions, gesture recognition to understand swipe patterns indicating aesthetic preferences, and/or contextual analysis to infer user intent from interaction patterns.

In some aspects, a customization interface 1406 may provide granular control over design parameters through intuitive slider controls. The customization interface 1406 may include a color slider that enables adjustment of color schemes within artist-approved palettes, preventing selection of colors that conflict with brand guidelines. In some aspects, a size slider controls the scale of design elements, ensuring text remains legible and graphics maintain appropriate proportions for production. As another example, a position slider adjusts the placement of elements on the merchandise, respecting safe zones for different product types such as avoiding critical seam areas on apparel or maintaining margin requirements for printed materials.

In some aspects, a customization engine 1416 processes the adjustment parameters in real-time or near real-time, applying transformations to the selected design while validating against approval rules 1428 stored in the backend systems 1424. The customization engine 1416 may implement similar validation logic to the knowledge agent 1312 shown in FIG. 13, ensuring modifications remain within acceptable parameters. In some aspects, real-time validation prevents users from creating non-compliant designs that would be rejected during final approval, improving user experience and reducing computational waste.

In some aspects, a preview interface 1408 displays the customized design in multiple viewing modes. The preview interface 1408 may include a physical preview that renders the design on a photorealistic product mockup, showing how the merchandise would appear when produced. This may include fabric texture simulation, color accuracy adjustments for different materials, and/or perspective corrections for three-dimensional products. An AR view may leverage augmented reality capabilities of the mobile device 155 to overlay the design onto the user's environment, enabling them to visualize how a t-shirt would look when worn or how a poster would appear on their wall. In some aspects, a preview renderer 1418 generates these visualizations by combining the customized design with product templates and environmental data. For physical previews, the preview renderer 1418 may apply physics-based rendering techniques to simulate material properties, lighting conditions, and/or printing characteristics. For AR previews, the preview renderer 1418 may utilize the mobile device's camera and motion sensors to track environmental geometry and/or lighting, compositing the virtual merchandise with real-world imagery in real-time.

In some aspects, a purchase interface 1410 presents transaction choices to the user. The purchase interface 1410 may include a "BUY NOW" option that initiates immediate purchase and production, while a "SAVE" option stores the design for later consideration or sharing. The purchase interface 1410 may also include options such as quantity selection, size specifications for apparel, and/or bundling with other merchandise items. In some aspects, a transaction processor 1420 handles the commercial aspects of the purchase flow. Upon receiving a purchase request, the transaction processor 1420 validates payment information, calculates applicable taxes and shipping costs, and/or initiates the appropriate fulfillment pathway. The transaction processor 1420 may interface with a payment system 1432 within one or more backend systems 1424, which may implement a smart contract functionality described in FIG. 11 and/or FIG. 13 for automated revenue distribution.

An iterative refinement loop enables users to modify their designs based on preview results without restarting the entire process. This feedback pathway connects the preview renderer 1418 back to the customization engine 1416 and potentially to the AI generation engine 1414 for more substantial modifications. Users can cycle through this loop multiple times, progressively refining their design until satisfied. The loop may maintain a history of modifications, enabling undo/redo functionality and A/B comparison between variations.

In some aspects, the one or more backend systems 1424 comprise integrated components that support the front-end interface operations. These systems may be implemented on cloud infrastructure to ensure scalability and reliability during high-demand periods such as album releases or concert tours. In some aspects, artist assets 1426 store the creative elements available for incorporation into derivative works (e.g., merchandisable derivatives). This repository corresponds to the input assets 1302-1310 shown in FIG. 13, and may maintain versioned libraries of logos, fonts, imagery, and/or other brand elements. The artist assets 1426 may be organized hierarchically, with global assets available for merchandise, tour-specific assets restricted to particular time periods, and/or exclusive assets reserved for premium fan tiers and/or special events.

In some aspects, the approval rules 1428 define the constraints and guidelines governing derivative work creation. In some aspects, these rules may correspond to the brand guidelines 1314 maintained by the knowledge agent 1312 in FIG. 13 and may be encoded as structured data similar to the content transformation rules 1206 shown in FIG. 12. The approval rules 1428 may specify prohibited combinations, such as preventing certain lyrics from appearing with specific imagery, mandatory elements that must appear on all merchandise, such as copyright notices or authentication markers, and/or conditional rules that activate based on context, such as different guidelines for concert merchandise versus online sales.

A production queue 1430 may manage the manufacturing pipeline for approved designs. The production queue 1430 may interface with print-on-demand services, maintaining optimal batch sizes, prioritizing orders based on shipping requirements, and/or coordinating with multiple production facilities to ensure timely delivery. The production queue 1430 may implement predictive algorithms to anticipate demand spikes and pre-position inventory accordingly. Following successful transaction processing, a fulfillment initiator 1434 may route orders to appropriate delivery channels. The fulfillment initiator 1434 may determine whether the purchase requires physical production or can be satisfied through digital delivery, allocating orders to the corresponding pathway.

For physical merchandise, a physical delivery 1436 pathway manages the logistics chain including production through final delivery. The physical delivery 1436 may include generating print-ready files with appropriate color profiles and resolution, coordinating with shipping carriers for optimal routing, providing tracking information to customers, and/or handling returns or quality issues. The physical delivery 1436 may interface with the POD fulfillment 1328 system described in FIG. 13.

For virtual merchandise, a digital delivery 1438 pathway may handle the distribution of digital assets. The digital delivery 1438 includes generating platform-specific file formats for different metaverse environments, minting NFTs or other blockchain-based ownership tokens if applicable, delivering download links or enabling direct platform integration, and/or managing digital rights and usage permissions. The digital delivery 1438 may interface with the metaverse platforms 1342 described in FIG. 13.

FIG. 13 depicts design outcomes based on compliance with established parameters. For example, a non-approved design 1440 represents merchandise concepts (e.g., merchandisable derivative(s)) that fail to meet the validation criteria established by the approval rules 1428. These designs may be rejected due to brand guideline violations, technical production limitations, and/or content policy conflicts. The system provides feedback to users regarding specific aspects that caused rejection, enabling iterative refinement toward compliance.

An approved design 1442 represents merchandise concepts (e.g., merchandisable derivative(s)) that successfully satisfy validation requirements and are cleared for production and distribution. The approved design 1442 has passed through the complete validation pipeline, including brand guideline compliance, technical production feasibility, and/or content policy adherence. These designs proceed to the fulfillment pathways and, in some aspects, are eligible for the digital watermark 145 application and authorization server 140 governance described in FIG. 1.

Figure 15:
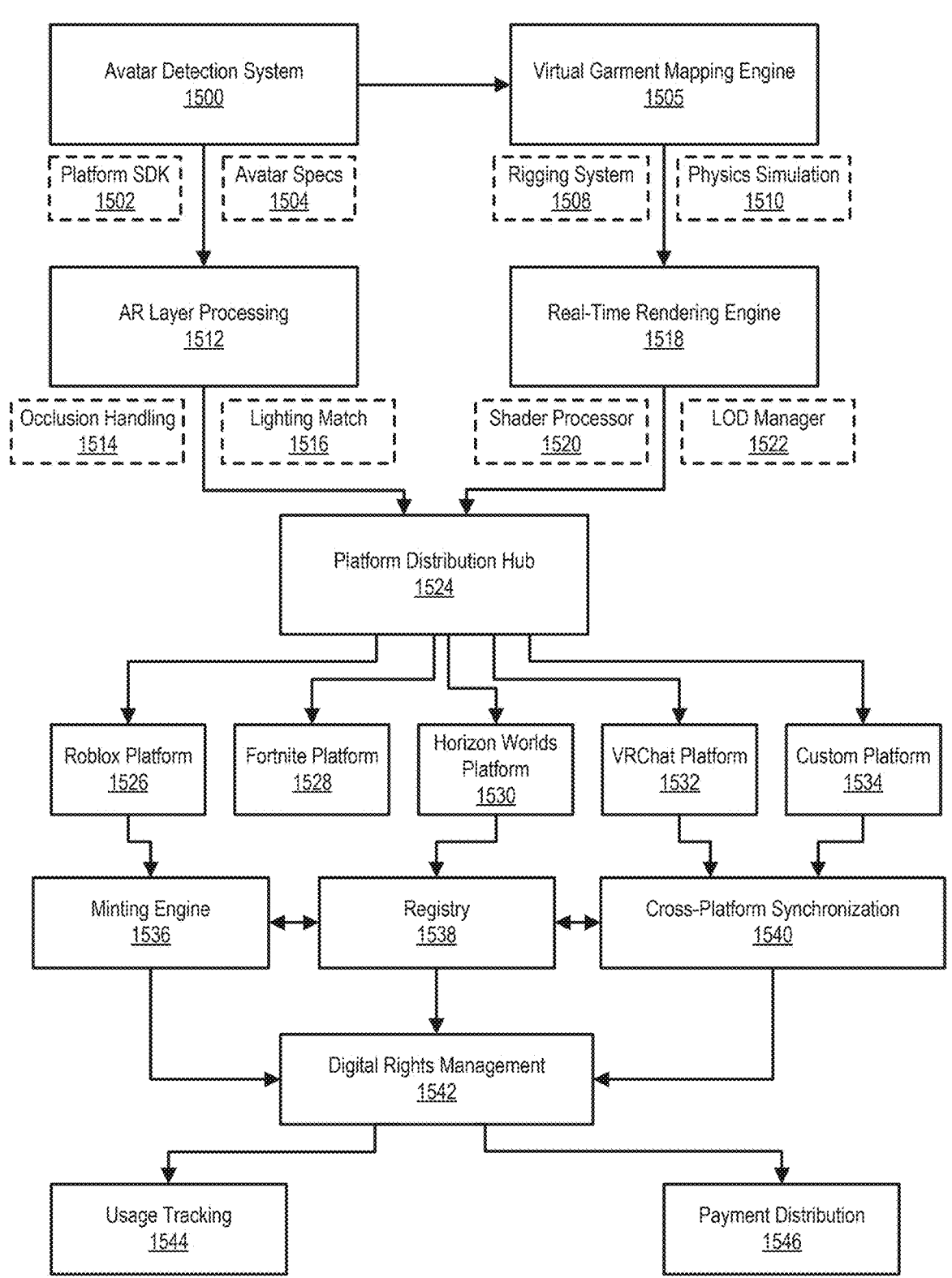
FIG. 15 depicts a diagram of a virtual merchandise pipeline system for generating, distributing, and/or managing digital merchandise derivative works across multiple platforms in accordance with aspects of the present disclosure.

FIG. 15 depicts a schematic diagram of a virtual merchandise pipeline system for generating, distributing, and managing digital merchandise derivative works across multiple metaverse platforms in accordance with aspects of the present disclosure. The system provides a framework for transforming approved merchandise designs into platform-specific virtual assets while maintaining cross-platform interoperability, ownership tracking, and/or rights management.

In some aspects, an avatar detection system 1500 initiates the virtual merchandise pipeline by identifying and analyzing a target avatar for which merchandise will be generated. The avatar detection system 1500 may interface with various metaverse platforms to retrieve avatar specifications, skeletal structures, and rendering requirements. The avatar detection system 1500 may correspond to an implementation of the 3D rendering 1340 component shown in FIG. 13, specifically optimized for avatar-based applications. In some aspects, the avatar detection system 1500 comprises a platform SDK 1502 that maintains software development kit integrations with multiple metaverse platforms. Each platform may provide proprietary APIs for accessing avatar data, and the platform SDK 1502 may abstract these platform-specific interfaces into a unified data model. This abstraction layer enables the system to process avatars from diverse platforms without requiring platform-specific code paths in downstream components.

In some aspects, one or more avatar specs 1504 store and manage technical specifications for various avatar systems. The avatar specs 1504 may include polygon count limitations, texture resolution constraints, bone hierarchy structures, animation rig configurations, and/or shader compatibility requirements. The avatar specs 1504 may maintain a database of common avatar archetypes, enabling adaptation of merchandise to standard avatar formats while supporting custom avatar configurations through dynamic specification parsing.

In some aspects, a virtual garment mapping engine 1505 receives avatar data from the avatar detection system 1500 and transforms two-dimensional merchandise designs into three-dimensional virtual garments. The virtual garment mapping engine 1505 may implement algorithms for projecting flat artwork onto complex three-dimensional surfaces while preserving design integrity and visual quality. The virtual garment mapping engine 1505 may utilize similar transformation techniques to those employed by the action agent 1316 in FIG. 13, adapted for three-dimensional geometry processing. Within the virtual garment mapping engine 1505, a rigging system 1508 may create the skeletal structure that enables the virtual garment to move naturally with the avatar. The rigging system 1508 may generate bone hierarchies that correspond to the underlying avatar skeleton, establishing weight maps that determine how the garment deforms during animation. This process may involve automated weight painting algorithms that distribute influence across vertices based on proximity to bones, manual adjustment capabilities for fine-tuning critical areas such as joints and seams, and/or constraint systems that prevent unrealistic deformations during extreme movements.

In some aspects, a physics simulation 1510 component may add realistic movement properties to the virtual garment. The physics simulation 1510 may implement cloth simulation algorithms that calculate how fabric behaves under various forces including gravity, wind, and/or avatar movement. The physics simulation 1510 may incorporate material properties such as stiffness, weight, and/or elasticity, collision detection to prevent garment interpenetration with the avatar body, and/or performance optimization through level-of-detail systems that adjust simulation complexity based on viewing distance. In some aspects, the virtual garment mapping engine 1505 may correspond to a machine-learning model configured to add realistic movement properties to the virtual garment and/or generate a virtual garment suitable for one or more avatars.

In some aspects, an AR layer processing 1512 component enables augmented reality applications where virtual merchandise may be overlaid onto real-world imagery. The AR layer processing 1512 may process camera input from mobile devices and/or AR headsets to composite virtual garments with physical environments. The AR layer processing 1512 may extend the AR preview functionality described in the preview renderer 1418 of FIG. 14 to support real-time, interactive AR experiences. In some aspects, the AR layer processing 1512 may include an occlusion handling 1514 subcomponent that determines when virtual merchandise should be hidden behind real-world objects. The occlusion handling 1514 may involve depth sensing using device hardware such as LiDAR or stereo cameras, semantic segmentation to identify foreground and background elements, and/or edge detection to create clean boundaries between virtual and physical content. The occlusion handling 1514 processes depth information such that virtual merchandise appears naturally integrated within the physical environment rather than simply overlaid on top.

A lighting match 1516 component may analyze environmental lighting conditions and adjust the virtual merchandise rendering accordingly. The lighting match 1516 may estimate light source positions, colors, and/or intensities from camera imagery, applying this lighting information to the virtual garment through dynamic shader adjustments. The lighting match 1516 may employ machine learning models trained on diverse lighting scenarios to achieve photorealistic integration between virtual and physical elements. In some aspects, a real-time rendering engine 1518 generates a final visual output for the virtual merchandise across various display contexts. The real-time rendering engine 1518 may optimize rendering performance to maintain interactive frame rates while preserving visual quality. The real-time rendering engine 1518 may implement similar rendering capabilities to the output space 485 shown in FIG. 4, specifically optimized for three-dimensional content. In some aspects, and within the real-time rendering engine 1518, a shader processor 1520 may execute programmable graphics operations that determine the final appearance of virtual merchandise. The shader processor 1520 may implement various shading models including physically-based rendering for realistic material appearance, stylized shading for artistic effects matching platform aesthetics, and/or special effects such as holographic, glowing, and/or animated textures. The shader processor 1520 may dynamically compile shaders optimized for specific graphics hardware, enabling efficient performance across diverse devices.

In some aspects, a LOD manager 1522 (Level of Detail manager) may adjust the complexity of virtual merchandise based on rendering context. The LOD manager 1522 may maintain multiple versions of each garment at different polygon resolutions, switching between versions based on factors such as distance from camera, screen space coverage, device performance capabilities, and network bandwidth constraints. This adaptive approach ensures smooth performance on devices ranging from high-end gaming PCs to mobile devices.

In some aspects, a platform distribution hub 1524 functions as the central routing system for deploying virtual merchandise across multiple metaverse platforms. The platform distribution hub 1524 may receive rendered assets from the real-time rendering engine 1518 and AR layer processing 1512 and convert them into platform-specific formats. The platform distribution hub 1524 may correspond to an extension of the metaverse platforms 1342 shown in FIG. 13, providing platform integration capabilities.

In some aspects, the platform distribution hub 1524 may route virtual merchandise to various platform-specific endpoints. For example, a Roblox® platform 1526 component may format assets according to Roblox's® specific requirements, including proprietary mesh format, texture atlasing specifications where multiple smaller textures are combined into a single larger texture image (called an atlas or texture sheet), and/or scripting interfaces. As another example, a Fortnite® platform 1528 component adapts merchandise for specific environments, implementing material systems and cosmetic item frameworks specific to the Fortnite® platform 1528. In some aspects, a Horizon Worlds® platform 1530 component prepares assets for Meta's® VR-focused platform, optimizing stereoscopic rendering and hand-tracking interactions. As another example, a VRChat® platform 1532 component provides compatibility with VRChat's user-generated content system, implementing their specific avatar dynamics and shader restrictions. In some aspects, a custom platform 1534 component provides flexibility for integrating with emerging or proprietary metaverse platforms through configurable export pipelines.

In some aspects, a minting engine 1536 creates blockchain-based ownership tokens for virtual merchandise. The minting engine 1536 may generate unique cryptographic tokens that represent ownership of specific virtual items, embedding metadata including creation timestamp, artist attribution, edition number, and/or usage rights. The minting engine 1536 may interface with various blockchain networks such as Ethereum®, Polygon®, and/or platform-specific chains, implementing smart contracts that encode ownership transfer rules and royalty distributions. In some aspects, a registry 1538 maintains immutable records of minted virtual merchandise. The registry 1538 may store transaction histories, ownership chains, and/or authentication data on distributed ledgers. The registry 1538 enables verification of item authenticity, prevention of unauthorized duplication, tracking of secondary market transactions, and/or automated royalty collection on resales. The registry 1538 may implement similar tracking capabilities to the watermark database 1108 shown in FIG. 11, adapted for blockchain-based systems.

In some aspects, a cross-platform synchronization component 1540 enables virtual merchandise to function across multiple metaverse platforms. The cross-platform synchronization component 1540 may maintain consistency of ownership and appearance across different virtual environments, implementing protocols for asset portability, ownership verification across platforms, appearance adaptation while preserving brand identity, and/or state synchronization for interactive or evolving items. The cross-platform synchronization component 1540 may address the challenge of platform fragmentation in the metaverse ecosystem, enabling users to utilize their virtual merchandise regardless of which platform they choose to engage with.

A digital rights management component 1542 may enforce usage restrictions and/or licensing terms for virtual merchandise. The digital rights management 1542 may implement similar functionality to the authorization server 140 shown in FIG. 1, specifically adapted for virtual assets. The digital rights management 1542 may validate usage contexts against licensing agreements, enforce platform-specific restrictions, manage time-limited or event-based access, and coordinates with platform-native DRM systems. In some aspects, a usage tracking component 1544 monitors how virtual merchandise is utilized across platforms. The usage tracking 1544 may collect metrics including wear frequency in different virtual environments, visibility in social contexts or streaming content, participation in virtual events or experiences, and/or user engagement patterns. This tracking data may provide insights to content owners about the performance and reach of their virtual merchandise, informing future design and distribution decisions.

A payment distribution component 1546 may automate payment disbursements based on virtual merchandise usage and sales. The payment distribution component 1546 may implement similar payment logic to the revenue distribution 1332 shown in FIG. 13, with capabilities for handling cryptocurrency transactions, platform-specific virtual currencies, cross-border payments in multiple fiat currencies, and/or complex royalty splits for collaborative creations. The payment distribution 1546 may integrate with both traditional payment processors and/or blockchain-based payment systems, enabling creators to receive appropriate compensation regardless of the transaction medium.

Figure 16:
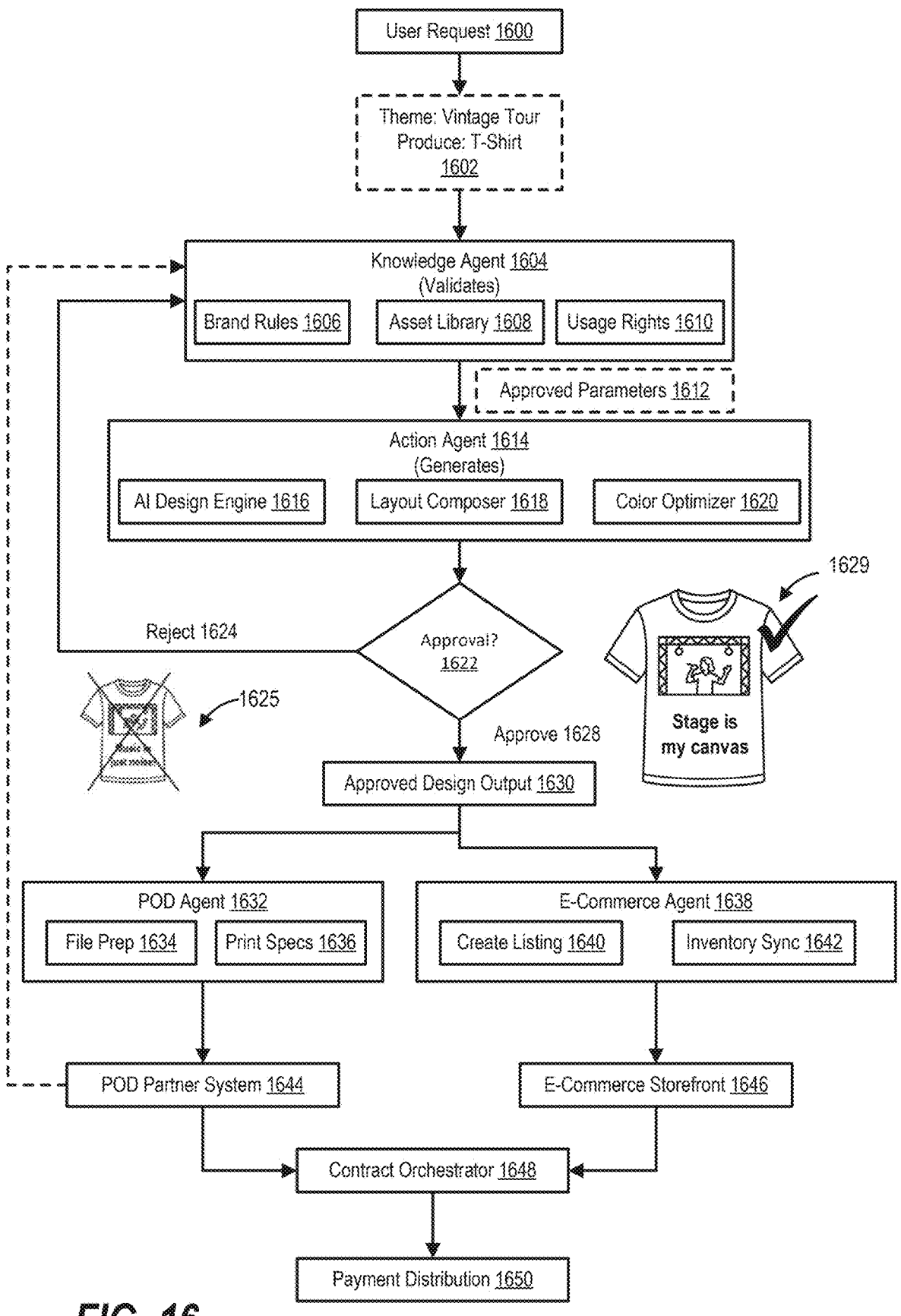
FIG. 16 depicts a flow diagram illustrating a multi-agent orchestration system for coordinating merchandise derivative work generation, production, and/or distribution in accordance with aspects of the present disclosure.

FIG. 16 depicts a schematic flow diagram illustrating a multi-agent orchestration system for coordinating merchandise derivative work generation, production, and/or distribution in accordance with aspects of the present disclosure. FIG. 16 depicts sequential and parallel processing flows whereby specialized autonomous agents collaborate to transform user requests into fulfilled merchandise orders while maintaining compliance with artist-defined constraints throughout the pipeline.

In some aspects, a user request 1600 may initiate the orchestration process by receiving merchandise creation parameters from a user. The user request 1600 may correspond to the fan interface 1400 depicted in FIG. 14 or may be implemented as an API endpoint for programmatic access by authorized third-party systems. The user request 1600 may capture parameters for merchandise generation, including thematic elements, product type specifications, customization preferences, and/or any user-specific metadata that may influence the design process. Within the user request 1600, request details 1602 may comprise structured data fields specifying the transformation parameters. In the depicted implementation, the request details 1602 include "THEME: VINTAGE TOUR" and "PRODUCT: T-SHIRT," though the system accommodates various themes and product types. These parameters may be extracted from natural language input using the prompt system 135 shown in FIG. 1, or may be selected from predefined options populated dynamically based on available artist assets and current promotional campaigns.

In some aspects, a knowledge agent 1604 may receive the user request 1600 and perform initial validation against artist-defined constraints. The knowledge agent 1604 may implement similar functionality to the knowledge agent 1312 depicted in FIG. 13, serving as the authoritative guardian of brand integrity throughout the orchestration process. The knowledge agent 1604 may evaluate whether the requested transformation falls within acceptable parameters before any computational resources are allocated to design generation. In some aspects, the knowledge agent 1604 comprises multiple validation components that assess different aspects of the request. Brand rules 1606 may encode the artist's aesthetic guidelines, prohibited elements, and/or mandatory requirements. For example, the brand rules 1606 may specify color palettes that must be avoided, imagery that conflicts with the artist's values, minimum quality standards for production, and/or temporal restrictions based on tour schedules or album releases. The brand rules 1606 may be stored in the filter database 290 shown in FIG. 3, enabling dynamic updates as artist preferences evolve.

In some aspects, an asset library 1608 maintains a repository of approved creative elements available for incorporation into derivative works (e.g., merchandisable derivatives). The asset library 1608 may correspond to the artist assets 1426 shown in FIG. 14 and may include versioned collections of logos, fonts, imagery, and/or design elements. The knowledge agent 1604 may verify that requested themes can be fulfilled using available assets, preventing generation attempts that would require unavailable or restricted materials.

In some aspects, usage rights 1610 may define the legal and/or commercial parameters governing derivative work creation and/or distribution. The usage rights 1610 may specify licensing terms for different product categories, territorial restrictions on merchandise distribution, duration limits for time-sensitive designs, and/or revenue sharing arrangements for different stakeholders. The knowledge agent 1604 may align the requested merchandise type and distribution model with established usage rights before approving progression to the generation phase.

Upon successful validation, the knowledge agent 1604 may transmit approved parameters 1612 to an action agent 1614. The approved parameters 1612 represent a constrained specification that provides that generated designs will comply with artist requirements. The approved parameters 1612 may include specific asset identifiers to be incorporated, boundary conditions for generative algorithms, required text or imagery that must appear, and/or metadata for downstream processing.

In some aspects, an action agent 1614 receives the approved parameters 1612 and generates the actual merchandise design. The action agent 1614 may correspond to the action agent 1316 shown in FIG. 13 and may implement generative AI capabilities similar to those of the DWGAE 220 depicted in FIG. 2. The action agent 1614 may operate within the constraints established by the knowledge agent 1604, establishing that creative output remains compliant while maximizing aesthetic appeal and commercial viability. Within the action agent 1614, an AI design engine 1616 may employ generative artificial intelligence to create one or more core visual elements of the merchandise. The AI design engine 1616 may utilize diffusion models similar to those described in the diffusion models 270 of FIG. 3, trained specifically on the artist's visual style and/or merchandise history. The AI design engine 1616 may generate multiple design candidates that incorporate the requested theme while maintaining brand consistency.

In some aspects, a layout composer 1618 may arrange design elements according to product-specific templates and composition rules. The layout composer 1618 may consider factors such as print areas for different garment types, safe zones that avoid seams or edges, visual hierarchy to ensure important elements are prominent, and/or scalability for different product sizes. The layout composer 1618 may implement rule-based algorithms that ensure text remains legible, images maintain proper aspect ratios, and/or overall composition achieves visual balance. In some aspects, a color optimizer 1620 may adjust the color scheme of the generated design based on production quality and/or brand alignment. The color optimizer 1620 may perform color space conversions from RGB to CMYK for print production, gamut mapping to ensure colors are reproducible on target substrates, contrast adjustments to maintain visibility on different background colors, and/or brand color matching to ensure consistency with official color specifications. The color optimizer 1620 may reference Pantone or other color standards specified in the brand rules 1606.

In some aspects, an approval check 1622 evaluates the generated design against final quality and compliance criteria. The approval check 1622 may implement similar logic to the approval validation 1320 shown in FIG. 13, performing automated verification that the design meets technical and/or aesthetic requirements. This verification may include resolution checks to ensure print quality, trademark clearance to avoid intellectual property conflicts, offensive content detection using machine learning classifiers, and/or aesthetic scoring based on historical performance data. In some aspects, if the approval check 1622 determines the design is non-compliant, a reject path 1624 routes the design back through a refine loop to the knowledge agent 1604. The reject path 1624 may include diagnostic information identifying specific aspects that caused rejection, enabling the knowledge agent 1604 to adjust parameters for subsequent generation attempts. This iterative refinement may continue until either an acceptable design is produced or a maximum iteration count is reached, at which point the request may be escalated for manual review.

A rejected design 1625 represents merchandise concepts that fail to meet the validation criteria established by the approval check 1622. The rejected design 1625 may be rejected due to brand guideline violations, technical production limitations, or content policy conflicts. The system may provide feedback to users regarding specific aspects that caused rejection, enabling iterative refinement toward compliance. In some aspects, upon successful approval via an approve path 1628, the system produces an approved design 1629. The approved design 1629 represents a production-ready merchandise design that has been validated for both creative quality and compliance with all applicable constraints. The approved design 1629 may include high-resolution artwork files, color specifications, placement instructions, and/or any metadata required for downstream processing.

An approved design output 1630 represents the finalized merchandise design that has passed through the complete validation pipeline. The approved design output 1630 may split into two processing paths for execution of production and commerce operations. In some aspects, a single processing path may be executed, or both processing paths may be executed. In some aspects, the processing paths may be executed in a serial fashion or in a parallel fashion. A parallel architecture ensures rapid time-to-market while maintaining synchronization between physical production and digital storefront preparation.

In some aspects, a POD agent 1632 may manage the interface with print-on-demand production systems. The POD agent 1632 may automate the complex process of preparing designs for physical production across diverse product types and manufacturing partners. The POD agent 1632 may correspond to the print agent 1326 shown in FIG. 13 and may implement production management capabilities. In some aspects, and within the POD agent 1632, a file prep component 1634 converts the approved design output 1630 into production-ready formats. The file prep 1634 may include generating separate files for different print processes such as screen printing, direct-to-garment, creating color separations for multi-color designs, adding bleed margins and crop marks, and/or embedding color profiles for accurate reproduction. The file prep 1634 ensures that designs are optimized for each specific production method and substrate. In some aspects, one or more print specs 1636 encode the technical specifications required for production, including substrate specifications such as fabric type and weight, print method parameters such as ink types and curing temperatures, quality control standards and tolerance levels, and/or packaging and labeling requirements. The print specs 1636 may be transmitted to a POD partner system 1644 along with the prepared design files. In some aspects, the POD partner system 1644 represents a third-party print-on-demand services that perform physical production of merchandise. The POD partner system 1644 may receive production orders from the POD agent 1632 and execute manufacturing according to the provided specifications. The POD partner system 1644 may include multiple vendors distributed geographically to optimize shipping times and costs.

In some aspects, an e-commerce agent 1638 may create and manages the digital commerce infrastructure for the merchandise. The e-commerce agent 1638 may correspond to the shop agent 1334 shown in FIG. 13 and may automate the creation of product listings, inventory management, and/or order processing workflows. In some aspects, a create listing component 1640 generates product listings including product titles optimized for search discovery, descriptions highlighting design elements and artist connection, size charts and product specifications, pricing based on production costs and margin requirements, and/or product photography using the approved design mockups. The create listing component 1640 may employ natural language generation to create compelling product descriptions that resonate with the target audience.

In some aspects, an inventory sync component 1642 maintains real-time synchronization between production capacity and/or storefront availability. The inventory sync component 1642 may track production queue status at POD partners, update available quantity based on material availability, manage pre-orders for high-demand items, and/or coordinate across multiple fulfillment locations. The inventory sync 1642 may prevent overselling while maximizing product availability. An e-commerce storefront 1646 may provide a customer-facing interface for merchandise sales. The e-commerce storefront 1646 may receive product listings from the e-commerce agent 1638 and manage the complete purchase experience including product browsing and search, shopping cart management, payment processing, and/or order confirmation. The e-commerce storefront 1646 may be integrated with existing artist merchandise stores or operate as a standalone platform.

In some aspects, a contract orchestrator 1648 functions as the central coordination point for all agents and systems involved in the merchandise pipeline. The contract orchestrator 1648 may extend the smart contract functionality described in FIG. 11, implementing merchandise-specific business logic for order routing, fulfillment tracking, and payment processing. The contract orchestrator 1648 may ensure that agents operate in synchronized fashion, maintaining consistency across the distributed system. In some aspects, the contract orchestrator 1648 receives transaction notifications from the POD partner system 1644 and/or e-commerce storefront 1646, correlating production status with sales data to manage fulfillment workflows. The contract orchestrator 1648 may implement event-driven architecture, triggering appropriate actions based on state changes such as order placement, production completion, and/or shipment confirmation.

Payment distribution component 1650 executes the financial settlements resulting from merchandise sales. The payment distribution component 1650 may implement similar logic to the revenue distribution 1332 shown in FIG. 13, calculating and disbursing payments to multiple stakeholders including the original artist or content owner, the platform operator, manufacturing partners, logistics providers, and/or potentially the user who created the custom design. Payment calculations may account for variable costs such as production expenses, platform fees based on transaction volume, royalties computed as percentages of net revenue, and/or any promotional discounts or adjustments.

Figure 17:
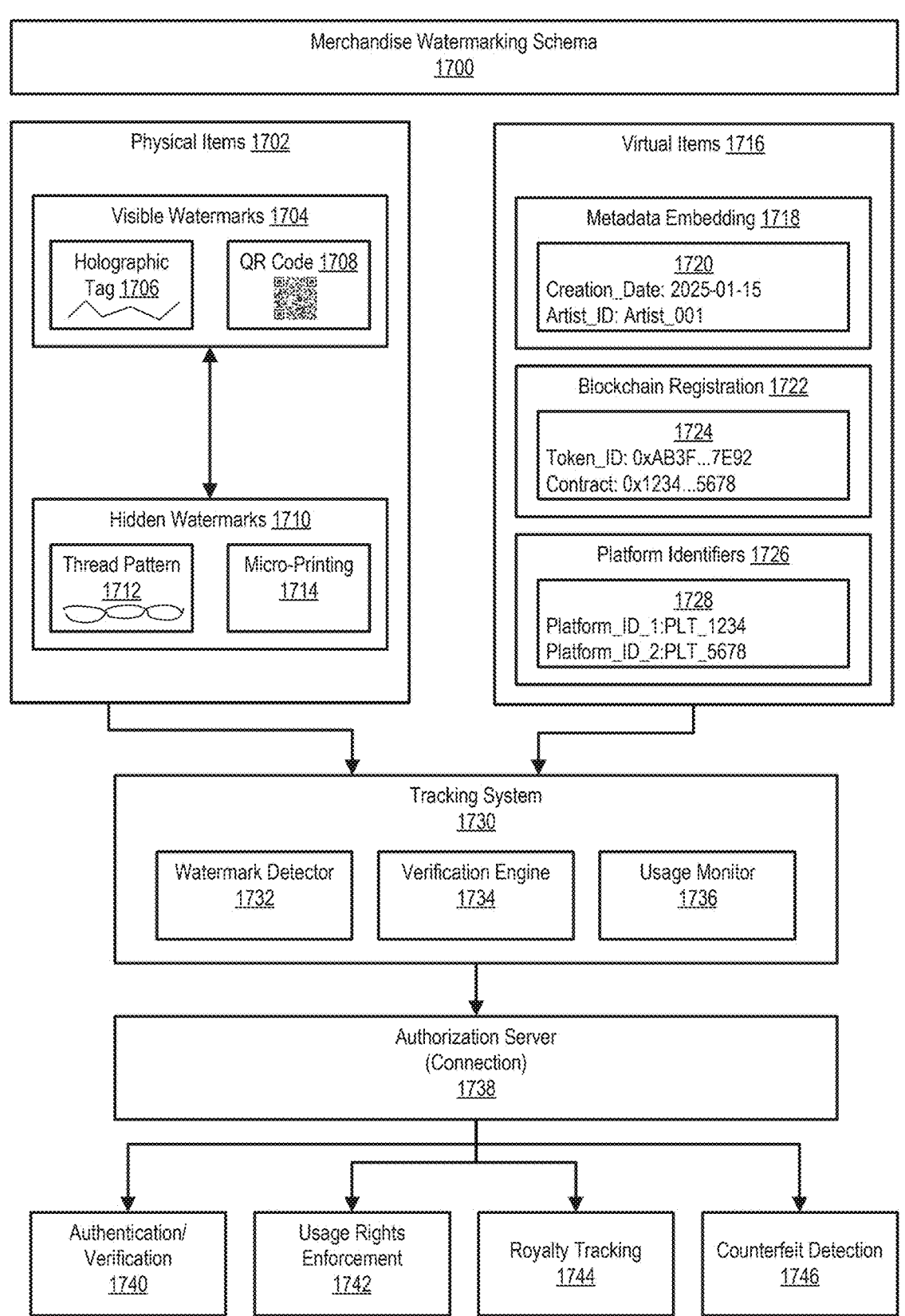
FIG. 17 depicts a merchandise watermarking schema for embedding, detecting, and/or managing authentication markers in physical and virtual merchandise derivative works in accordance with aspects of the present disclosure.

FIG. 17 depicts a merchandise watermarking schema 1700 for embedding, detecting, and/or managing authentication markers in physical and/or virtual merchandise derivative works in accordance with aspects of the present disclosure. The merchandise watermarking schema 1700 provides a framework for implementing multi-layered authentication and tracking mechanisms that enable rights management, counterfeit prevention, and/or usage monitoring across diverse merchandise formats.

The merchandise watermarking schema 1700 may comprise two primary domains: physical items 1702 and virtual items 1716, each implementing watermarking methodologies optimized for their respective media characteristics while converging into a unified tracking infrastructure. In some aspects, and within the physical items 1702 domain, watermarking techniques may be categorized into visible watermarks 1704 and hidden watermarks 1710, providing multiple layers of authentication.

In some aspects, the visible watermarks 1704 comprise authentication elements designed to be readily apparent to consumers and counterfeit detection systems. For example, a holographic tag 1706 may implement optical variable ink and/or holographic foil technology that produces distinctive visual effects when viewed from different angles. The holographic tag 1706 may incorporate microtext, color-shifting inks, three-dimensional imagery, guilloche patterns, and/or tamper-evident features that destruct upon removal attempts. The holographic tag 1706 may provide visual authentication to consumers while incorporating anti-counterfeiting features that are difficult to reproduce without access to specialized manufacturing equipment.

In some aspects, a QR code 1708 embeds machine-readable data directly onto the physical merchandise. The QR code 1708 may encode information including unique product identifiers, manufacturing batch codes, authentication URLs for verification, encrypted signatures validating authenticity, and/or links to augmented reality experiences. The QR code 1708 may be dynamically generated for each merchandise item, ensuring unique identification and enabling individual item tracking throughout the distribution chain. When scanned by the mobile device 155 shown in FIG. 1, the QR code 1708 may trigger an authentication workflow that verifies the item's legitimacy against the authorization server 140.

The hidden watermarks 1710 implement a covert authentication feature that may not be immediately visible to casual observation but can be detected through specialized equipment or techniques. For example, a thread pattern 1712 may incorporate security threads woven into fabric merchandise or embedded within product materials. As an example, these threads may contain fluorescent fibers visible under ultraviolet light, metallic strips detectable by magnetic readers, microprinted text readable only under magnification, color-changing elements responsive to temperature, and/or RFID chips for wireless authentication. The thread pattern 1712 may be integrated during the manufacturing process, making post-production counterfeiting difficult.

Micro-printing 1714 may embed text or patterns at a scale below normal visual perception, typically requiring magnification of 10× or greater to read. The micro-printing 1714 may include copyright notices, authentication codes, brand signatures, manufacturing dates, and/or serialized identifiers. This technique may leverage limitations of standard printing equipment to reproduce extremely fine details, as counterfeit operations typically lack the high-resolution printing capabilities required to accurately replicate micro-printed elements.

Within the virtual items 1716 domain, watermarking techniques leverage digital properties unique to virtual merchandise. Metadata embedding 1718 incorporates authentication and tracking information directly within the digital asset files. The embedded creation metadata 1720 includes structured data fields such as CREATION_DATE indicating when the derivative work was generated, ARTIST_ID linking to the authorized content owner, usage rights and licensing terms, platform-specific rendering parameters, and cryptographic signatures for integrity verification. The metadata embedding 1718 may utilize steganographic techniques to hide information within the asset data itself, such as encoding data in least significant bits of texture maps or within unused color channels.

Blockchain registration 1722 creates immutable records of virtual merchandise on distributed ledger systems. The blockchain registration 1722 includes token identifiers 1724 such as TOKEN_ID representing unique cryptographic identifiers for each virtual item and SMART_CONTRACT addresses defining the programmatic rules governing item behavior, ownership transfer, and royalty distribution. The blockchain registration 1722 may interface with multiple blockchain networks, including Ethereum for NFT standardization, platform-specific chains for reduced transaction costs, and private chains for proprietary ecosystems. Smart contracts associated with the registration can automatically enforce usage restrictions, process royalty payments, and validate ownership transfers without centralized intervention.

Platform identifiers 1726 comprise platform-specific identification platform codes 1728 that enable virtual merchandise to function across different metaverse environments. These identifiers include, for example, ROBLOX_ID for items in the Roblox® ecosystem, FORTNITE_ID for Epic Games® platforms, and/or similar identifiers for other virtual worlds. Each platform may require different identifier formats, metadata structures, and/or authentication protocols. The platform identifiers 1726 enable cross-platform tracking while respecting the technical requirements of individual platforms. In some aspects, a tracking system 1730 serves as a central convergence point for both physical and virtual watermark detection and management. The tracking system 1730 aggregates authentication data from multiple sources to provide comprehensive oversight of merchandise distribution and usage. Within the tracking system 1730, a watermark detector 1732 implements various detection technologies optimized for different watermark types. For physical items, this may include optical scanners for QR codes and holograms, UV light sources for fluorescent elements, magnetic readers for security threads, and high-resolution cameras for micro-printing verification. For virtual items, the watermark detector 1732 may include metadata parsers, blockchain query interfaces, and/or platform API integrations. The watermark detector 1732 may employ machine learning algorithms trained to identify authentic watermarks while detecting sophisticated counterfeits.

A verification engine 1734 processes detected watermark data to determine authenticity and authorization status. The verification engine 1734 compares detected watermarks against authoritative databases, validates cryptographic signatures, checks temporal validity of time-limited watermarks, and correlates multiple watermark layers for enhanced security. The verification engine 1734 may implement similar logic to the approval validation 1320 shown in FIG. 13, adapted for post-production authentication rather than pre-production approval.

A usage monitor 1736 tracks how authenticated merchandise is utilized across various contexts. For physical items, this may include retail point-of-sale scanning, geographic distribution tracking, resale market monitoring, and social media presence detection. For virtual items, the usage monitor 1736 tracks platform-specific usage metrics, avatar wear frequency, appearance in user-generated content, and participation in virtual events. The usage monitor 1736 generates analytics that inform royalty calculations, market insights, and anti-counterfeiting efforts.

In some aspects, an authorization server 1738 connection interfaces the tracking system 1730 with the broader authorization infrastructure. This connection enables real-time verification queries, usage rights validation, dynamic watermark updates, and enforcement action triggers. In some aspects, the authorization server 1738 connection corresponds to integration with the authorization server 140 depicted in FIG. 1, extending its capabilities to encompass merchandise-specific authentication and tracking requirements.

In some aspects, the merchandise watermarking schema 1700 outputs four primary enforcement functions that leverage the authenticated watermark data. Authentication verification 1740 confirms the legitimacy of merchandise items by validating watermark authenticity against authoritative records. This function prevents counterfeit items from entering legitimate distribution channels and provides consumers with confidence in their purchases. Usage rights enforcement 1742 ensures merchandise is utilized in accordance with established licensing terms. This includes preventing unauthorized reproduction of physical items, restricting virtual item usage to licensed platforms, enforcing temporal limitations on special edition items, and/or managing geographic distribution restrictions. Royalty tracking 1744 monitors authenticated merchandise transactions to calculate appropriate compensation for stakeholders. By tracking each authenticated item through its lifecycle, the system can accurately compute royalties for primary sales, secondary market transactions, platform usage fees, and/or cross-platform portability charges. The royalty tracking 1744 interfaces with the payment distribution systems described in FIGS. 11 and 13 to ensure automated compensation. Counterfeit detection 1746 identifies unauthorized reproductions by comparing detected items against authentication databases. When potential counterfeits are identified, the system can trigger various responses including marketplace delisting requests, legal action notifications, consumer warnings, and supply chain investigations. The counterfeit detection 1746 may employ pattern recognition to identify counterfeit operations and predict emerging threats.

Figure 18:
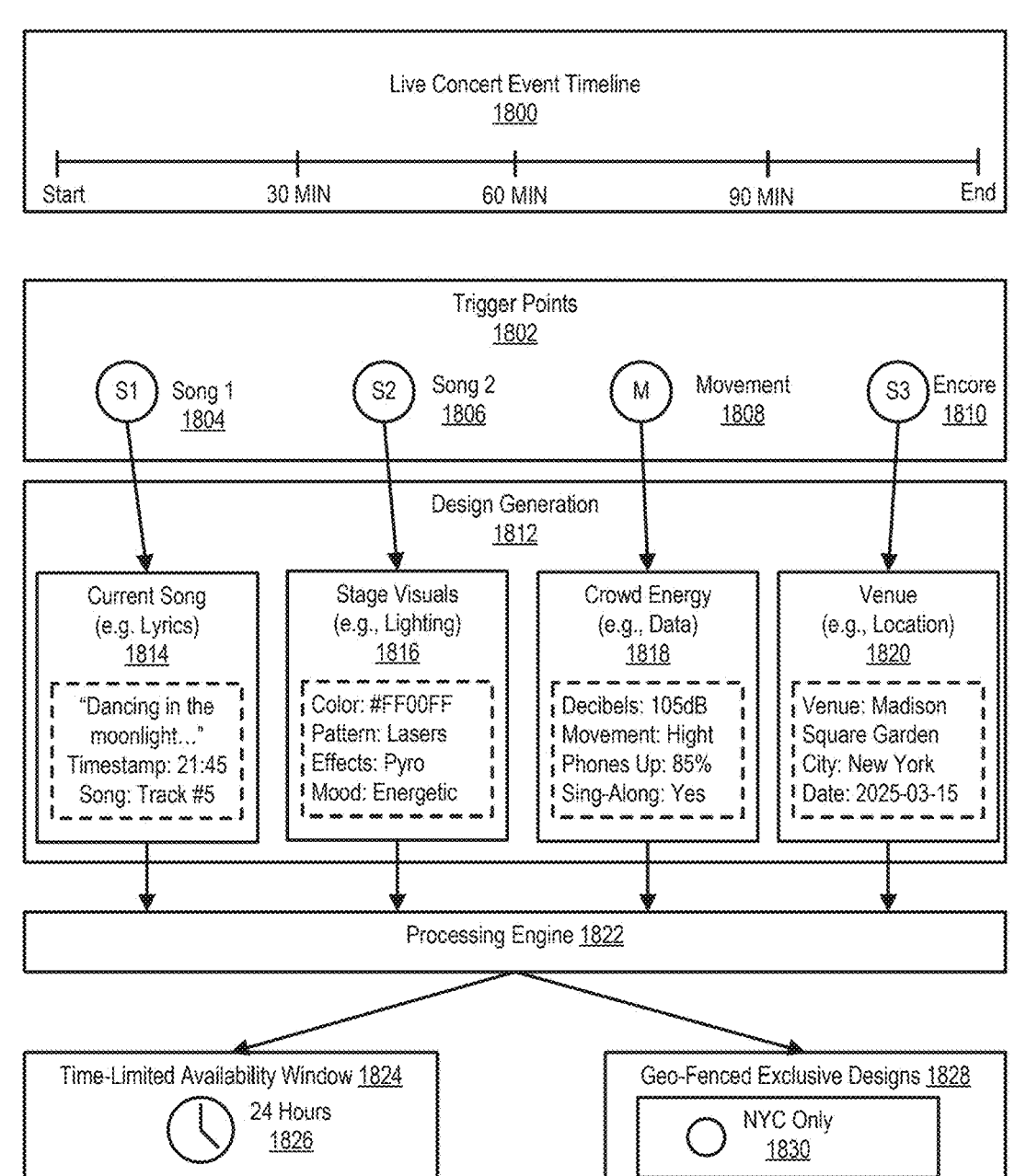
FIG. 18 depicts a schematic timeline diagram illustrating a concert-synchronized merchandise generation system for creating derivative works based on performance parameters in accordance with aspects of the present disclosure.

FIG. 18 depicts a schematic timeline diagram illustrating a concert-synchronized merchandise generation system for creating real-time derivative works based on live performance parameters in accordance with aspects of the present disclosure. FIG. 18 depicts a framework for capturing ephemeral concert moments and transforming them into unique, contextually-relevant merchandise that reflects specific temporal, spatial, and experiential elements of live performances.

In some aspects, a concert timeline 1800 establishes a temporal framework within which merchandise generation occurs. The concert timeline 1800 spans from START to END of a concert performance, with marked intervals at 30, 60, and 90 minutes providing reference points for tracking performance progression. This temporal structure enables correlation between specific concert moments and generated merchandise, ensuring each derivative work can be associated with its inspirational context. The concert timeline 1800 may be synchronized with multiple data sources including venue master clocks, streaming platform timestamps, and artist performance schedules to maintain temporal accuracy across distributed systems.

In some aspects, trigger points 1802 identify specific moments during a concert, or other event, that initiate merchandise generation workflows. For example, the trigger points 1802 represent predetermined or dynamically identified events that warrant commemorative merchandise creation. The system monitors the concert progression and activates generation processes when trigger conditions are met. For example, a first song trigger 1804, designated as S1, corresponds to the performance of a particular song in the concert setlist. The first song trigger 1804 may activate based on various criteria including the start of a signature song, audience recognition metrics exceeding thresholds, or artist designation of featured tracks. The first song trigger 1804 may capture not only the identity of the performed song but also performance-specific variations such as acoustic arrangements, extended solos, and/or guest performer participation that distinguish this rendition from studio recordings.

As another example, a second song trigger 1806, designated as S2, represents another musical performance milestone. The second song trigger 1806 enables creation of merchandise that commemorates different portions of the concert experience, allowing fans to select items that resonate with their personal highlights. Each song trigger may initiate different design generation parameters, ensuring variety in the resulting merchandise offerings. In some aspects, a movement trigger 1808, designated as M, captures exceptional or unexpected events that transcend the planned setlist. The movement trigger 1808 may include spontaneous artist-audience interactions, technical malfunctions that become memorable, special announcements or revelations, surprise guest appearances, or extraordinary crowd participation. The movement trigger 1808 implements event detection algorithms that identify statistical anomalies in crowd energy, social media sentiment spikes, or artist behavior patterns that suggest a noteworthy occurrence. As another example, an encore trigger 1810, designated as S3, marks the climactic conclusion of the performance. Encore performances often feature heightened emotional intensity and audience engagement, making them particularly suitable for commemorative merchandise. The encore trigger 1810 may incorporate cumulative concert data, synthesizing elements from the entire performance into designs that encapsulate the complete experience.

A design generation system 1812 processes multiple real-time data streams to create contextually-relevant merchandise designs. The design generation system 1812 may operate with minimal latency to ensure merchandise availability while concert memories remain vivid and purchase intent is highest. The design generation 1812 system corresponds to an implementation of the DWGAE 220 shown in FIG. 2, optimized for real-time operation with live data feeds.

In some aspects, a current song component 1814 provides textual content for incorporation into merchandise designs. The current song component 1814 may extract specific lyrical passages being performed at the trigger moment, as exemplified by "Dancing in the moonlight . . . " with associated metadata including TIMESTAMP: 21:45 indicating the exact performance time and SONG: Track 5 identifying the specific composition. The current song 1814 component may interface with the lyrics/text asset described in FIG. 13, dynamically selecting passages that align with the performance moment. The system may employ natural language processing to identify emotionally resonant phrases, crowd sing-along sections, or artist-emphasized lyrics that particularly connect with the audience.

Stage visuals 1816 capture the aesthetic environment of the performance moment. The stage visuals 1816 record visual elements including COLOR: FF00FF representing the dominant lighting hue, PATTERN: LASERS indicating projection or effect types, EFFECTS: PYRO documenting special effects deployment, and MOOD: ENERGETIC characterizing the overall atmospheric tone. The stage visuals 1816 parameters may be acquired through integration with venue lighting control systems, computer vision analysis of stage cameras, or predetermined show design databases. The visual parameters ensure generated merchandise reflects the sensory experience of the specific moment, creating designs that evoke visual memories of the performance.

Crowd energy 1818 quantifies audience engagement and enthusiasm at the trigger moment. The crowd energy 1818 measures multiple engagement metrics including DECIBELS: 105 dB indicating crowd volume levels, MOVEMENT: HIGH assessing physical activity through motion detection, PHONES UP: 85% measuring device usage for recording or illumination, and SING-ALONG: YES detecting vocal participation. The crowd energy 1818 metrics may be captured through venue-installed sensors, analysis of crowd-sourced mobile device data, computer vision processing of audience footage, or acoustic analysis of crowd noise. The crowd energy 1818 data ensures merchandise reflects not just the artist's performance but the collective experience shared between performer and audience.

A venue location 1820 component provides geographic and temporal context for the merchandise. The venue location 1820 records location parameters including VENUE: Madison Square Garden identifying the specific performance space, CITY: New York establishing the metropolitan context, and DATE: 2025 Mar. 15 documenting the specific performance date. The venue location 1820 data enables creation of venue-specific designs that incorporate local landmarks, cultural references, or geographic elements that distinguish this performance from others on the tour. The venue location 1820 data may interface with the geographic restrictions described in the content transformation rules of FIG. 12.

A processing engine 1822 synthesizes the multiple data streams into cohesive merchandise designs. The processing engine 1822 may operate in real-time (e.g., near real-time), processing incoming data from multiple generation parameters simultaneously. The processing engine 1822 may implement diffusion models similar to those described in FIG. 4, but optimized for low-latency operation required by live event contexts. The processing engine 1822 may maintain pre-trained models for different merchandise types, enabling rapid generation without requiring full training cycles during the concert. The processing may include style transfer to apply concert-specific aesthetics, text layout optimization for lyrical content, color harmony analysis for visual cohesion, and/or quality verification to ensure production readiness.

In some aspects, an availability window 1824 creates scarcity and urgency for the generated merchandise. The availability window 1824 may implement a countdown mechanism, depicted as a time limit 1826 showing 24 HOURS, though the duration may be configurable based on artist preferences or merchandise type. The time limitation serves multiple purposes including encouraging immediate purchase decisions while concert excitement remains high, creating exclusive collectibles that gain value through limited availability, managing production capacity by controlling order volumes, and/or maintaining merchandise freshness by preventing market saturation. The availability window 1824 may be enforced through the authorization server 140 shown in FIG. 1, which can revoke access to designs after expiration. The usage-constraint metadata includes a time-to-live value and the authorization server 140 automatically disables distribution of the derivative work upon expiry of the time-to-live value. The system may further comprise updating the usage registry with a renewed time-to-live value in response to receipt of a renewal payment.

Exclusive designs 1828 may restrict merchandise availability to specific geographic regions. The exclusive designs 1828 may implement location-based access control through a location restriction 1830, illustrated as NYC ONLY within a map boundary. Geo-fencing enables creation of local merchandise that can be obtained by concert attendees, rewards physical presence at the event, prevents unauthorized reproduction in distant markets, and/or creates regional collectibles that may gain value through geographic scarcity. The geo-fencing may be implemented through IP address geolocation, GPS verification from the mobile device 155, venue Wi-Fi network detection, and/or ticket purchase verification. The geographic restrictions may interface with the usage constraints described in the digital rights management component of FIG. 15. The usage-constraint metadata comprises at least one of: distribution channel restrictions; monetization parameters; attribution requirements; time-limited usage permissions; or geographical distribution limitations. The usage-constraint metadata may include a geographic whitelist and the authorization server 140 may enforce the geographic whitelist by geolocating each distribution request.

A merchandise output 1832 presents the various product types created from the concert data. The merchandise output 1832 may generate multiple merchandise formats from the same trigger event, allowing fans to select their preferred medium. Product types include but are not limited to shirt merchandise 1834 featuring designs optimized for apparel printing, poster merchandise 1836 formatted for wall display, digital merchandise 1838 (that may be minted on blockchain for virtual collecting), vinyl merchandise 1840 containing live performance audio, and augmented reality merchandise 1842 for augmented reality experiences. The merchandise output 1832 may also include plush merchandise 1844 and additional merchandise 1846 representing other product categories. Each merchandise type may undergo format-specific optimization to ensure design elements translate effectively to the target medium while maintaining coherence across the product line.

A purchase interface 1848 provides the user-facing endpoint for merchandise acquisition. The purchase interface 1848, implemented as a MOBILE APP, enables immediate purchase while fans remain at the venue or are traveling home. The purchase interface 1848 may correspond to the mobile application shown in FIG. 1, extended with concert-specific functionality, and/or the purchase options 1410 of FIG. 14. The purchase interface 1848 may implements feature including push notifications when new merchandise becomes available, augmented reality preview showing merchandise in context, one-click purchasing with pre-stored payment methods, social sharing to showcase exclusive purchases, and/or countdown timers displaying remaining availability. The purchase interface 1848 may provide authentication that verifies concert attendance through ticket validation, location confirmation, and/or venue check-in, ensuring that legitimate attendees can access exclusive merchandise.

In some aspects, a request to generate a merchandisable derivative may be generated automatically by an application from contextual data without explicit user input. In this implementation, a concert-synchronized merchandise generation system operates autonomously, detecting trigger conditions and initiating merchandise creation workflows without requiring explicit user prompts. The system may analyze real-time performance data, audience engagement metrics, and/or environmental factors to automatically determine when commemorative merchandise should be generated, streamlining the creation process while concert events are occurring.

The concert-synchronized merchandise generation system thus creates a dynamic merchandising ecosystem that transforms live performance into tangible and digital keepsakes. By capturing the unique confluence of artistic performance, audience energy, and spatiotemporal context, the system generates merchandise above and beyond generic tour products to become authentic mementos of specific, irreplaceable moments. The real-time generation capability ensures merchandise availability while emotional connection remains strongest, maximizing both fan satisfaction and commercial opportunity. The combination of temporal limitations and geographic restrictions creates scarcity dynamics that enhance merchandise value while the multi-parameter generation process ensures each design authentically reflects its inspirational moment, creating products that resonate with attendees' lived experience of the performance.

Figure 19:
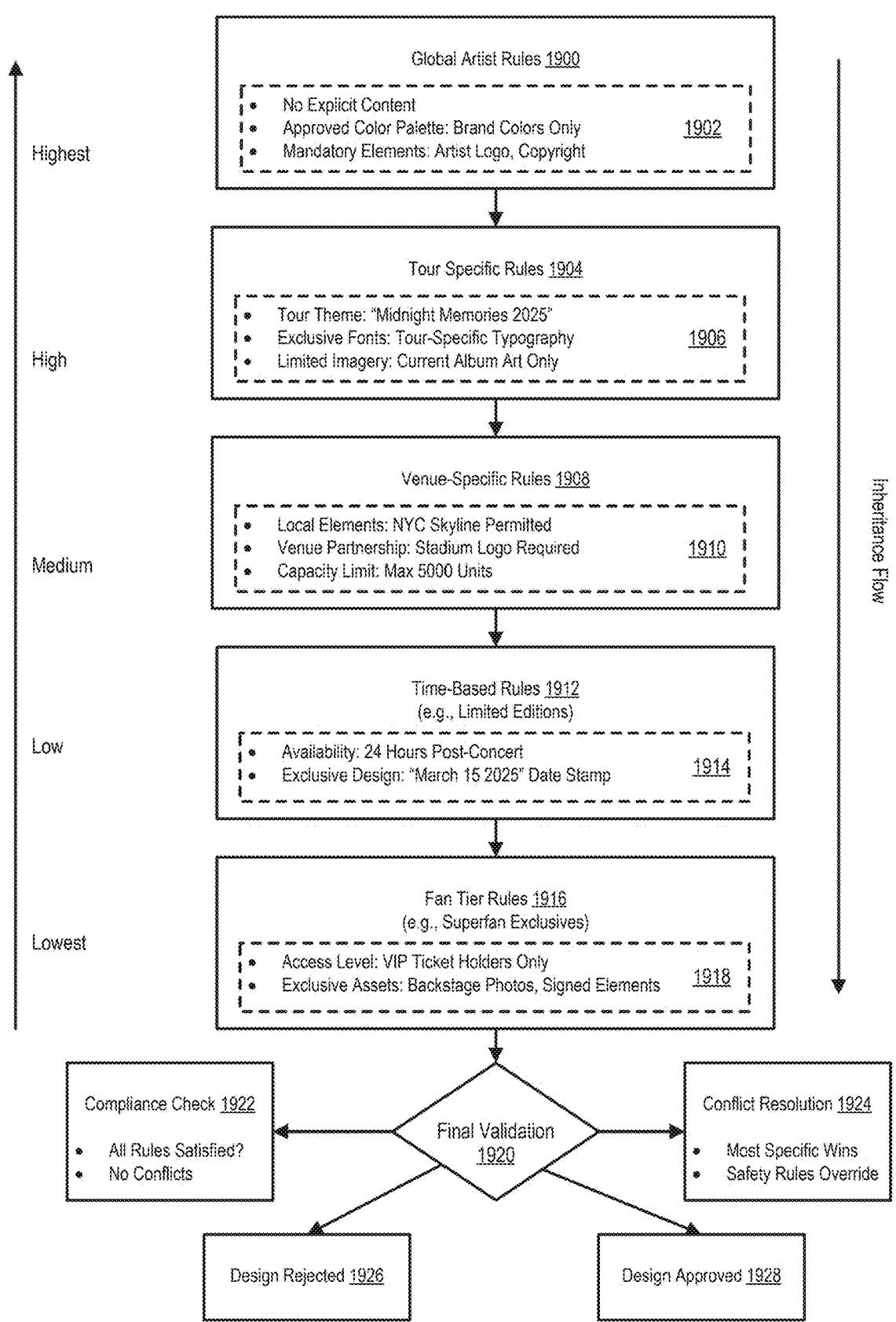
FIG. 19 depicts a hierarchical rule validation diagram illustrating a rule hierarchy system for governing merchandise derivative work generation through cascading authorization constraints in accordance with aspects of the present disclosure.

FIG. 19 depicts a hierarchical rule validation diagram illustrating a rule hierarchy system for governing merchandise derivative work generation through cascading authorization constraints in accordance with aspects of the present disclosure. The rule hierarchy system demonstrates a multi-tiered rule inheritance architecture wherein progressively specific constraints may be applied to merchandise generation requests, ensuring compliance with artist preferences while enabling contextual flexibility for different merchandising scenarios.

In some aspects, global rules 1900 establish foundation constraints that govern merchandise derivative works associated with a particular artist or content owner. The global rules 1900 represent immutable brand standards that are to be satisfied regardless of context, tour, venue, or timing. The global rules 1900 may occupy the highest priority level in the hierarchy, ensuring that core brand integrity is maintained across all merchandise variations.

The global rules 1900 comprise specific global constraints 1902 that define universal requirements and restrictions. The global constraints 1902 include content restrictions such as "NO EXPLICIT CONTENT," ensuring derivative works maintain appropriate standards across markets and demographics. Aesthetic parameters specify "APPROVED COLOR PALETTE: BRAND COLORS ONLY," maintaining visual consistency with established brand identity. Mandatory inclusion requirements dictate "MANDATORY ELEMENTS: ARTIST LOGO, COPYRIGHT," ensuring proper attribution and legal compliance in derivative works. The global constraints 1902 may be stored in the filter database 290 shown in FIG. 3 and enforced by the knowledge agent 1604 depicted in FIG. 16.

Tour rules 1904 inherit constraints from the global rules 1900 while adding tour-contextual requirements. The inheritance relationship ensures that tour-specific customizations do not violate fundamental brand standards while enabling thematic variations for different performance series. The tour rules 1904 may occupy a high priority level, subordinate to the global rules 1900.

Tour constraints 1906 include thematic elements such as "TOUR THEME: 'MIDNIGHT MEMORIES 2025'" that align merchandise with current promotional campaigns. Typography restrictions specify "EXCLUSIVE FONTS:

TOUR-SPECIFIC TYPOGRAPHY," ensuring visual consistency within a tour's merchandise line while differentiating from previous tours. Content limitations such as "LIMITED IMAGERY: CURRENT ALBUM ART ONLY" focus merchandise on contemporary creative works rather than historical catalog. The tour constraints 1906 enable temporal merchandising strategies that support album releases and tour marketing while maintaining overall brand coherence.

Venue rules 1908 inherit from both the global rules 1900 and tour rules 1904 while introducing location-based modifications. The relationship designation "INHERITS+OVERRIDES" indicates that venue rules can supersede tour-level constraints when local requirements demand variation, though the global rules 1900 remain inviolate. This override capability enables compliance with local regulations, venue partnerships, and/or market-specific preferences while maintaining hierarchical constraint satisfaction.

Venue constraints 1910 incorporate geographic elements through "LOCAL ELEMENTS: NYC SKYLINE PERMITTED," enabling merchandise to reflect the unique character of performance locations. Partnership obligations such as "VENUE PARTNERSHIP: MSG LOGO REQUIRED" fulfill contractual requirements with venue operators who may have negotiated co-branding rights. Production limitations including "CAPACITY LIMIT: MAX 5000 UNITS" manage inventory based on venue size, expected attendance, or exclusive distribution agreements. The venue constraints 1910 may interface with the geographic restrictions described in the usage rights 1610 of FIG. 16.

Time rules 1912 for limited editions introduce temporal constraints that create scarcity and exclusivity. The time rules 1912 apply to the accumulated rule set, adding time-sensitive restrictions without modifying the inherited spatial and thematic constraints. The time rules 1912 occupy a low priority level, applying only after higher-level rules are satisfied. Time constraints 1914 establish availability windows through "AVAILABILITY: 24 HOURS POST-CONCERT," creating urgency that drives immediate purchase decisions. Temporal identifiers such as "EXCLUSIVE DESIGN: 'MARCH 15 2025' DATE STAMP" commemorate specific performances, transforming merchandise into dated collectibles. The time constraints 1914 may be enforced through the availability window 1824 described in FIG. 18, with the authorization server 140 revoking access after expiration.

Fan rules 1916 for superfan exclusives filter the applicable rule set based on customer segmentation. The fan rules 1916 may occupy the lowest priority level, representing the final layer of constraints applied only to specific customer categories. The fan rules 1916 enable differentiated merchandise offerings that reward customer loyalty or premium purchases. Fan constraints 1918 restrict access through "ACCESS LEVEL: VIP TICKET HOLDERS ONLY," ensuring exclusive merchandise remains available to qualifying customers. Enhanced content specifications such as "EXCLUSIVE ASSETS: BACKSTAGE PHOTOS, SIGNED ELEMENTS" provide premium merchandise options that justify higher price points or reward valued customers. The fan constraints 1918 may interface with the user authentication mechanisms in the authorization server 140 shown in FIG. 1, verifying customer tier status before enabling access to exclusive designs.

A validation process 1920, represented as a diamond decision point, evaluates the complete rule hierarchy to determine whether a proposed merchandise design satisfies all applicable constraints. The validation process 1920 may implement a deterministic evaluation that ensures no rule violations exist at any hierarchical level. This final validation corresponds to the approval check 1622 shown in FIG. 16, but specifically evaluates hierarchical rule compliance rather than single-level constraints.

A compliance check 1922 may systematically evaluate whether "All rules satisfied?" and "No conflicts?" exist in the proposed design. The compliance check 1922 traverses the complete rule hierarchy, verifying that constraints at each level are met. The compliance check 1922 may employ Boolean logic, evaluating each rule as a binary satisfied/unsatisfied condition and requiring unanimous satisfaction for approval. The check process may generate detailed compliance reports identifying which specific rules are satisfied or violated, enabling iterative refinement of non-compliant designs.

A conflict resolution component 1924 addresses scenarios where rules at different hierarchical levels impose contradictory requirements. Resolution strategies include "Most specific wins," where lower-level rules override higher-level rules when explicit override permission exists, and "Safety rules override," where certain critical constraints such as legal compliance or safety requirements supersede all other rules regardless of hierarchy. The conflict resolution component 1924 may maintain a precedence matrix defining which rule types can override others, ensuring predictable and consistent resolution of rule conflicts.

The validation process 1920 produces binary outcomes: a rejected design 1926 when any applicable rule is violated or unresolvable conflicts exist, and an approved design 1928 when all hierarchical constraints are satisfied and conflicts are successfully resolved. The rejected design 1926 may be returned to the generation system with diagnostic information identifying specific rule violations, enabling targeted modifications. The approved design 1928 proceeds to production with certification that all hierarchical constraints have been satisfied.

In some aspects, evaluating the request against the pre-generation preference data may comprise applying a machine-learning classifier trained on historical approvals and rejections designated by the content authority. The machine-learning classifier may be trained on the hierarchical rule structure, learning to predict approval likelihood based on the complex interactions between global constraints 1902, tour constraints 1906, venue constraints 1910, time constraints 1914, and/or fan constraints 1918. The classifier may analyze patterns in historical decisions to identify subtle rule interactions that might not be explicitly encoded in the hierarchical structure.

The method may further comprise transmitting the request to an external verification service designated by the content authority and approving the request for generation when both the machine-learning classifier and the external verification service return an approval indication. The external verification service may provide specialized expertise in evaluating complex hierarchical rule interactions, particularly when venue constraints 1910 or fan constraints 1918 introduce unusual override conditions that require human judgment or specialized domain knowledge.

In some aspects, the pre-generation preference data may specify at least one of a temporal, quantitative, or geographic limit on derivative-work creation and the method may further comprise rejecting the request when fulfillment of the request would exceed the limit on derivative-work creation. The temporal limits may be encoded within the time constraints 1914, quantitative limits may be specified in the venue constraints 1910 through capacity restrictions, and geographic limits may be implemented through the venue rules 1908 that restrict creation to specific territories or performance locations.

Figure 20:
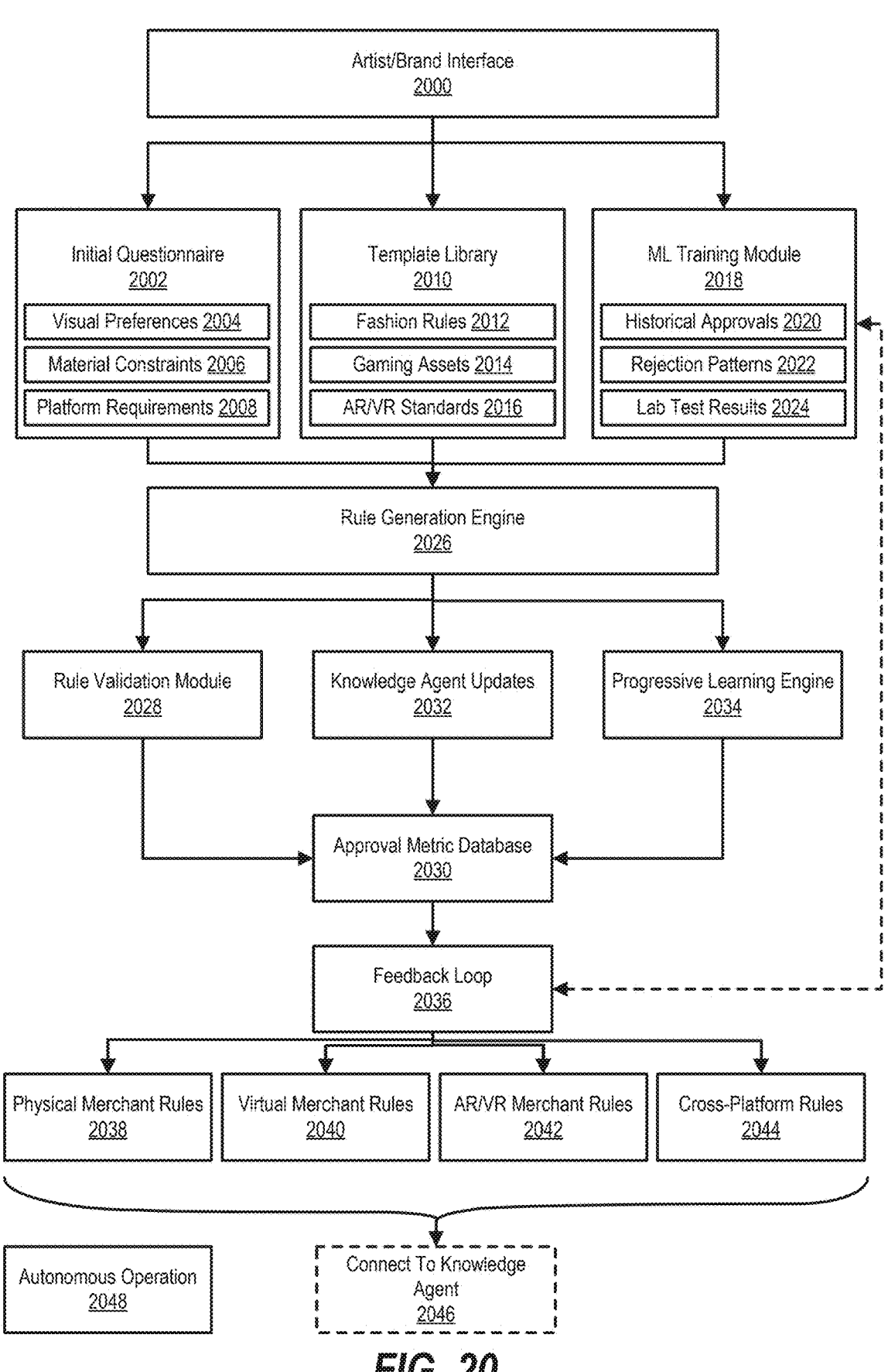
FIG. 20 depicts a schematic diagram of a merchandise rule generation and learning system for establishing and refining transformation parameters for merchandise derivative works in accordance with aspects of the present disclosure.

FIG. 20 depicts a schematic diagram of a merchandise rule generation and learning system for establishing and refining artist-governed transformation parameters for merchandise derivative works in accordance with aspects of the present disclosure. FIG. 20 depicts a comprehensive framework for one-time configuration of merchandise-specific rules that subsequently enable autonomous approval of fan-created derivative works without manual intervention, directly addressing scalability requirements for high-volume merchandise customization across physical and virtual platforms.

An artist brand interface 2000 serves as the primary configuration portal through which content authorities establish transformation parameters for merchandise derivative works. The artist brand interface 2000 may be implemented as a web-based dashboard, mobile application, and/or API-accessible service that enables content owners, their representatives, or authorized management entities to define permissible and prohibited transformations for their branded assets. This interface may correspond to an extended implementation of the content owner interface depicted in FIG. 12, specifically adapted for merchandise-related parameters rather than general content transformations. In some aspects, the artist brand interface 2000 connects to three configuration pathways that collectively establish a rule framework. An initial questionnaire 2002 provides a structured data collection mechanism for capturing content authority preferences through guided interrogation. The initial questionnaire 2002 may be implemented using interview and chatbot techniques described in relation to the prompt system of FIG. 1, adapted to elicit merchandise-specific parameters rather than general transformation themes.

Within the initial questionnaire 2002, visual preferences 2004 capture aesthetic parameters including color palettes, stylistic elements, compositional rules, and/or brand identity guidelines. The visual preferences 2004 may specify acceptable color variations such as permitting pastels but prohibiting neon colors, logo placement constraints such as minimum clear space requirements, or artistic style parameters such as allowing vintage effects but prohibiting grunge aesthetics. Material constraints 2006 define physical production parameters including fabric types, printing methods, durability requirements, and sustainability criteria. For virtual merchandise, the material constraints 2006 may specify rendering parameters such as texture resolution, shader complexity, or polygon count limitations. Platform requirements 2008 establish technical specifications for different distribution channels, including file format requirements for gaming platforms, augmented reality marker specifications, or blockchain standards for NFT implementations.

A template library 2010 provides pre-configured rule sets that content authorities can select and customize rather than defining all parameters from scratch. The template library 2010 accelerates the configuration process by offering industry-standard baselines that can be modified to match specific brand requirements. This corresponds to the rule registry database shown in FIG. 12 but focuses specifically on merchandise transformation rules rather than general content modification parameters.

Fashion rules 2012 within the template library 2010 provide apparel-specific templates covering garment types, print locations, sizing specifications, and fashion industry standards. These templates may be derived from established practices in the fashion and apparel industry, ensuring compatibility with existing production and distribution infrastructure. Gaming assets 2014 offer templates optimized for virtual merchandise in gaming environments, including specifications for different game engines, avatar systems, and virtual economy requirements. These templates account for platform-specific limitations such as texture memory budgets, animation constraints, or multiplayer synchronization requirements. AR/VR standards 2016 provide templates for augmented and virtual reality merchandise, addressing unique requirements such as occlusion handling, lighting consistency, and spatial tracking markers.

An ML training module 2018 leverages historical data and ongoing performance metrics to establish and refine rule parameters through machine learning techniques. The ML training module 2018 implements similar learning mechanisms to the content approval models shown in FIG. 3, but specifically trained on merchandise approval patterns rather than general content transformations.

Historical approvals 2020 comprise a dataset of previously approved merchandise derivatives, including the transformation parameters applied, the resulting designs, and any post-approval performance metrics such as sales data or fan engagement levels. This historical data enables the system to identify patterns in successful merchandise transformations and encode these patterns as rules. Rejection patterns 2022 analyze merchandise derivatives that were rejected either by the automated system or through manual review, identifying common characteristics that led to rejection. This negative training data may be valuable for establishing rule boundaries, helping the system learn what transformations to avoid. Lab test results 2024 may incorporate controlled experimentation data where different rule variations were tested with subset populations to determine optimal parameters. These tests might compare different color palette restrictions, logo size requirements, or platform-specific optimizations to identify rules that maximize both brand protection and fan satisfaction.

A rule generation engine 2026 may synthesize inputs from the initial questionnaire 2002, template library 2010, and/or ML training module 2018 to create a comprehensive rule set for merchandise transformations. The rule generation engine 2026 may employ conflict resolution algorithms to handle contradictory inputs, prioritization mechanisms to weight different rule sources, and/or validation logic to ensure the generated rules are internally consistent and practically implementable. This engine may utilize the same or similar generative artificial intelligence capabilities described for the content derivation platform in FIG. 1, but configured to generate rules rather than derivative works. In some aspects, the generative artificial-intelligence model may be a latent diffusion model that processes rule configuration data through the shared latent space to generate coherent rule sets that maintain consistency across different merchandise categories and platforms.

The rule generation engine 2026 outputs to one or more processing components. For example, a rule validation module 2028 performs verification checks on the generated rules to ensure they are technically feasible, legally compliant, and/or aligned with the content authority's overall brand strategy. This validation may include checking for conflicts with existing licensing agreements, verifying compliance with platform terms of service, or ensuring rules do not inadvertently prohibit all transformations.

Knowledge agent updates 2032 may transfer the validated rules to the knowledge agent shown in FIG. 13, populating it with merchandise-specific transformation parameters. This update process may occur through direct database insertion, API calls, and/or distributed ledger transactions, depending on the implementation architecture. The knowledge agent updates 2032 ensure that the rules are immediately available for enforcement across all merchandise generation requests.

An approval metrics database 2030 aggregates performance data from all three processing components, maintaining comprehensive analytics on rule effectiveness. The approval metrics database 2030 tracks metrics such as approval rates, average processing time, fan satisfaction scores, and revenue per derivative work. These metrics inform both immediate rule adjustments and longer-term strategic decisions about merchandise transformation policies.

A progressive learning engine 2034 implements continuous improvement mechanisms that refine rules based on ongoing usage patterns. Unlike the initial ML training module 2018 which operates on historical data, the progressive learning engine 2034 processes real-time approval decisions, fan feedback, and market performance data to suggest rule adjustments. This creates an adaptive system that improves over time without requiring manual intervention from content authorities. The progressive learning engine 2034 may implement fine-tuning of the latent diffusion model on training data selected according to the transformation theme, prior to generating the derivative work, enabling the system to adapt to emerging trends and user preferences while maintaining brand consistency.

A feedback loop 2036 creates bidirectional data flow between the approval metrics database 2030 and the ML training module 2018, enabling continuous learning and refinement. In some aspects, the feedback loop 2036 prevents system instability from too-frequent rule changes while ensuring the system adapts to evolving market conditions and fan preferences.

The feedback loop 2036 outputs to platform-specific rule sets optimized for different merchandise categories. Physical merchant rules 2038 govern transformations for tangible products such as apparel, accessories, or printed materials, accounting for production constraints, shipping logistics, and/or quality control requirements. Virtual merchant rules 2040 control transformations for digital goods in gaming environments, social platforms, or digital collectible markets, addressing factors such as rendering performance, platform compatibility, and/or digital rights management. AR/VR merchant rules 2042 specify parameters for augmented and virtual reality merchandise, including spatial tracking requirements, occlusion handling, and/or cross-reality synchronization. Cross platform rules 2044 establish universal parameters that apply regardless of the output format, ensuring brand consistency across merchandise categories while allowing platform-specific optimizations.

The system culminates in an autonomous operation module 2048 that processes potentially millions of fan customization requests without manual intervention. A knowledge agent connector 2046 establishes the complete pipeline from rule configuration through to merchandise production, ensuring that the scalable rule generation system seamlessly interfaces with the existing merchandise derivation architecture. This connection establishes integration with the knowledge agent of FIG. 13, enabling the autonomous operation module 2048 to leverage the comprehensive rule sets generated through the learning system.

The system may further comprise executing a smart contract that automatically allocates revenue from each authorized distribution of the derivative work to stakeholders identified in the usage registry. The smart contract interfaces with the approval metrics database 2030 to track successful merchandise transactions and automatically distribute compensation based on the rule parameters established through the artist brand interface 2000. This automated revenue distribution ensures that content authorities, platform operators, and other stakeholders receive appropriate compensation for merchandise created through the autonomous approval system.

The merchandise rule generation and learning system thus provides rule establishment and refinement capabilities necessary for the merchandise derivation system of FIG. 13 to operate autonomously at scale. By enabling content authorities to configure rules once through intuitive interfaces while leveraging machine learning for continuous optimization, the system maintains strict brand control while empowering fans to create personalized merchandise. This architecture ensures that whether processing ten or ten million customization requests, the system maintains consistent application of artist-defined rules while continuously improving its rule parameters based on real-world usage patterns and market performance data.

In some aspects, the merchandise derivation system operates through coordinated interactions between multiple specialized components that collectively enable end-to-end creation and distribution of derivative merchandise works. The system architecture facilitates seamless data flow from initial user requests through validation, generation, production, and fulfillment while maintaining strict adherence to artist-defined constraints and brand guidelines. When a user initiates a merchandise creation request, the system begins with comprehensive validation through the knowledge agent, which may function as a gatekeeper for brand integrity. The knowledge agent evaluates the incoming request against hierarchical rule structures that encompass global artist constraints, tour-specific parameters, venue-based modifications, temporal limitations, and/or fan tier restrictions. This multi-layered validation ensures that only compliant requests proceed to the generation phase, preventing computational resources from being allocated to derivative works that would ultimately be rejected.

Upon successful pre-generation validation, the action agent receives approved parameters and employs generative artificial intelligence to create merchandise designs. The action agent operates within the constraints established by the knowledge agent, utilizing diffusion models and other generative architectures to produce visual designs that maintain brand consistency while incorporating user-specified themes. The bidirectional communication between the knowledge agent and action agent enables iterative refinement during the generation process, with the knowledge agent providing continuous feedback to ensure the evolving design remains within approved parameters.

The post-generation evaluation process implements content analysis to verify that generated merchandise meets all quality and compliance requirements. In some implementations, evaluating the derivative work against the post-generation preference data may comprise generating a content-approval score and approving the derivative work when the content-approval score satisfies a binary pass/fail threshold. This binary evaluation framework ensures that derivative works either meet all necessary standards or require revision, eliminating ambiguity in the approval process. The content-approval score may be determined through analysis of multiple factors including aesthetic quality, brand guideline compliance, technical production feasibility, and content policy adherence.

When derivative works fail to meet the established approval criteria, the system may provide detailed diagnostic information to facilitate improvement. The method may further comprise generating, when the derivative work fails the binary threshold, a remediation report that identifies portions of the derivative work responsible for the failure. The remediation report analyzes specific aspects of the rejected design, such as color palette violations, inappropriate imagery, text legibility issues, or production constraint conflicts. This targeted feedback enables users to understand precisely which elements require modification, supporting an efficient iterative refinement process that guides users toward compliant designs without requiring complete regeneration.

For audio-based merchandise derivatives, the evaluation process may include specialized analysis techniques to ensure appropriate transformation of source content. The method may comprise evaluating the derivative work further by comparing an audio fingerprint of the derivative work with a fingerprint library representing the source content and rejecting the derivative work when fingerprint similarity exceeds a similarity threshold. This fingerprint comparison prevents derivative works from too closely replicating original recordings while ensuring that transformations maintain sufficient creative distance to constitute legitimate derivative works. The fingerprint analysis examines spectral characteristics, temporal patterns, and other audio features to quantify similarity levels and enforce appropriate transformation boundaries.

The system accommodates complex scenarios where derivative works may themselves become source material for subsequent transformations. The method may further comprise, when the derivative work is subsequently received as source content, detecting the digital identifier and replacing the digital identifier with a nested digital identifier that preserves provenance for successive derivative generations. This hierarchical watermarking approach maintains a complete chain of attribution across multiple transformation generations, enabling the system to track the lineage of derivative works and ensure appropriate compensation to all stakeholders involved in the creation process. The nested digital identifier structure preserves metadata from previous transformations while adding new information about the current derivative relationship.

Multi-agent orchestration coordinates the parallel execution of production and commerce operations once designs receive approval. The system simultaneously prepares designs for physical production through print-on-demand services while creating digital commerce infrastructure through e-commerce platforms. This parallel processing architecture minimizes time-to-market while maintaining synchronization between manufacturing and sales operations. The orchestration system manages complex workflows that include file preparation for different production methods, inventory synchronization across multiple fulfillment partners, and real-time coordination between production capacity and storefront availability.

The rule hierarchy system governs the approval process through cascading constraint evaluation that balances brand consistency with contextual flexibility. Global artist rules establish immutable brand standards that apply universally, while tour-specific rules, venue-specific rules, time-based rules, and fan tier rules provide increasingly granular control over merchandise generation. The hierarchical structure enables sophisticated override mechanisms where more specific rules may supersede general constraints when explicitly permitted, while ensuring that fundamental brand requirements remain inviolate. The validation process systematically evaluates proposed designs against all applicable rule levels, generating detailed compliance reports and implementing conflict resolution strategies when contradictory requirements arise.

The learning system continuously refines transformation parameters through analysis of historical approval patterns, user feedback, and market performance data. Machine learning algorithms identify successful transformation patterns and encode these insights as updated rule parameters, enabling the system to improve its approval accuracy over time without requiring manual intervention from content authorities. The progressive learning engine processes real-time approval decisions and fan engagement metrics to suggest rule adjustments that optimize both brand protection and user satisfaction. This adaptive capability ensures that the rule framework evolves with changing market conditions and user preferences while maintaining consistency with established brand guidelines.

Concert-synchronized real-time generation represents an integrated application of all system components working in coordinated fashion to capture ephemeral performance moments and transform them into commemorative merchandise. The system monitors multiple data streams including song lyrics, stage visuals, crowd energy metrics, and venue location data to identify trigger events that warrant merchandise creation. When trigger conditions are met, the system rapidly processes these contextual parameters through the same validation and generation pipeline used for standard merchandise requests, but optimized for low-latency operation required by live event contexts.

The real-time generation capability leverages pre-trained models and cached rule sets to minimize processing delays while concert events are occurring. The system maintains synchronized connections with venue systems, streaming platforms, and mobile applications to ensure temporal accuracy and immediate availability of generated merchandise. Time-limited availability windows and geographic restrictions create scarcity dynamics that enhance the value of concert-specific merchandise while managing production capacity and maintaining exclusivity for attendees.

Revenue distribution and payment processing operate through automated smart contract execution that allocates compensation to stakeholders based on predetermined agreements. The system tracks usage and sales data across multiple distribution channels, automatically calculating and distributing royalties to original content owners, platform operators, manufacturing partners, and other participants in the merchandise creation and distribution process. This automated compensation framework supports complex revenue sharing arrangements while reducing administrative overhead and ensuring timely payments to all stakeholders involved in the derivative work ecosystem.

The comprehensive integration of these system components enables scalable merchandise derivation that maintains artistic integrity while empowering fan creativity. The architecture supports processing volumes ranging from individual custom requests to millions of concurrent merchandise generation operations, with consistent application of brand guidelines and quality standards across all generated items. The modular design enables individual components to be updated or replaced without disrupting overall system operation, ensuring long-term viability as technologies and business requirements continue to evolve.

A number of implementations have been described. Nevertheless, it will be understood that various modifications may be made. For example, the steps of the disclosed techniques may be performed in a different sequence, components of the disclosed systems may be combined in a different manner, or the components may be supplemented with other components. Accordingly, other implementations are contemplated, within the scope of the following claims.

Implementation examples are described in the following number clauses:

Clause 1: A method for multi-stage approval and controlled distribution of a derivative work, the method comprising: receiving a request associated with source content and a transformation theme for creating a derivative work based on the source content; in response to evaluating the request against pre-generation preference data associated with a content authority, generating the derivative work from the source content in accordance with the transformation theme by applying a generative artificial-intelligence model; in response to evaluating the derivative work against post-generation preference data associated with the content authority, embedding a digital identifier comprising at least one of a watermark or fingerprint as part of the derivative work; providing to a usage registry addressable via the digital identifier, usage-constraint metadata for the derivative work; and enabling distribution of the derivative work in accordance with the usage-constraint metadata.

Clause 2: A method for multi-stage approval and controlled distribution of a derivative work, the method comprising: receiving a request associated with source content and a transformation theme for creating a derivative work based on the source content; in response to evaluating the request against pre-generation preference data associated with a content authority, generating the derivative work from the source content in accordance with the transformation theme by applying a generative artificial-intelligence model; in response to evaluating the derivative work against post-generation preference data associated with the content authority, generating a digital identifier based on the derivative work; enabling at least one of distribution or usage of the derivative work in accordance with the digital identifier.

Clause 3: The method of any one of Clauses 1-2, wherein the request is received through a user interface presented on a client device.

Clause 4: The method of Clause 3, wherein the request comprises a natural-language prompt, and the method further comprises extracting the transformation theme by parsing the natural-language prompt with a large-language-model parser.

Clause 5: The method of any one of Clauses 1-4, wherein the request is generated automatically by an application from contextual data without explicit user input.

Clause 6: The method of any one of Clauses 1-5, wherein evaluating the request against the pre-generation preference data comprises applying a machine-learning classifier trained on historical approvals and rejections designated by the content authority.

Clause 7: The method of Clause 6, further comprising: transmitting the request to an external verification service designated by the content authority; and approving the request for generation when both the machine-learning classifier and the external verification service return an approval indication.

Clause 8: The method of any one of Clauses 1-7, wherein the pre-generation preference data specifies at least one of a temporal, quantitative, or geographic limit on derivative-work creation and the method further comprises rejecting the request when fulfilment of the request would exceed the limit on derivative-work creation.

Clause 9: The method of any one of Clauses 1-8, wherein the generative artificial-intelligence model is a latent diffusion model.

Clause 10: The method of Clause 9, further comprising fine-tuning the latent diffusion model on training data selected according to the transformation theme, prior to generating the derivative work.

Clause 11: The method of any one of Clauses 1-10, wherein evaluating the derivative work against the post-generation preference data comprises generating a content-approval score and approving the derivative work when the content-approval score satisfies a binary pass/fail threshold.

Clause 12: The method of Clause 11, further comprising generating, when the derivative work fails the binary threshold, a remediation report that identifies portions of the derivative work responsible for the failure.

Clause 13: The method of any one of Clauses 11-12, wherein evaluating the derivative work further comprises: comparing an audio fingerprint of the derivative work with a fingerprint library representing the source content; and rejecting the derivative work when fingerprint similarity exceeds a similarity threshold.

Clause 14: The method of any one of Clauses 1-13, wherein the digital identifier is a pointer that resolves to a remote record storing at least one of provenance data, attribution data or licensing data for the derivative work.

Clause 15: The method of Clause 14, wherein the pointer comprises a cryptographically signed hash and the method further comprises verifying the cryptographic signature before enabling distribution of the derivative work.

Clause 16: The method of any one of Clauses 1-15, further comprising, when the derivative work is subsequently received as source content, detecting the digital identifier and replacing the digital identifier with a nested digital identifier that preserves provenance for successive derivative generations.

Clause 17: The method of any one of Clauses 1-16, wherein the usage-constraint metadata includes a time-to-live value and an authorization server automatically disables distribution of the derivative work upon expiry of the time-to-live value.

Clause 18: The method of Clause 17, further comprising updating the usage registry with a renewed time-to-live value in response to receipt of a renewal payment.

Clause 19: The method of any one of Clauses 1-18, wherein the usage-constraint metadata comprises at least one of: distribution channel restrictions; monetization parameters; attribution requirements; time-limited usage permissions; or geographical distribution limitations.

Clause 20: The method of any one of Clauses 1-19, wherein the usage-constraint metadata includes a geographic whitelist and an authorization server enforces the geographic whitelist by geolocating each distribution request.

Clause 21: The method of any one of Clauses 1-20, further comprising executing a smart contract that automatically allocates revenue from each authorized distribution of the derivative work to stakeholders identified in the usage registry.

Clause 22: The method of Clause 1-21, wherein the smart contract is triggered by an authorization server each time the digital identifier is verified during a streaming session and records each distribution event in a distributed ledger.

Clause 23: The method of any one of Clauses 1-22, wherein evaluating the derivative work against post-generation preference data comprises: analyzing the derivative work for unauthorized incorporation of third-party content;

comparing the derivative work against objectionable content criteria; and scoring the derivative work based on quality thresholds defined by the content authority.

Clause 24: The method of Clause 23, further comprising rejecting the derivative work if the score falls below a predetermined threshold.

Clause 25: The method of any one of Clauses 1-24, wherein the post-generation evaluation is performed by a third-party service independent from the entity generating the derivative work.

Clause 26: The method of any one of Clauses 1-25, wherein: the pre-generation preference data comprises exclusionary criteria identifying at least one of themes, topics, or content elements prohibited from inclusion in the derivative work; and evaluating the request against pre-generation preference data comprises: identifying keywords or semantic elements within the request; comparing the identified keywords or semantic elements against the exclusionary criteria; and rejecting the request if the identified keywords or semantic elements match the exclusionary criteria.

Clause 27: The method of any one of Clauses 1-26, wherein the pre-generation preference data is periodically updated based on machine learning analysis of previously approved and rejected derivative works.

Clause 28: The method of any one of Clauses 1-27, wherein generating the derivative work comprises maintaining predetermined elements of the source content while modifying other elements according to the transformation theme.

Clause 29: The method of Clause 28, wherein the predetermined elements comprise at least one of original vocals, melody lines, rhythm patterns, or visual components.

Clause 30: The method of any one of Clauses 1-29, wherein the transformation theme comprises at least one of a musical key change, a tempo modification, a genre shift, a vocal replacement, an instrumental addition, a remix specification, or a style transfer parameter.

Clause 31: A method for multi-stage approval and controlled distribution of a derivative work, the method comprising: receiving a request associated with source content and a transformation theme for creating a derivative work based on the source content; in response to evaluating the request against pre-generation preference data associated with a content authority and confirming compliance with content authority guidelines, generating the derivative work from the source content in accordance with the transformation theme through the use o a generative artificial-intelligence model; in response to confirming compliance of the derivative work against post-generation guidelines from the content authority, if any, generating a digital identifier comprising at least one of a watermark, fingerprint, embedded metadata, or external metadata payload or entry in a content database.

Clause 32: The method of Clause 31, wherein the request has been verified through a usage registry and addressable via a digital identifier, watermark, fingerprint, embedded metadata, or external metadata payload for the derivative work; and enabling or disabling distribution or the hearing or viewing of the derivative work in accordance with the usage-constraint metadata payload.

Clause 33: A method for approval and controlled distribution of a derivative work, the method comprising: receiving a request associated with source content and a transformation theme for creating a derivative work based on the source content; in response to evaluating the request against pre-generation preference data associated with a content authority, generating the derivative work from the source content in accordance with the transformation theme through the use of a generative artificial-intelligence model; generating a digital identifier comprising at least one of a watermark, fingerprint, embedded metadata, hash, external metadata payload, or entry in a content database for the derivative work; providing the digital identifier to a usage registry; and enabling or disabling distribution of the derivative work based on usage constraints associated with the digital identifier.

Clause 34: A method for approval and controlled distribution of a derivative work, the method comprising: receiving a request associated with source content and a transformation theme for creating a derivative work based on the source content; in response to evaluating the request against pre-generation preference data associated with a content authority, generating the derivative work from the source content in accordance with the transformation theme through the use of a generative artificial-intelligence model; generating a digital identifier based on the derivative work; providing at least one of the digital identifier or data associated with the digital identifier to a usage registry; and enabling or disabling at least one of distribution or usage of the derivative work based on usage constraints associated with the at least one of the digital identifier or data associated with the digital identifier.

Clause 35: The method of any one of Clauses 33-34, wherein evaluating the request against pre-generation preference data comprises confirming compliance with content authority guidelines before generating the derivative work.

Clause 36: The method of any one of Clauses 33-35, further comprising: receiving a subsequent request to access the derivative work; verifying the subsequent request by querying the usage registry using the digital identifier to retrieve associated usage constraints; and selectively enabling or disabling playback, viewing, or distribution of the derivative work in accordance with the retrieved usage constraints.

Clause 37: The method of any one of Clauses 33-36, wherein the pre-generation preference data comprises exclusionary criteria identifying at least one of themes, topics, or content elements prohibited from inclusion in the derivative work.

Clause 38: The method of any one of Clauses 33-37, wherein evaluating the request against pre-generation preference data comprises applying a machine-learning classifier trained on historical approvals and rejections designated by the content authority.

Clause 39: The method of any one of Clauses 33-38, wherein the generative artificial-intelligence model is a latent diffusion model.

Clause 40: The method of any one of Clauses 33-39, wherein the usage constraints include at least one of: distribution channel restrictions, monetization parameters, attribution requirements, time-limited usage permissions, or geographical distribution limitations.

Clause 41: The method of any one of Clauses 33-40, wherein the digital identifier is a pointer that resolves to a remote record storing at least one of provenance data, attribution data, or licensing data for the derivative work.

Clause 42: The method of any one of Clauses 33-41 further comprising executing a smart contract that automatically allocates revenue from each authorized distribution of the derivative work to stakeholders identified in the usage registry.

Clause 43: The method of Clause 42, wherein the smart contract is triggered when the digital identifier is verified during a streaming session and records each distribution event in a distributed ledger.

Clause 44: The method of any one of Clauses 33-43, wherein the usage registry includes a time-to-live value and an authorization server automatically disables distribution of the derivative work upon expiry of the time-to-live value.

Clause 45: The method of any one of Clauses 33-44, wherein generating the derivative work comprises maintaining predetermined elements of the source content while modifying other elements according to the transformation theme, wherein the predetermined elements comprise at least one of original vocals, melody lines, rhythm patterns, or visual components.

Clause 46: The method of any one of Clauses 33-45, wherein the usage registry is configured to store transactional data including access history, distribution events, and royalty disbursement logs for the derivative work.

Clause 47: The method of any one of Clauses 33-46, wherein the enabling or disabling of distribution is performed by an authorization server that verifies digital identifier validity and retrieves associated distribution rights in real time.

Clause 48: The method of any one of Clauses 33-47, further comprising revoking access to the derivative work by invalidating the digital identifier in response to a policy breach, rights revocation, or time-based expiration condition.

Clause 49: The method of any one of Clauses 33-48, wherein the transformation theme is determined based on an interactive interview conducted via a chatbot interface, the interview responses being semantically mapped to pre-approved thematic vectors.

Clause 50: A processing system, comprising: a memory comprising computer-executable instructions; and a processor configured to execute the computer-executable instructions and cause the processing system to perform a method in accordance with any one of Clauses 1-49.

Clause 51: A processing system, comprising means for performing a method in accordance with any one of Clauses 1-49.

Clause 52: A non-transitory computer-readable medium storing program code for causing a processing system to perform the steps of any one of Clauses 1-49.

Clause 53: A computer program product embodied on a computer-readable storage medium comprising code for performing a method in accordance with any one of Clauses 1-49.

Clause 54: An apparatus configured to perform multi-stage approval and controlled distribution of a derivative work, comprising: one or more memories configured to store a request associated with source content and a transformation theme for creating a derivative work based on the source content; and one or more processors, coupled to the one or more memories, configured to: in response to an evaluation of the request against pre-generation preference data associated with a content authority, generate the derivative work from the source content in accordance with the transformation theme using a generative artificial-intelligence model; in response to an evaluation of the derivative work against post-generation preference data associated with the content authority, embed a digital identifier comprising at least one of a watermark or fingerprint as part of the derivative work; provide to a usage registry addressable via the digital identifier, usage-constraint metadata for the derivative work;

and enable distribution of the derivative work in accordance with the usage-constraint metadata.

Clause 55: A system for rule-based generation of derivative works using artificial intelligence, the system comprising: a user interface configured to receive a transformation request comprising a selected content identifier and a requested theme; a rule registry database storing transformation rules associated with a plurality of content identifiers, the transformation rules comprising at least one of: one or more permitted operations; one or more prohibited operations; one or more approved themes; usage limitations; or geographic and temporal restrictions; a rule verification engine operatively coupled to the user interface and the rule registry database, the rule verification engine configured to: retrieve a rule set corresponding to the selected content identifier, evaluate the transformation request against the retrieved rule set, and generate an approval output when the transformation request complies with the rule set; and a generative artificial intelligence module operatively coupled to the rule verification engine, the generative artificial intelligence module configured to generate a derivative work as a function of the requested theme and the selected content identifier, in response to the approval output.

Clause 56: The system of Clause 55, wherein the rule verification engine is further configured to transmit one or more suggested alternatives to the user interface in response to a rejected transformation request.

Clause 57: The system of any one of Clauses 55-56, further comprising a digital identifier generator configured to produce a unique identifier for the derivative work, the identifier comprising at least one of: a watermark, a fingerprint, embedded metadata, a cryptographic hash, an external metadata payload, or an entry in a remote content registry.

Clause 58: The system of any one of Clauses 55-57, further comprising an authorization module operatively coupled to the digital identifier generator, the authorization module configured to enable or disable distribution of the derivative work based on usage constraints associated with the digital identifier.

Clause 59: A method for generating merchandisable derivative works from designated source content, the method comprising: receiving a request to generate a derivative work from designated source content, wherein the derivative work comprises a merchandisable derivative, generated from designated source content, for application to at least one of a physical item or a virtual merchandise item; evaluating the request against transformation constraints derived from preference data; generating, upon determining the request satisfies at least a portion of the transformation constraints, the derivative work by applying a generative model to the source content using parameters derived from the preference data; evaluating the generated derivative work against output requirements derived from the preference data; and upon determining compliance with the output requirements, triggering a distribution of the derivative work through one or more of a digital merchandise platform, a physical manufacturing system, or a cross-platform digital asset registry.

Clause 60: The method of Clause 59, wherein the derivative work comprises a virtual merchandise item selected from the group consisting of avatar skins, digital clothing, accessories, in-game items, or augmented reality assets.

Clause 61: The method of any one of Clauses 59-60, wherein generating the derivative work comprises transforming a three-dimensional model or texture while preserving brand-identifying features specified in the preference data.

Clause 62: The method of any one of Clauses 59-61, wherein the transformation constraints comprise predefined permissible modifications including at least one of: color variations, pattern applications, dimensional scaling, or text insertions.

Clause 63: The method of Clause 62, wherein modifications exceeding the predefined permissible modifications trigger a manual review prior to derivative work generation.

Clause 64: The method of any one of Clauses 59-63, wherein triggering distribution comprises embedding a digital watermark or metadata to enable tracking of the derivative work across multiple digital platforms or metaverse environments.

Clause 65: The method of any one of Clauses 59-64, wherein triggering distribution comprises transmitting the derivative work to a print-on-demand system for physical item production.

Clause 66: The method of any one of Clauses 59-65, wherein triggering distribution comprises transmitting the derivative work to a digital storefront for availability as a virtual merchandise item.

Clause 67: The method of any one of Clauses 59-66, wherein generating the derivative work and triggering the distribution of the derivative work are executed through multi-agent orchestration comprising: a knowledge agent to maintain brand constraints and validate designs; an action agent to apply a generative artificial intelligence model to generate the derivative work; and a distribution agent to manage physical production and virtual merchandise deployment.

Clause 68: The method of any one of Clauses 59-67, wherein the preference data comprises a hierarchical rule system including a plurality of rule levels, each rule level of the plurality of rule levels including at least one of global rules, tour-specific rules, venue-specific rules, time-based rules, or fan-tier rules, and each rule level inheriting constraints from higher rule levels.

Clause 69: The method of any one of Clauses 59-68, wherein evaluating the request against the transformation constraints further comprises filtering the request against prohibited content categories defined in the preference data.

Clause 70: The method of any one of Clauses 59-69, wherein the preference data is updated in response to artist or brand-owner inputs specifying additional transformation constraints or output requirements.

Clause 71: The method of any one of Clauses 59-70, wherein the system processes a plurality of merchandise creation requests autonomously using the preference data.

Clause 72: The method of any one of Clauses 59-71, wherein the preference data is established through an artist brand interface comprising at least one of: an initial questionnaire, a template library, or a machine learning training module configured to define transformation parameters for merchandise generation.

Clause 73: The method of any one of Clauses 59-72, wherein triggering the distribution of the derivative work further comprises embedding multi-layered authentication markers, including at least one of: holographic tags, QR codes, RFID chips, metadata embedding, blockchain registration, or platform-specific identifiers.

Clause 74: The method of any one of Clauses 59-73, wherein when the derivative work is subsequently received as source content, the system assigns a nested identifier preserving provenance across multiple generations of derivative works.

Clause 75: The method of any one of Clauses 59-74, further comprising executing a smart contract that allocates revenue from distribution of the derivative work to multiple stakeholders.

Clause 76: The method of any one of Clauses 59-75, further comprising tracking usage of the derivative work across physical distribution channels and virtual distribution channels; and determining one or more royalties or enforcement actions based on the tracking.

Clause 77: The method of any one of Clauses 59-76, wherein evaluating the generated derivative work against the output requirements comprises applying a machine learning model trained to detect non-compliant elements relative to the preference data.

Clause 78: The method of any one of Clauses 59-77, wherein the preference data is generated by a machine learning system trained on historical approval and rejection decisions.

Clause 79: The method of any one of Clauses 59-78, wherein the designated source content comprises content that has been registered in a controlled content library with associated transformation permissions.

Clause 80: The method of any one of Clauses 59-79, wherein the generative model comprises at least one of a diffusion model, a generative adversarial network, or a transformer-based model trained on merchandise design patterns.

Clause 81: The method of any one of Clauses 59-80, wherein triggering distribution comprises automatically routing the derivative work to distribution channels selected based on the format and characteristics of the derivative work.

Clause 82: The method of any one of Clauses 59-81, wherein the request is generated automatically in response to a trigger event detected during a live performance, the trigger event comprising at least one of: initiation of a particular song, detection of a crowd energy threshold, or occurrence of a stage visual effect.

Clause 83: The method of any one of Clauses 59-82, wherein receiving the request comprises: providing an interactive interface enabling a customization of the derivative work; and validation the derivative work against the transformation constraints.

Clause 84: A method for generating merchandise derivative works during a performance, the method comprising: receiving event data streams comprising at least one of: current song lyrics, stage visuals, lighting parameters, crowd engagement metrics, or venue location data; identifying a trigger event within the event data streams; generating, responsive to the trigger event, a merchandise derivative work by applying a generative model to designated source content using parameters derived from the event data streams; evaluating the merchandise derivative work against transformation constraints defined in preference data; and upon determining compliance with the transformation constraints, triggering a distribution of the merchandise derivative work with availability restricted by at least one of a temporal availability window or a geographic region.

Clause 85: The method of Clause 84, wherein the trigger event comprises a performance milestone comprising at least one of initiation of a particular song, occurrence of a lighting effect, detection of a crowd energy threshold, or commencement of an encore event.

Clause 86: The method of any one of Clauses 84-85, wherein the event data streams further comprise one or more of: audio fingerprint data, visual stage effect data, motion detection data, or social media sentiment analysis.

Clause 87: The method of any one of Clauses 84-86, wherein generating the merchandise derivative work comprises combining captured lyric fragments, color palettes derived from stage lighting, and audience engagement metrics to create a context-specific design incorporated into the merchandise derivative work.

Clause 88: The method of any one of Clauses 84-87, wherein the temporal availability window is defined by a time-to-live parameter enforced by an authorization server.

Clause 89: The method of any one of Clauses 84-88, wherein triggering distribution further comprises applying the geographic restrictions through geo-fencing, limiting availability to at least one of a venue region or a verified attendee population.

Clause 90: The method of any one of Clauses 84-89, wherein triggering distribution comprises simultaneously generating physical merchandise through a print-on-demand system and virtual merchandise assets for deployment to one or more digital platforms.

Clause 91: The method of any one of Clauses 84-90, wherein triggering distribution further comprises minting a digital token on a distributed ledger to record at least one of ownership, provenance, or attendance verification for the merchandise derivative work.

Clause 92: The method of any one of Clauses 84-91, further comprising providing an interactive interface enabling customization of the merchandise derivative work during the performance.

Clause 93: The method of any one of Clauses 84-92, wherein identifying the trigger event comprises analyzing the event data streams to detect statistical anomalies indicating noteworthy performance moments.

Clause 94: A method for governing generation of derivative works, the method comprising: receiving a creation request specifying source content and customization parameters; validating the request against a hierarchical rule structure comprising global rules, context-specific rules, and user-specific rules, each rule level inheriting constraints from higher levels; resolving conflicts between applicable rules according to predetermined override hierarchies; approving the request when the request satisfies all applicable hierarchical rules; and transmitting the approved request for derivative work generation.

Clause 95: The method of Clause 94, wherein the global rules establish non-overridable constraints including at least one of: approved color palettes, mandatory inclusion of brand elements, or exclusion of prohibited content.

Clause 96: The method of any one of Clauses 94-95, wherein the context-specific rules comprise modifications tied to at least one of: a temporal event, a geographic location, a promotional campaign, or a performance series.

Clause 97: The method of any one of Clauses 94-96, wherein the user-specific rules comprise access restrictions based on user attributes including at least one of: subscription tier, purchase history, or verified attendance.

Clause 98: The method of any one of Clauses 94-97, wherein resolving conflicts comprises applying a priority scheme in which more specific rules override general rules except where designated as non-overridable.

Clause 99: The method of any one of Clauses 94-98, wherein validating the request comprises applying a machine-learning model trained on historical rule application patterns.

Clause 100: The method of any one of Clauses 94-99, wherein the hierarchical rule structure is updated through a configuration interface receiving inputs defining transformation parameters.

Clause 101: The method of any one of Clauses 94-100, further comprising generating, upon rejection of the request, a remediation report identifying specific rule violations.

Clause 102: The method of any one of Clauses 94-101, wherein approving the request comprises embedding a compliance indicator in metadata associated with the generated derivative work.

Clause 103: The method of any one of Clauses 94-102, wherein the hierarchical rule structure governs generation of merchandise derivative works.

Clause 104: The method of any one of Clauses 94-103, wherein the hierarchical rule structure comprises at least three levels with each subordinate level capable of adding constraints but not removing constraints from superior levels.

Clause 105: The method of any one of Clauses 94-104, wherein context-specific rules are automatically activated based on at least one of: temporal conditions, geographic conditions, or event detection.

Clause 106: The method of any one of Clauses 94-105, wherein the hierarchical rule structure is stored as a directed acyclic graph with inheritance relationships between rule nodes.

Clause 107: The method of any one of Clauses 94-106, further comprising caching frequently-accessed rule combinations to reduce validation latency for subsequent requests.

Clause 108: The method of any one of Clauses 94-107, wherein validating the request occurs in stages, with early termination upon detection of a global rule violation.

Clause 109: The method of any one of Clauses 94-108, wherein the predetermined override hierarchies are configurable by a content authority.

Clause 110: The method of any one of Clauses 94-109, wherein the creation request is automatically generated based on contextual data without explicit user input.

Clause 111: A method for enabling user co-creation of merchandise derivative works with validation, the method comprising: providing an interface configured to receive user selections from a content library; generating, via a generative model, one or more design variations incorporating the user-selected content; receiving user customization inputs for modifying the design variations; applying the customization inputs to the design variations while validating the modified designs in against transformation constraints; presenting a preview of the validated merchandise derivative work; and upon user approval, transmitting the validated merchandise derivative work for distribution.

Clause 112: The method of any one of Clauses 59-111, wherein the content library comprises designated source content including at least one of: logos, fonts, textual content, visual artwork, or event-specific imagery.

Clause 113: The method of any one of Clauses 111-112, wherein the generative model generates multiple design variations; and wherein one or more design variations of the multiple design variations are presented to a user.

Clause 114: The method of any one of Clauses 111-113, wherein the validation prevents modifications that would violate at least one of: transformation constraints, licensing restrictions, or production requirements.

Clause 115: The method of any one of Clauses 111-114, wherein presenting the preview comprises rendering the merchandise derivative work on a three-dimensional model.

Clause 116: The method of any one of Clauses 111-115, wherein presenting the preview comprises an augmented reality overlay on a camera feed.

Clause 117: The method of any one of Clauses 111-116, wherein the customization inputs are received via at least one of: touch controls, gesture recognition, or natural language commands.

Clause 118: The method of any one of Clauses 111-117, wherein the validation comprises comparing the modified design against a constraint database.

Clause 119: The method of any one of Clauses 111-118, further comprising providing automated feedback when a customization input violates a constraint, the feedback comprising suggested compliant alternatives.

Clause 120: The method of any one of Clauses 111-119, wherein the preview comprises simultaneous display of multiple design variations.

Clause 121: The method of any one of Clauses 111-120, wherein transmitting the validated merchandise derivative work comprises routing the validated merchandise derivative work to multiple distribution channels simultaneously.

Clause 122: The method of any one of Clauses 111-121, wherein the validation occurs within a latency threshold enabling immediate visual feedback for each customization input.

Clause 123: The method of any one of Clauses 111-122, wherein the interface adapts available customization options based on the selected distribution channel.

Clause 124: The method of any one of Clauses 111-123, wherein the validation occurs through parallel processing by a knowledge agent while an action agent generates the visual preview.

Clause 125: The method of any one of Clauses 111-124, wherein user approval triggers automatic payment processing and production queue insertion.

Clause 126: A method for orchestrating derivative work generation using multiple autonomous agents, the method comprising: receiving a creation request specifying source content and customization parameters; processing the request with a knowledge agent configured to validate the request against transformation constraints; transmitting approved parameters from the knowledge agent to an action agent; generating, by the action agent, a derivative work using a generative model operating within the approved parameters; validating the generated derivative work through iterative feedback between the action agent and the knowledge agent; and upon validation, routing the approved derivative work to a distribution agent configured to initiate distribution.

Clause 127: The method of any one of Clauses 59-126, wherein the knowledge agent maintains a rules database comprising hierarchical constraints and approval guidelines.

Clause 128: The method of any one of Clauses 126-127, wherein the action agent comprises a generative artificial intelligence model.

Clause 129: The method of any one of Clauses 126-128, wherein the iterative feedback comprises bidirectional communication between the knowledge agent and the action agent during generation.

Clause 130: The method of any one of Clauses 126-129, wherein the distribution agent formats the approved derivative work for multiple distribution channels.

Clause 131: The method of any one of Clauses 126-130, wherein the distribution agent manages revenue allocation through automated contract execution.

Clause 132: The method of any one of Clauses 126-131, wherein the multiple autonomous agents are coordinated by a contract orchestrator synchronizing operations among the agents.

Clause 133: The method of any one of Clauses 126-132, wherein each agent operates independently with defined interfaces, enabling individual agent updates without system disruption.

Clause 134: The method of any one of Clauses 126-133, wherein the knowledge agent performs pre-generation validation and the action agent performs generation, with validation occurring before computational resources are allocated to generation.

Clause 135: The method of any one of Clauses 126-134, wherein the iterative feedback includes a maximum iteration threshold, after which the derivative work is either approved with modifications or rejected.

Clause 136: The method of any one of Clauses 126-135, further comprising instantiating specialized distribution agents for different output formats, including a print agent for physical merchandise and a digital agent for virtual assets.

Clause 137: The method of any one of Clauses 126-136, wherein the agents communicate through an event-driven architecture with asynchronous message passing.

Clause 138: The method of any one of Clauses 126-137, wherein the knowledge agent caches frequently-used validation results to reduce processing latency for similar requests.

Clause 139: The method of any one of Clauses 126-138, wherein agent failures trigger automatic failover to backup agents maintaining operational continuity.

Clause 140: The method of any one of Clauses 126-139, wherein the orchestration includes monitoring agent performance metrics and dynamically reallocating resources based on workload.

Clause 141: The method of any one of Clauses 126-140, wherein the action agent maintains multiple generative models optimized for different derivative work types, with model selection based on the creation request parameters.

Clause 142: The method of any one of Clauses 126-141, wherein the agents generate audit logs tracking decision rationale for compliance and debugging purposes.

Clause 143: A processing system, comprising: a memory comprising computer-executable instructions; and a processor configured to execute the computer-executable instructions and cause the processing system to perform a method in accordance with any one of Clauses 59-142.

Clause 144: A processing system, comprising means for performing a method in accordance with any one of Clauses 59-142.

Clause 145: A non-transitory computer-readable medium storing program code for causing a processing system to perform the steps of any one of Clauses 59-142.

Clause 146: A computer program product embodied on a computer-readable storage medium comprising code for performing a method in accordance with any one of Clauses 59-142.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

A number of implementations have been described. Nevertheless, it will be understood that various modifications may be made without departing from the spirit and scope of the disclosure. Accordingly, other implementations are within the scope of the following claims.

What is claimed is:

1. A method for generating merchandisable derivative works from designated source content, the method comprising:

receiving a request to generate a merchandisable derivative work from designated source content having transformation constraints established by a content authority, the transformation constraints defining permissible and prohibited transformations applicable to the designated source content for merchandise derivation, wherein the merchandisable derivative work is for application to at least one of a physical item or a virtual merchandise item;

evaluating the request against one or more of the transformation constraints established by the content authority;

upon determining the request satisfies one or more of the transformation constraints, generating the merchandisable derivative work comprising a merchandise design by applying a generative model to the designated source content, wherein generating the merchandisable derivative work comprises transforming a three-dimensional model or texture while preserving brand-identifying features specified in brand guidelines;

evaluating the generated merchandisable derivative work against compliance criteria established by the content authority, the compliance criteria including brand guidelines defining permissible and impermissible visual characteristics for merchandisable derivative works, wherein evaluating the generated merchandisable derivative work against the compliance criteria comprises comparing the generated merchandisable derivative work to the brand guidelines to detect non-compliant visual elements; and upon determining compliance with the compliance criteria, triggering commercial distribution of the generated merchandisable derivative work through one or more of a digital merchandise platform, a physical manufacturing system, or a cross-platform digital asset registry.

2. The method of claim 1, wherein the merchandisable derivative work is configured for application to a virtual merchandise item selected from the group consisting of avatar skins, digital clothing, accessories, in-game items, or augmented reality assets.

3. The method of claim 1, wherein the transformation constraints comprise predefined permissible modifications including at least one of: color variations, pattern applications, dimensional scaling, or text insertions.

4. The method of claim 3, wherein modifications exceeding the predefined permissible modifications trigger a manual review prior to merchandisable derivative work generation.

5. The method of claim 1, wherein triggering commercial distribution comprises embedding at least one of a digital watermark or metadata in the merchandisable derivative work to enable tracking across at least one of a digital platform or metaverse environment.

6. The method of claim 1, wherein triggering commercial distribution comprises transmitting the merchandisable derivative work to a print-on-demand system for physical item production.

7. The method of claim 1, wherein triggering commercial distribution comprises transmitting the merchandisable derivative work to a digital storefront for availability as a virtual merchandise item.

8. The method of claim 1, wherein generating the merchandisable derivative work and triggering the commercial distribution of the merchandisable derivative work are executed through multi-agent orchestration comprising:

a knowledge agent to maintain transformation constraints and brand guidelines, and validate designs;

an action agent to apply a generative artificial intelligence model to generate the merchandisable derivative work; and a distribution agent to manage physical production and virtual merchandise deployment.

9. The method of claim 1, wherein the transformation constraints comprise a hierarchical rule system including a plurality of rule levels, each rule level of the plurality of rule levels including at least one of global rules, tour-specific rules, venue-specific rules, time-based rules, or fan-tier rules, and each rule level inheriting constraints from higher rule levels.

10. The method of claim 1, wherein evaluating the request against the transformation constraints further comprises filtering the request against prohibited content categories established by the content authority.

11. The method of claim 1, further comprising processing a plurality of merchandise creation requests autonomously based on the transformation constraints established by the content authority.

12. The method of claim 1, wherein evaluating the generated merchandisable derivative work against the compliance criteria comprises applying a machine learning model trained to detect non-compliant elements relative to the brand guidelines.

13. The method of claim 1, wherein the transformation constraints are generated by a machine learning system trained on historical approval and rejection decisions.

14. The method of claim 1, wherein the designated source content comprises content that has been registered in a controlled content library with associated transformation permissions.

15. The method of claim 1, wherein the generative model comprises at least one of a diffusion model, a generative adversarial network, or a transformer-based model trained on merchandise design patterns.

16. The method of claim 1, wherein triggering commercial distribution comprises automatically routing the merchandisable derivative work to distribution channels selected based on a format and characteristics of the merchandisable derivative work.

17. The method of claim 1, wherein the request is generated automatically in response to a trigger event detected during a live performance, the trigger event comprising at least one of: initiation of a particular song, detection of a crowd energy threshold, or occurrence of a stage visual effect.

18. A method for generating merchandisable derivative works during a performance, the method comprising:

receiving event data streams comprising at least one of: current song lyrics, stage visuals, lighting parameters, crowd engagement metrics, or venue location data;

identifying a trigger event within the event data streams;

generating, responsive to the trigger event, a merchandisable derivative work comprising a merchandise design by applying a generative model to designated source content using parameters derived from the event data streams, wherein generating the merchandisable derivative work comprises transforming a three-dimensional model or texture while preserving brand-identifying features specified in brand guidelines;

evaluating the merchandisable derivative work against compliance criteria established by a content authority, the compliance criteria including brand guidelines defining permissible and impermissible visual characteristics for merchandisable derivative works, wherein evaluating the merchandisable derivative work against the compliance criteria comprises comparing the merchandisable derivative work to the brand guidelines to detect noncompliant visual elements; and upon determining compliance with the compliance criteria, triggering commercial distribution of the merchandisable derivative work with availability restricted by at least one of a temporal availability window or a geographic region.

19. The method of claim 18, further comprising providing an interactive interface enabling customization of the merchandisable derivative work during the performance.

* * * * *